United States Patent [19]

Ikenoue et al.

[11] Patent Number: 5,191,648
[45] Date of Patent: Mar. 2, 1993

[54] IMAGE PROCESSING SYSTEM

[75] Inventors: Yoshikazu Ikenoue; Hirokazu Yamada; Syuzi Maruta; Kazuhiro Araki, all of Osaka; Kaoru Hashimoto, Amagasaki, all of Japan

[73] Assignee: Minolta Camera Kabushiki Kaisha, Osaka, Japan

[21] Appl. No.: 377,943

[22] Filed: Jul. 10, 1989

[30] Foreign Application Priority Data

Jul. 11, 1988 [JP] Japan .................. 63-172443
Jul. 11, 1988 [JP] Japan .................. 63-172444
Jul. 11, 1988 [JP] Japan .................. 63-172445

[51] Int. Cl.⁵ ............... G06F 15/16; G06F 13/00
[52] U.S. Cl. ....................... 395/200; 395/325; 395/800; 364/DIG. 1; 364/230.4; 364/232.9; 364/931.44; 364/942.4
[58] Field of Search ............. 395/325, 200, 800; 364/200 MS File, 900 MS File

[56] References Cited

U.S. PATENT DOCUMENTS

| | | | |
|---|---|---|---|
| 4,495,573 | 1/1985 | Ballegeer et al. | 364/200 |
| 4,523,299 | 6/1985 | Donohue et al. | 355/210 |
| 4,556,310 | 12/1985 | Masuda | 355/202 |
| 4,700,292 | 10/1987 | Campanini | 364/200 |
| 4,750,115 | 6/1988 | Sekiya et al. | 364/200 |
| 4,750,115 | 6/1988 | Sekiya et al. | 395/200 |
| 4,847,756 | 7/1989 | Ito et al. | 364/200 |
| 4,949,241 | 8/1990 | Iwasaki et al. | 364/200 |
| 4,979,108 | 12/1990 | Crabbe, Jr. | 364/200 |

FOREIGN PATENT DOCUMENTS 61-103297 5/1986 Japan .
61-103298 5/1986 Japan .
61-103299 5/1986 Japan .
61-103345 5/1986 Japan .

Primary Examiner—Lawrence E. Anderson
Assistant Examiner—Krisna Lim
Attorney, Agent, or Firm—Burns, Doane, Swecker & Mathis

[57] ABSTRACT

An image processing system having operating and stand-by modes of operation which are to be selectively put into effect, including a plurality of slave data processors each operative to execute a set of predetermined functions assigned thereto, a master data processor for controlling the operation of each data processor, the master data processor being operative to output a data processing command requesting any of the slave data processors to execute any of the predetermined functions assigned to the slave data processor and a control command predominant over the communication of data dictating the operation of each slave data processor, and an interface bus providing connection between the master data processor and each slave data processor for allowing transmission therethrough of the data processing command and the control command to any of the slave data processors, the master data processor being operative to detect a state in which the master data processor is currently coupled to any one of the slave data processors through the interface bus to allow transmission of the data processing command or the communication control command to the particular one of the slave data processor, wherein, in an operating mode of operation of the system, the data processing command or the control command is distributed through the interface bus exclusively to the particular slave data processor which is detected to be currently coupled to the master data processor.

3 Claims, 56 Drawing Sheets

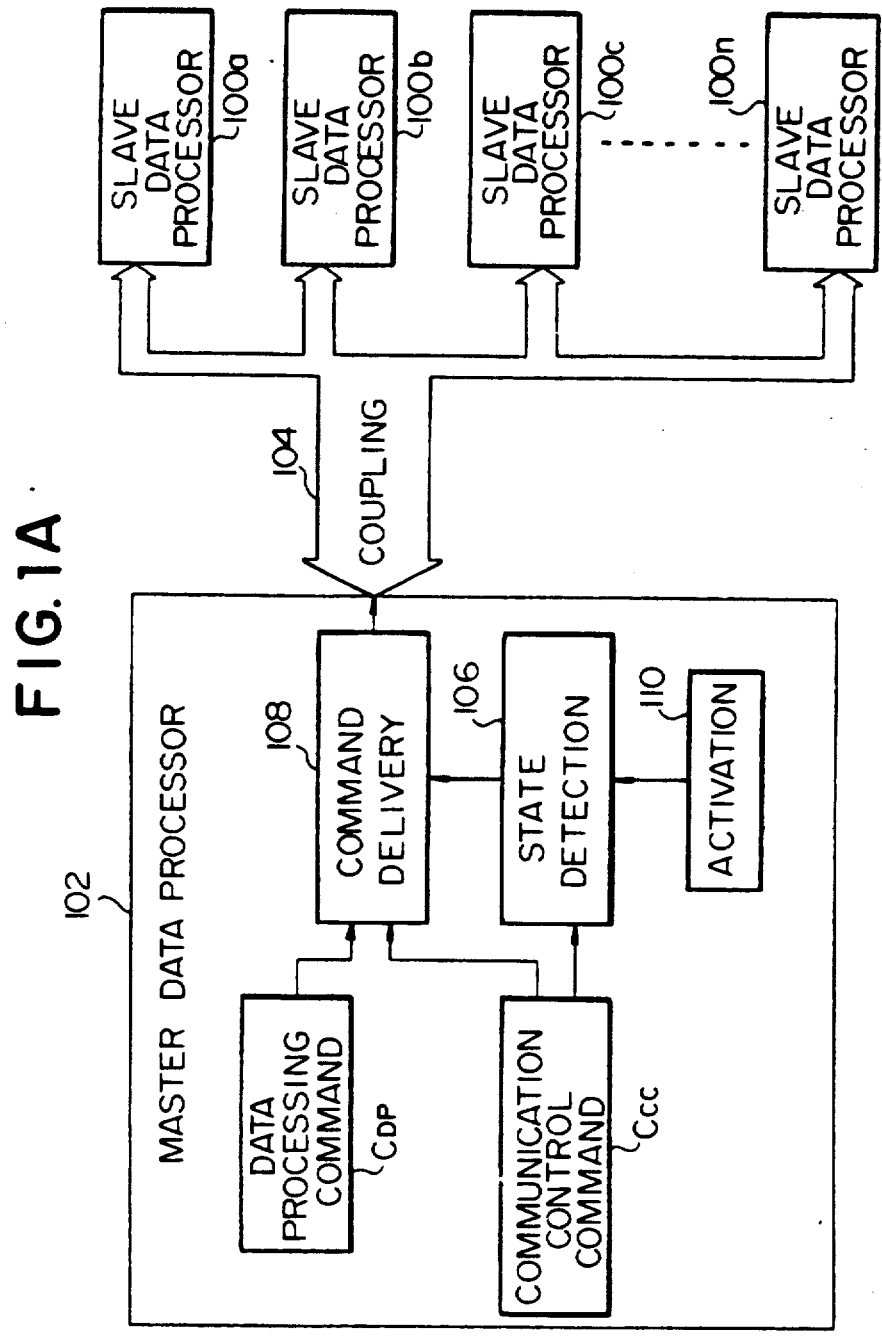

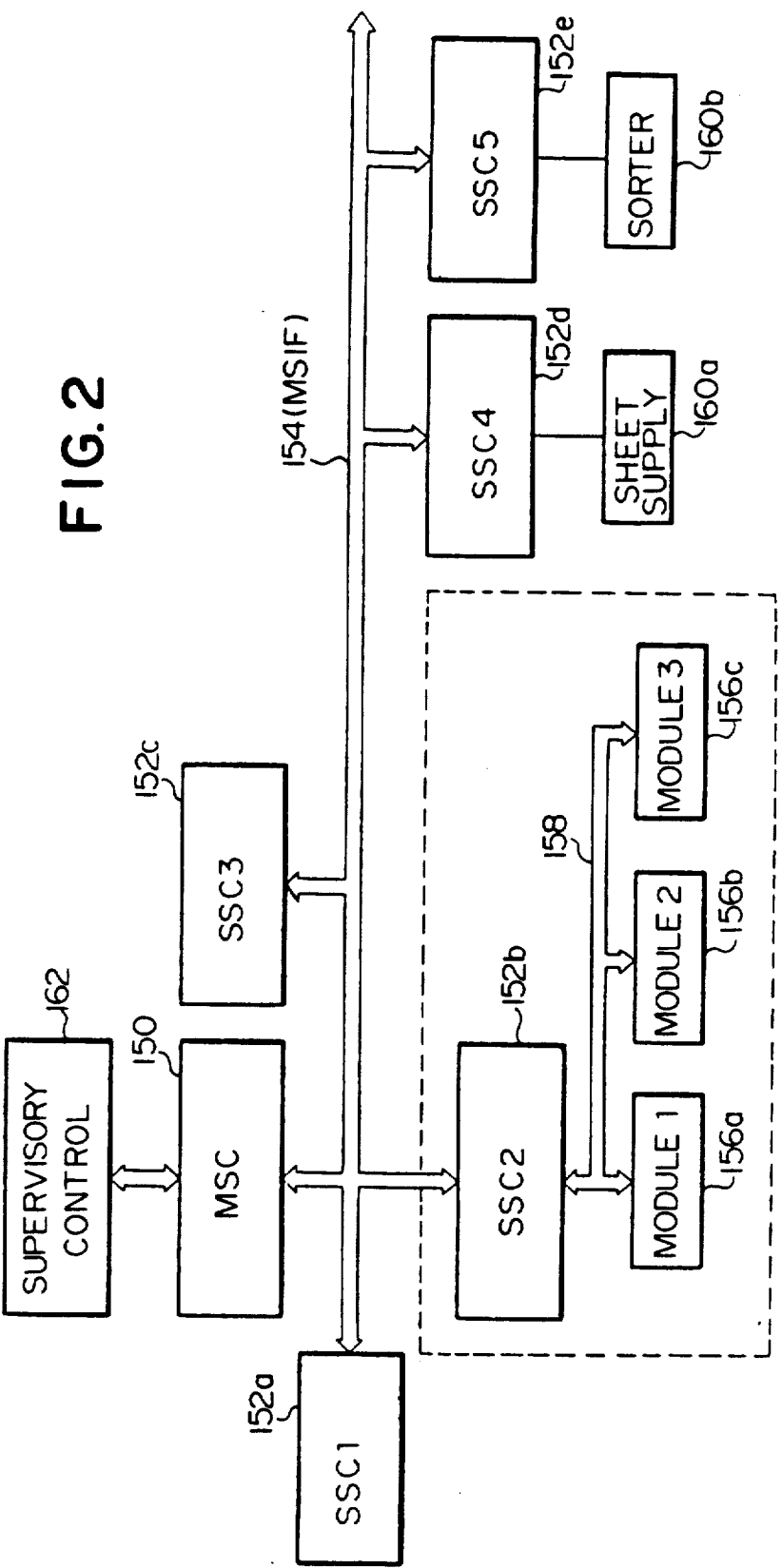

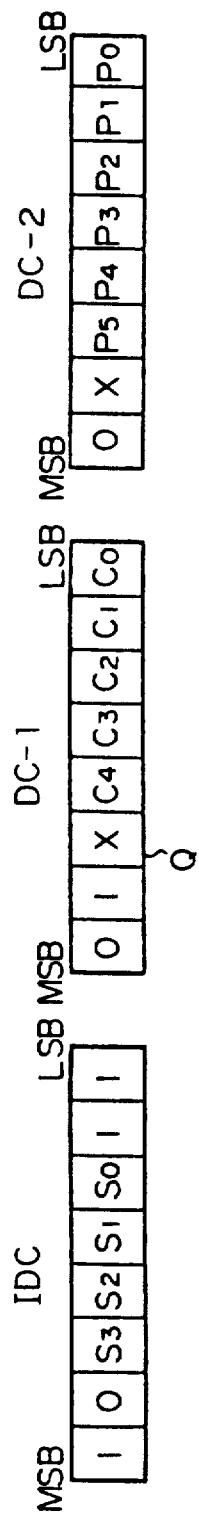
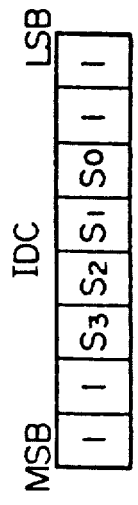
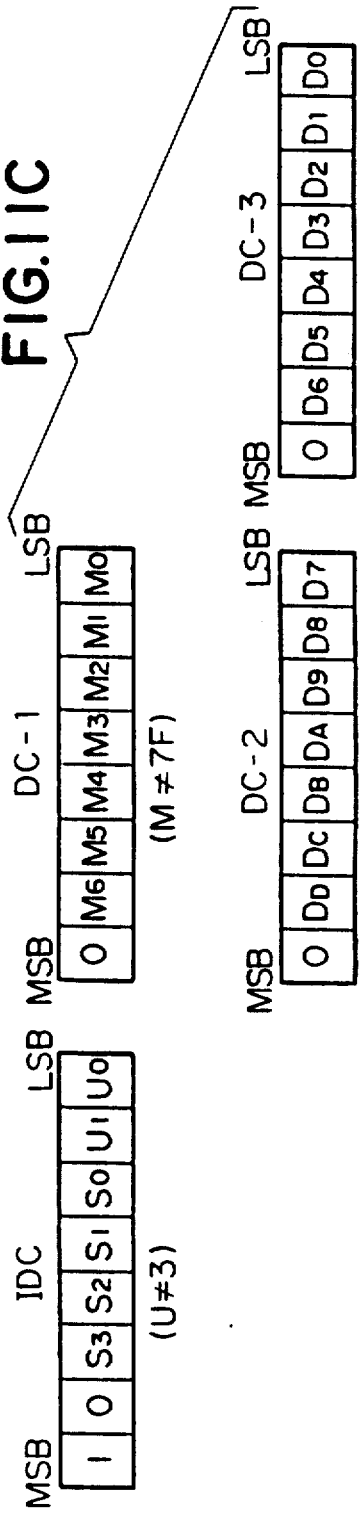

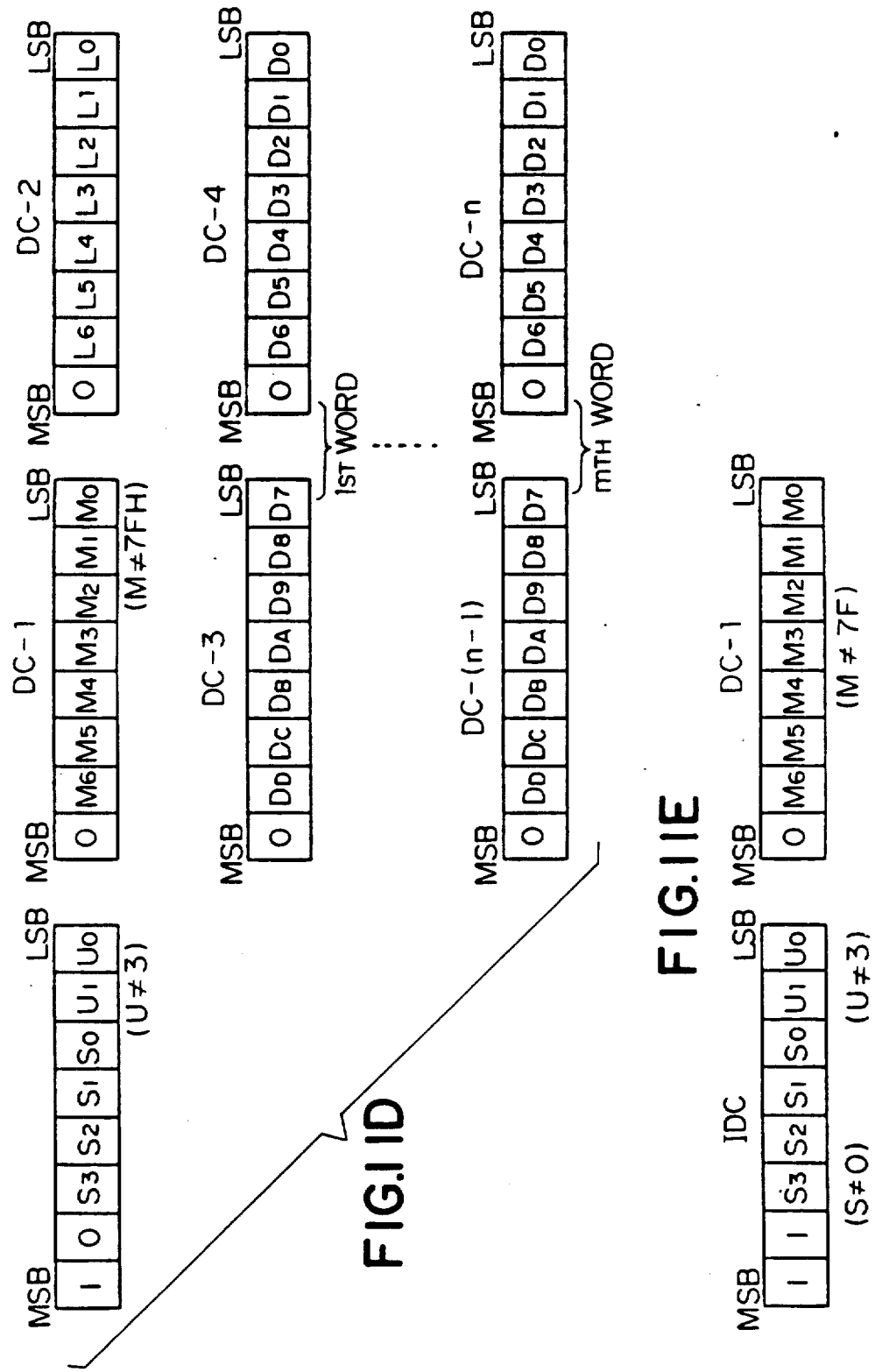

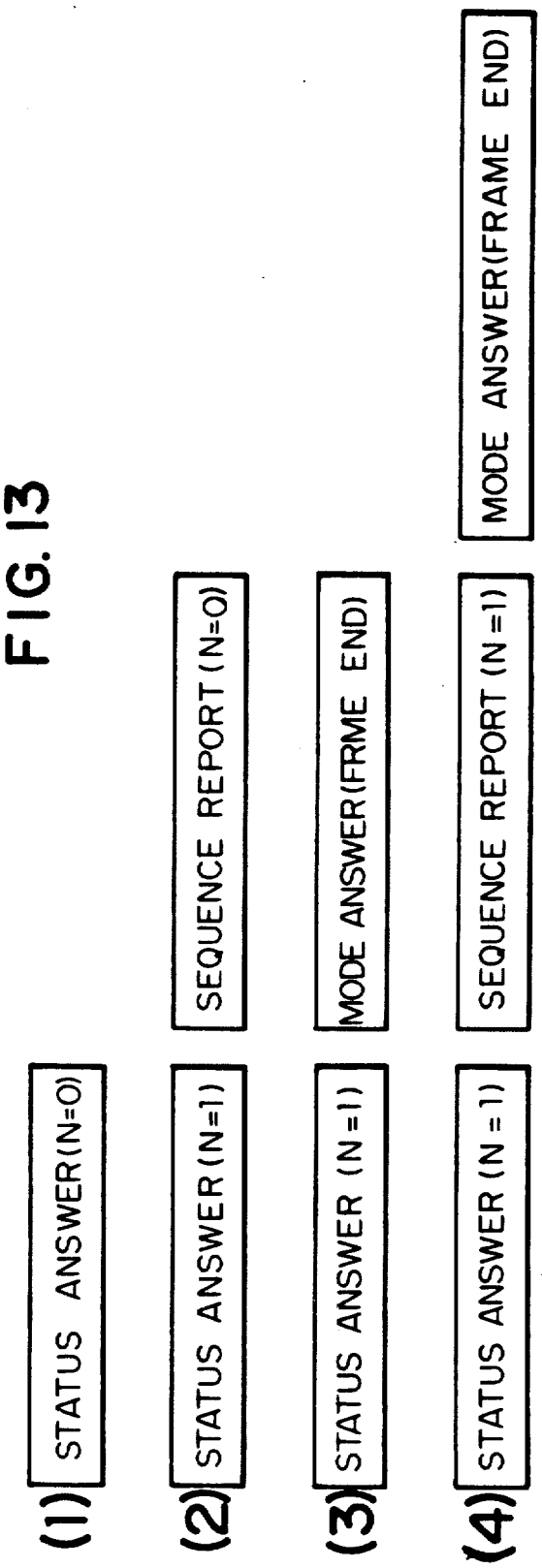

FIG. 14

| HEX | BIT CONFIGURATION | | | | | | | | | | | | | | | | FUNCTION |
|---|---|---|---|---|---|---|---|---|---|---|---|---|---|---|---|---|---|
| | TR | RR | Dd | Dc | Db | Da | D9 | D8 | D7 | D6 | D5 | D4 | D3 | D2 | D1 | D0 | |
| 00 | | | | | | | | | | | | | | | | | |
| 01 | | | | | | | | | | | | | | | | | |
| 02 | | | | | | | | | | | | | | | | | |
| 03 | | | | | | | | | | | | | | | | | |
| 04 | | | | | | | | | | | | | | | | | |
| 05 | | | CORRESPONDS TO "ERROR" BIT | | | | | | | | | | | | | | DETAILED STATUS DATA RELATING TO ERROR |
| 06 | | | CORRESPONDS TO "FATAL" BIT | | | | | | | | | | | | | | DETAILED STATUS DATA RELATING TO FATAL ERROR |
| 07 | | | | | | | | | | | | | | | | | (RESERVED FOR FUTURE USE) |
| 08 | | | CORRESPONDS TO "BUSY" BIT | | | | | | | | | | | | | | DETAILED DATA RELATING TO "BUSY" STATE |
| 09 | | | CORRESPONDS TO "NOT READY" BIT | | | | | | | | | | | | | | |
| 0A | | | | | | | | | | | | | | | | | |
| 0B | | | | | | | | | | | | | | | | | |
| 0C | | | REPORT MODE INFORMATION | | | | | | | | | | | | | | |
| 0D | | | | | | | | | | | | | | | | | |
| 0E | | | | | | | | | | | | | | | | | |
| 0F | | | | | | | | | | | | | | | | | |

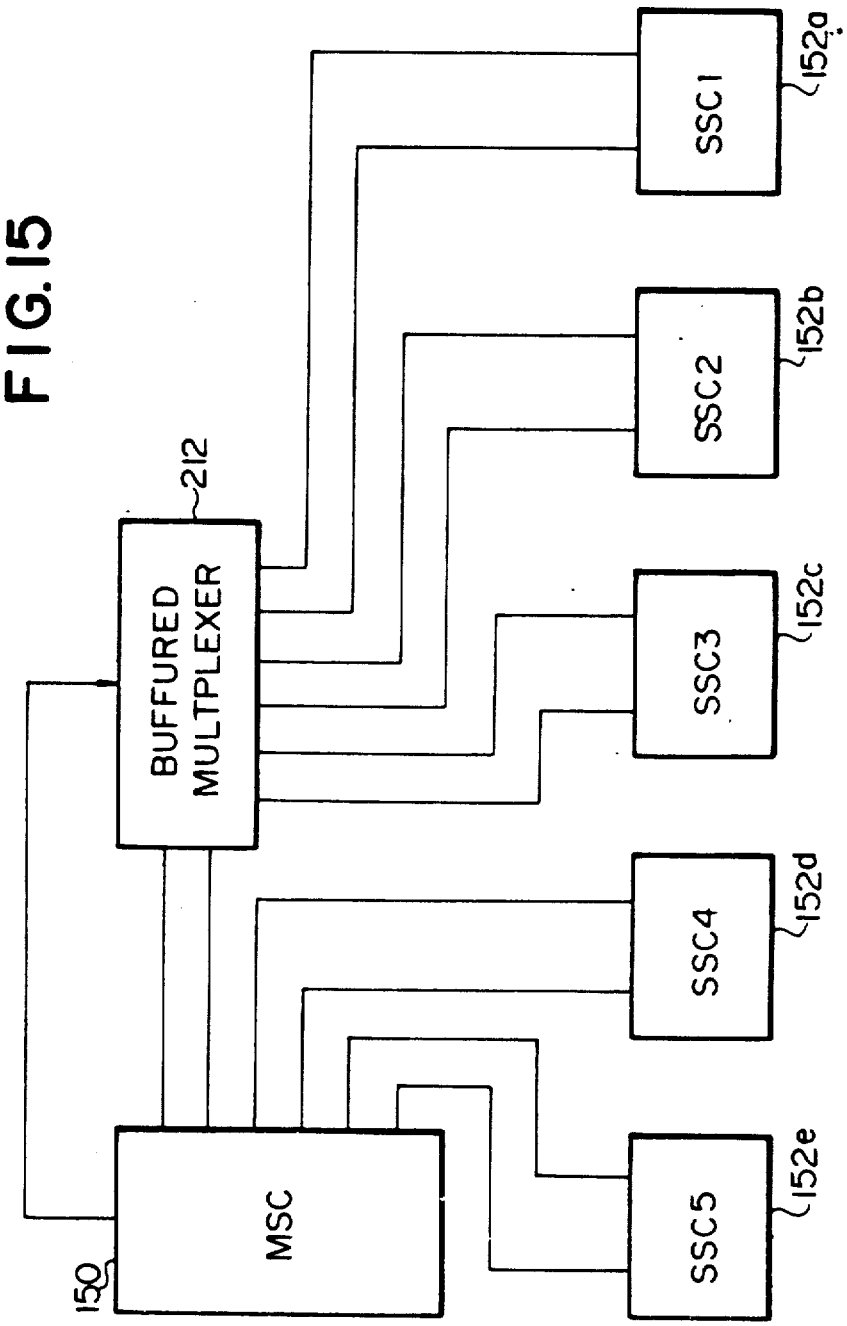

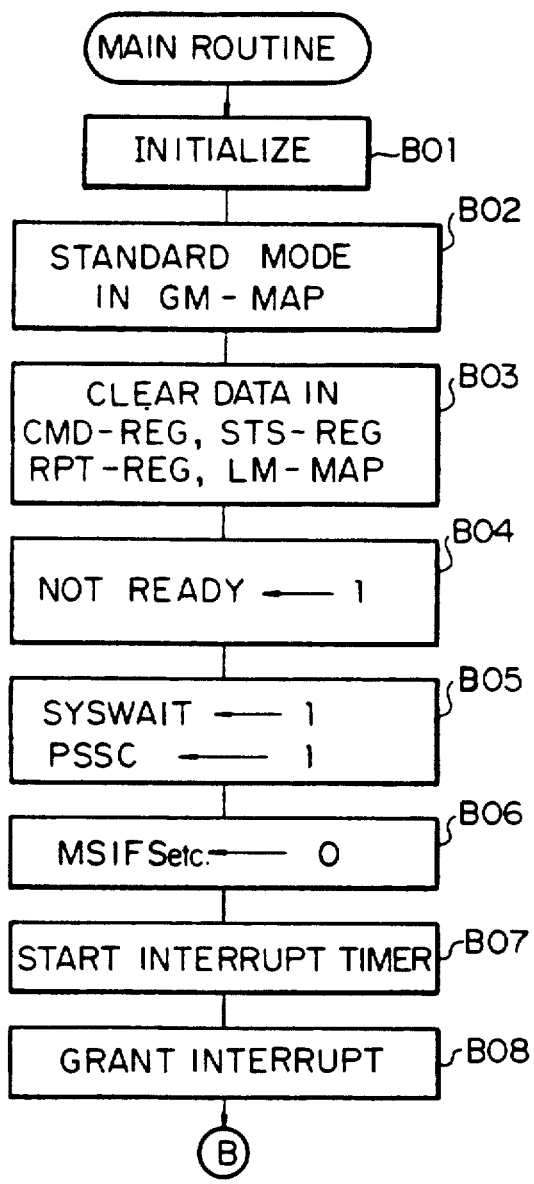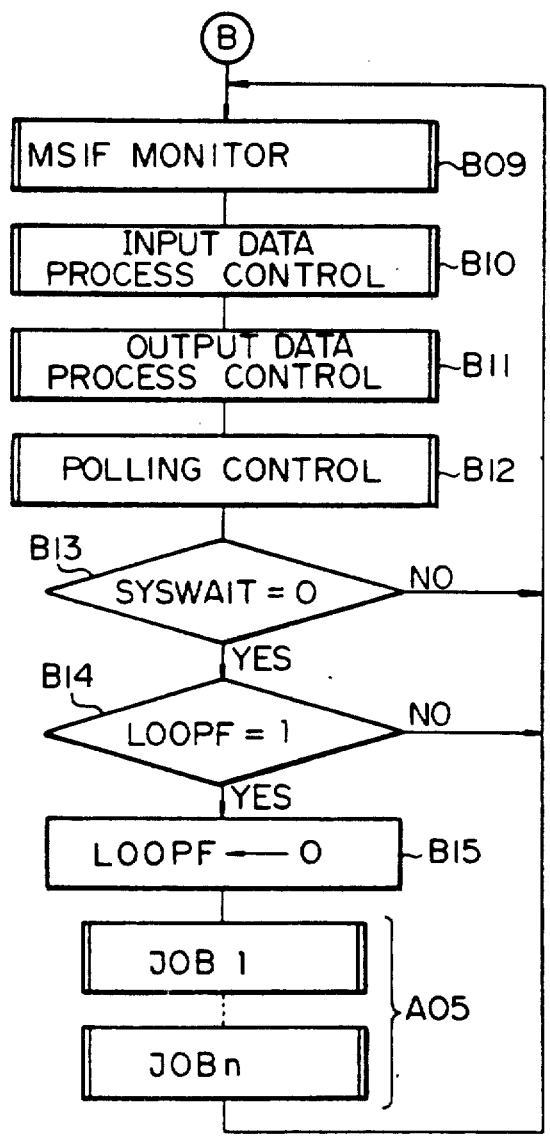

FIG.18A
FIG.18B
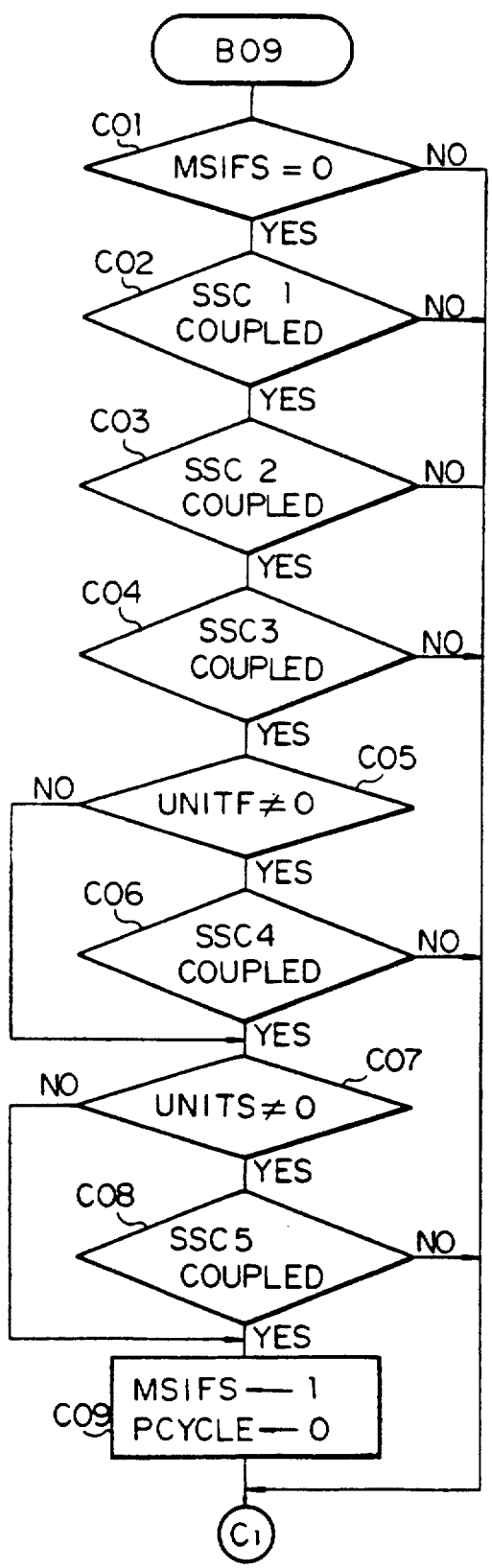
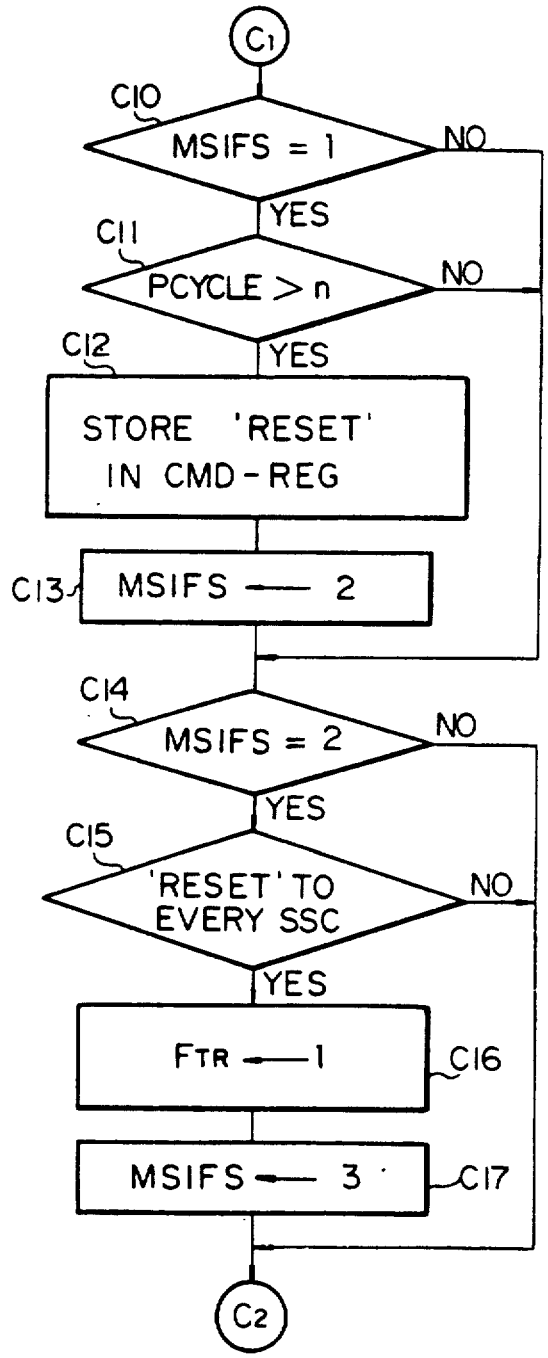

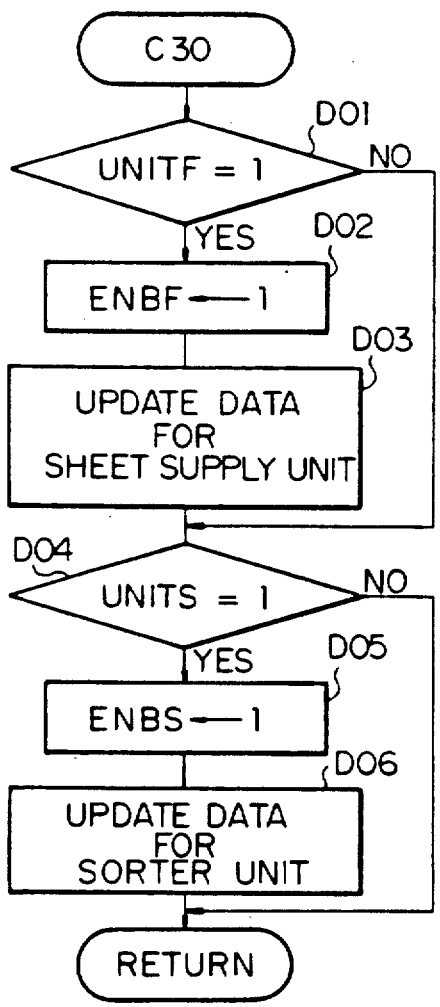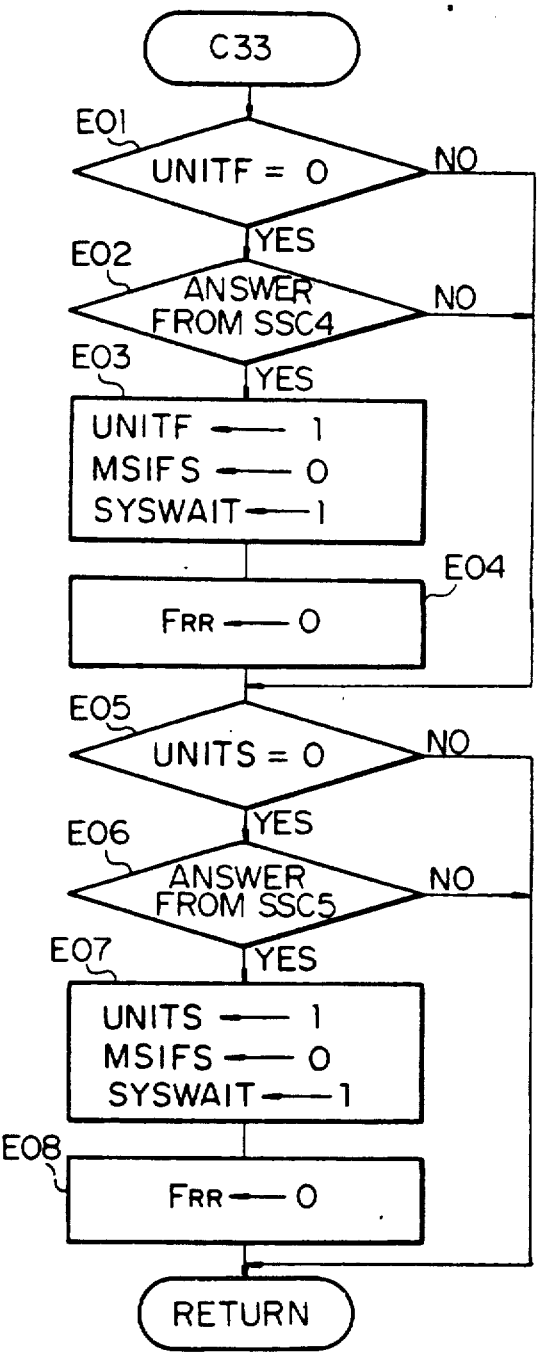

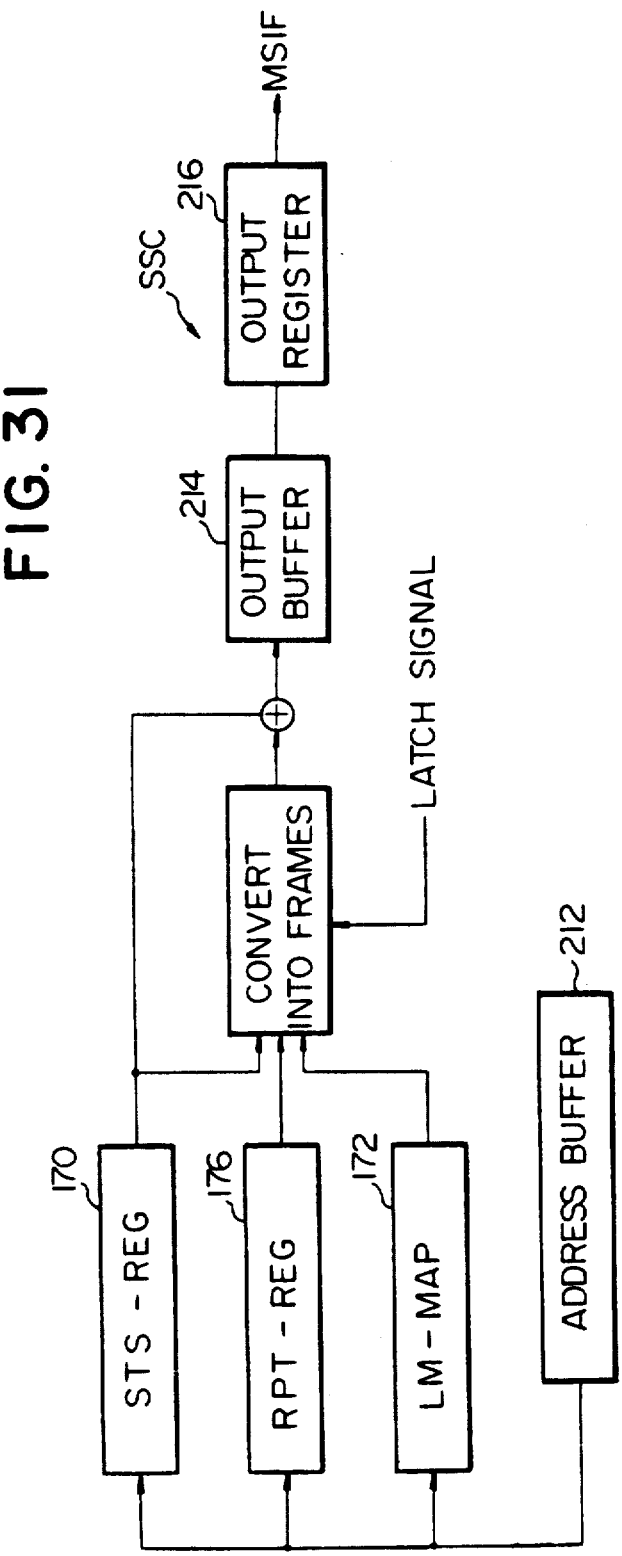

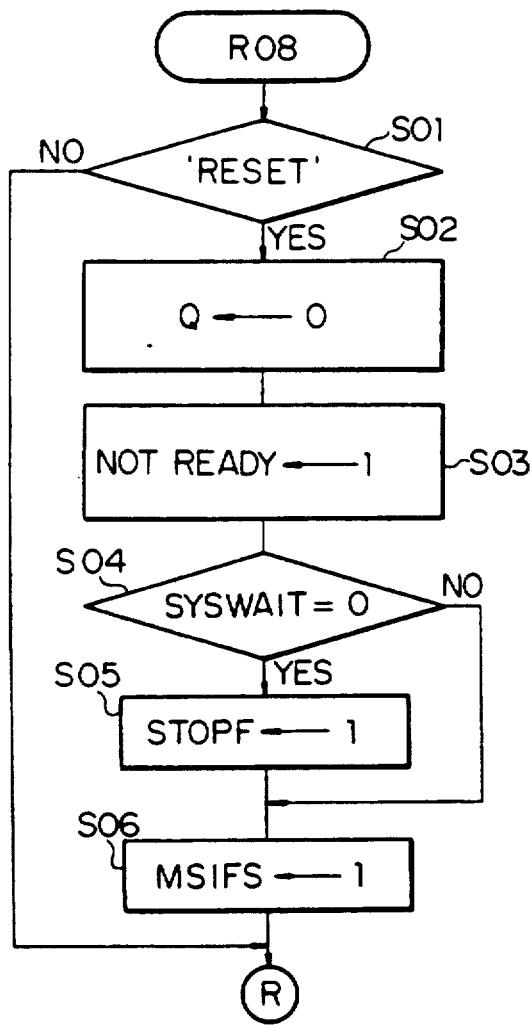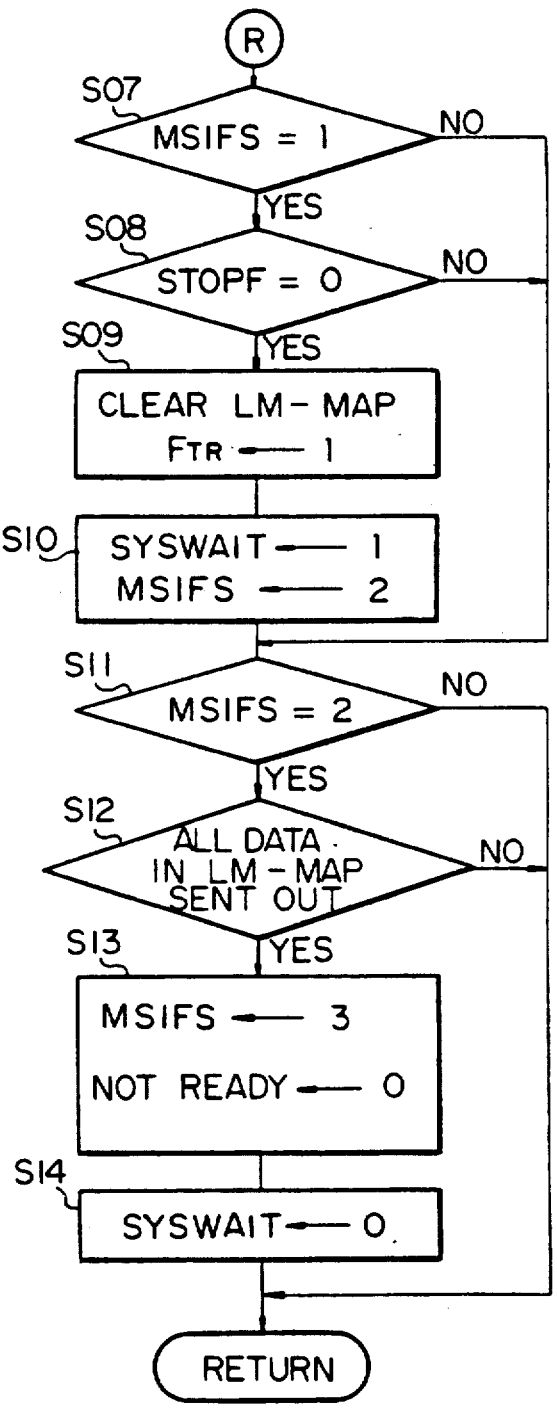

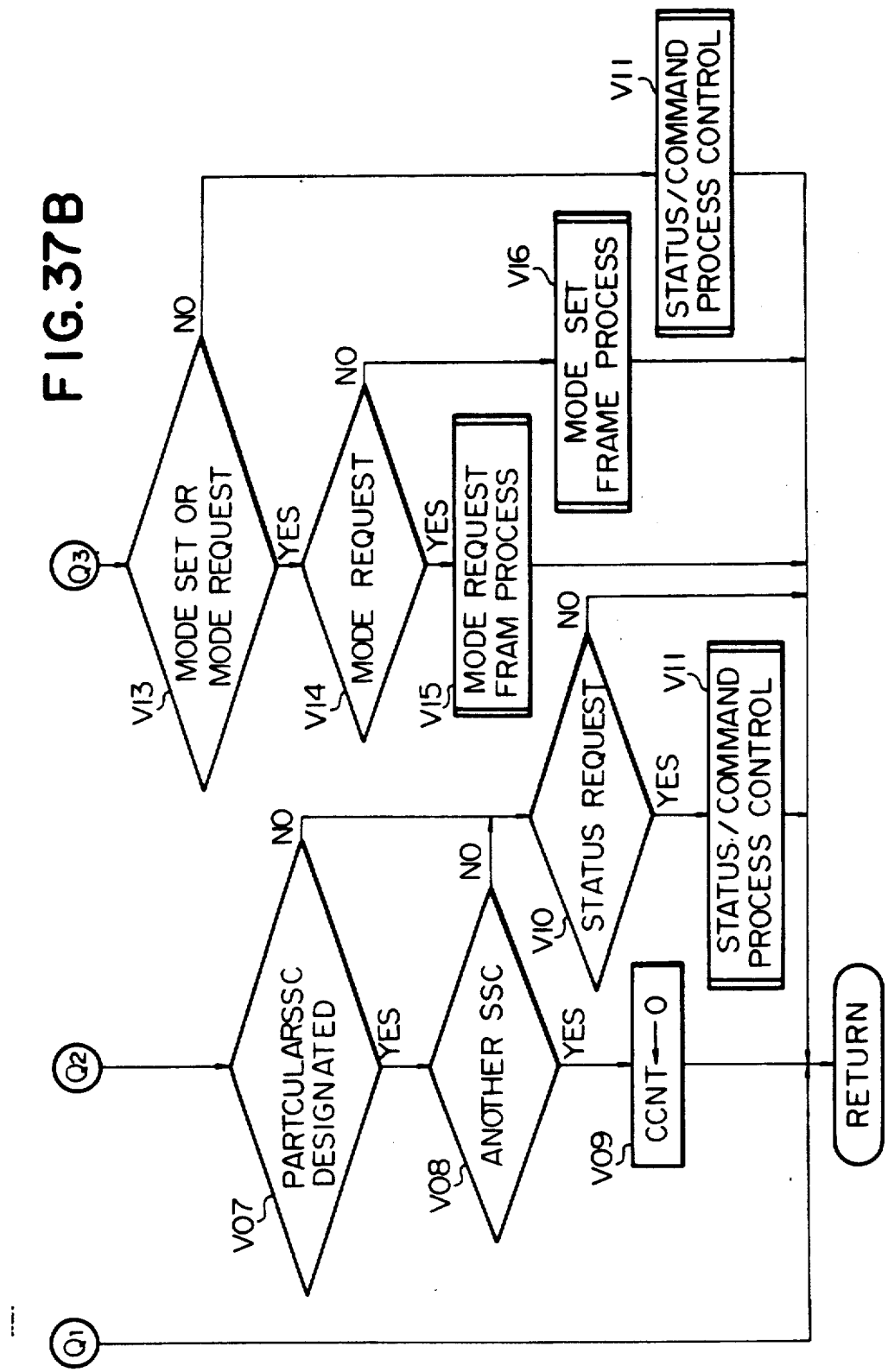

IMAGE PROCESSING SYSTEM

FIELD OF THE INVENTION

The present invention relates in general to an image processing system, and particularly to an image processing system for use typically in a printer apparatus of, for example, the laser image reproducing type. An image processing system according to the present invention will find a most typical application in a printer apparatus including a plurality of functional modules such as for example a control panel, a print engine and a display unit. It may be noted that these functional modules of a printer apparatus are distinguished as "standard" functional modules from optional functional modules of an ordinary printer apparatus such as a print-sheet supply unit and an output page sorting unit (hereinafter referred to frequently as sorter).

Thus, the present invention is more particularly concerned with an image processing system which includes a single master system control unit and a plurality of subsidiary system control units which are under the control of the master system control unit. The subsidiary system control units include those which are in control of the standard functional modules and those which are in control of the optional functional modules of the printer apparatus. The individual subsidiary system control units are controlled by the master system control unit so that the respective functions of the subsidiary system control units are coordinated at various phases of operation of the printer apparatus. The master system control unit is predominant over such functions of the subsidiary system control units through communication with each of the subsidiary system control units in a particular mode of communication selected by each subsidiary system control unit. The mode of communication which may thus be selected by each of the subsidiary system control units may be the polling mode of communication or the "report" mode of communication as will be described.

BACKGROUND OF THE INVENTION

A prior-art image processing system for a printer apparatus is taught in, for example, Japanese Provisional Patent Publication (Kokai) No. 61-103299 concerned with an image processing system incorporated in an image duplicating apparatus. In the image processing system disclosed therein, various control and data signals are supplied from the main or master control unit of the system to the subsidiary system control unit associated with the standard functional modules but also the subsidiary system control unit for each of the optional functional modules provided in the printer apparatus. It may happen in this type of system that a master system control unit fails to receive a reply to the control or data signal once transmitted from the master system control unit to the subsidiary system control unit. In such an occasion, the master system control unit issues a similar control or data signal to the particular subsidiary system control unit a prescribed number of times. If there is no reply received from the subsidiary system control unit after the control or data signal has been sent out the prescribed number of times, the master system control unit determines that the particular subsidiary system control unit is not coupled or not properly coupled to the master system control unit and outputs an error signal.

In the prior-art image processing system of the described type, the subsidiary system control units associated with the optional functional modules are not distinguished from those for the standard functional modules. An optional functional module of a printer or an image duplicating apparatus may be coupled to or uncoupled from the apparatus at the user's option before or after the apparatus is switched in for use. This means that the master system control unit may be able to detect the absence of an optional functional module uncoupled from the apparatus after the apparatus is switched in but could not respond to an optional functional module newly coupled to the apparatus after the apparatus is switched in and the master system control unit is initialized.

Accordingly, it is an important object of the present invention to eliminate such an inconvenience of a prior-art image processing system for a printer apparatus through provision of an improved image processing system which is responsive not only to an optional functional module uncoupled from the apparatus after the apparatus is switched in but to an optional functional module newly coupled to the apparatus after the apparatus is switched in.

Each of the subsidiary system control units in a known image processing system has a memory area in which are to be stored various pieces of data including the data representative of the current status of the functional module which is under the control of the particular control unit. The master system control unit accesses the memory thus incorporated in each of the subsidiary system control units and controls the operation of each subsidiary system control unit on the basis of the data representing the current status of the associated functional module of the apparatus. In this instance, the master system control unit directly accesses the data thus stored in the memory area of each subsidiary system control unit and, for this reason, requires a significantly increased amount of time in accessing the memory areas of all the subsidiary system control units where an increased number of subsidiary system control units are included in the system. The increased amount of time in accessing the memory areas of the subsidiary system control units further result in reduction in the performance efficiency of the master system control unit performing various jobs to control the individual subsidiary system control units.

It is, therefore, another important object of the present invention to provide an improved image processing system enabling the master system control unit to access the memory areas of all the subsidiary system control units more efficiently than the master system control unit used in a prior-art image processing system.

In a prior-art image processing system, the master system control unit is connected to each of the subsidiary system control units through data transmission lines which are proper to the subsidiary system control unit to allow a "report" mode of communication in the system. This type of communication network is useful for achieving a high performance efficiency in the system but requires provision of a more intricate hardware configuration especially where the system incorporates a large number of subsidiary system control units.

In contrast to such a network arrangement between the master system control unit and each of the subsidiary system control units, there is known a system communication network in which the master system control unit is coupled with the individual subsidiary system control units through common data transmission lines or a macrosystem interface bus. This type of communication network allows a "polling" mode of communication in the system and is useful for simplifying the wiring arrangement of the system as a whole. Such a communication network however has a drawback in that the amount of data to be exchanged between the master system control unit and each subsidiary system control unit varies from one subsidiary system control unit to another so that any one or more of the subsidiary system control units may require more time for communication with the master system control unit than the others. The use of more time for communication by a subsidiary system control unit may impair the performance efficiency of the system as a whole since the common communication network must be occupied for an exceptionally long period time by the particular subsidiary system control unit.

Thus, it is still another important object of the present invention to provide an improved image processing system featuring a "hybrid" communication network adapted to alternative selection between the report and polling modes of communication in each of the subsidiary system control units.

SUMMARY OF THE INVENTION

In accordance with the present invention, there is provided an image processing system which has modes of operation including operating and stand-by modes of operation which are to be selectively put into effect, comprising a) a plurality of slave data processor units each of which is operative to execute a set of predetermined functions assigned thereto, b) a master data processor unit for controlling the operation of each of the slave data processor units, the master data processor unit being operative to output a data processing command requesting any of the slave data processor units to execute any of the predetermined functions assigned to the slave data processor unit and a communication control command predominant over the communication of data dictating the operation of each of the slave data processor units, and c) coupling means providing bidirectional connection between the master data processor unit and each of the slave data processor units for allowing transmission therethrough of the data processing command and the communication control command to any of the slave data processor units, the master data processor unit comprising b/1) state detecting means for detecting which of the slave data processor units is currently coupled to the master data processor unit through the coupling means by confirming receipt of a reply from the slave data processor unit responsive to the communication control command, b/2) command delivery means through which, in an operating mode of operation of the system, the data processing command or the communication control command is to be distributed through the coupling means exclusively to the particular slave data processor unit which is detected to be currently coupled to the master data processor unit, and b/3) activating means operative to activate the state detecting means during a stand-by mode of operation of the system.

In accordance with another outstanding aspect of the present invention, there is provided an image processing system which comprises a) at least one slave data processor unit operative to execute a set of predetermined functions assigned thereto, b) a master data processor unit for controlling the operation of the slave data processor unit, and c) coupling means providing bidirectional connection between the slave data processor unit and the master data processor unit, d) first and second address spaces each under the control of the master data processor unit, e) third and fourth address spaces each under the control of the slave data processor unit, the third address space being to renewably retain therein detailed information relating to current operating conditions of the slave data processor unit, the fourth address space being to renewably retain therein brief information relating to the current operating conditions of the slave data processor unit, the slave data processor unit having incorporated therein information transfer means operative to transfer the detailed information from the third address space to the first address space and the brief information from the fourth address space to the second address space at a request from the master data processor unit, the master data processor unit having incorporated therein b/1) brief information requesting means for requesting the information transfer means to transfer the brief information from the fourth address space to the second address space, b/2) control means operative to control the operation of the slave data processor unit on the basis of the brief information transferred to the second address space, the control means being further operative to determine on the basis of the brief information whether or not it is necessary for the control means to check the detailed information currently retained in the third address space, and b/3) detailed information requesting means for requesting the information transfer means to transfer the detailed information from the third address space to the first address space when it is determined by the control means that the detailed information currently retained in the third address space should be checked by the control means.

In accordance with still another outstanding aspect of the present invention, there is provided an image processing system which comprises a) a plurality of slave data processor units shown including slave data processor units each of which is operative to execute a set of predetermined functions assigned thereto, b) a master data processor unit for controlling the operation of each of the slave data processor units, and c) coupling means providing bidirectional connection between the master data processor unit and each of the slave data processor units, d) the master data processor unit being in control of a main address space for retaining therein communication mode information relating to a plurality of prescribed modes of communication including a fixedly wired mode of communication and a polling mode of communication between the master data processor unit and each of the slave data processor units through the coupling means, e) the slave data processor units being in control of subsidiary address spaces which are respectively associated with the individual slave data processor units, each of the subsidiary address spaces being to renewably retain therein communication mode information indicating one of the prescribed mode of communication selected by the master data processor unit.

BRIEF DESCRIPTION OF THE DRAWINGS

The features and advantages of an image processing system according to the present invention will be more clearly appreciated from the following description taken in conjunction with the accompanying drawings in which:

FIG. 1A is a block diagram schematically showing an image processing system according to a first outstanding aspect of the present invention;

FIG. 2 is a view showing the hardware configuration of the macrosystem implementing a preferred embodiment of an image processing system according to the present invention and including a master system control unit and a plurality of subsidiary system control units;

FIGS. 11A, 11B, 11C, 11D, and 11E are diagrams showing examples of the character and bit formats of the various frames which originate in the master system control unit for transmission to each of the subsidiary system control units in the image processing system embodying the present invention;

FIG. 13 is a chart showing examples of the formats of a series of frames including a frame-under-transmission bit used in each of the subsidiary system control units in the system embodying the present invention;

FIG. 14 is a chart showing the designations and functions of the various bits forming the brief status data used in the image processing system embodying the present invention;

FIG. 15 is a block diagram showing an example of the "hybrid" communication network incorporated in the system embodying the present invention;

FIGS. 17A and 17B are flowcharts showing the details of the main routine program illustrated in FIG. 16A;

FIGS. 18A, 18B, 18C and 18D are flowcharts showing the details of the macrosystem interface monitor subroutine program included in the main routine program illustrated in FIGS. 17A and 17B;

FIG. 19 is a flowchart showing the details of the system update control subroutine program included in the macrosystem interface monitor routine program illustrated in FIGS. 18A to 18D;

FIG. 20 is a flowchart showing the details of the optional unit detect subroutine program included in the macrosystem interface monitor routine program illustrated in FIGS. 18A to 18D;

FIG. 31 is a flowchart showing further details of the hardware configuration of each of the subsidiary system control units included in the system embodying the present invention;

FIGS. 34A and 34B are flowcharts showing the details of the macrosystem interface monitor subroutine program included in the main routine program illustrated in FIGS. 33A and 33B;

FIGS. 37A and 37B are flowcharts showing the details of the input data process control subroutine program included in the incoming interrupt routine program illustrated in FIG. 32C;

DESCRIPTION OF THE PREFERRED EMBODIMENT

Figure 1B:
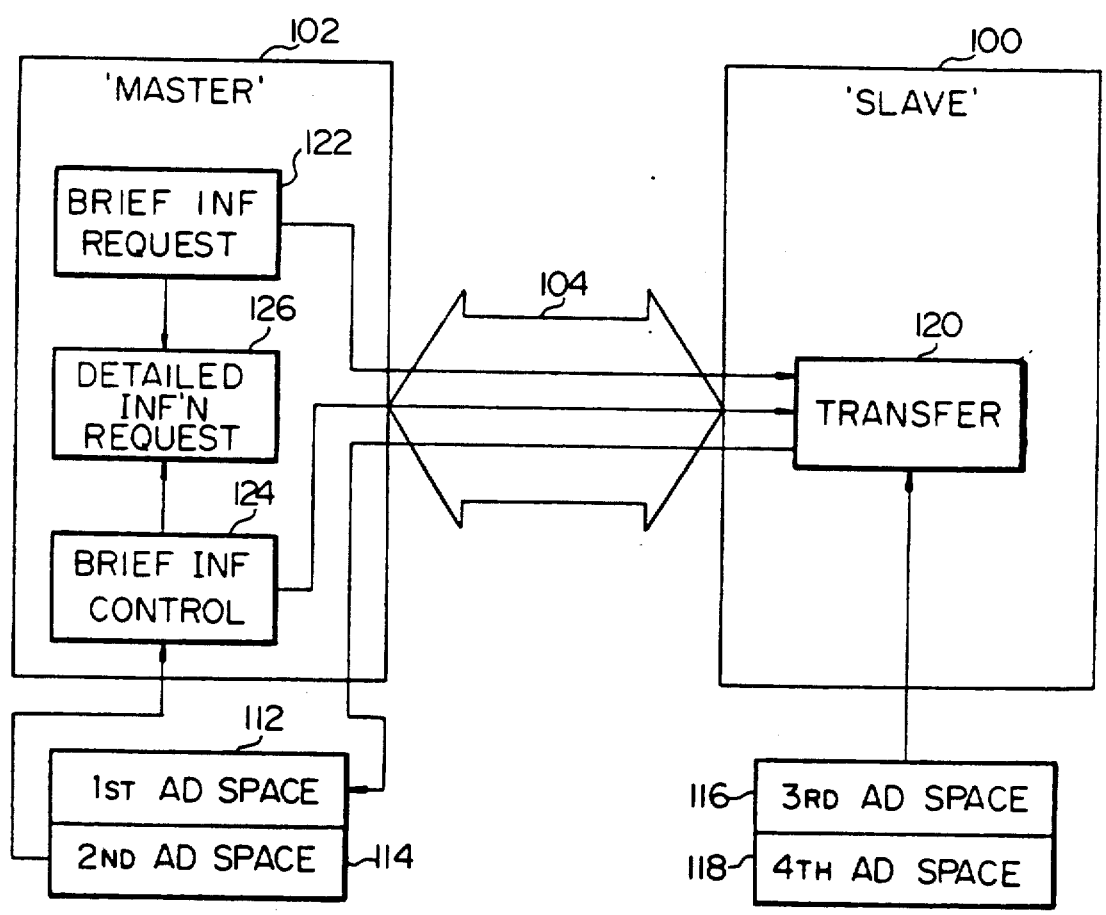
FIG. 1B is a block diagram schematically showing an image processing system according to a second outstanding aspect of the present invention.

Referring to FIG. 1A of the drawings, an image processing system according to a first outstanding aspect of the present invention has modes of operation including operating and stand-by modes of operation which are to be selectively put into effect and generally comprises a plurality of slave data processor units $100a$, $100b$, $100c$ . . . $100n$ each of which is operative to execute a set of predetermined functions assigned thereto, a master data processor unit 102 for controlling the operation of each of the slave data processor units $100a$, $100b$, $100c$ . . . $100n$. The master data processor unit 102 is operative to output a data processing command $C_{DP}$ requesting any of the slave data processor units $100a$, $100b$, $100c$ . . . $100n$ to execute any of the predetermined functions assigned to the data processor unit and a communication control command $C_{CC}$ predominant over the communication of data dictating the operation of each of the slave data processor units $100a$, $100b$, $100c$ . . . $100n$. The image processing system further comprises coupling means 104 providing bidirectional connection between the master data processor unit 102 and each of the slave data processor units $100a$, $100b$, $100c$ . . . $100n$ for allowing transmission therethrough of the data processing command $C_{DP}$ and communication control command $C_{CC}$ to any of the slave data processor units $100a$, $100b$, $100c$ . . . $100n$. The master data processor unit 102 comprises state detecting means 110 to detect which of the slave data processor units $100a$, $100b$, $100c$ . . . $100n$ is currently coupled to the master data processor unit 102 through the coupling means 104 by confirming receipt of a reply from any of the slave data processor units $100a$, $100b$, $100c$ . . . $100n$ responsive to the communication control command $C_{CC}$ to the particular one of the slave data processor units $100a$, $100b$, $100c$ . . . $100n$, command delivery means 108 through which, in an operating mode of operation of the system, the data processing command $C_{DP}$ or the communication control command $C_{CC}$ is to be distributed by way of the coupling means 104 exclusively to the particular slave data processor unit which is detected to be currently coupled to the master data processor unit 102, and activating means 110 operative to activate the state detecting means 106 during a stand-by mode of operation of the system.

During a stand-by mode of operation of the image processing system thus constructed and arranged generally in accordance with the first outstanding aspect of the present invention, the activating means 110 activates the state detecting means 106 into operation and the communication control command $C_{CC}$ is distributed by way of the coupling means 104 to all the slave data processor units $100a$, $100b$, $100c$ . . . $100n$. The communication control command $C_{CC}$ is predominant over the communication of the data dictating the operation of each of the slave data processor units $100a$, $100b$, $100c$ . . . $100n$ and is not effective to enable the slave data processor units $100a$, $100b$, $100c$ . . . $100n$ to execute any of the predetermined functions assigned to each of the data processor units. The communication control command $C_{CC}$ being distributed to any one of the slave data processor units $100a$, $100b$, $100c$ . . . $100n$ via the coupling means 104, the state in which the master data processor unit 102 is coupled to the particular slave data processor unit is detected by the state detecting means 106 by confirming receipt of the reply from the particular slave data processor unit.

It being detected that the master data processor unit 102 is coupled to one of the slave data processor units 100a, 100b, 100c ... 100n through the coupling means 104, during the operating mode of operation immediately subsequent to the current stand-by mode of operation of the system, the command delivery means 108 supplies the data processing command $C_{DP}$ exclusively to the particular slave data processor unit which is detected to be currently coupled to the master data processor unit 102. If any additional slave data processor unit is incorporated into the system or any one of the existing slave data processor units 100a, 100b, 100c ... 100n is disconnected from the system after the system is switched in, the master data processor unit 102 is enabled to supply the data processing command $C_{DP}$ exclusively to any one of the slave data processor units which are ready to operate on termination of the detecting operation of the state detecting means.

Thus, the image processing system according to the first outstanding aspect of the present invention is characterized in that the system is reasonably responsive to incorporation of an additional slave data processor unit into the system or exclusion of any one or more of the existing slave data processor units from the system. The master data processor unit 102 is enabled to supply the data processing command $C_{DP}$ exclusively to any one of the slave data processor units which have been confirmed to be coupled to the master data processor unit 102. Accordingly, the system is enabled to operate efficiently since, in the event there is a slave data processor unit which has not been confirmed to be coupled to the master data processor unit 102, the data processing command $C_{DP}$ could not be supplied to the particular slave data processor unit.

Turning to FIG. 1B, an image processing system according to a second outstanding aspect of the present invention generally comprises at least one slave data processor unit 100 operative to execute a set of predetermined functions assigned thereto, a master data processor unit 102 for controlling the operation of the slave data processor unit 100, and coupling means 104 providing bidirectional connection between the slave data processor unit 100 and the master data processor unit 102. The master data processor unit 102 is in control of a first address space 112 and a second address space 114, while the slave data processor unit 100 is in control of a third address space 116 and a fourth address space 118. In the third address space 116 is to be renewably retained detailed information relating to current operating conditions of the slave data processor unit 100 while the fourth address space 118 is to renewably retain therein brief information relating to the current operating conditions of the data processor unit 100. The slave data processor unit 100 has incorporated therein information transfer means 120 operative to transfer the detailed information from the third address space 116 to the first address space 112 and the brief information from the fourth address space 118 to the second address space 114 each through the coupling means 104 at a request from the master data processor unit 102. The master data processor unit 102 has incorporated therein brief information requesting means 122 to request the information transfer means 120 to transfer the brief information from the fourth address space 118 to the second address space 114, control means 124 operative to control the operation of the slave data processor unit 100 on the basis of the brief information thus transferred to the second address space 114, the control means 124 being further operative to determine on the basis of the brief information whether or not it is necessary for the control means 124 to check the detailed information currently retained in the third address space 116, and detailed information requesting means 122 to request the information transfer means 120 to transfer the detailed information from the third address space 116 to the first address space 112 when it is determined by the control means 124 that the detailed information currently retained in the third address space 116 should be checked by the control means 124.

In the image processing system thus constructed and arranged in accordance with the second outstanding aspect of the present invention, the slave data processor unit 100, which may be one of a plurality of such units, is enabled to execute any of the predetermined functions assigned thereto under the control of the master data processor unit 102 through the coupling means 104. The detailed information relating to current operating conditions of the slave data processor unit 100 is generated and is renewably retained from time to time into the third address space 116 by the slave data processor unit 100 per se. The slave data processor unit 100 per se is further operative to summarize the detailed information, generate the brief information relating to the current operating conditions of the data processor unit 100, and renewably retain the brief information into the fourth address space 118. On the other hand, the master data processor unit 102 activates the brief information requesting means 122 to request the information transfer means 120 to transfer the brief information from the fourth address space 118 to the second address space 114 by way of the coupling means 104. On the basis of the brief information thus transferred to the second address space 114 from the fourth address space 118, the control means 124 monitors the current operating conditions of the slave data processor unit 100 and, when it is determined on the basis of the brief information that the current operating conditions of the slave data processor unit 100 are worthy of being taken into account, the detailed information requesting means 122 is activated to request the information transfer means 120 to transfer the detailed information from the third address space 116 to the first address space 112.

Thus, the image processing system according to the second outstanding aspect of the present invention is characterized in that the master data processor unit 102 is allowed to fetch the detailed information from the third address space 116 when, and only when, the brief information fetched from the fourth address space 118 indicates that the current operating conditions of the slave data processor unit 100 include those which are worthy of being taken into account. The master data processor unit 102 having the brief and detailed information requesting means 122 and 126 is not required to check the detailed information at all times and is for this reason enabled to control the slave data processor unit 100 at a significantly enhanced efficiency without giving rise to an increase in the burden which the slave data processor unit 100 is required to bear.

Figure 1C:
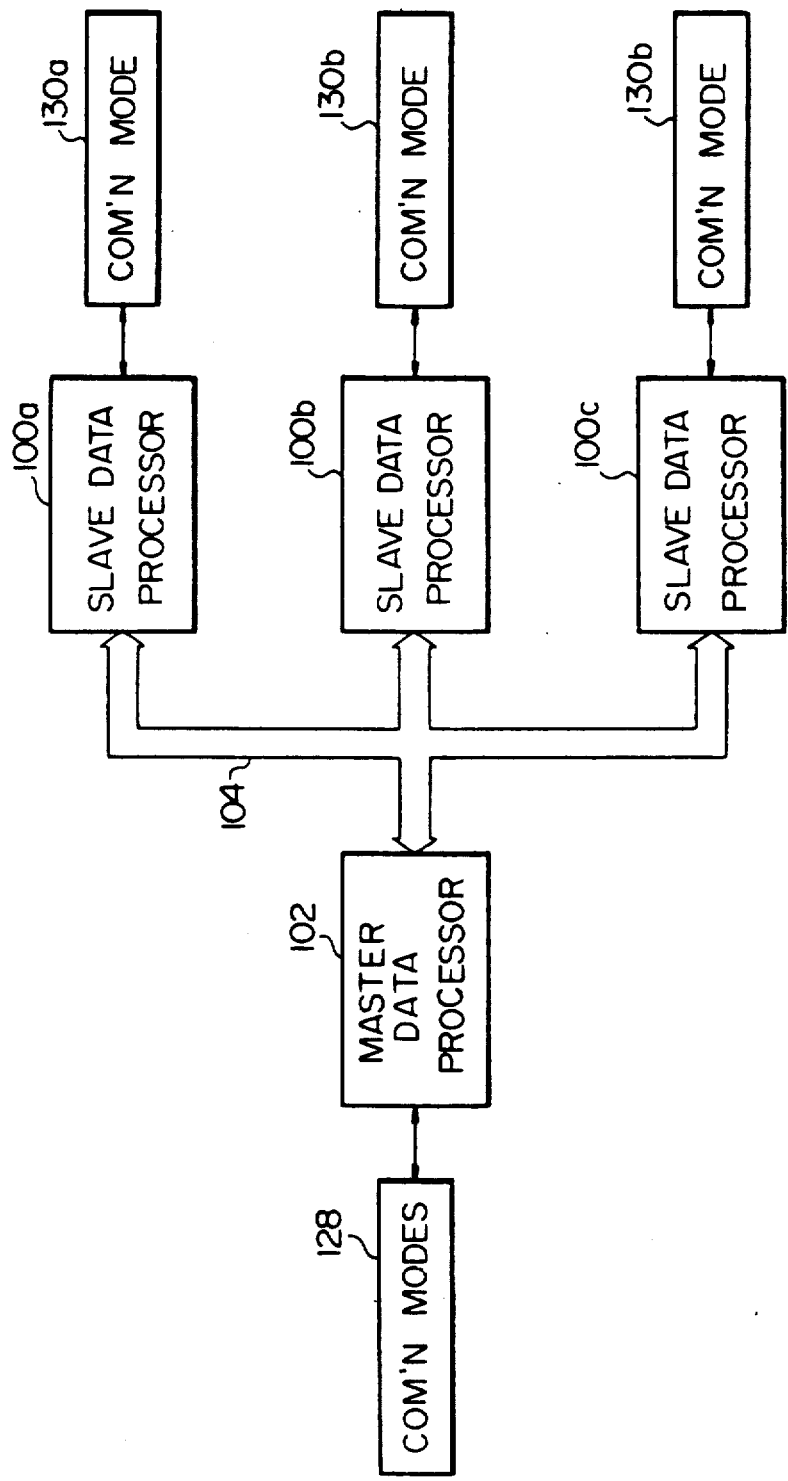
FIG. 1C is a block diagram schematically showing an image processing system according to a third outstanding aspect of the present invention.

Referring to FIG. 1C, an image processing system according to a third outstanding aspect of the present invention generally comprises a plurality of slave data processor units shown including slave data processor units 100a, 100b and 100c each of which is operative to execute a set of predetermined functions assigned thereto, and a master data processor unit 102 for controlling the operation of each of the slave data processor units 100a, 100b and 100c. The image processing system further comprises coupling means 104 providing bidirectional connection between the master data processor unit 102 and each of the slave data processor units 100a, 100b and 100c. The master data processor unit 102 is in control of a main address space 128 for retaining therein communication mode information relating to a plurality of prescribed modes of communication including a fixedly wired mode of communication and a polling mode of communication between the master data processor unit 102 and each of the slave data processor units 100a, 100b and 100c through the coupling means 104. The slave data processor units 100a, 100b and 100c are in control of subsidiary address spaces 130a, 130b and 130c which are respectively associated with the individual slave data processor units 100a, 100b and 100c. In each of these subsidiary address spaces 130a, 130b and 130c associated with the slave data processor units 100a, 100b and 100c, respectively, is to be renewably retained communication mode information indicating one of the prescribed mode of communication selected by the master data processor unit 102.

In an image processing system thus constructed and arranged in accordance with the third outstanding aspect of the present invention, the master data processor unit 102 supplies communication mode information from the main address space 128 to each of the subsidiary address spaces 130a, 130b and 130c which are respectively associated with the individual slave data processor units 100a, 100b and 100c. In supplying communication mode information from the main address space 128 to each of the subsidiary address spaces 130a, 130b and 130c, the master data processor unit 102 may select one of the prescribed modes of communication such as, for example, either the fixedly wired mode of communication or the polling mode of communication for each of the subsidiary address spaces 130a, 130b and 130c respectively associated with the slave data processor units 100a, 100b and 100c. Alternatively, the master data processor unit 102 may select one of the prescribed modes of communication such as, for example, the fixedly wired mode of communication for one or more of the subsidiary address spaces 130a, 130b and 130c and another prescribed mode of communication such as, for example, the polling mode of communication for the subsidiary address space or spaces associated with the other slave data processor unit or units.

After a particular mode of communication is thus set up in each of the subsidiary address spaces 130a, 130b and 130c associated with the slave data processor units 100a, 100b and 100c, respectively, the master data processor unit 102 and each of the slave data processor units 100a, 100b and 100c communicates with each other in the mode of communication set up in the subsidiary address space associated with the particular slave data processor unit. The mode of communication indicated by the communication mode information retained in each of the subsidiary address spaces 130a, 130b and 130c is renewable at a request from the master data processor unit 102. It may happen that the system which has been used in one working environment is required to operate in another working environment so that the mode of communication which has been established between the master data processor unit 102 and any one of the slave data processor units 100a, 100b and 100c is obsolete for the new working environment. In such an instance, the master data processor unit 102 may select another mode of communication for the particular one of the slave data processor units 100a, 100b and 100c and substitute the obsolete mode of communication with the new one to enable the slave data processor unit to operate properly in the newly established working environment.

A preferred embodiment of an image processing system according to the present invention will be hereinafter described with reference to the drawings. While the present invention will be herein described as being embodied in an image processing system for a laser printer apparatus, it should be borne in mind that an image processing system according to the present invention is applicable to any other image forming apparatus such as an electrophotographic image duplicating apparatus or a digital copier.

Hardware Configuration

FIG. 2 of the drawings shows the hardware configuration of the macrosystem (hereinafter referred to merely as "system") implementing the preferred embodiment of an image processing system according to the present invention. As shown, the image processing system embodying the present invention comprises a master system control unit 150 (MSC) and a plurality of subsidiary system control units (SSC's) including first, second, third and fourth subsidiary system control units 152a, 152b, 152c, 152d and 152e (labelled SSC1, SSC2, SSC3, SSC4 and SSC5, respectively). Each of the subsidiary system control units 152a to 152e is typically of the type including a semiconductor microprocessor and is operative to execute a set of predetermined functions parameters assigned thereto. The master system control unit 150 and is also of the type including a semiconductor microprocessor and is operative to control the operation of each of the subsidiary system control units 152a to 152e.

The master system control unit 150 is herein assumed to be implemented by a printer control module of image processing control system of a laser printer apparatus and corresponds to the master data processor unit 102 included in each of the image processing control systems hereinbefore described with reference to FIGS. 1A, 1B and 1C. The first, second, third, fourth and fifth subsidiary system control units 152a, 152b, 152c, 152d and 152e are assumed to be implemented by a control panel control module, a print engine control module, a display data processing control module, a print-sheet supply control module, and an output page sorting control module, respectively, of the image processing control system of the laser printer apparatus. Each of these first to fifth subsidiary system control units 152a to 152e corresponds to each of the slave data processor units 100a, 100b, 100c, . . . included in each of the image processing control systems hereinbefore described with reference to FIGS. 1A and 1C or the slave data processor unit 100 included in the image processing control system hereinbefore described with reference to FIG. 1B.

It may be noted that, of the five subsidiary system control units 152a to 152e included in the system herein shown, the first, second and third subsidiary system control units 152a, 152b and 152c implemented by the control panel control module, print engine control module and display data processing control module.

respectively, are provided as indispensable control units in the system, while the fourth and fifth subsidiary system control units 152d and 152e implemented by the print-sheet supply control module and the output page sorting control module, respectively, are provided as optional control units in the system. Each of these optional subsidiary system control units 152d and 152e may thus be newly added to or removed from the system after the system is initially switched in.

The master system control unit 150 is coupled to each of the first to fifth subsidiary system control units 152a to 152e through a macrosystem interface bus 154 which corresponds to the coupling means 104 of the image processing control systems hereinbefore described with reference to FIGS. 1A, 1B and 1C.

The first subsidiary system control unit 152a implemented by the control panel control module is operative to monitor the turned-on and turned-off states of the individual control keys provided on a manually operated control panel (not shown) through which the operator's various instructions are to be entered into the printer apparatus. The second subsidiary system control unit 152b implemented by the print engine control module is predominant over the operation of some functional modules and assemblies of the printer apparatus such as, typically, a functional module 156a including the image transfer drum and a functional module 156b including the optical image scanner of the image reproducing system of the printer apparatus. The second subsidiary system control unit 152b is thus coupled to these functional modules 156a, 156b, . . . through a sub-system interface bus 158. The detailed construction and arrangement of each of these functional modules 156a, 156b, . . . of the printer apparatus are well known in the art and, as such, will not be herein described. The display data processing control module implementing the third subsidiary system control unit 152c is coupled to the display unit (not shown) of the printer apparatus. Likewise, the print-sheet supply control module implementing the fourth subsidiary system control unit 152d and the output page sorting control module implementing the fifth subsidiary system control unit 152e are coupled to a print-sheet supply unit 160a and an output page sorting unit 160b, respectively, of the printer apparatus. The detailed construction and arrangement of each of these optional functional modules 160a and 160b of the printer apparatus are also well known in the art and, as such, will not be herein described.

Though not shown, the laser printer apparatus incorporating the image processing system embodying the present invention is assumed to form part of a user system of a higher level and, thus, the master system control unit 150 is operative under the control of a supervisory control unit 162 incorporated in the user system.

Logic Address Space Configuration of SSC

Figure 3:
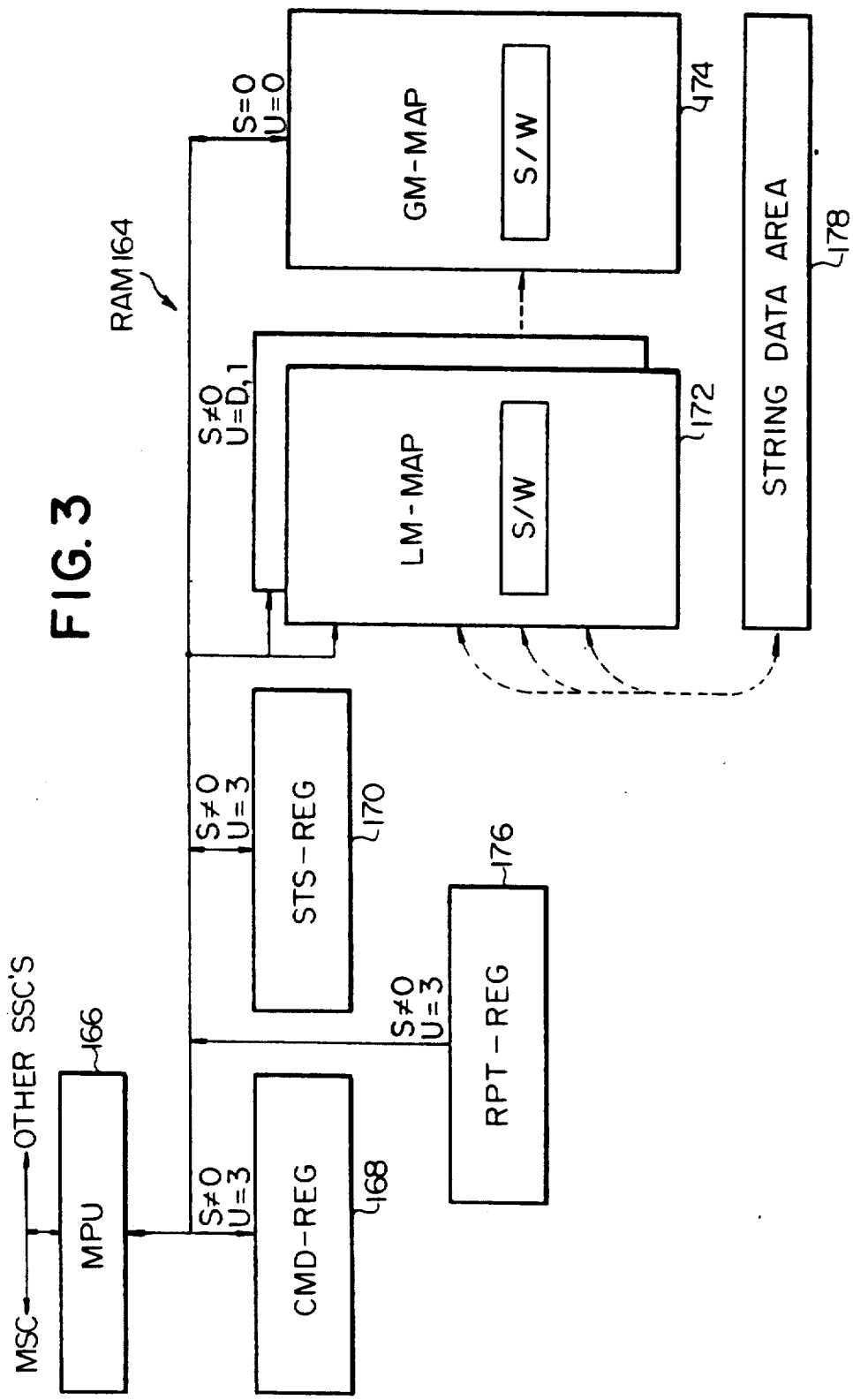
FIG. 3 is a block diagram showing the configuration of the logic address spaces incorporated in each of the subsidiary system control units in the preferred embodiment of the image processing system according to the present invention.

FIG. 3 schematically shows the general configuration of the logic address spaces incorporated in a random-access memory 164 to be accessed by a semiconductor microprocessor 166 (MPU) in each of the subsidiary system control units 152a to 152e provided in the preferred embodiment of the image processing system according to the present invention. The microprocessor 166 herein shown is representative of the microprocessor included in each of the first to fifth subsidiary system control units 152a to 152e and, accordingly, the memory 164 is one of the similar memories which are provided in the individual subsidiary system control units 152a to 152e, respectively.

The address spaces of the memory 164 under the control of the microprocessor 166 of each of the first to fifth subsidiary system control units 152a to 152e include those defining:

1) a command register 168 (CMD-REG),
2) a status register 170 (STS-REG),
3) a local mode map 172 (LM-MAP) sectioned into a plurality of memory areas which are herein assumed to consist of two areas for simplicity sake,
4) a global mode map 174 (GM-MAP), and
5) a report register 176 (PRT-REG).

Each of the local mode map 172 and global mode map 174 has a particular address herein referred to as "string window" (S/W). The microprocessor accessing the particular address thus implementing this string window of the local mode map 172 or the global mode map 174 is actually allowed to access not the particular address but a string data area 178 designated by the particular address of the local or global mode map 172 or 174.

In the registers and maps 168 to 176 of the memory 164 in each subsidiary system control unit are to be temporarily stored various pieces of data. These pieces of data include various data processing command $C_{DP}$ and a communication control command $C_{CC}$ to be delivered from the master system control unit 150 to each of the subsidiary system control units 152a to 152e and temporarily stored in the command register 168 of each subsidiary system control unit. Each of the data processing commands $C_{DP}$ is effective to request each of the subsidiary system control units 152a to 152e to execute any of the predetermined functions assigned to the subsidiary system control unit, while the communication control command $C_{CC}$ is predominant over the communication of data dictating the operation of each of the subsidiary system control units 152a to 152e. When the microprocessor 166 of each of the subsidiary system control units 152a to 152e becomes ready to execute the command supplied thereto, the data processing command $C_{DP}$ or the communication control command $C_{CC}$ which has been stored in the subsidiary system control unit is released therefrom and is transferred to the microprocessor 166.

Each of the subsidiary system control units 152a to 152e per se has a set of predetermined functions and parameters assigned thereto as previously noted and execute any of these functions in different modes of operation including a standard mode of operation. This standard mode of operation of each subsidiary system control unit is established in the master system control unit 150 in accordance with prescribed default rules when the master system control unit 150 is initialized after the system is initially switched in (as will be described later with reference to FIGS. 17A and 17B). Each of the subsidiary system control units 152a to 152e receives a data processing command $C_{DP}$ from the master system control unit 150 to establish the standard mode of operation designated by the command $C_{DP}$ and execute any of the functions designated by the standard mode of operation. Each of the subsidiary system control units 152a to 152e is further capable of executing functions other than those designated in the standard mode of operation. The local and global mode maps 174 and 176 of the memory 164 are to be used for this purpose. The local mode map 172 has retained therein data or "mode data" relating to the functions and parameters proper to each of the subsidiary system control units 152a to 152e, while the global mode map 174 has retained therein mode data relating to the functions to be executed commonly by the individual subsidiary system control units 152a to 152e. Each of the subsidiary system control units 152a to 152e is enabled to execute functions other than those designated in the standard mode of operation on the basis of the mode data thus retained in both of the local and global mode maps 174 and 176.

In the local mode map 172 are to be retained not only the mode data relating to the functions and parameters specific to each of the subsidiary system control units 152a to 152e but also data or "status data" indicating the current status of the subsidiary system control unit including the particular local mode map 172. The local mode map 172 is sectioned into a plurality of memory areas as previously noted so that, where the subsidiary system control unit including the particular local mode map 172 has two or more functional modules to be controlled as is the case with the print engine control unit 152b (FIG. 2), the mode and status data representing the functions and parameters and the current status of one of the functional modules are stored in one of the memory areas and those of another functional module are stored in another memory area of the map 172. The mode data stored in each of the local and global mode maps 174 and 176 are updated to be representative of prescribed standard functions and parameters for the subsidiary system control unit when the system is initialized.

In the status register 168 of the memory 164 is to be stored data representing a summarized version of the status represented by the status data stored in the local mode map 172. Thus, the master system control unit 150, when required to monitor the status data regarding each of the subsidiary system control units 152a to 152e, first checks the summarized status data stored in the status register 170 of the memory 164 in each subsidiary system control unit and then determines on the basis of the summarized status data whether or not the status data stored in the local mode map 172 in the particular subsidiary system control unit is to be inspected. This is useful for saving the burden which the master system control unit 150 is required to bear and accordingly for speeding up the operation of the system as a whole. The report register 176 of the memory 164 is used to store sequence report data which is to be generated in each of the subsidiary system control units 152a to 152e. The sequence report data indicates an occurrence of an event in each of the subsidiary system control units 152a to 152e.

Logic Address Spaces and Functional Blocks of MSC

Figure 4:
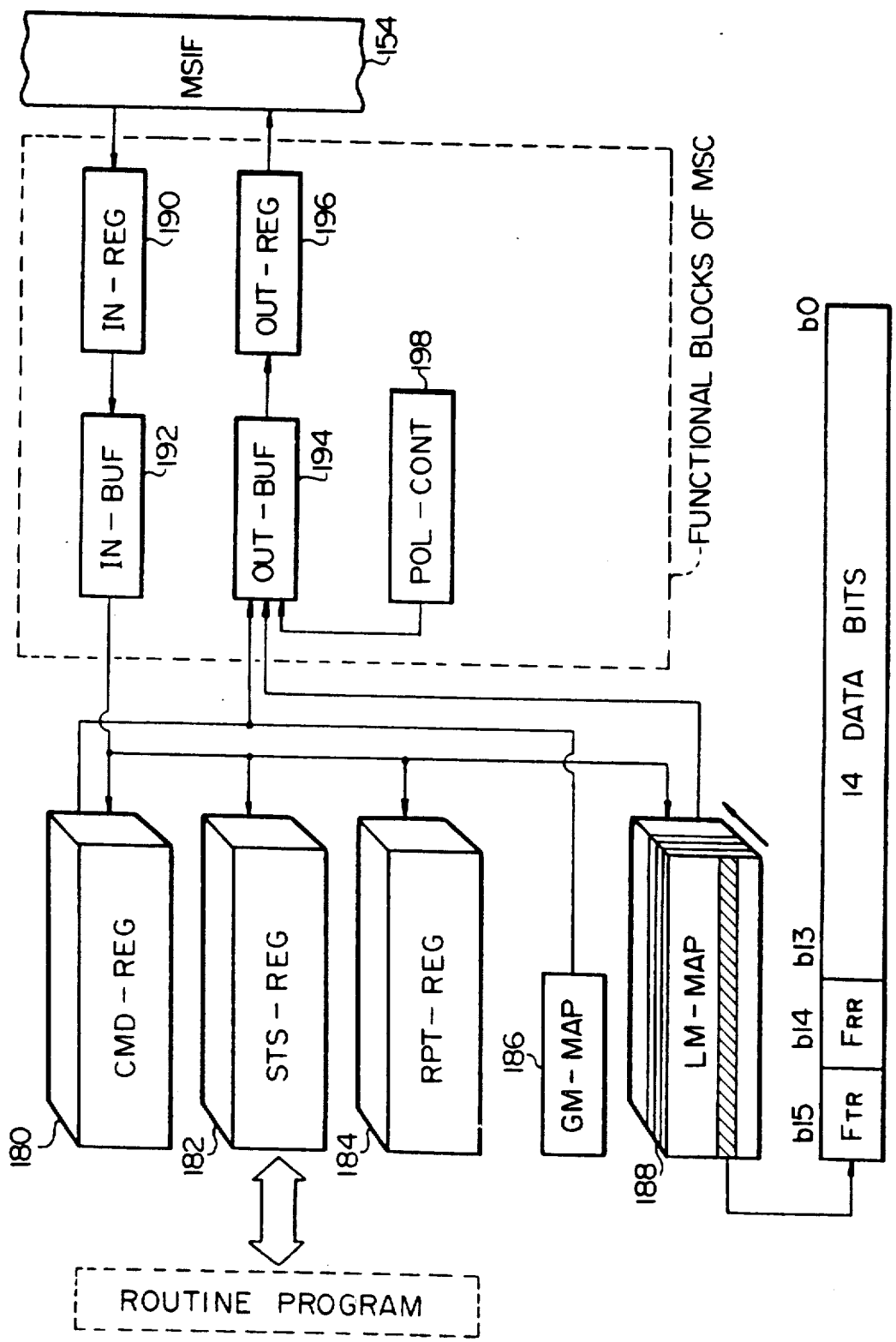
FIG. 4 is a block diagram showing the general relationship between the functional blocks of the master system control unit and the logic address spaces of the memory under the control of the master system control unit in the system illustrated in FIG. 2.

FIG. 4 shows the general arrangement of the functional blocks of the master system control unit 150 in conjunction with the associated logic address spaces of a random-access memory included in the master system control unit 150 of the system described with reference to FIG. 2. The logic address spaces of the memory include those defining:

1) a command register 180 (CMD-REG) having a plurality of memory areas respectively proper to the subsidiary system control units 152a to 152e, 2) a status register 182 (STS-REG) having a plurality of memory areas respectively proper to the subsidiary system control units 152a to 152e, 3) a report register 184 (RPT-REG) having a plurality of memory areas respectively proper to the subsidiary system control units 152a to 152e, 4) a global mode map 186 (GM-MAP) common to all the subsidiary system control units 152a to 152e, and 5) a local mode map 188 (LM-MAP) having a plurality of memory areas respectively proper to the subsidiary system control units 152a to 152e.

The command register 180 is used to transmit data process control commands $C_{DP}$ and communication control command $C_{CC}$ to each of the subsidiary system control units 152a to 152e. The data process control commands $C_{DP}$ and communication control command $C_{CC}$ thus transmitted from the command register 180 to each subsidiary system control unit are stored in the command register 168 of the memory 164 in the particular subsidiary system control unit. The global mode map 186 has stored therein mode data representative of the functions and parameters common to all the subsidiary system control units 152a to 152e so that the mode data sent out from the global mode map 186 of the master system control unit 150 is stored in the respective global mode map 174 of each of the subsidiary system control units 152a to 152e. The report register 184 is used to store the sequence report data generated in and supplied from each of the subsidiary system control units 152a to 152e. As has been noted, the sequence report data indicates an occurrence of an event in each of the subsidiary system control units 152a to 152e.

The local mode map 188 of the memory in the master system control unit 150 is provided to supply to the local mode map 172 of each of the subsidiary system control units 152a to 152e the mode data representing the functions to be executed by the subsidiary system control unit and receive from the local mode map 172 of each of the subsidiary system control units 152a to 152e the status data representing the current status of the subsidiary system control unit. The status data received from the local mode map 172 of each subsidiary system control unit is stored in the corresponding memory area of the local mode map 188 of the master system control unit 150 and, likewise, the mode data supplied from a certain memory area of the local mode map 188 of the master system control unit 150 is stored in the local mode map 172 of the subsidiary system control unit to which the particular memory area of the local mode map 188 corresponds.

The functional blocks of the master system control unit 150 include an input data register 190 (OUT-RE)) connected to the macrosystem interface bus 154 (MSIF). The status data and sequence report data output from each of the subsidiary system control units 152a to 152e are supplied via the macrosystem interface bus 154 to the input data register 190 of the master system control unit 150 and is temporarily stored therein before the data are transferred to an input data buffer 192 (IN-BUF). The status data released from the input data buffer 192 is stored into the local mode map 186 and the sequence report data output from the input data buffer 192 is stored into the report register 184. On the other hand, the command stored in the command register 180 or the mode data stored in the local mode map 186 or the global mode map 188 is temporarily latched in an output data buffer 194 (OUT-BUF) and is thereafter transferred to an output data register 196 (OUT-REG). The data released from the output data register 196 is transmitted to one or all of the subsidiary system control units 152a to 152e by way of the macrosystem interface bus 154 and is stored into the command register 168 or the local or global mode map 172 or 174 of one or each of the subsidiary system control units 152a to 152e.

As has been described, the pieces of data to be stored in the local mode map 188 of the master system control unit 150 include those which are to be transmitted to one or each of the subsidiary system control units 152a to 152e and those which are supplied from one or each of the subsidiary system control units 152a to 152e. Each piece of data thus handled by the local mode map 188 of the master system control unit 150 is provided in the form of a 16-bit data sequence including, in addition to the lower 14 data bits, the most significant bit (b15) used as data transmission request flag $F_{TR}$ and the second most significant bit (b14) used as data receipt report flag $F_{RR}$. The data transmission request flag $F_{TR}$ indicates that the piece of data bearing the particular flag is to be sent out from the master system control unit 150 to one or each of the subsidiary system control units 152a to 152e, while the data receipt system flag $F_{RR}$ indicates that the piece of data bearing the particular flag is sent from any of the subsidiary system control units 152a to 152e and is to be accepted in the master system control unit 150.

Thus, upon receipt of a piece of data supplied from one of the subsidiary system control units 152a to 152e through the input data register 190 and input data buffer 192, the master system control unit 150 sets a logic value "1" at the 15th bit "b14" of the data as the data receipt report flag $F_{RR}$ and thereafter stores the data into an appropriate memory area of the local mode map 188. The data receipt report flag $F_{RR}$ of logic value "1" of the piece of data thus stored into the master system control unit 150 is reset to logic value "0" after the data has been processed as required in the master system control unit 150. On the other hand, a piece of data to be supplied from the master system control unit 150 to one or each of the subsidiary system control units 152a to 152e has a logic value "1" which is set at the 16th bit b15 of the data as the data transmission request flag $F_{TR}$ and is thereafter sent to the destination through the output data buffer 94 and output data register 196. The data transmission request flag $F_{TR}$ of logic value "1" of the piece of data thus stored into the subsidiary system control unit is reset to logic value "0" after the data has been processed as required in the subsidiary system control unit.

The functional block of the master system control unit 150 further include a polling control block 198 (POL-CONT) by means of which the master system control unit 150 is enabled to communicate with each of the subsidiary system control units 152a to 152e. Thus, the master system control unit 150 sends out a request for communication to each of the subsidiary system control units 152a to 152e from this polling control block 198. The request for communication thus issued from the polling control block 198 is passed through the output data buffer 194 and output data register 196 to any one of the subsidiary system control units 152a to 152e and, on receipt of the request, the subsidiary system control unit starts communication with the master system control unit 150.

Arrangement of Communication Network

Figure 5:
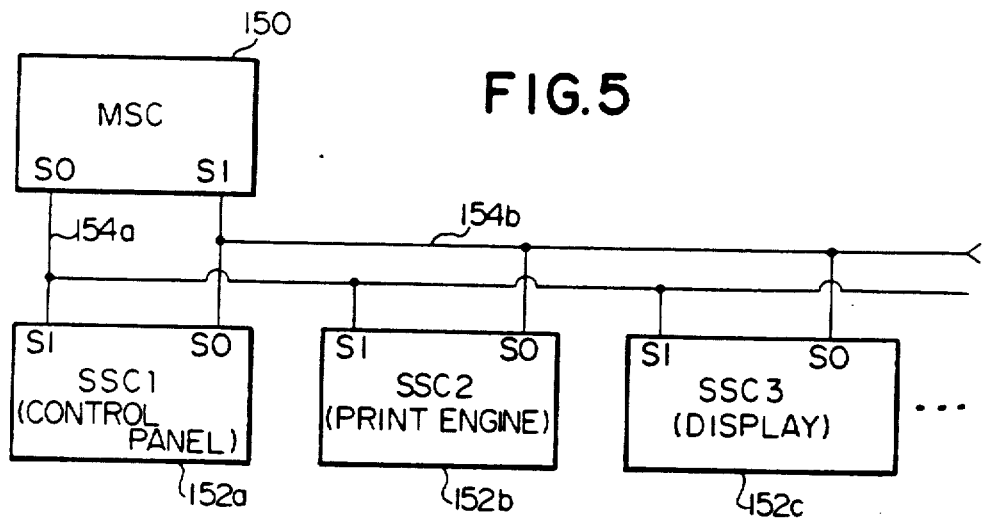
FIG. 5 is a block diagram showing the general circuit arrangement of a communication network organized in the image processing system embodying the present invention.

FIG. 5 shows the general circuit arrangement of a communication network organized in the image processing system embodying the present invention, wherein the optional subsidiary system control units 152d and 152e included in the system shown in FIG. 2 are omitted from illustration for simplicity sake. As illustrated in FIG. 5, the subsidiary system control units 152a to 152c herein shown (labelled SSC1, SSC2 and SSC3, respectively) have respective input terminals SI connected through a common serial data transmission line 154a to an output terminal SO of the master system control unit 150 and respective output terminals SO connected through a common serial data transmission line 154b to an input terminal SI of the master system control unit 150. The serial data transmission lines 154a and 154b thus interconnecting the master system control unit 150 and subsidiary system control units 152a to 152c form part of the macrosystem interface bus 154.

Hardware Configuration of Control Unit

Figure 6:
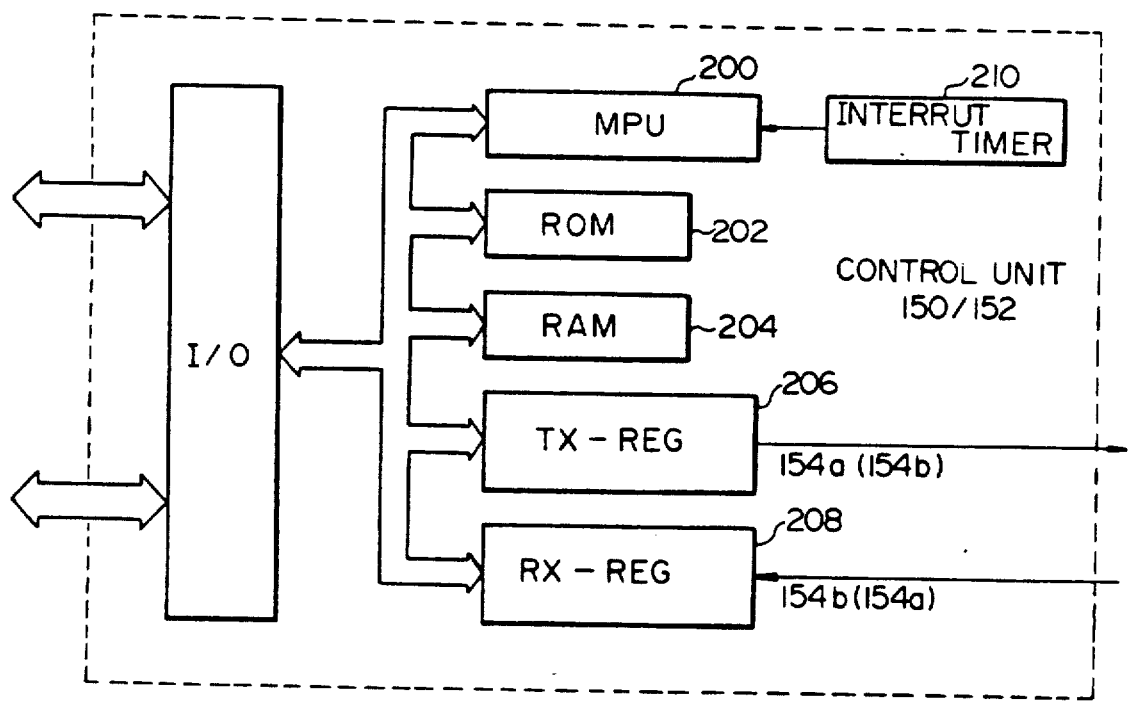
FIG. 6 is a block diagram showing an example of the hardware configuration of each of the master and subsidiary system control units connected by the communication network illustrated in FIG. 5.

FIG. 6 shows an example of the hardware configuration of each of the master and subsidiary system control units connected by the communication network illustrated in FIG. 5. As shown, each of the master system control unit 150 and subsidiary system control units 152a to 152e comprises a microprocessor 200, a read-only memory 202 (ROM) fixedly storing the program predominant over the operation of the microprocessor 200, a random-access memory 204 (RAM) providing the logic address spaces for the master system control unit 150 or each of the subsidiary system control units 152a to 152e, an output data register 206 (TX-REG) connected to the serial data transmission line 154a or 154b, and an input data register 208 (RX-REG) connected to the serial data transmission line 154b or 154a. Each of the master system control unit 150 and subsidiary system control units 152a to 152e further comprises an interrupt timer 210 which dictates the timings at which the microprocessor 192 is to be interrupted by an external system control unit.

The microprocessor 200 herein shown may correspond to the microprocessor 166 of each of the subsidiary system control units 152a to 152e and the random-access memory 204 herein shown may correspond to the memory 164 of each of the subsidiary system control units 152a to 152e. Thus, the random-access memory 204, when corresponding to the memory 164 of each of the subsidiary system control units 152a to 152e, has defined therein the command register 168, status register 170, local mode map 172, global mode map 174, and report register 176 as described with reference to FIG. 3. On the other hand, the random-access memory 204, when incorporated in the master system control unit 150, has defined therein the command register 180, status register 182, report register 184, global mode map 186, and local mode map 188 as described with reference to FIG. 4.

Furthermore, the output and input data registers 206 and 208 shown in FIG. 6 may correspond to the output and input data registers 196 and 190, respectively, of the master system control unit 150 shown in FIG. 4 and respectively have associated output and input data buffers similar to the buffers 194 and 194 included in the master system control unit 150.

The microprocessor 200 of the master system control unit 150 implemented by the system control unit herein shown is activated in response to a command signal from the supervisory control unit 162 incorporated in the user system (FIG. 2). The microprocessor 200 of the master system control unit 150 thus activated executes the program incorporated in the read-only memory 202 and accesses the various logic address spaced within the random-access memory 204. The microprocessor 200 thus fetches the data process control commands $C_{DP}$ and communication control command $C_{CC}$ which have been stored in these logic address spaces and outputs the commands $C_{DP}$ and $C_{CC}$ to the data transmission line 154a through the output data register 206 of the master system control unit 150. Each or one of the subsidiary system control units 152a to 152e receives these data processing and communication control commands $C_{DP}$ and $C_{CC}$ and temporarily stores the control commands $C_{DP}$ and $C_{CC}$ in the input data register 208 thereof. Thereafter, the microprocessor 200 of the particular subsidiary system control unit executes the program fetched from the read-only memory 202 of the subsidiary system control unit in order to provide the functions designated by the commands $C_{DP}$ and $C_{CC}$ received. If the subsidiary system control unit under consideration is required to send out status data, the microprocessor 200 of the subsidiary system control unit fetches the status data stored in the status register provided in one of the logic address spaces in the random-access memory 204 and outputs the status data to the data transmission line 154b through the output data register 206 of the subsidiary system control unit. The data thus output to the data transmission line 154b is transmitted to and temporarily stored in the input data register 208 of the master system control unit 150 and is thereafter stored into the random-access memory 204 of the master system control unit 150 for being read out by the microprocessor 200 of the control unit 150.

Communication Protocol

Figure 7:
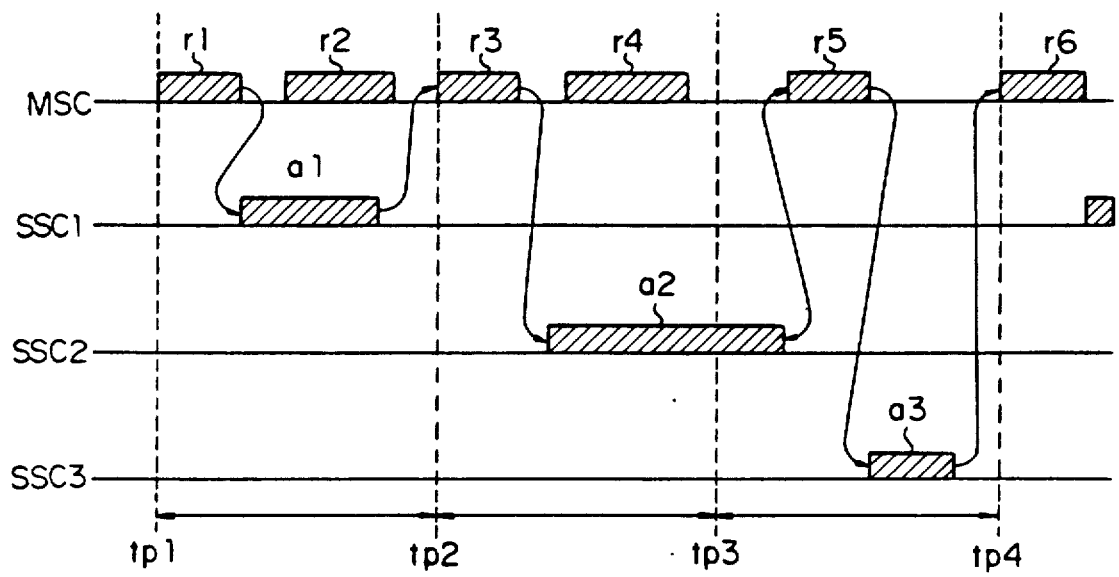
FIG. 7 is a time chart showing the basic concept of the polling mode of communication used in the image processing system embodying the present invention.

In the image processing system embodying the present invention, the communication between the master system control unit 150 and each of the subsidiary system control units 152a to 152e is effected basically in a polling mode of communication in which the individual subsidiary system control units 152a to 152e successively send out answers responsive to requests for communication from the master system control unit 150 which plays the role of a control terminal. FIG. 7 is a time chart showing the basic concept of the polling mode of communication thus used in the image processing system embodying the present invention, wherein the subsidiary system control units are herein represented by the subsidiary system control units 152a to 152c (SSC1, SSC2 and SSC3) implementing the control panel control, print engine control and display control modules of the system.

As indicated in FIG. 7, the master system control unit 150 is allowed to output a succession of communication request frames r1, r2, r3, ... at timings determined arbitrarily by the master system control unit 150 per se without respect to the cycles of polling operation which are assumed to be started at times tp1, tp2, tp3, , , , , respectively. On the other hand, the subsidiary system control units 152a to 152c are permitted to send out answer frames a1, a2 and a3 at timings determined to occupy the data transmission line 154b for limited time durations respectively granted to the subsidiary system control units 152a to 152c. If, thus, the communication request frame r1 is issued from the master system control unit 150 to the first subsidiary system control unit 152a at time tp1 which is coincident with the starting of a first cycle of polling operation as indicated in FIG. 7, the subsidiary system control unit 152a responsive to the communication request frame r1 recognizes from the identification code included in the request frame r1 that it is the subsidiary system control unit 152a itself which is currently requested to communicate with the master system control unit 150. Thus, the subsidiary system control unit 152a which has received the communication request frame r1 sends out the answer frame a1 at a timing subsequent to time tp1. Having received the answer frame a1 from the subsidiary system control unit 152a by the end of the first cycle of polling operation, the master system control unit 150 will direct the communication request frame r3 to the second subsidiary system control unit 152b at time tp2 which is coincident with the starting of a second cycle of polling operation. The second subsidiary system control unit 152b will thus recognize from the identification code included in the communication request frame r3 that it is the subsidiary system control unit 152b which is now requested to communicate with the master system control unit 150. Thus, the subsidiary system control unit 152b which has received the communication request frame r3 will send out the answer frame a2 at a timing subsequent to time tp2 but prior to the termination of the second cycle of polling operation. Upon detection of the termination of the answer frame a2 from the subsidiary system control unit 152b as at a timing later than the starting of a third cycle of polling operation, the master system control unit 150 will direct the communication request frame r5 to the third subsidiary system control unit 152c at a timing later than the time tp3 at which the third cycle of polling operation is started. The third subsidiary system control unit 152c which has received the communication request frame r5 will send out the answer frame a3 at a timing prior to the termination of the third cycle of polling operation.

Thus, the request for communication directed to each of the subsidiary system control units 152a to 152c is issued from the master system control unit 150 on condition that (1) the answer frame responsive to the preceding communication request frame has terminated and that (2) the cycle of polling operation during which the preceding request frame was issued has terminated. The latter requirement is useful for avoiding reduction of the data processing efficiency in each subsidiary system control unit as would otherwise result from an increase in the frequency of communication between the master system control unit 150 and each subsidiary system control unit. It may be noted that the master system control unit 150 is allowed to send the communication request frames r2, r4, ... to any of the subsidiary system control units 152a to 152c without respect to the answer frames received from the subsidiary system control units.

Bit Configuration of Data Frame

Figure 8:
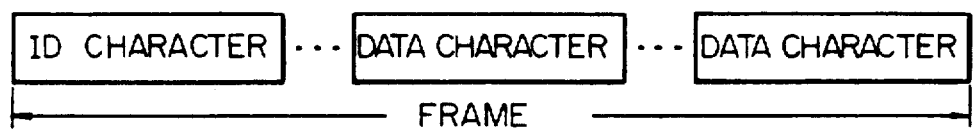
FIG. 8 is a diagram showing the "character" configuration of a frame of data used in the polling mode of communication between the master system control unit and each of the subsidiary system control units in the image processing system embodying the present invention.
Figure 9:
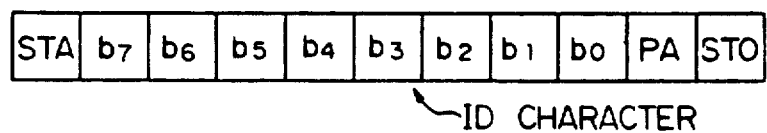
FIG. 9 is a diagram showing the bit sequence forming each of the identification and data characters implementing the data frame illustrated in FIG. 8.

Each of the communication request frames transmitted from the master system control unit 150 to the subsidiary system control units 152a to 152e and the answer frames transmitted from the subsidiary system control units 152a to 152e to the master system control unit 150 is provided in the form of a frame of data having a variable length and composed of a variable number of "characters" each of a predetermined length. The characters thus forming a frame include a starting character herein referred to as identification (ID) character followed by one or more characters which are herein referred to as data characters as indicated in FIG. 8. As further depicted in FIG. 9, each of the identification and data characters thus forming a frame is composed of an eleven-bit bit sequence consisting of a start bit "STA" implemented by the most significant bit and thus indicating the start of the character, a series of eight data bits b7, b6, b5, . . . b0 subsequent to the starting bit "STA", a parity bit "PA" subsequent to the last one of the data bits, and a stop bit "STO" implemented by the least significant bit of the bit sequence and thus indicating the end of the character. The start bit "STA", parity bit "PA" and stop bit "STO" are common to the identification and data characters and, thus, the identification character is discriminated from the data character or characters in respect of the logic states of the eight data bits b7 to b0.

Figure 10:
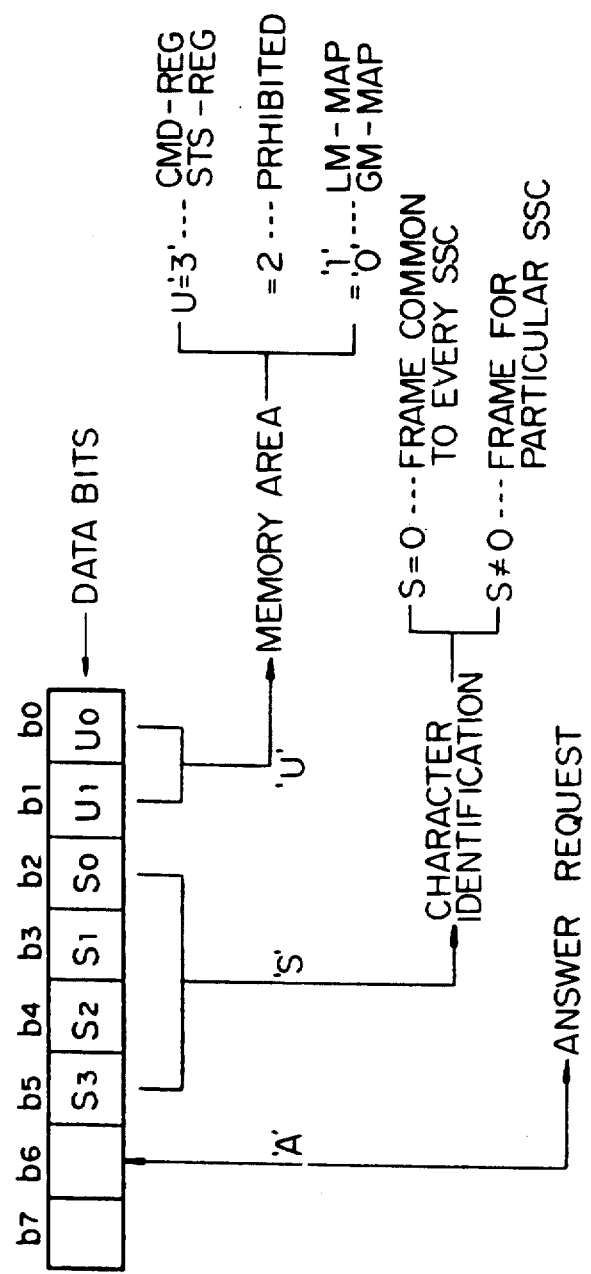
FIG. 10 is a diagram showing the configuration of the data bits included in each of the identification and data characters forming the identification character having the bit sequence illustrated in FIG. 9.

The highest-order data bit b7 of the identification character is set to logic value "1" by which the identification character is discriminated from the data character which has the highest-order bit b7 set to logic value "0". The highest-order data bit b7 of the identification character will thus be herein referred to as character identification bit "I" as indicated in FIG. 10. The second highest-order bit b6 of the identification character is used as answer request bit "A" indicating whether or not the control unit in which the frame including the character is requesting an answer to the particular frame. The bits b5 to b2 of the identification character form a four-bit destination identification code "S" (=S3-S2-S1-S0) specifying the destination of the frame including the character. The remaining two bits b1 and b0 of the identification character form a memory area identification code "U" (=U1-U0) designating the memory area to be accessed in the logic address spaces of the random-access memory incorporated in the control unit by which the frame including the character is to be received.

As will have been understood from the above description, the identification character organized as illustrated in FIG. 10 is capable of expressing various pieces of data by the different combinations of the logic states of the answer request bit "A", destination identification code "S" and memory area identification code "U" contained in the character. Any of such combinations of the logic states of the bits b7 to b0 is further combined with the subsequent data character or characters to form a variety of frames having different configurations. These frames include a sequence command, a mode set frame, a status request frame and a mode request frame which are to be transmitted from the master system control unit 150 to each of the subsidiary system control units 152a to 152e, and a status answer frame, a sequence report frame, a mode answer frame which are to be transmitted from each of the subsidiary system control units 152a to 152e to the master system control unit 150. Description will be hereinafter made in regard to each of these various frames used in the image processing system embodying the present invention.

(1) Sequence Command

The sequence command is a frame to be transmitted from the master system control unit 150 to each of the subsidiary system control units 152a to 152e. This sequence command is one of the previously mentioned data processing commands $C_{DP}$ and is used to control all the phases and aspects of the operation of the image processing system embodying the present invention. The sequence command transmitted from the master system control unit 150 to each of the subsidiary system control units 152a to 152e is stored into the command register 168 of the memory 164.

(2) Mode Set Frame

The mode set frame is also transmitted from the master system control unit 150 to each of the subsidiary system control units 152a to 152e and is used to renew the modes of operation which have been established in all of the subsidiary system control units 152a to 152e or the mode or modes of operation of one or more of the subsidiary system control units 152a to 152e. The mode set frame is effective to update the mode data currently stored in the local mode map 172 or the mode data currently stored in the global mode map 174 of the subsidiary system control unit or each of the subsidiary system control units which have received the frame.

(3) Status Request Frame

The status request frame is also transmitted from the master system control unit 150 to each of the subsidiary system control units 152a to 152e and is used to request the recipient subsidiary system control unit to send back to the master system control unit 150 the status data currently stored in the status register 170 of the subsidiary system control unit. During polling mode of communication established between the master system control unit 150 and each of the subsidiary system control units 152a to 152e, this status request frame is used to inform each of the subsidiary system control units 152a to 152e of the timing at which the subsidiary system control unit is to transmit a frame to the master system control unit 150. The status request command implements the previously mentioned communication control command $C_{CC}$.

(4) Mode Request Frame

The mode request frame is also transmitted from the master system control unit 150 to each of the subsidiary system control units 152a to 152e and is used to request the recipient subsidiary system control unit to send back to the master system control unit 150 the mode data currently stored in the local mode map 172 or the mode data currently stored in the global mode map 174 of the subsidiary system control unit or each of the subsidiary system control units which have received the frame. The mode request frame is useful for confirming whether or not each of the subsidiary system control units 152a to 152e is operating in a proper state or has properly responded to the mode set frame.

(5) Status Answer Frame

The status answer frame is to be transmitted from each of the subsidiary system control units 152a to 152e in response to the status request frame or the sequence command received from the master system control unit 150. The status answer frame is used to send back to the master system control unit 150 the command currently stored in the command register 168 or the status data currently stored in the status register 170 of the subsidiary system control unit or each of the subsidiary system control units which have received the frame.

(6) Mode Answer Frame

The mode answer frame is also transmitted from each of the subsidiary system control units 152a to 152e to the master system control unit 150 in response to the mode request frame received from the master system control unit 150. The mode answer frame is used to send back to the master system control unit 150 the mode data currently stored in the local mode map 172 of the subsidiary system control unit or each of the subsidiary system control units which have received the frame.

(7) Sequence Report Frame

The sequence report frame is transmitted from each of the subsidiary system control units 152a to 152e to the master system control unit 150 when any event which should be informed to the master system control unit 150 has taken place in connection with any operation carried out or being carried out under the control of a subsidiary system control unit. The sequence report frame is useful, when issued in conjunction with the sequence command issued from the master system control unit 150, for controlling all the phases and aspects of the operation of the image processing system embodying the present invention.

Each of the frames above described is used in conjunction with one or more of the other frames. For example, the status answer is issued from any of the subsidiary system control units 152a to 152e in response to the sequence command transmitted from the master system control unit 150. In response, furthermore, to the status request frame issued from the master system control unit 150, the subsidiary system control unit which has received the frame sends back the status answer to the master system control unit 150. When the master system control unit 150 sends the mode request the mode request frame to any of the subsidiary system control units 152a to 152e, the subsidiary system control unit which has received the frame responds to the frame by sending the mode answer to the master system control unit 150. When, however, there is the mode set frame output from the master system control unit 150, none of the subsidiary system control units 152a to 152e is responsive to the frame. Likewise, when there is the sequence report frame submitted from any of the subsidiary system control units 152a to 152e, the master system control unit 150 is not responsive to the frame.

The values, in hexadecimal notation, of the answer request bit "A", destination identification code "S" and memory area identification code "U" contained in the identification character included in each of the frames hereinbefore described are demonstrated in the following Table I wherein "P.C." refers to "Prohibited Combination".

TABLE I

| "A" | "S" | "U" | FROM MSC | FROM SSC |
|---|---|---|---|---|
| 0 | 0 | 3 | Sequence Command | Status Answer Frame, or Sequence Report Frame |
| 0 | 0̄ | 2 | (P.C.) | (P.C.) |
| 0 | 0̄ | 1 | Mode Set Frame | Mode Answer Frame |
| 0 | 0 | 0 | (LM-MAP) | (LM-MAP) |
| 0 | 0 | 3 | Sequence Command | (P.C.) |
| 0 | 0 | 2 | (P.C.) | (P.C.) |
| 0 | 0 | 1 | (P.C.) | (P.C.) |
| 0 | 0 | 0 | Mode Set Frame (GM-MAP) | (P.C.) |
| 1 | 0̄ | 3 | Status Request Frame | (P.C.) |
| 1 | 0̄ | 2 | (P.C.) | (P.C.) |
| 1 | 0̄ | 1 | Mode Request Frame | (P.C.) |
| 1 | 0 | 0 | (LM-MAP) | (P.C.) |
| 1 | 0 | 3 | (P.C.) | (P.C.) |
| 1 | 0 | 2 | (P.C.) | (P.C.) |
| 1 | 0 | 1 | (P.C.) | (P.C.) |
| 1 | 0 | 0 | (P.C.) | (P.C.) |

Formats of Frames Originating in MSC

Description will be hereinafter made with reference to FIGS. 11A to 11E which show examples of the character and bit formats of the various frames which originate in the master system control unit 150 for transmission to each of the subsidiary system control units 152a to 152e in the image processing system embodying the present invention.

FIG. 11A shows an example of the character and bit format of the sequence command. The sequence command is composed of three characters which consist of two 8-bit data characters $DC_1$ and $DC_2$ in addition to an identification character IDC having the tabulated bit configuration. Each of the two data characters $DC_1$ and $DC_2$ has a most significant bit (b7) set at logic value "0". The second highest bit (b6) of the first data character $DC_1$ immediately following the identification character IDC functions as a receipt confirmation bit "Q" and is used in combination with the status answer frame to confirm whether or not the sequence command directed to a subsidiary system control unit has been duly received by the subsidiary system control unit. The third highest bit (b5) of the first data character $DC_1$ and the second highest bit (b6) of the second data character $DC_2$ immediately following the first data character $DC_1$ are reserved for future use (RFU). The bits thus reserved for future use are disregarded by the subsidiary system control units 152a to 152e. Thus, a command code $C_4$ to $C_0$ indicative of the sequence command is assigned to the lower five bits (b4 to b0) of the first data character $DC_1$, and a parameter $P_6$ to $P_0$ is assigned to the lower six bits (b6 to b0) of the second data character $DC_2$.

FIG. 11B shows an example of the character and bit format of the status request frame. The status request frame is composed of an identification character IDC alone and has the tabulated bit configuration.

FIG. 11C shows an example of the character and bit format of the mode set frame. The mode set frame is of the word type configuration and is composed of four characters which consist of three 8-bit data characters $DC_1$ to $DC_3$ in addition to an identification character IDC having the tabulated bit configuration. Each of the data characters $DC_1$ to $DC_3$ has a most significant bit (b7) set at logic value "0". To the lower seven bits (b6 to b0) of the first data character $DC_1$ immediately following the identification character IDC is assigned a 7-bit map address $M_6$ to $M_0$ which is indicative of the address space into which the data represented by the 14-bit data word $D_D$ to $D_0$ at the lower seven bits (b6 to b0) of the second and third data characters $DC_2$ and $DC_3$ is to be stored. When the destination identification code "S" (=S3-S2-S1-S0) of the identification character IDC is set at value "0", the data represented by the data word $D_D$ to $D_0$ is stored into the global mode map 174 of every one of the subsidiary system control units 152a to 152e.

When the destination identification code "S" is set at a non-zero numerical value, the data represented by the 14-bit data word $D_D$ to $D_0$ is stored into the local mode map 172 or global mode map 174 of the particular one of the subsidiary system control units 152a to 152e. The particular subsidiary system control unit into which the data is to be transmitted is determined by the non-zero numerical value of the destination identification code "S". In this instance, whether the data is to be stored into the local mode map 172 or the global mode map 174 of the subsidiary system control unit is determined by the numerical value of the memory area identification code "U" of the identification character IDC. The map address $M_6$ to $M_0$ represented by the first data character $DC_1$ could not be set at hexadecimal value 7F (which equals 127 in decimal notation) which is reserved for indicating the termination of a frame such as the mode answer frame as will be described.

FIG. 11D shows an example of the character and bit format of the mode set frame of the string type configuration. While a single piece of data is provided for a single address by the mode set frame of the word type configuration as above described, two or more pieces of data can be provided for a single address by the mode set frame of the string type configuration. The mode set frame of the string type configuration is shown composed of characters consisting of an n number of 8-bit data characters $DC_1$ to $DC_n$ in addition to an identification character IDC having the tabulated bit configuration. Each of the data characters $DC_1$ to $DC_n$ has a most significant bit (b7) set at logic value "0".

To the lower seven bits (b6 to b0) of the first data character $DC_1$ immediately following the identification character IDC is assigned a 7-bit map address $M_6$ to $M_0$ indicative of the address space into which the data represented by this frame is to be stored. The first data character $DC_1$ thus indicating the map address $M_6$ to $M_0$ is followed by the second data character $DC_2$ to which is assigned 7-bit data $L_6$ to $L_0$ indicative of the number of the 14-bit data words contained in this frame. The data words, $D_D$ to $D_0$, are formed by the lower seven bits (b6 to b0) of the third to nth data characters $DC_3$ to $DC_n$. The mode set frame of the string type configuration is in other respects similar to the mode set frame of the word type configuration. The map address $M_6$ to $M_0$ represented by the first data character $DC_1$ could not be set at numerical value 7F for the reason explained hereinabove.

FIG. 11E shows an example of the character and bit format of the mode request frame. The mode request frame is composed of two characters which consist of a single 8-bit data character $DC_1$ in addition to an identification character IDC having the tabulated bit configuration. The sole data characters $DC_1$ has a most significant bit (b7) set at logic value "0". The lower seven bits (b6 to b0) of the data character $DC_1$ are indicative of a 7-bit map address $M_6$ to $M_0$ at which data is to be fetched from the local mode map 172 or the global mode map 174 of the subsidiary system control unit to which the frame is directed. The map address $M_6$ to $M_0$ represented by the data character $DC_1$ could not be set at numerical value 7F also for the reason explained.

Formats of Frames Originating in SSC

FIGS. 12A to 12D which show examples of the character and bit formats of the various frames which originate in each of the subsidiary system control units $152a$ to $152e$ for transmission to the master system control unit 150 in the image processing system embodying the present invention.

Figure 12A:
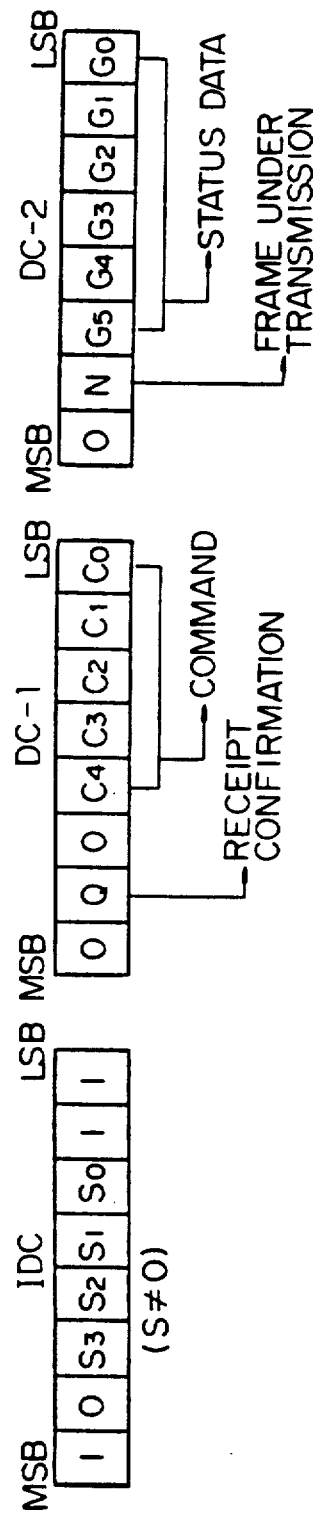
FIGS. 12A, 12B, 12C and 12D are diagrams showing examples of the character and bit formats of the various frames which originate in each of the subsidiary system control units for transmission to the master system control unit in the image processing system embodying the present invention.

FIG. 12A shows an example of the character and bit format of the status answer frame. The status answer frame is composed of characters which consist of two 8-bit data characters $DC_1$ and $DC_2$ in addition to an identification character IDC having the tabulated bit configuration. Each of the two data characters $DC_1$ and $DC_2$ has a most significant bit (b7) set at logic value "0". The second highest bit (b6) of the first data character $DC_1$ immediately following the identification character IDC functions as a receipt confirmation bit "Q" and is used in combination with the status answer frame to confirm whether or not the sequence command directed to the subsidiary system control unit under consideration has been duly received by the subsidiary system control unit. The receipt confirmation bit "Q" maintained at logic value "1" indicates that receipt has not been confirmed of a frame which has been issued from the master system control unit 150 and as such the master system control unit 150 is prohibited from issuing a new frame. The receipt confirmation bit "Q" is reset to logic value "0" after a command transmitted from the master system control unit 150 has been executed by the subsidiary system control unit responsive to the frame from the master system control unit 150.

The lower five bits (b4 to b0) of the first data character $DC_1$ are indicative of a code $C_4$ to $C_0$ representative of the command which is currently stored in the command register 168 of the subsidiary system control unit. This command code $C_4$ to $C_0$ is useful for enabling the master system control unit 150 to confirm whether or not a frame transmitted toward a particular subsidiary system control unit has been duly received by the subsidiary system control unit. When the status answer frame having the receipt confirmation bit "Q" reset to logic value "0" as discussed above, the command code $C_5$ to $C_0$ is cleared.

The second highest bit (b6) of the second data character $DC_2$ functions as a frame-under-transmission bit "N" which indicates that a frame is to be transmitted from the subsidiary system control unit subsequently to the frame currently transmitted. This frame-to-continue bit "N" enables the master system control unit 150 to confirm the termination of a series of frames transmitted from the subsidiary system control unit. The lower six bits (b5 to b0) of the second data character $DC_2$ indicate a code $G_5$ to $G_0$ representative of the status data currently stored in the status register 170 of the subsidiary system control unit under consideration. If the data to be sent from the subsidiary system control unit is provided in the form of two or more frames, the plurality of frames are transmitted successively from the subsidiary system control unit to the master system control unit 150 with the frame-to-continue bit "N" maintained at logic value "1" until all the frames are sent out from the subsidiary system control unit.

Figure 12B:
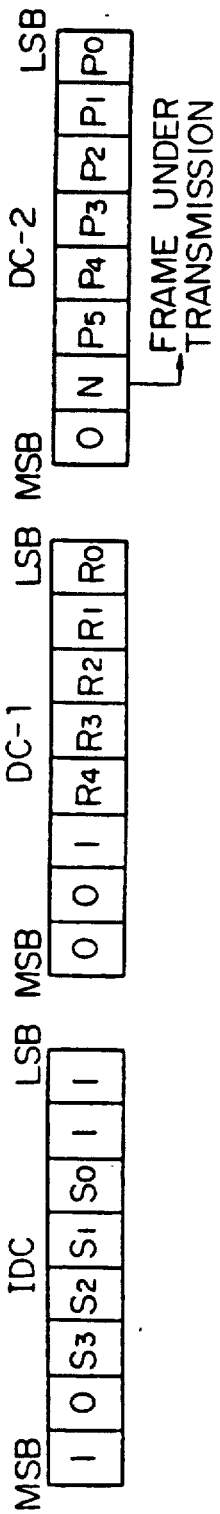

FIG. 12B shows an example of the character and bit format of the sequence report frame. The sequence report frame is composed of characters which consist of two 8-bit data characters $DC_1$ and $DC_2$ in addition to an identification character IDC having the tabulated bit configuration. Each of the data characters $DC_1$ and $DC_2$ has a most significant bit (b7) set at logic value "0". A report code $R_4$ to $R_0$ indicative of the sequence report data is assigned to the lower five bits (b4 to b0) of the first data character $DC_1$, and a parameter $P_6$ to $P_0$ is assigned to the lower six bits (b6 to b0) of the second data character $DC_2$. The second highest bit (b6) of the second data character $DC_2$ functions as a frame-to-continue bit "N" as in the status answer frame.

Figure 12C:
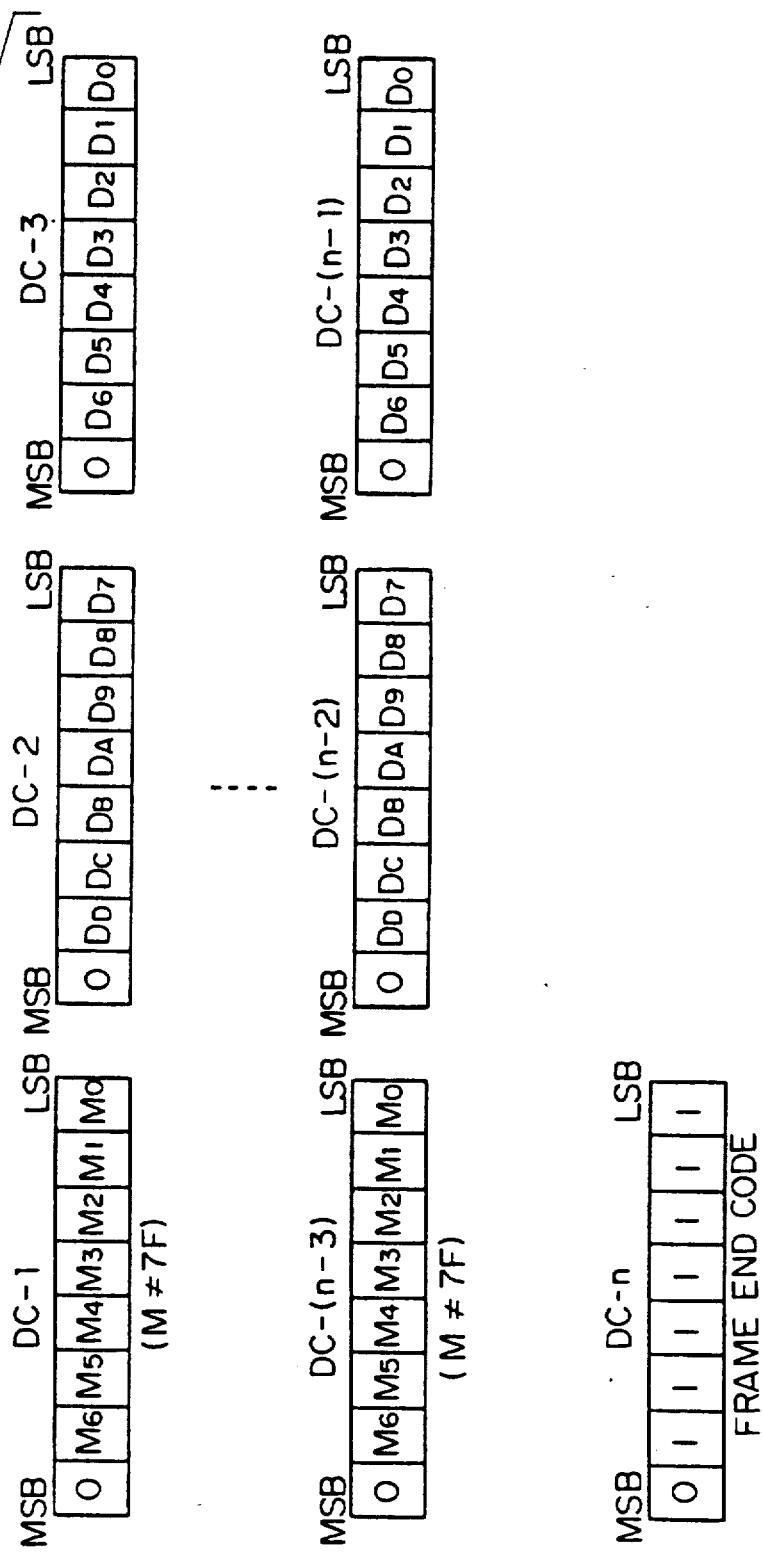

FIG. 12C shows an example of the character and bit format of the mode answer frame. The mode answer frame is of the word type configuration and is assumed to be composed of characters which consist of an n number of 8-bit data characters $DC_1$ to $DC_n$ in addition to an identification character IDC having the tabulated bit configuration. Each of the data characters $DC_1$ to $DC_n$ has a most significant bit (b7) set at logic value "0". The data characters $DC_1$ to $DC_n$ in turn consist of a maximum of four groups of data characters in addition to the last, viz., the nth data character $DC_n$, each group of the data characters consisting of a map address character followed by two data characters.

To the lower seven bits (b6 to b0) of the first data character $DC_1$, $DC_4$, ... $DC_{n-3}$ of each group of data characters is thus assigned a map address $M_6$ to $M_0$ indicative of the address space into which the data represented by the 14-bit data word $D_D$ to $D_0$ formed by the lower seven bits (b6 to b0) of the second data character $DC_2$, $DC_5$, ... $DC_{n-2}$ and third data characters $DC_3$, $DC_6$, ... $DC_{n-1}$ is to be stored. The nth data character $DC_n$ following these groups of data characters $DC_1$ to $DC_{n-1}$ has a logic value "1" at each of its lower seven bits (b6 to b0) to indicate a hexadecimal value of 7F. These lower seven bits of the last data character $DC_n$ are used to form a frame end code indicating the termination of the mode answer frame and, for this reason, the 14-bit data word $D_D$ to $D_0$ as well as the 7-bit map address $M_6$ to $M_0$ could not be set at numerical value 7F.

Figure 12D:
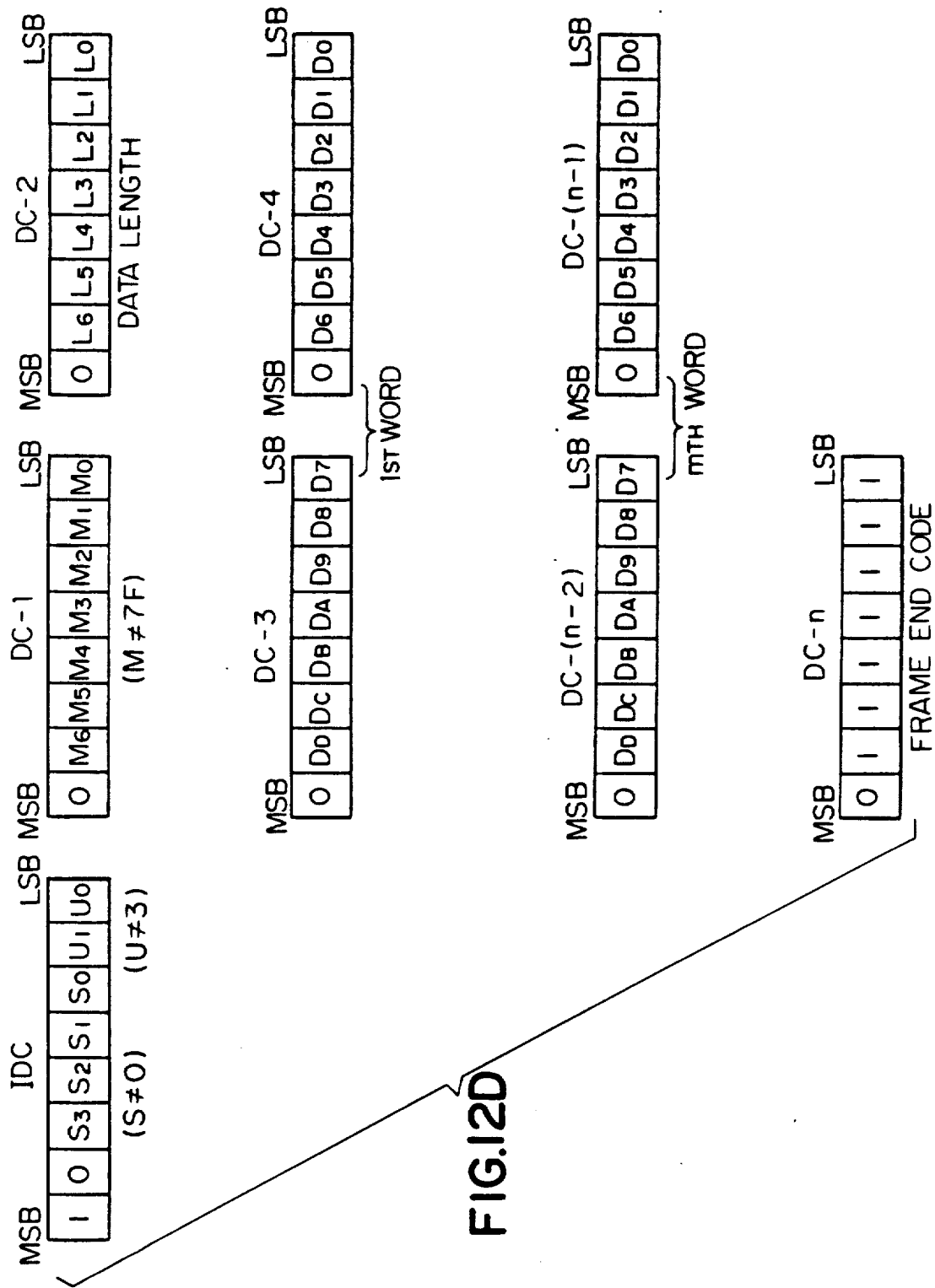

FIG. 12D shows an example of the character and bit format of the mode answer frame of the string type configuration. As has been described in connection with the mode set frame illustrated in FIG. 11D, two or more pieces of data can be provided for a single address by the mode answer frame of the string type configuration. The mode answer frame of the string type configuration is shown composed of characters consisting of an n number of 8-bit data characters $DC_1$ to $DC_n$ in addition to an identification character IDC having the tabulated bit configuration. Each of the data characters $DC_1$ to $DC_n$ has a most significant bit (b7) set at logic value "0".

To the lower seven bits (b6 to b0) of the first data character $DC_1$ immediately following the identification character IDC is assigned a map address $M_6$ to $M_0$ indicative of the address space into which the data represented by this frame is to be stored. The first data character $DC_1$ thus indicating the map address $M_6$ to $M_0$ is followed by the second data character $DC_2$ to which is assigned data $L_6$ to $L_0$ indicative of the number of the data words contained in this frame. The data words, $D_D$ to $D_0$, are formed by the lower seven bits (b6 to b0) of the third to (n−1)th data characters $DC_3$ to $DC_{n-1}$.

The nth data character $DC_n$ following these data characters $DC_3$ to $DC_{n-1}$ has a logic value "1" at each of its lower seven bits (b6 to b0) to form a frame end code indicating the termination of the mode answer frame. Thus, the 14-bit data word $D_D$ to $D_0$ as well as the 7-bit map address $M_6$ to $M_0$ could not be set at numerical value 7F.

As will have been understood from the foregoing description, the master system control unit 150 and each of the subsidiary system control units 152a to 152e in the image processing system embodying the present invention communicates with each other with use of frames and the letter is permitted to communicate with the formed when, and only when, requested by the former. If there is a great amount of data to be transmitted from any of the subsidiary system control units 152a to 152e to the master system control unit 150, the data must be broken down to a series of frames and, when such a series of frames is transmitted to the master system control unit 150, the master system control unit 150 is required to detect termination the series of the frames before the master system control unit 150 sends out a request for communication to any other subsidiary system control unit. The frame-to-continue bit "N" included in the status answer frame (FIG. 12A) or the sequence report frame (FIG. 12B) is used to indicate that there is a frame being transmitted from the subsidiary system control unit toward the master system control unit 150.

FIG. 13 shows examples of the formats of a series of frames including such a frame-to-continue bit "N".

Section (1) of FIG. 13 is presented for the sake of comparison between a single frame and a series of frames, wherein the status answer frame is followed by neither a sequence report frame nor a mode answer frame and, thus, the frame-to-continue bit "N" is set at a logic value "0". In the series of frames shown in section (2) of FIG. 13, the status answer frame is followed by a single sequence report frame and, thus, the frame-to-continue bit "N" in the status answer frame is set at logic value "1" and the frame-to-continue bit "N" in the sequence report frame is set at a logic value "0". In the series of frames shown in section (3) of FIG. 13, the status answer frame is followed by a mode answer frame including the frame end code so that the frame-to-continue bit "N" in the status answer frame is set at logic value "1". The termination of the series of frames is thus indicated either by the frame-to-continue bit "N" of logic "0" in the sequence report frame or by the frame end code in the mode answer frame. The series of frames shown in section (4) of FIG. 13 includes the status answer frame followed by a sequence report frame which is further followed by a mode answer frame. The frame-to-continue bit "N" in each of the status answer and sequence report frames is set at logic value "1" with the termination of the series of frames is indicated the frame end code in the mode answer frame.

Status Data

In the image processing system embodying the present invention, each of the subsidiary system control units 152a to 152e is enabled to execute any of its functions under the control of the master system control unit 150 and, for this reason, the master system control unit 150 is required to be at all times informed of the current status of each of the subsidiary system control units 152a to 152e to coordinate particular functions of two or more of the subsidiary system control units 152a to 152e. The status of each of the subsidiary system control units 152a to 152e is represented by detailed status data stored in the local mode map 172 of each of the subsidiary system control units 152a to 152e. Where there is a great number of subsidiary system control units included in the image processing system embodying the present invention, the master system control unit 150 is required to bear an increased amount of burden in accessing the status data thus stored in each of the subsidiary system control units and could not achieve its potential performance efficiency. In each of the subsidiary system control units 152a to 152e provided in the image processing system embodying the present invention, there is formulated a summarized version of the detailed status status data stored in the local mode map 172 of the subsidiary system control unit. Such summarized, brief status data is stored in the status register 170 of each of the subsidiary system control units 152a to 152e.

The brief status data stored in the status register 170 of each subsidiary system control unit is provided in the form of a six-bit bit sequence consisting of bits $G_5$ to $G_0$. The most significant bit $G_5$ of such brief status data is used to indicate that the particular subsidiary system control unit is in an initializing state and will be herein referred to as "NOT READY" bit. The subsidiary system control unit having the brief status data including this "NOT READY" bit of logic value "1" is ready to receive either the sequence command or the mode set frame from the master system control unit 150. The "NOT READY" bit is to be reset to logic value "0" when the initialization of the subsidiary system control unit is complete. The second highest bit $G_4$ of the brief status data is used to indicate that the particular subsidiary system control unit is in a transient state responding to a new command supplied from the master system control unit 150 or renewing the functions to be executed by the subsidiary system control unit. This bit $G_4$ is herein referred to as "BUSY" bit and is to be reset to logic value "0" at the end such a transient state. The third bit $G_3$ is reserved for future use (RFU) and is not assigned to any status of the subsidiary system control unit. The fourth bit $G_2$ of the brief status data is a "FATAL" bit which used to indicate that the particular subsidiary system control unit is in an inoperative state due to an irrecoverable failure invited therein. This "FATAL" bit can be by no means reset by the subsidiary system control unit or master system control unit 150 unless the failure invited is eliminated by a serviceman. The second lowest bit $G_1$ of the brief status data is an "ERROR" bit to indicate that the particular subsidiary system control unit is in an inoperative state due to a recoverable failure invited therein. This "ERROR" bit can be reset when the failure invited is eliminated by the user of the apparatus. The least significant bit $G_0$ is also reserved for future use and is not assigned to any status of the subsidiary system control unit. Table II shows the designations and functions of these bits of the brief status data used in the image processing system embodying the present invention.

TABLE II

| Bit | Designation | Function |
|---|---|---|
| $G_5$ | "NOT READY" | Indicate that the SSC is in initializing state. SSC ready to receive either sequence command or mode set frame. Reset initialization is complete. |
| $G_4$ | "BUSY" | Indicate that SSC is in transient state. Reset at the end transient state. |
| $G_3$ | (RFU) | Reserved for future use. |
| $G_2$ | "FATAL" | Indicate that the SSC is in inoperative state due to irrecoverable failure. Resettable upon elimination of the failure by serviceman. |
| $G_1$ | "ERROR" | Indicate that the SSC is in inoperative state due to recoverable failure. Resettable upon elimination of the failure by the user. |
| $G_0$ | (RFU) | Reserved for future use. |

As has been described, the brief status data is summarized from the detailed status data stored in the local mode map 172 of each of the subsidiary system control units 152a to 152e. The local mode map 172 storing the detailed status data has a portion herein referred to as "standard" map area, a format of which is illustrated in FIG. 14. As will be seen from the bit configuration herein shown, the standard map area has addresses 05, 06, 08 and 09 corresponding to the above defined "ERROR", "FATAL", "BUSY" and "NOT READY" bits, respectively, of the status data stored in the status register 170. Thus, the status register 170 has register sections storing the brief status data regarding the respective functions of these bits. Such register sections of the status register 170 are herein referred to as "error" register section, "fatal" register section, "busy" register section, and "not ready" register section. It may be noted that, in the bit configuration shown in FIG. 14, address 0C is assigned to the report mode data to be referenced during shifting between the report and polling modes of communication.

Description will now be made in regard to the report and polling modes of communication which may be used in the image processing system embodying the present invention. As has been described with reference to FIGS. 5 to 7, the master system control unit 150 of the image processing system embodying the present invention is coupled with each of the subsidiary system control units 152a to 152e through common data transmission lines 154a and 154b or macrosystem interface bus 154. This type of communication network is useful for simplifying the wiring arrangement of the system as a whole but has a drawback in that the communication between the master system control unit 150 and each subsidiary system control unit is effected in the form of an answer of the subsidiary system control unit to a request for communication issued from the master system control unit 150. If the master system control unit 150 is connected to each of the subsidiary system control units 152a to 152e through data transmission lines which are proper to the subsidiary system control unit to allow a "report" mode of communication in the system, there could be achieved an increased performance efficiency of the system although such a mode of communication will require provision of a more intricate hardware configuration.

To exploit such an advantage of the report mode of communication, each of the subsidiary system control units 152a to 152e provided in the image processing system embodying the present invention is arranged to be capable of storing report mode data in the standard mode map area of the local mode map 172. Thus, if any one of the subsidiary system control units 152a to 152e has the report mode data stored in the standard mode map area of its local mode map 172, the subsidiary system control unit is allowed to communicate with the master system control unit 150 in the report mode of communication and, if not, the subsidiary system control unit will communicate with the master system control unit 150 in the polling mode of communication. In the image processing system embodying the present invention, each of the subsidiary system control units 152a to 152e is allowed to select either the report mode of communication or the polling mode of communication so that one of 152 may communicate with the master system control unit 150 in the report mode of communication and another in the polling mode of communication.

FIG. 15 shows an example of the "hybrid" communication network adapted to allow such alternative selection in each of the subsidiary system control units 152a to 152e. In the circuit arrangement herein shown, the first to third subsidiary system control units 512a to 152c (which are herein assumed to be the standard subsidiary system control units) are connected to the master system control unit 150 through a buffered multiplexer 212 with the fourth and fifth subsidiary system control units 512d 152e (which are assumed to be the optional subsidiary system control units) directly connected to the master system control unit 150. Each of the subsidiary system control units 512a to 152c communicates with the master system control unit 150 in the polling mode of communication while each of the subsidiary system control units 512d and 152e communicates with the master system control unit 150 in the report mode of communication. Through the use of the subsidiary system control units operating in the report mode of communication in combination with the subsidiary system control units operating in the report mode of communication as in the arrangement herein shown, the periods of time for which the master system control unit 150 is required to communicate with the individual subsidiary system control units would not be increased significantly if there are an increased number of subsidiary system control units coupled to the master system control unit 150. Such an advantage of the "hybrid" communication network could be further exploited if some of the subsidiary system control units provided in a system are not required to communicate with the master system control unit 150 more efficiently than others. In a system having such subsidiary system control units, the subsidiary system control units allowed to operate at relatively low performance efficiencies may be arranged to adopt the polling mode of communication with the other subsidiary system control units arranged to adopt the report mode of communication. It may be noted that not only the first to third subsidiary system control units 512a to 152c but also the fourth and fifth subsidiary system control units 512d and 152e are to communicate with the master system control unit 150 in the polling mode of communication during initialization of the system after the system is switched in. This is important for avoiding collision of frames on, particularly, the transmission lines interconnecting the master system control unit 150 and the subsidiary system control units 512d and 152e.

Operation

Description will now be made in regard to the operation of the image processing system embodying the present invention. During operation of the image processing system, various flags and parameters are used to achieve various functions of the master system control unit 150. Typical ones of such flags and parameters used by the master system control unit 150 are as follows:

"JOBACT", a flag used to indicate whether or not the system is currently in operation for performing any job during printing operation of the apparatus. When reset to logic value "0", the flag indicates that the apparatus as a whole is in a stand-by condition. When set to logic value "1", the flag indicates that any one of the subsidiary system control units 152a to 152e under the control of the master system control unit 150 is currently in control of the operation of the associated functional module and that the operation by the functional module is still in progress.

"SYSWAIT", a flag used to indicate whether or not the image processing system as a whole is being initialized. The flag is set to logic value "1" with the start of the initialization of the system and, upon termination of the initialization, the flag is reset to logic "0".

"LOOPF", a flag used to indicate whether or not a timing (main loop timing) is reached at which any job is to be started during execution of the main routine program by the master system control unit 150. When it is detected that the timing at which the job is to be started is reached, the flag is set to logic value "1". In the presence of the flag "LOOPF" of logic value "0", the master system control unit 150 is not allowed to start execution of a job.

"MSIFS", a parameter indicating the current stage of execution of the macrosystem interface monitor subroutine program which is currently executed by the master system control unit 150 in conjunction with any of the subsidiary system control units 152a to 152e under the control of the master system control unit 150. The stage of execution is indicated by any of the numerical values "0" to "5" as the process of execution proceeds in conjunction with any of the subsidiary system control units 152a to 152e.

"UNITF", a flag used to indicate whether or not the optional print-sheet supply unit 160a (which is assumed to be under the control of the fourth subsidiary system control unit 152d as shown in FIG. 2) external to the printer apparatus is coupled to the apparatus. When it is detected that the print-sheet supply unit 160a is coupled to the apparatus, the flag is set to logic value "1" and, if to the contrary, the flag is reset to logic value "0".

"UNITS", a flag used to indicate whether or not the optional output page sorting unit 160b (which is assumed to be under the control of the fifth subsidiary system control unit 152e as shown in FIG. 2) external to the printer apparatus is coupled to the apparatus. When it is detected that the page sorting unit 160b is coupled to the apparatus, the flag is set to logic value "1" and, if to the contrary, the flag is reset to logic value "0".

"ENBF", a flag used to indicate whether or not the print-sheet supply unit 160a may be selected for use. The flag set to logic "1" indicates that selection of the print-sheet supply unit 160a is granted. When reset to logic "0", the flag indicates that selection of the print-sheet supply unit 160a is currently not granted.

"ENBS", a flag used to indicate whether or not the output page sorting unit 160b may be put into operation in a particular mode. The flag set to logic "1" indicates that the output page sorting unit 160b may be put into operation. When reset to logic "0", the flag indicates that the output page sorting unit 160b currently can not be put into operation.

"PANS", a flag used to indicate receipt of the status answer frame. The flag is set to logic "1" when the status answer frame is received by the master system control unit 150.

"PCYCLE", a parameter indicative of the number of times which the master system control unit 150 has sent out to subsidiary system control units 152a to 152e.

"PEND", a flag used to indicate whether or not a series of frames transmitted from a subsidiary system control unit is terminated. The flag is set to logic "1" in the presence of the frame-to-continue bit "N" of logic value "1" in the status answer frame or sequence report frame or of the frame end code in the mode answer frame transmitted from a subsidiary system control unit.

"PTIMING", a flag used to indicate the timing at which a cycle of polling operation is to be started (as at tp1, tp2, ... in FIG. 7).

"CCNT", a parameter indicative of the number of the characters of a frame or a series of frames which have been received by the master system control unit 150 after the starting bit of the frame or the series of frames was received.

"IDS", a parameter which corresponds to the destination identification code "S" in the identification character in a frame received by the master system control unit 150. The parameter specifies a particular subsidiary system control unit with which the master system control unit 150 is currently requested to communicate.

"IDU", a parameter which corresponds to the memory area identification code "U" in the identification character in a frame received by the master system control unit 150. The parameter indicates a particular logic address space to be accessed in the subsidiary system control unit with which the master system control unit 150 is requested to communicate.

"FLEN", a parameter indicative of the total number of the characters of a frame or a series of frames received by the master system control unit 150 from the subsidiary system control unit with which the master system control unit 150 is currently in communication. The parameter is incremented each time a new character is received by the input data buffer 182 (FIG. 4) of the master system control unit 150.

"LENTBL", a parameter indicative of the total number of the characters of frames which the master system control unit 150 has received from all the subsidiary system control units which communicate with the master system control unit 150 in the polling mode of communication. When all the subsidiary system control units have been accessed by the master system control unit 150 in the polling mode of communication, the count indicated by the parameter "LENTBL" is cleared.

"PSSC", a parameter indicative of the subsidiary system control unit or units with which the master system control unit 150 is required to communicate in the polling mode of communication.

"TRML", a flag used to indicate whether or not a character in a frame being received by the master system control unit 150 is stored in the output data register 196 (FIG. 4) of the master system control unit 150. When transferred from the output data buffer 194 to the output data register 196, the flag is set to logic value "1" and, when output from the output data register 196 to the macrosystem interface bus 154 (or data transmission line 154a), the flag is reset to logic value "0".

"LMTF", a parameter indicative of the maximum amount of data which a subsidiary system control unit responsive to a request for communication from the master system control unit 150 is allowed to transmit to the master system control unit 150. The parameter is reserved in a limiting counter.

"STRNG", a flag used to indicate that a mode answer frame received by the master system control unit 150 is of the string type configuration.

Routine Programs for MSC

Figure 16A:
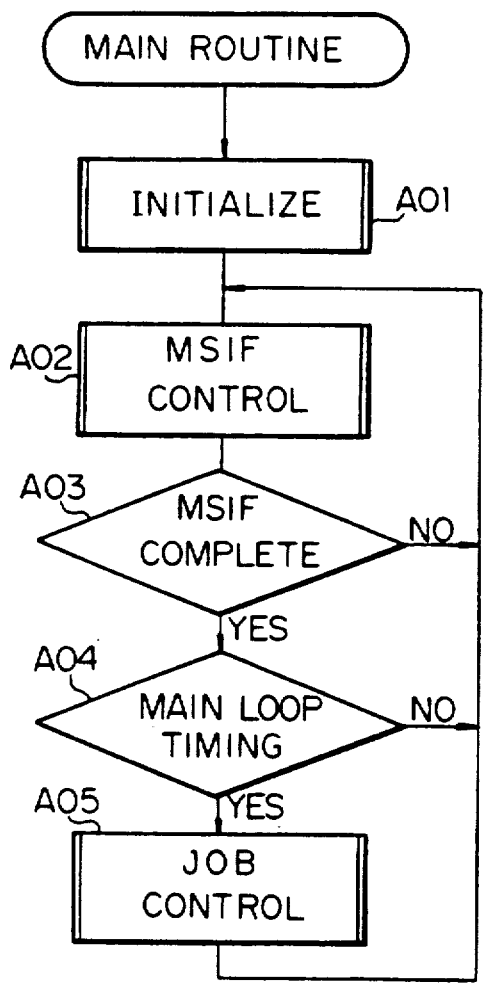
FIG. 16A is a flowchart showing the main routine program to be executed by the master system control unit of the image processing system embodying the present invention.

FIG. 16A is a flowchart showing the main routine program to be executed by the master system control unit 150 of the image processing system embodying the present invention. The image processing system executes three different interrupt routine programs shown in FIGS. 16B to 16D in addition to the main routine program illustrated in FIG. 16A.

Referring first to FIG. 16A, the execution of the main routine program is started when the system is initially switched in. The system being thus switched in, the microprocessor 200 (FIG. 6) of the master system control unit 150 executes an initializing subroutine program A01. Details of this initializing subroutine program A01 will be hereinafter described with reference to FIGS. 17A and 17B. Upon termination of the initializing subroutine program A01, the microprocessor 200 proceeds to a macrosystem interface (MSIF) control subroutine program A02 to follow process steps including those for detecting the interconnection between the master system control unit 150 and each of the subsidiary system control units 152a to 152e through the macrosystem interface bus 154.

When it is then confirmed at step A03 that the execution of the macrosystem interface control subroutine program A02 is complete, the microprocessor 200 detects the flag "LOOPF" at step A04 to confirm whether or not the timing, viz., main loop timing is reached at which any job is to be performed in the master system control unit 150. When it is confirmed from the flag "LOOPF" that such a timing has not been reached, the microprocessor 200 reverts to the macrosystem interface control subroutine program A02 and repeats the loop composed of the subroutine program A02 and decision steps A03 and A04 until the answer for step A04 turns affirmative. When it is thus confirmed at step A04 that the main loop timing is reached, then the microprocessor 200 executes a job control subroutine program A05 to control the operation to perform the job currently required. Upon termination of the job control subroutine program A05, the microprocessor 200 recycles to the macrosystem interface control subroutine program A02 and repeats the loop composed of the subroutine program A02, decision steps A03 and A04 and job control subroutine program A05.

During operation of the master system control unit 150 thus executing the loop composed of the subroutine program A02, decision steps A03 and A04 and job control subroutine program A05, the interrupt timer 210 (FIG. 6) provided in the master system control unit 150 may generate an interrupt in the master system control unit 150. In such an occasion, a timer interrupt takes place in the master system control unit 150 so that the microprocessor 200 shifts from the main routine program to a timer interrupt routine program illustrated in FIG. 16B. In this timer interrupt routine program, the microprocessor 200 executes a main loop timer control subroutine program A06 and thereafter a polling control timer control subroutine program A07. Upon termination of these subroutine programs A06 and A07, the master system control unit 150 returns to the loop composed of the subroutine program A02, steps A03 and A04 and job control subroutine program A05 of the main routine program illustrated in FIG. 16A. Details of the main loop timer control subroutine program A06 and polling control timer control subroutine program A07 will be hereinafter described with reference to FIGS. 21A and 21B.

During operation of the master system control unit 150 executing the loop composed of the subroutine program A02, steps A03 and A04 and job control subroutine program A05, a frame may be transmitted from any one of the subsidiary system control units 152a to 152e to the master system control unit 150. When the first character (which is the identification character) of the frame thus transmitted to the master system control unit 150 is latched in the input data register 190 of the master system control unit 150, an incoming interrupt occurs in the master system control unit 150 so that the master system control unit 150 shifts from the main routine program to an incoming interrupt routine program illustrated in FIG. 16C. In this incoming interrupt routine program, the microprocessor 200 executes an input data buffer control subroutine program A08 to temporarily store the received frame into the input data buffer 192 of the master system control unit 150. Upon termination of this subroutine program A08, the master system control unit 150 also returns to the loop composed of the subroutine program A02, steps A03 and A04 and job control subroutine program A05 of the main routine program illustrated in FIG. 16A.

Figure 16B:
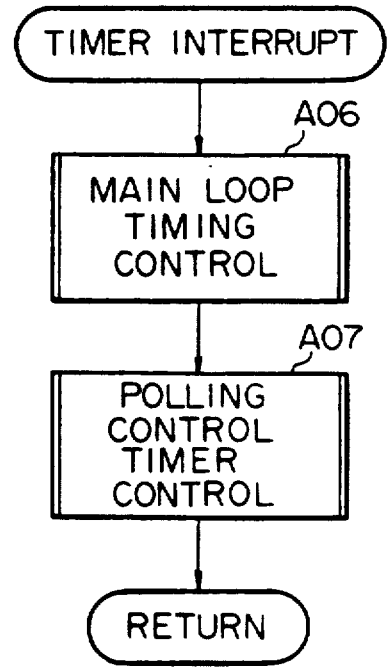
FIGS. 16B, 16C and 16D are flowcharts showing the interrupt routine programs each of which is to be executed by the master system control unit of the image processing system embodying the present invention.
Figure 16C:
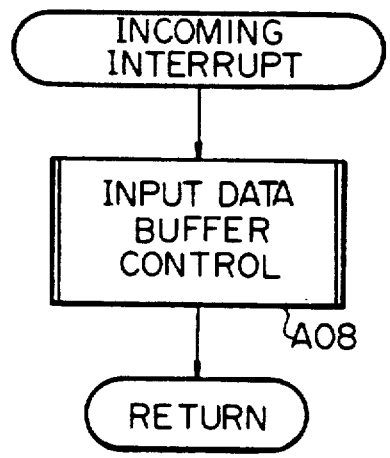
Figure 16D:
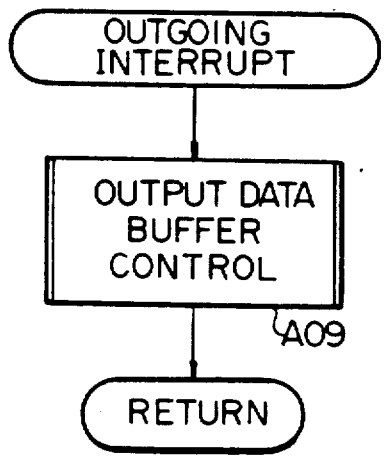
Figure 18C:
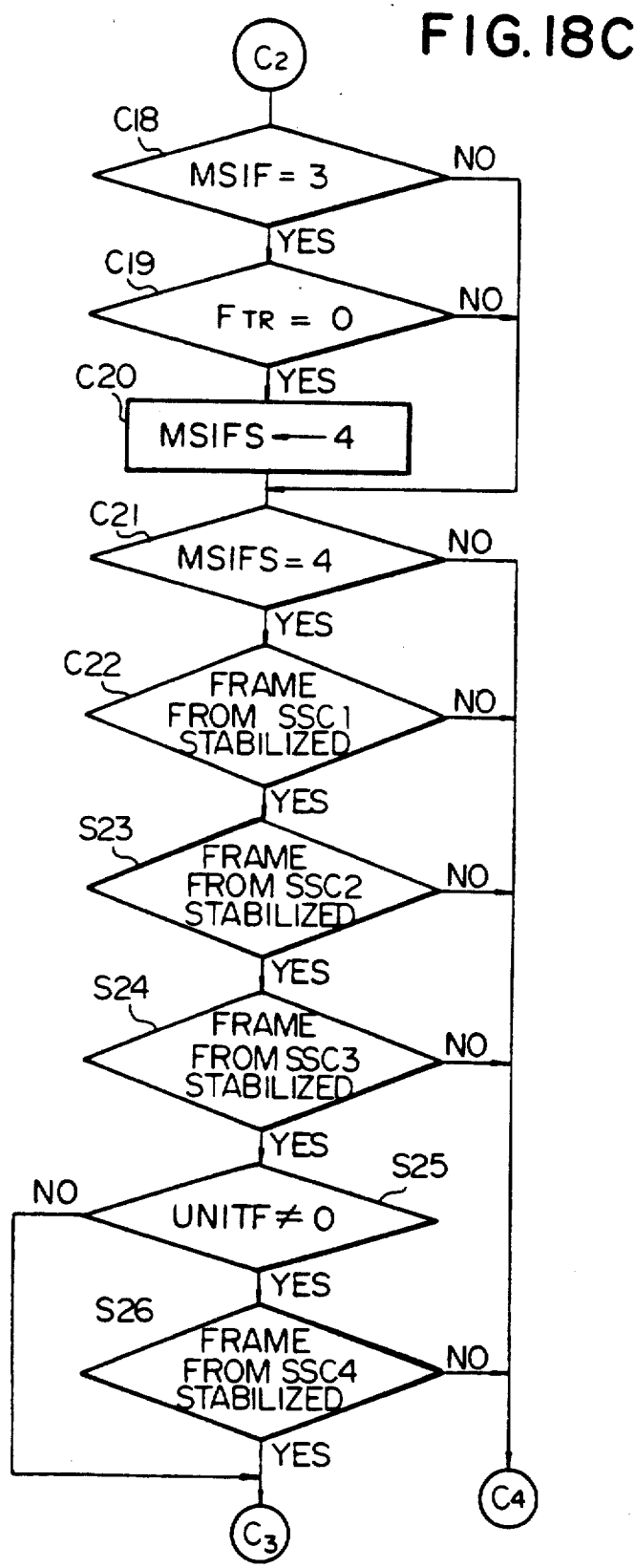
Figure 18D:
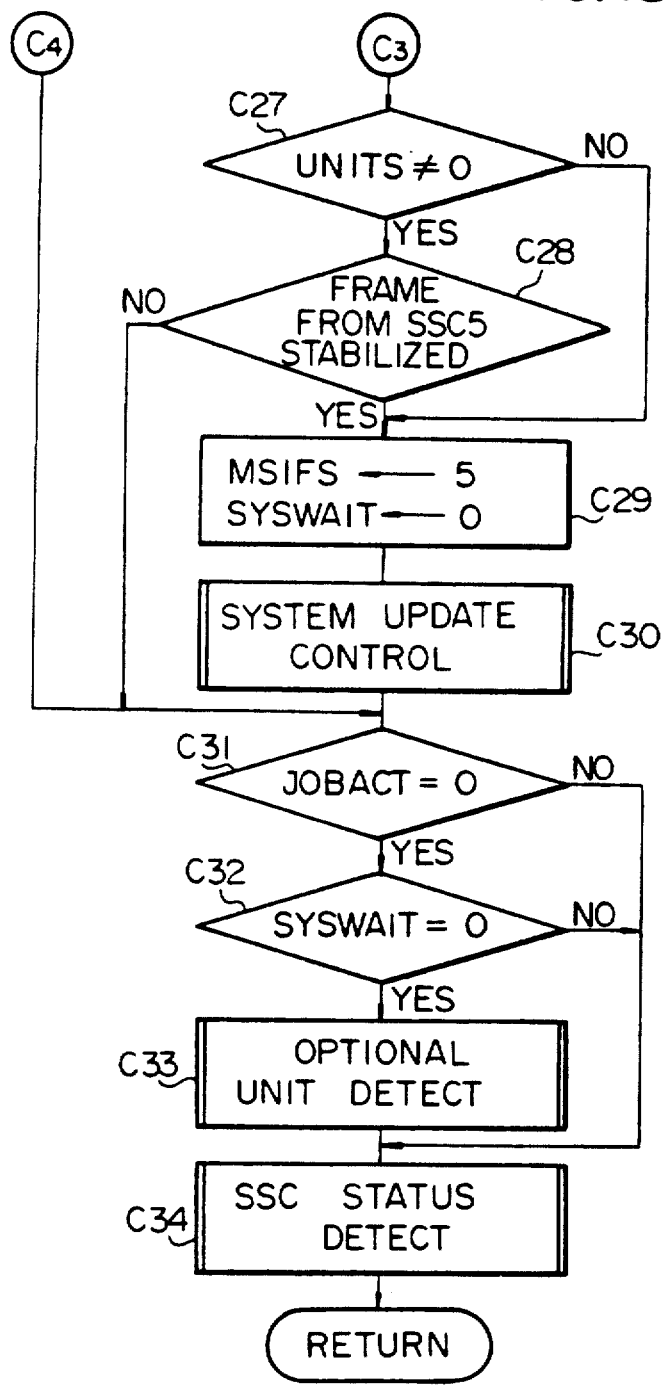

When, on the other hand, the first character (which is the identification character) of the frame stored in the output data register 196 of the master system control unit 150 is released to the macrosystem interface bus 154, an outgoing interrupt occurs in the master system control unit 150 so that the master system control unit 150 shifts from the main routine program to an outgoing interrupt routine program illustrated in FIG. 16D. In this outgoing interrupt routine program, the microprocessor 200 executes an output data buffer control subroutine program A09 through which the data bits forming the frame stored in the output data register 196 of the master system control unit 150 are successively transferred to the macrosystem interface bus 154. Upon termination of this subroutine program A09, the master system control unit 150 also returns to the loop composed of the subroutine program A02, steps A03 and A04 and job control subroutine program A05 of the main routine program illustrated in FIG. 16A.

Main Routine Programs for MSC

FIGS. 17A and 17B are flowcharts showing the details of the main routine program described with reference to FIG. 16A.

As has been noted, the execution of the main routine program for the master system control unit 150 is started when the system is initially switched in. With the system thus switched in, the microprocessor 200 of the master system control unit 150 executes an initializing step B01 to initialize the internal circuitry of the microprocessor and thereafter proceeds to step B02 to establishes standard functions and parameters in the global mode map 186 of the master system control unit 150. Subsequently to step B02, the microprocessor 200 proceeds to step B03 to clear the data stored in the command register 180, status register 182, report register 184, local mode map 188 and string data areas.

The microprocessor 200 then proceeds to step B04 to place the "NOT READY" bit of logic value "1" in the "not ready" register section of the status register 182. As noted previously, this "NOT READY" bit is used to detect the interconnection between the macrosystem interface bus 154 and each of the subsidiary system control units 152a to 152e. At this step B04, the microprocessor 200 further produces a signal to indicate that the initializing subroutine program A01 is currently in progress. Upon termination of the step B04, the microprocessor 200 proceeds to step B05 to set the flag "SYSWAIT" to logic value "1" to indicate that initialization is currently in progress in the printer apparatus as a whole and further set the parameter "PSSC" to numerical value "1". The parameter "PSSC" of numerical value "1" indicates that the number of the subsidiary system control units to be accessed by the master system control unit 150 is one and, as such, the master system control unit 150 is to access the first subsidiary system control unit 152a.

Subsequently to step B05, the microprocessor 200 proceeds to step B06 to reset every one of the flags and parameters in use to logic or numerical value "0" except for the flags "SYSWAIT" and "PSSC" which have been set to logic "1" at step B05. Thus, each of the parameter "MSIFS" and flags "JOBACT", "UNITF" and "UNITS" to be referenced during execution of the macrosystem interface control subroutine program A02 is reset to numerical or logic value "0". The step B06 is followed by step B07 to start the interrupt timer 210 of the master system control unit 150. If there is a request for interrupt produced in any of the interrupt routine programs described with reference to FIGS. 16B to 16D, the microprocessor 200 grants the request for interrupt at step B08 and thereafter proceeds to the main loop of the main routine program.

The main loop of the main routine program to be executed by the master system control unit 150 includes steps to execute the macrosystem interface control subroutine program A02 and steps to execute the job control subroutine program A05 described with reference to FIG. 16A.

The steps to execute the macrosystem interface control subroutine program A02 include a macrosystem interface monitor subroutine program B09 through which the microprocessor 200 initialize the macrosystem interface bus 154 and detects the interconnection between the macrosystem interface bus 154 and each of the subsidiary system control units 152a to 152e. The details of this macrosystem interface monitor subroutine program B09 will be described with reference to FIGS. 18A to 18D. The macrosystem interface monitor subroutine program B09 is followed by input data process control subroutine program B10 through which each of the frames which the input data buffer 192 has received from the individual subsidiary system control units 152a to 152e is analyzed by the master system control unit 150. Subsequently, the microprocessor 200 executes a data transmission request subroutine program B11 through which the data to be transmitted to any one or ones of the subsidiary system control units 152a to 152e is selected from the data stored in the command register 180, a global mode map 186 and local mode map 188 of the master system control unit 150 and is converted into a frame or frames, which are then stored into the output data buffer 194 of the master system control unit 150. The frame or frames thus stored in the output data buffer 194 of the master system control unit 150 are released to the macrosystem interface bus 154 through execution of the timer interrupt routine program described with reference to FIG. 16B or the outgoing interrupt routine program described with reference to FIG. 16D. The data transmission request subroutine program B11 is followed by a polling control subroutine program B12 through which the microprocessor 200 sends out a request for communication to each of the subsidiary system control units 152a to 152e in the polling mode of communication to realize communication between the master system control unit 150 and each of subsidiary system control units 152a to 152e. The request for communication thus transmitted to each of the subsidiary system control units 152a to 152e is provided in the form of the status request frame, in response to which the subsidiary system control unit which has received the request sends back the status answer frame to the master system control unit 150 to supply the necessary data to the master system control unit 150.

When it is then confirmed at step B13 that the flag "SYSWAIT" is reset to logic value "0" indicating that the initialization of the system is complete, the microprocessor 200 further checks the flag "LOOPF" at step B14 (which is identical with step A04) to confirm whether or not the main loop timing is reached at which a job is to be performed in the master system control unit 150. When it is confirmed from the flag "LOOPF" that such a timing has not been reached, the microprocessor 200 reverts to the macrosystem interface monitor subroutine program B09 and repeats the loop composed of the subroutine programs B09 to B12 and decision steps B13 and B14 until the answer for step B14 turns affirmative. When it is thus confirmed at step B14 that the main loop timing is reached, then the microprocessor 200 executes step B15 to reset the flag "LOOPF" to logic value "0" for future execution of the job control subroutine program A05. The job control subroutine program A05 consists of a plurality of stages "JOB1" to "JOBn" which are to be executed in predetermined cycles as the main routine program for the master system control unit 150 is in progress. Details of this job control subroutine program A05 will be also described with reference to FIG. 29. Upon termination of the job control subroutine program A05, the microprocessor 200 recycles to the macrosystem interface monitor subroutine program B09 and repeats the loop composed of the subroutine programs B09 to B12, steps B13 to B15 and job control subroutine program A05.

FIGS. 18A to 18D are flowcharts showing the details of the macrosystem interface monitor subroutine program B09 included in the main routine program described with reference to FIGS. 17A and 17B.

The macrosystem interface monitor subroutine program B09 starts with a decision step C01 to check if the parameter "MSIFS" is reset to numerical value "0". Because of the fact that the parameter "MSIFS" has been reset to numerical value "0" at step B06 of the main routine program, the answer for this decision step C01 is given in the affirmative when the macrosystem interface monitor subroutine program B09 is started. Thus the microprocessor 200 proceeds from step C01 to a series of decision steps C02, C03 and C04 to confirm whether or not the standard subsidiary system control units 152a to 152c are coupled to the master system control unit 150. For this purpose, the microprocessor 200 checks whether or not the data receipt report flag $F_{RR}$ in the data sequence stored in the local mode map 188 of the master system control unit 150 is set to logic "value" indicating that a status answer frame is received from the first standard subsidiary system control unit 152a in response to a status request frame sent from the master system control unit 150. The data transmission request subroutine program B11 included in the main routine program is not yet executed immediately after the execution of this macrosystem interface monitor subroutine program B09 and, for this reason, the frame which may have been received from the subsidiary system control unit 152a to which a request for communication was sent has not been analyzed in the input data process control subroutine program B10. Accordingly, the data receipt report flag $F_{RR}$ in the data sequence stored in the local mode map 188 of the master system control unit 150 is not set to logic "value" and, thus, the answer for the decision step C02 must be given in the negative. When the answer for the step C02 is given in the negative, the microprocessor 200 jumps over steps C03 to C09 and proceeds to step C10 to check if the parameter "MSIFS" is set to numerical value "1". Because of the fact that the parameter "MSIFS" has already been reset to numerical value "0" as has been noted, the answer for this step C10 is also given in the negative so that the microprocessor 200 further jumps over steps C11, C12 and C13 and proceeds to step C14 to check if the parameter "MSIFS" is set to numerical value "2". The parameter "MSIFS" having been reset to numerical value "0" as has been noted, the answer for this step C14 is also given in the negative so that the microprocessor 200 further jumps over steps C15, C16 and C17 and proceeds to step C18 to check if the parameter "MSIFS" is set to numerical value "3". The answer for this step C18 is also given in the negative and, thus, the microprocessor 200 further jumps over steps C19 and C20 and proceeds to step C21 to check if the parameter "MSIFS" is set to numerical value "4".

The answer for this step C21 is also given in the negative so that the microprocessor 200 further jumps over steps C22 to C30 and proceeds to step C31 to check if the flag "JOBACT" is reset to logic value "0". Because of the fact that this flag "JOBACT" is reset to logic value "0" unless execution of a job is in progress in the master system control unit 150, the answer for this step C31 is given in the affirmative and, thus, the microprocessor 200 now proceeds to step C32 to check if the flag "SYSWAIT" is reset to logic value "0". The flag "SYSWAIT" having already been set to logic value "1" at step B05 of the main routine program as has been noted, the answer for this step C32 is given in the negative immediately after the execution of this macrosystem interface monitor subroutine program B09 is started. Accordingly, the microprocessor 200 jumps over an optional unit detect subroutine program C33 and executes a subsidiary system control unit status detect subroutine program C34 and thereafter recycles to the main routine program shown in FIGS. 17A and 17B.

In this fashion, the microprocessor 200 recycles to the main routine program recurrently to repeat the loops included in the macrosystem interface monitor subroutine program B09 to check the interconnection between the macrosystem interface bus 154 and each of the first, second and third standard subsidiary system control units 152a to 152c.

Thus, it will be confirmed at each of the steps C02, C03 and C04 that the data receipt report flag $F_{RR}$ in the data sequence stored in the local mode map 188 of the master system control unit 150 is set to logic "value" indicating that a status answer frame is received from each of the first, second and third standard subsidiary system control units 152a to 152c in response to a status request frame supplied from the master system control unit 150. The answer for each of the decision steps C02 to C04 being now given in the affirmative, the microprocessor 200 determines that all of the first, second and third standard subsidiary system control units 152a to 152c are coupled to the master system control unit 150 through the macrosystem interface bus 154.

When it is thus found that all of the standard subsidiary system control units 152a to 152c are coupled to the master system control unit 150 through the macrosystem interface bus 154, the microprocessor 200 proceeds to still another decision step C05 to detect whether or not the flag "UNITF" is set to a non-zero logic value, viz., a logic value "1". Because of the fact that the flag "UNITF" has already been reset to logic value "0" at step B05 of the main routine program, the answer for the step C05 is given in the negative immediately after execution of the macrosystem interface monitor subroutine program B09 is started. In this instance, the microprocessor 200 jumps over step C06 and proceeds to step C07 to check if the flag "UNITS" is set to a non-zero logic value, viz., a logic value "1". Immediately after execution of the macrosystem interface monitor subroutine program B09 is started, the answer for this step C07 must be given in the negative so that the microprocessor 200 jumps over step C08 and proceeds to step C09 to increment the parameter "MSIFS" by one and reset the parameter "PCYCLE" to numerical value "0" to enable the master system control unit 150 to control the period of time for which the connection of the standard subsidiary system control units 152a to 152c to the macrosystem interface bus 154 is to be detected.

Each of the flags "UNITF" and "UNITS" is maintained at logic value "0" until it is confirmed in the optional unit detect subroutine program C33 that the optional subsidiary system control units 152d and 152e are coupled to the master system control unit 150 through the macrosystem interface bus 154. The steps C06 and C08 are intended to check the interconnection between the master system control unit 150 and the optional subsidiary system control units 152d and 152e and are for the above reason not followed until it is found that all of the standard subsidiary system control units 152a to 152c are coupled to the master system control unit 150 through the macrosystem interface bus 154. Upon termination of the step C09, an initial stage of the macrosystem interface monitor subroutine program B09 is complete.

Subsequently to step C09, the microprocessor 200 proceeds to step C10 to inspect the parameter "MSIFS" for the purpose of confirming the termination of the initial stage of the macrosystem interface monitor subroutine program B09. If the parameter "MSIFS" is found not to have the numerical value "1" at step C10, the microprocessor 200 executes the subsidiary system control unit status detect subroutine program C34 and then reverts to the main routine program illustrated in FIGS. 17A and 17B. The microprocessor 200 will thereafter proceed to step C10 for a second time to further check the parameter "MSIFS" to confirm the termination of the initial stage of the macrosystem interface monitor subroutine program B09. The parameter "MSIFS" is set to numerical value "1" after it is found that all of the standard subsidiary system control units 152a to 152c are coupled to the master system control unit 150 through the macrosystem interface bus 154, the answer for the step C10 is under ordinary conditions given in the affirmative so that the microprocessor 200 proceeds from the step C10 to subsequent step C11 to compare the numerical value of the parameter "PCYCLE" with a limiting value "n". This limiting value "n" is indicative the maximum number of times which the master system control unit 150 is allowed to send requests for communication to the subsidiary system control units 152a to 152e and is given as a sum of the number of times which the master system control unit 150 is required to send requests for communication to the subsidiary system control units 152a to 152e and a predetermined number selected to provide a desired degree of allowance.

Immediately after it is found that the standard subsidiary system control units 152a to 152c are coupled to the master system control unit 150 through the macrosystem interface bus 154, the numerical value of the parameter "PCYCLE" is less than such a limiting value "n" and thus the answer for the step C11 is given in the negative. Accordingly, the microprocessor 200 proceeds through steps CC14, C18 and C21 and C31 and subsidiary system control unit status detect subroutine program C34 and returns to the main routine program.

The limiting value "n" as above defined is recurrently incremented in the polling control subroutine program B12 and, for this reason, the numerical value of the parameter "PCYCLE" will become larger than the limiting value "n". When the answer for step C11 turns affirmative, the microprocessor 200 proceeds to step C12 to set a reset command "RESET" of logic value "1" in the command register 180 of the master system control unit 150 to transmit the reset command to each of the subsidiary system control units which have been confirmed to be coupled to the macrosystem interface bus 154. The transmission of the reset command to each of the subsidiary system control units confirmed to be coupled to the macrosystem interface bus 154 is effected in the data transmission request subroutine program B11 of the main routine program and the output data buffer control subroutine program A09 of the interrupt routine program described with reference to FIG. 16D. The functions to be executed by the subsidiary system control units confirmed to be coupled to the macrosystem interface bus 154 will be described later in connection with the routine programs to be executed by each of the subsidiary system control units.

After the reset command "RESET" of logic value "1" is set in the command register 180 of the master system control unit 150 in respect of each of the subsidiary system control units confirmed to be coupled to the macrosystem interface bus 154, the microprocessor 200 proceeds to step C13 to increment the parameter "MSIFS" to numerical value "2" and thereby brings an end to a second stage of the macrosystem interface monitor subroutine program B09.

The step C13 is followed by step C14 at which the microprocessor 200 detects whether or not the parameter "MSIFS" is set to numerical value "2". If the answer for this step C14 is given in the negative, the microprocessor 200 executes the subsidiary system control unit status detect subroutine program C34 and reverts to the main routine program shown in FIGS. 17A and 17B. The microprocessor 200 will thereafter further proceed through step C01 and step C10 to the step C14 to check if the parameter "MSIFS" is set to numerical value "2". The parameter "MSIFS" having been set to numerical value "2" by the end of the second stage of the macrosystem interface monitor subroutine program B09, the answer for this step C14 is now given in the affirmative so that the microprocessor 200 proceeds to step C15 to confirm whether or not the reset command "RESET" has been supplied to every one of the subsidiary system control units confirmed to be coupled to the macrosystem interface bus 154. If the answer for this step C15 is given in the negative, the microprocessor 200 returns to the main program and thereafter further proceeds through steps C01, C10 and C14 to the step C15 to check if the reset command "RESET" has been supplied to every one of the subsidiary system control units confirmed to be coupled to the macrosystem interface bus 154.

When the transmission of the reset command "RESET" to each of the subsidiary system control units confirmed to be coupled to the macrosystem interface bus 154 is complete and the answer for the step C15 turns affirmative, the microprocessor 200 proceeds to step C16 to set the data transmission request flag $F_{TR}$ of logic value "1" in the data sequence stored in the local mode map 188 of the master system control unit 150. With the data transmission request flag $F_{TR}$ of logic value "1" thus set in the local mode map 188, the data representative of the standard functions and parameters stored in the global mode map 186 of the master system control unit 150 through execution of the step B02 of the main routine program is transmitted to each of the subsidiary system control units confirmed to be coupled to the macrosystem interface bus 154. Subsequently to step C16, the microprocessor 200 proceeds to step C17 to set the parameter "MSIFS" at numerical value "3"

and thereby brings an end to a third stage of the macrosystem interface subroutine program B09.

Upon termination of the third stage of the macrosystem interface subroutine program B09, the microprocessor 200 proceeds to step C18 to check if the parameter "MSIFS" is set at numerical value "3" and, if the answer for this step C18 is given in the negative, reverts to the main routine program after executing the subsidiary system control unit status detect subroutine program C34.

The microprocessor 200 thereafter further proceeds through steps C01, C10 and C14 to the step C18 to confirm whether or not the parameter "MSIFS" is set at numerical value "3". The parameter "MSIFS" having been set to numerical value "3" at step C17, the answer for this step C18 is now given in the affirmative and, as such, the microprocessor 200 proceeds to step C19 to detect whether or not the data transmission request frame $F_{TR}$ is reset to logic value "0". As in the case of the reset command "RESET", transmission of the data representative of the standard functions and parameters stored in the global mode map 186 of the master system control unit 150 to each of the subsidiary system control units confirmed to be coupled to the macrosystem interface bus 154 is effected in the data transmission request subroutine program B11 of the main routine program and the output data buffer control subroutine program A09 of the interrupt routine program described with reference to FIG. 16D. After such data is transmitted to each of the subsidiary system control units confirmed to be coupled to the macrosystem interface bus 154, the data transmission request fram $F_{TR}$ is reset to logic value "0". Thus, the negative answer for the step C19 is indicative of the fact that the data representative of the standard functions and parameters stored in the global mode map 186 has not been transmitted to the subsidiary system control units confirmed to be coupled to the macrosystem interface bus 154. If the answer for the step C19 is given in the negative, the microprocessor 200 executes the subsidiary system control unit status detect subroutine program 34 and then returns to the main routine program illustrated in FIGS. 17A and 17B.

The microprocessor 200 will thereafter further proceeds to steps C01, C10, C14 and C18 to the step C19 to check if the data transmission request frame $F_{TR}$ is reset to logic value "0". The data representative of the standard functions and parameters stored in the global mode map 186 will be then transmitted to the subsidiary system control units confirmed to be coupled to the macrosystem interface bus 154 and the data transmission request frame $F_{TR}$ reset to logic value "0". When this is confirmed at step C19, the microprocessor 200 proceeds to step C20 to set the parameter "MSIFS" at numerical value "4" and thereby brings an end to a fourth stage of the macrosystem interface subroutine program B09.

Upon termination of the fourth stage of the macrosystem interface subroutine program B09, the microprocessor 200 proceeds to step C20 to check if the parameter "MSIFS" is set at numerical value "4" and, if the answer for this step C20 is given in the negative, reverts to the main routine program after executing the subsidiary system control unit status detect subroutine program C34.

The microprocessor 200 thereafter further proceeds through steps C01, C10, C14 and C18 to the step C21 to confirm whether or not the parameter "MSIFS" is set at numerical value "4". The parameter "MSIFS" having been set to numerical value "4" at step C20, the answer for this step C21 is now given in the affirmative and, as such, the microprocessor 200 proceeds to step C22 to detect whether or not the state of the frame supplied from the first standard subsidiary system control unit 152a has been stabilized. This decision is made on the basis of the parameter "LENTBL" which is produced from the parameter "FLEN" during execution of the polling control subroutine program B12 as will be described later. As previously noted, the parameter "FLEN" is indicative of the amount of data received from each of the subsidiary system control units 152a to 152e and accordingly the data length of the frame received from a subsidiary system control unit during execution of the input data process control subroutine program B10. More specifically, the parameter "FLEN" is indicative of the amount of the status data received from the subsidiary system control unit to which a request for communication is sent out from the master system control unit 150.

When it is found that the numerical value represented by the parameter "LENTBL" is less than a preselected value, then the microprocessor 200 determines that the state of the frame supplied from the subsidiary system control unit to which a request for communication is sent out from the master system control unit 150, viz., the first standard subsidiary system control unit 152a in this instance has been stabilized. Insofar as the answer for the step C23 remains negative, the microprocessor 200, upon execution of the subsidiary system control unit status detect subroutine program 34, returns to the main routine program illustrated in FIGS. 17A and 17B.

The microprocessor 200 will thereafter further proceeds to steps C01, C10, C14, C18 and C21 to the step C22 to check if the state of the frame supplied from the first standard subsidiary system control unit 152a has been stabilized. When the state of the frame supplied from the first standard subsidiary system control unit 152a is found stabilized, the answer for the step C22 turns affirmative and as a consequence the microprocessor 200 proceed to step C23 to detect whether or not the state of the frame supplied from the second standard subsidiary system control unit 152b has been stabilized as in a manner described in regard to step C22. When it is found that the numerical value represented by the parameter "LENTBL" is less than the preselected value in respect of the second standard subsidiary system control unit 152b, then the microprocessor 200 determines that the state of the frame supplied from the second standard subsidiary system control unit 152b. In these manners, the microprocessor 200 inspects the respective states of the frames supplied from the first, second and third standard subsidiary system control units 152a, 152b and 152c at steps C22, C23 and C24, respectively.

When it is thus determined that the state of the frame supplied from every one of the first, second and third standard subsidiary system control units 152a, 152b and 152c has been stabilized, the microprocessor 200 proceeds to step C25 to confirm whether or not the flag "UNITF" is set to a non-zero logic value, viz., a logic value "1". Before the optional unit detect subroutine program C33 is executed, the flag "UNITF" is reset to logic value "0" at step B06 of the main routine program and, for this reason, the answer for this step C25 is given in the negative. Thus, the microprocessor 200 jumps over step C26 and proceeds to step C27 to check if the flag "UNITS" is set to a non-zero logic value, viz., a logic value "1". Before the optional unit detect subroutine program C33 is executed, the flag "UNITS" is also reset to logic value "0" at step B06 of the main routine program and, for this reason, the answer for this step C27 is given in the negative. Accordingly, the microprocessor 200 jumps over step C28 and proceeds to step C29.

It being herein assumed in the image processing system embodying the present invention that not only the standard subsidiary system control unit 152a, 152b and 152c but also the optional subsidiary system control unit 152d and 152e are coupled to the master system control unit 150 through the macrosystem interface bus 154, as previously noted. The flags "UNITF" and "UNITS" will be finally set each to logic value "1". When the flags "UNITF" and "UNITS" are thus set each to logic "1" and accordingly the answer for each of the steps C25 turns affirmative, the microprocessor 200 proceeds to steps C26 and C28, respectively to check if the state of the frame supplied from the optional subsidiary system control units 152d and 152e have been stabilized. When it is thus determined that the state of the frame supplied from each of the optional subsidiary system control units 152d and 152e has been stabilized, the microprocessor 200 proceeds to step C29 to set the parameter "MSIFS" to numerical value "5" and reset the flag "SYSWAIT" at logic value "0".

The microprocessor 200 then executes a system update control subroutine program 30 to determine the particular subsidiary system control unit to which a frame or frames are to be transmitted from the master system control unit 150. The details of this system update control subroutine program 30 are depicted in FIG. 19.

As will be understood upon cursory review of the flowchart of FIG. 19, the microprocessor 200 passes through the system update control subroutine program C30 without executing any of the process steps included therein and immediately reverts to the macrosystem interface monitor subroutine program B09 unless the flags "UNITF" and "UNITS" are found to be each set at logic value "1" (steps D01 and D04). Each of these flags "UNITF" and "UNITS" is to be set at logic value "1" when each of the optional subsidiary system control units 152d and 152e are detected to be coupled to the master system control unit 150 through the macrosystem interface bus 154. This is performed during execution of the optional unit detect subroutine program C33, the details of which are depicted in FIG. 20. The details of the system update control subroutine program C30 will be for this reason described after the details of the optional unit detect subroutine program C33 are described with reference to FIG. 20. Incidentally, the details of the subsidiary system control unit status detect subroutine program C34 will be hereinafter described with reference to FIG. 28.

The microprocessor 200 which has returned from the system update control subroutine program C30 to the macrosystem interface monitor subroutine program B09 with each of the flags "UNITF" and "UNITS" set at logic value proceeds to step C31 to check if the flag "JOBACT" is reset at logic value "0". If the answer for this step C31 is given in the negative, the microprocessor 200 executes the subsidiary system control unit status detect subroutine program C34 and reverts to the main program illustrated in FIGS. 17A and 17B. The microprocessor 200 will thereafter further proceed to the step C31 to see if the flag "JOBACT" is reset at logic value "0". This flag "JOBACT" has been reset to logic value "0" through execution of the step B06 of the main routine program and, accordingly, the answer for this step C31 is now given in the affirmative. The step C31 is thus followed by step C32 at which the microprocessor 200 detects whether or not the flag "SYSWAIT" is reset at logic value "0".

If the answer for this step C32 is given in the negative, the microprocessor 200 executes the subsidiary system control unit status detect subroutine program C34 and reverts to the main program. The microprocessor 200 will thereafter further proceed to the step C32 to check if the flag "SYSWAIT" is reset at logic value "0". This flag "SYSWAIT" has however been set to logic value "0" through execution of the step C29 of the present macrosystem interface monitor subroutine program B09 and, accordingly, the answer for this step C32 is now also given in the affirmative. Thus, the microprocessor 200 proceeds from the step C32 to the optional unit detect subroutine program C33.

FIG. 20 is a flowchart showing the details of the optional unit detect subroutine program C33 included in the macrosystem interface monitor routine program B09 described with reference to FIGS. 18A to 18D.

The optional unit detect subroutine program C33 starts with a decision step E01 to check if the flag "UNITF" is reset at logic value "0". If the answer for this step E01 is given in the negative, the microprocessor 200 jumps over steps E02 to E04 and proceeds to another decision step E05 to detect whether or not the flag "UNITS" is set at logic value "0". If the answer for this step E05 is also given in the negative, the microprocessor 200 reverts to the macrosystem interface monitor subroutine program B09 hereinbefore described with reference to FIGS. 18A to 18D.

The flag "UNITS" and "UNITS" are however set each to logic value "1" at step E03 and step E07, respectively, of this optional unit detect subroutine program C33 when it is determined at steps E02 and E06 that the optional subsidiary system control units 152d and 152e are confirmed to have been coupled to the master system control unit 150 through the macrosystem interface bus 154.

During the first iteration of this optional unit detect subroutine program C33, it has not yet been confirmed that the optional subsidiary system control units 152d and 152e are coupled to the master system control unit 150 and, for this reason, the answer for each of the steps E01 and E05 is therefore given in the affirmative. Accordingly, the microprocessor 200 proceeds from the step E01 to step E02 to detect if the optional subsidiary system control unit 152d is coupled to the master system control unit 150 through the macrosystem interface bus 154. This decision is made in a manner similar to that described in regard to the step C02 of the macrosystem interface monitor subroutine program B09 shown in FIGS. 18A to 18D.

If the answer for this step E02 is given in the negative, the microprocessor 200 determines that the optional subsidiary system control unit 152d is not coupled to the master system control unit 150 and as such jumps over steps steps E03 and E04 to proceed to step E05. Where the optional subsidiary system control unit 152d is coupled to the master system control unit 150 through the macrosystem interface bus 154 as is the case with the image processing system embodying the present invention, the answer for the step E02 is given in the affirmative and as such the microprocessor 200 proceeds to step E03 to set the flag "UNITF" to logic value "1" to indicate that the optional subsidiary system control unit 152d is confirmed to have been coupled to the master system control unit 150 through the macrosystem interface bus 154. The step E03 is executed to further reset the parameter "MSIFS" to numerical value "0" and set the flag "SYSWAIT" to logic value "1".

Upon completion of the step E03, the microprocessor 200 proceeds to step E04 to reset the data receipt report flag $F_{RR}$ to logic value "0" in the status data stored in the status register 182 in regard to the optional subsidiary system control unit 152d.

Subsequently to this step E04, the microprocessor 200 proceeds to step E05 to detect whether or not the flag "UNITS" is reset at logic value "0". If, in this instance, it has already been confirmed that the optional subsidiary system control unit 152e is coupled to the master system control unit 150 through the macrosystem interface bus 154, the flag "UNITS" is maintained at logic value "1" at this point of time so that the microprocessor 200 reverts to the macrosystem interface monitor subroutine program B09 of FIGS. 18A to 18D.

During the first iteration of this optional unit detect subroutine program C33, it has not been confirmed that the optional subsidiary system control unit 152e is coupled to the master system control unit 150 and, for this reason, the answer for this step E05 is given in the affirmative as has been noted. Accordingly, the microprocessor 200 proceeds from the step E05 to step E06 to detect if the optional subsidiary system control unit 152e is coupled to the master system control unit 150 through the macrosystem interface bus 154. This decision is also made in a manner similar to that described in regard to the step C02 of the macrosystem interface monitor subroutine program B09 shown in FIGS. 18A to 18D. If the answer for this step E06 is given in the negative, the microprocessor 200 determines that the optional subsidiary system control unit 152e is not coupled to the master system control unit 150 and as such jumps over steps steps E07 and E08 and returns to the macrosystem interface monitor subroutine program B09 with the flag "UNITS" maintained at logic value "0".

It however being assumed that the optional subsidiary system control unit 152e is coupled to the master system control unit 150 through the macrosystem interface bus 154 in the image processing system embodying the present invention, the answer for the step E06 is given in the affirmative and as such the microprocessor 200 proceeds to step E07 to set the flag "UNITS" to logic value "1" to indicate that the optional subsidiary system control unit 152e is confirmed to have been coupled to the master system control unit 150 through the macrosystem interface bus 154. The step E07 is executed to further reset the parameter "MSIFS" to numerical value "0" and set the flag "SYSWAIT" to logic value "1" as at step E03. Upon completion of the step E07, the microprocessor 200 proceeds to step E08 to reset the data receipt report flag $F_{RR}$ to logic value "0" in the status data stored in the status register 182 in regard to the optional subsidiary system control unit 152e. The microprocessor then reverts to the macrosystem interface monitor subroutine program B09 shown in FIGS. 18A to 18D to execute the subsidiary system control unit status subroutine program C34 and, thereafter, returns to the main routine program described with reference to FIGS. 17A and 17B. As the main routine program is thus executed, the parameter "MSIFS" is recurrently incremented from the initial numerical value "0". During each reiteration of the main routine program, each of the flags "UNITF" and "UNITS" is set at logic value "1" through execution of the optional unit detect subroutine program C33 and, for this reason, the answer for each of the steps C05 and C07 of the macrosystem interface monitor subroutine program B09 is given in the affirmative. It therefore follows that the microprocessor 200 detects at steps C06 and C08 of the subroutine program B09 whether or not the optional subsidiary system control units 152d and 152e are invariably coupled to the master system control unit 150 through the macrosystem interface bus 154. If it is thus confirmed for a second time that the optional subsidiary system control units 152d and 152e are still coupled to the master system control unit 150 through the macrosystem interface bus 154, the microprocessor 200 resets the reset command "RESET" for each of the subsidiary system control units 152d and 152e through execution of the step C12 during the second stage of the macrosystem interface monitor subroutine program B09. Accordingly, the reset command "RESET" is distributed not only to each of the standard subsidiary system control units 152a to 152c but also each of the optional subsidiary system control units 152d and 152e of the system.

During the third stage of the macrosystem interface monitor subroutine program B09, the microprocessor 200 sets the transmission request flag $F_{TR}$ to logic value "1" in order to transmit the data stored in the global mode map 186 in regard to the standard functions and parameters which each of the subsidiary system control units 152a to 152e is to receive. The transmission request flag $F_{TR}$ being thus set at logic value "1", the data regarding the standard functions and parameters is also stored in the global mode map 186 in each of the subsidiary system control units 152a to 152e.

During the subsequent fifth stage of the macrosystem interface monitor subroutine program B09, the answer for each of the steps C25 and C27 turns affirmative so that the microprocessor 200 detects the degree of stability of the frame received by each of the optional subsidiary system control units 152d and 152e at each of the step C26 and C28, respectively.

In this fashion, the microprocessor 200 checks the status of not only each of the standard subsidiary system control units 152a to 152c but each of the optional subsidiary system control units 152d and 152e and at step C29 sets the parameter "MSIFS" to numerical value "5" and resets the flag "SYSWAIT" to logic value "0". Subsequently, the microprocessor 200 starts execution of the optional unit detect subroutine program C33. By the time this optional unit detect subroutine program C33 is executed, the system update control subroutine program C30 could not substantially be executed and, thus, the microprocessor 200 then reverts to the main routine program described with reference to FIGS. 17A and 17B. During reiteration of the macrosystem interface monitor subroutine program B09, the optional unit detect subroutine program C33 has already been executed and accordingly each of the flags "UNITF" and "UNITS" has already been set to logic value "1" at each of the steps E03 and E07 of the optional unit detect subroutine program C33.

Under these conditions, the answer for step D01 of the system update control subroutine program C30 illustrated in FIG. 19 is given in the affirmative with the flag "UNITF" already set to logic value "1" so that the microprocessor 200 proceeds to step D02 to set the sheet-supply unit select grant flag "ENBF" to logic value "1". This step D02 is followed by step D03 at which the microprocessor 200 updates the data which the global mode map 186 of the master system control unit 150 has stored in regard to the external print-sheet supply unit 160a (FIG. 2). In the apparatus including the system embodying the present invention, the answer for step D04 of the system update control subroutine program C30 is also given in the affirmative with the flag "UNITS" already set to logic value "1" so that the microprocessor 200 proceeds to step D05 to set the page sorter unit select grant flag "ENBS" to logic value "1". This step D05 is followed by step D06 at which the microprocessor 200 updates the data which the global mode map 186 of the master system control unit 150 has stored in regard to the external output-page sorting unit 160b (FIG. 2). Thereupon, the microprocessor 200 returns to the macrosystem interface monitor subroutine program B09 described with reference to FIGS. 18A to 18D.

As will have been understood from the foregoing description, the master system control unit 150 included in the image processing system embodying the present invention first detects whether or not each of the standard subsidiary system control units 152a to 152c is duly coupled to the master system control unit 150 through the macrosystem interface bus 154. This process is performed immediately after the system is initially switched in. Subsequently, the master system control unit 150 further detects whether or not each of the optional subsidiary system control units 152d and 152e which may be dispensed if desired is coupled to the master system control unit 150 through the macrosystem interface bus 154. This process is performed through execution of the optional unit detect subroutine program C33 of the macrosystem interface monitor subroutine program B09 and, when the execution of the subroutine program C33 is in progress, the system embodying the present invention is in its entirety maintained in a stand-by condition with the flag "JOBACT" maintained at logic value "0". It may be noted that such an optional unit detect subroutine program C33 is executed unexceptionally in the presence of the flag "SYSWAIT" reset at logic value "0". Thus, each of the subsidiary system control units 152a to 152e is checked for its connection to the master system control unit 150 not only after the system is initially switched in but also when the system as a whole is maintained in a stand-by condition so that, if the sheet-supply unit 160a or the output-page sorting unit 160b is assembled to the apparatus after the apparatus is initially switched in, each of the subsidiary system control units 152a to 152e is checked for its connection to the master system control unit 150.

As has been described in regard to the main routine program illustrated in FIGS. 17A and 17B, the macrosystem interface monitor subroutine program B09 is followed by a series of subroutine programs including the input data process control subroutine program B10, transmission request control subroutine program B11 and polling control subroutine program B12 in this sequence. In consideration of the order of the steps to be followed by the master system control unit 150, description will be hereinafter made first in connection with the main loop timer control subroutine program A06 and polling control timer control subroutine program A07 included in the timer interrupt routine program described with reference to FIG. 16B. Description will be thereafter made in regard to the polling control subroutine program B12, transmission request control subroutine program B11, and input data process control subroutine program B10 in this sequence.

Figure 21A:
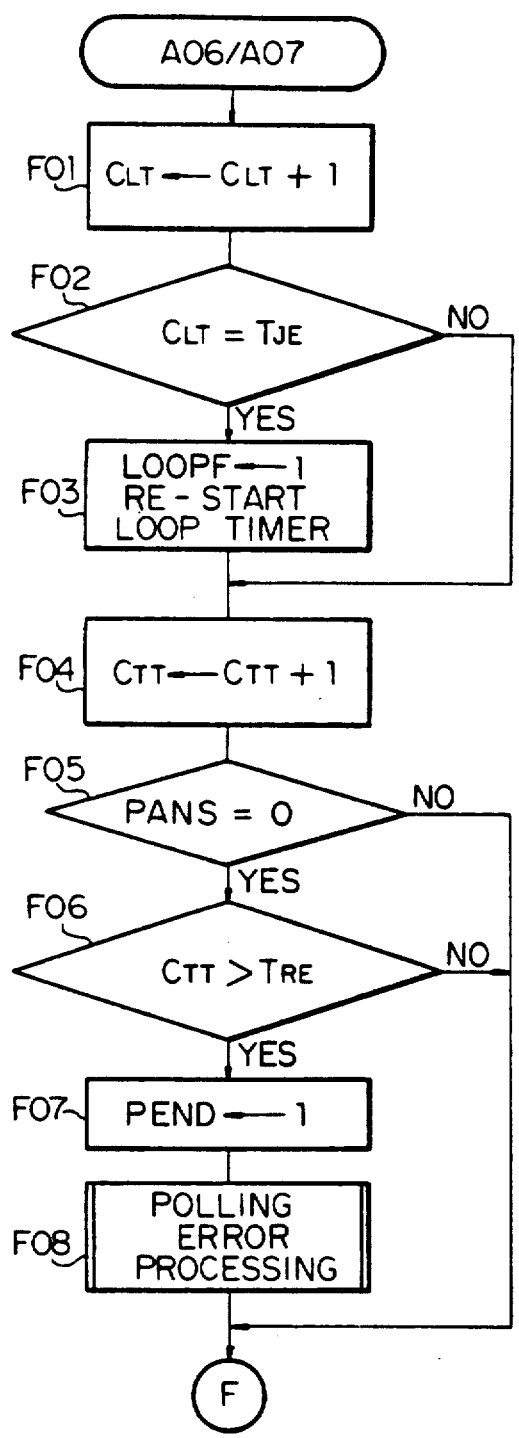
FIGS. 21A and 21B are flowcharts showing the details of the main loop timer control subroutine program and polling control timer control subroutine program, respectively, which are included in the timer interrupt routine program illustrated in FIG. 16B.
Figure 21B:
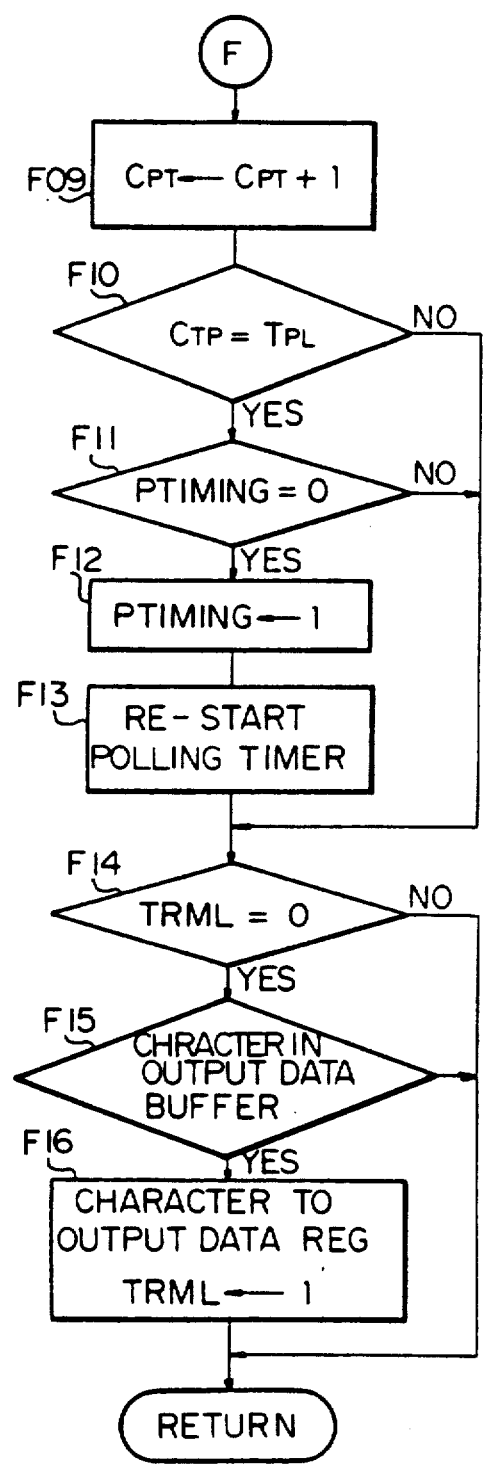

The main loop timer control subroutine program A06 and polling control timer control subroutine program A07 included in the timer interrupt routine program shown in FIG. 16B are executed during each iteration or reiteration of the timer interrupt routine program. FIGS. 21A and 21B show details of these main loop timer control subroutine program A06 and polling control timer control subroutine program A07.

The main loop timer control subroutine program A06 starts with a step F01 at which the microprocessor 200 increments the loop timer count $C_{LT}$. This loop timer count $C_{LT}$ is predominant over the cycles in which the jobs JOB1 to JOBn are to be performed through the job control subroutine program A05 of the main routine program described with reference to FIG. 16A. It is then tested at step F02 whether or not the loop timer count $C_{LT}$ thus incremented at step F01 has reached a numerical value representing a preset job execution timing $T_{JE}$ which is indicative of the timing at which any of the jobs JOB1, . . . JOBn is to be executed. If the answer for this step F02 is given in the negative, the microprocessor 200 jumps over step F03 and proceeds to step F04. If, however, it is found at step F02 that the loop timer count $C_{LT}$ has reached the numerical value representing such a job execution timing $T_{JE}$ so that the answer for the step F02 is given in the affirmative, the microprocessor 200 proceeds to the step F03 to set the flag "LOOPF" to logic value "1" and reset the loop timer count $C_{LT}$ to numerical value "0" enabling the loop timer to start counting operation for a second time from the reset state. The flag "LOOPF" being thus set to logic value "1", the answer for the step B14 of the main routine program is given in the affirmative during the subsequent reiteration of the main routine program and enables the microprocessor 200 to execute any of the jobs JOB1 to JOBn required.

Subsequently, the microprocessor 200 proceeds to step F04 to increment the trouble timer count $C_{TT}$. It is then tested at step F05 whether or not the status answer receipt confirmation flag "PANS" is reset at logic value "0". If the answer for this step F05 is given in the negative, the microprocessor 200 jumps over steps F06 and F07 and subroutine program F08 and proceeds to step F09. If, however, it is found at step F02 that the status answer receipt confirmation flag "PANS" is reset at logic value "0" so that the answer for the step F05 is given in the affirmative, the microprocessor 200 determines that the status answer is not yet received and thus proceeds to the step F06 to set the flag "LOOPF" to check if the trouble timer count $C_{TT}$ has reached the numerical value representing a preset response error timing $T_{RE}$. This response error timing $T_{RE}$ is indicative of a maximum period of time allowed for a frame to reach a subsidiary system control unit after the frame is sent out from the master system control unit 150. If it is found at step F06 that the trouble timer count $C_{TT}$ has reached the numerical value representing the response error timing $T_{RE}$ so that the answer for the step F06 is given in the affirmative, the microprocessor 200 proceeds to step F07 to set the flag "PEND" to logic value "1". After setting the flag "PEND" to logic value "1", the microprocessor 200 determines that communication could not be exchanged properly with the subsidiary system control unit under consideration and as such executes the polling error processing subroutine program F08. The details of this polling error processing subroutine program F08 will be hereinafter described with reference to FIGS. 22A and 22B.

If it is found at step F06 that the trouble timer count $C_{TT}$ has not yet reached the numerical value representing the response error timing $T_{RE}$ so that the answer for the step F06 is given in the negative, the microprocessor 200 determines that communication can be exchanged properly with the subsidiary system control unit under consideration and as such jumps over the step F07 and polling error processing subroutine program F08 to proceed to step F09. Thus, the microprocessor 200 now puts an end to the main loop timer control subroutine program A06 and proceeds to the polling control timer control subroutine program A07 of the timer interrupt routine program illustrated in FIG. 16B.

At step F09 of the polling control timer control subroutine program A07, the microprocessor 200 increments the count $C_{PT}$ of the polling timer and thereafter proceeds to step F10 to check if the count $C_{PT}$ of the polling timer thus incremented at step F09 has reached the numerical value representing a preset polling timing $T_{PL}$ at which a request for communication is to be sent out from the master system control unit 150 to any one of the subsidiary system control units 152a to 152e. If the answer for this step F10 is given in the negative, the microprocessor 200 jumps over step F11, F12 and F13 to proceed to step F14. If the answer for the step F10 is given in the affirmative, then the microprocessor 200 proceeds to step F11 and confirms whether or not the flag "PTIMING" indicative of the timing (tp1, tp2, . . . , FIG. 7) at which a cycle of polling operation is to be started is reset at logic value "0". If the answer for this step F10 is given in the negative, the microprocessor 200 determines that the timing at which a cycle of polling operation is to be started is reached and thus jumps over steps F12 and F13 to directly proceed to step F14. If however the answer for step F11 is given in the affirmative, then the microprocessor 200 proceeds to step F12 to set the flag "PTIMING" to logic value "1". This step F12 is followed step F13 at which the microprocessor 200 resets the count $C_{PT}$ of the polling timer to logic value "0" to enable the polling timer to start counting operation for a second time from the reset state.

Thereafter, the microprocessor 200 proceeds to step F14 and checks if the flag "TRML" is reset at logic value "0" indicating that there is no more character to be sent out from the output data buffer 184 (FIG. 4) of the master system control unit 150. The process of this step F14 is intended to enable the microprocessor 200 to be ready execute the data transmission request subroutine program B11 of the main routine program. If the answer for the step F14 is given in the negative with the flag "TRML" found set at any non-zero value, viz., at logic value "1", the microprocessor 200 determines that there currently is a character or characters still remaining to be sent out from the output data buffer 184 of the master system control unit 150 and thus jumps over steps F15 and F16 to revert to the timer interrupt routine program described with reference to FIG. 16B.

If the answer for the step F15 is given in the affirmative with the flag "TRML" found reset at logic value "0", the microprocessor 200 determines that there currently is no character remaining to be sent out from the output data buffer 184 and thus proceeds to step F15 to confirm whether or not there is a character or characters left in the output data buffer 184. If the answer for this step F15 is given in the negative indicating that there is no character left in the output data buffer 184, the microprocessor 200 jumps over the step F16 and reverts to the timer interrupt routine program illustrated in FIG. 16B. If however the answer for the step F15 is given in the affirmative indicating that there is a character or characters still left in the output data buffer 184, the microprocessor 200 proceeds to step F16 to transfer the remaining character or characters in the output data buffer 184 to the output data register 196 and sets the flag "TRML" to logic value "1". Subsequently to this step F16, the microprocessor reverts to the timer interrupt routine program illustrated in FIG. 16B.

Figure 22A:
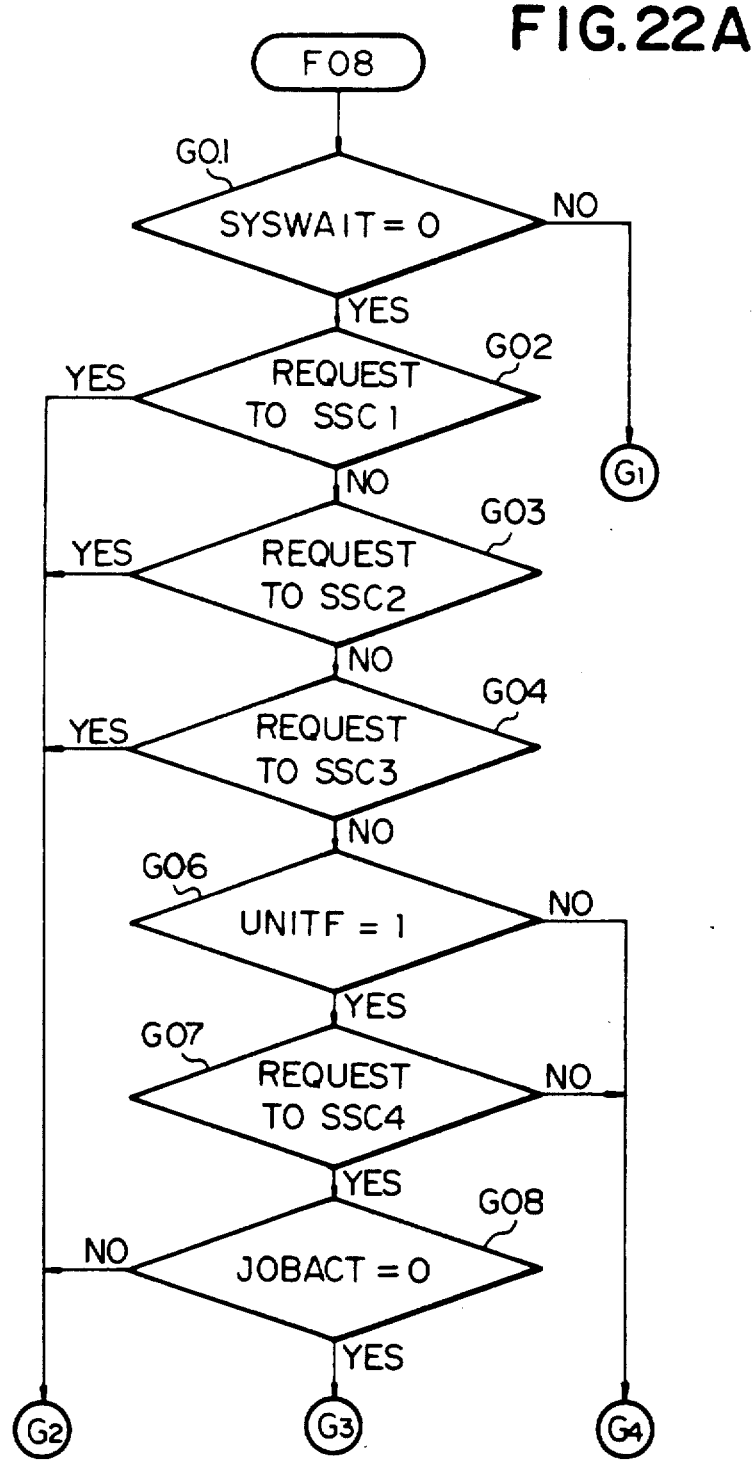
FIGS. 22A and 22B are flowcharts showing the details of the polling error processing subroutine program included in the main loop timer control routine program illustrated in FIG. 21A.
Figure 22B:
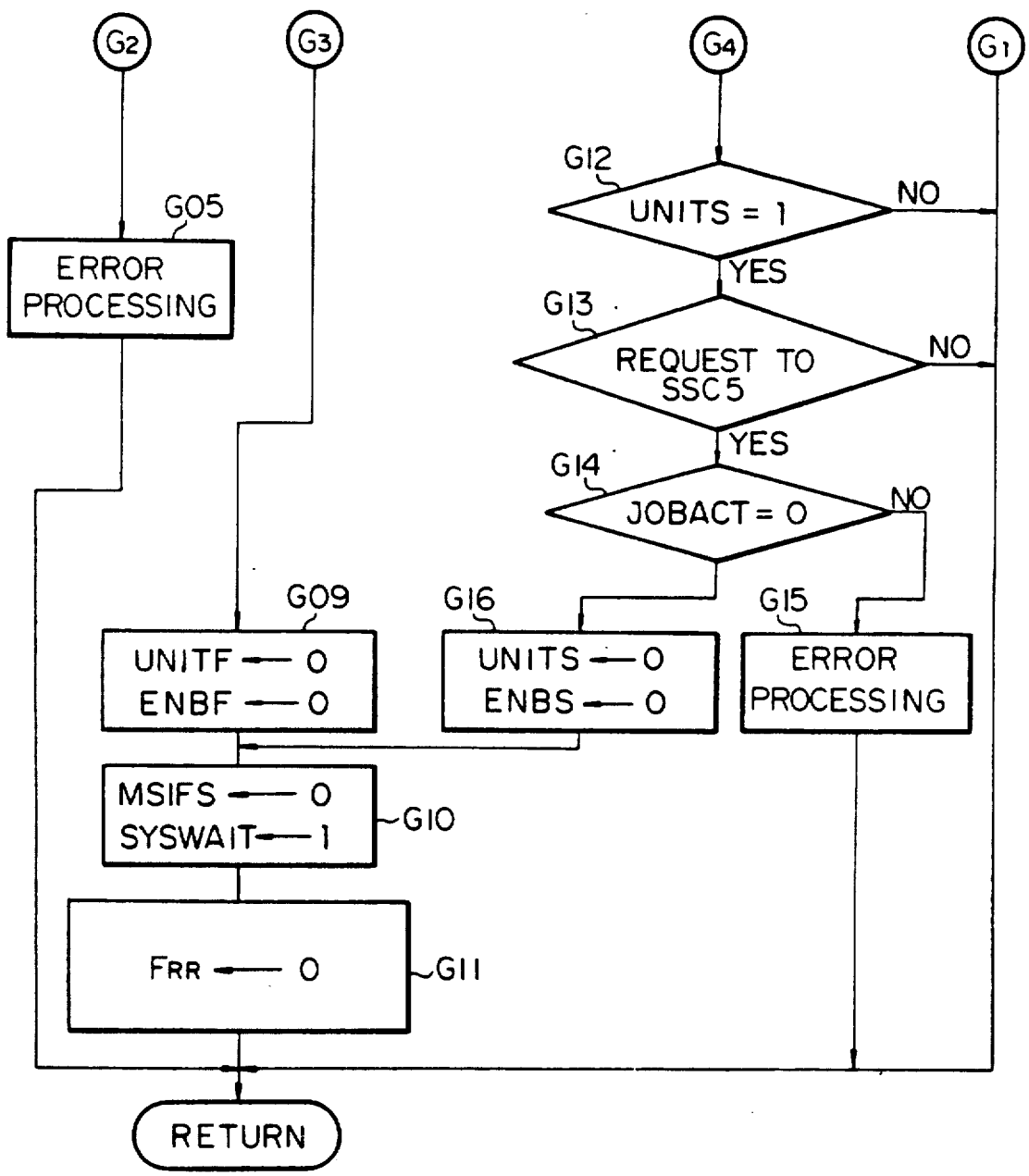

FIGS. 22A and 22B are flowchart showing the details of the polling error processing subroutine program F08 included in the main loop time control routine program A06 described with reference to FIGS. 21A and 21B.

The polling error processing subroutine program F08 starts with a decision step G01 at which the microprocessor 200 checks if the flag "SYSWAIT" is set at logic value "0". If the answer for this step G01 is given in the negative, the microprocessor 200 determines that the process for initialization is currently in progress and as such jumps over all the remaining steps of the polling error processing subroutine program F08 and reverts to the polling control timer control subroutine program A07 of the timer interrupt routine program shown in FIG. 16B.

If the answer for the step G01 is given in the affirmative, then the microprocessor 200 executes a series of steps G02 to G04 to detect the error currently detected is present in which one of the standard subsidiary system control units 52a to 152c. If it is determined that the error currently detected is present in any one of the standard subsidiary system control units 152a to 152c, the answer for any one of these steps G02 to G04 is given in the affirmative. In this instance, the microprocessor 200 proceeds to step G05 to execute steps required for coping with the error invited and thereafter reverts to the polling control timer control subroutine program A07 of the timer interrupt routine program shown in FIG. 16B.

If, on the other hand, it is determined through execution of the steps G02 to G04 that the error currently detected is present in none of the standard subsidiary system control units 152a to 152c, the answer for each of these steps G02 to G04 is given in the negative. In this instance, the microprocessor 200 proceeds to step G06 to check if the flag "UNITF" is set at logic value "1" indicating that the optional subsidiary system control unit 152d is coupled to the master system control unit 150 through the macrosystem interface bus 154. If the optional subsidiary system control unit 152d is coupled to the master system control unit 150 through the macrosystem interface bus 154 and accordingly the answer for this step G06 is given in the affirmative, the microprocessor 200 proceeds to step G07 to detect whether or not the error currently detected is present in the optional subsidiary system control unit 152d. If the answer for this step G07 is given in the affirmative, the microprocessor 200 proceeds to step G08 and checks if the flag parameter "JOBACT" is reset at logic value "0". If the answer for this step G08 is given in the negative indicating that printing operation is currently in progress in the apparatus, the microprocessor 200 proceeds to the step G05 to execute the steps required for coping with the error invited and thereafter reverts to the polling control timer control subroutine program A07 of the timer interrupt routine program shown in FIG. 16B.

If it is found at step G08 that the flag parameter "JOBACT" is reset at logic value "0" indicating that printing operation is not in progress, the microprocessor 200 determines that the subsidiary system control unit 152d which has been confirmed to be duly coupled to the master system control unit 150 has invited an error while the control unit was held in a stand-by condition. In this instance, the microprocessor 200 proceeds to step G09 to reset each of the flags "UNITF" and "ENBF" to logic value "0" to regard the subsidiary system control unit 152d as having been disconnected from the macrosystem interface bus 154. The microprocessor 200 thereafter proceeds to step G10 to reset the flags "MSIFS" at logic value "0" and and set the flag "SYSWAIT" to logic value "1". The step G10 is followed by step G11 at which the microprocessor 200 resets the data receipt report flag $F_{RR}$ to logic value "0" in the status data stored in the status register 182 of the master system control unit 150. Having executed this series of steps G09, G10 and G11, the microprocessor 200 reiterates the macrosystem interface monitor subroutine program B09 as described with reference to FIGS. 18A to 18D and each of the optional subsidiary system control unit 152d and 152e is for a second time checked for its connection to the macrosystem interface bus 154.

On the other hand, if the answer for any one of the steps G06 and G07 is given in the negative, then the microprocessor 200 proceeds to step G12 to detect whether or not the flag "UNITS" is set at logic value "1" indicating that the optional subsidiary system control unit 152e is coupled to the master system control unit 150 through the macrosystem interface bus 154. If the optional subsidiary system control unit 152e is coupled to the master system control unit 150 through the macrosystem interface bus 154 and accordingly the answer for this step G12 is given in the affirmative, the microprocessor 200 proceeds to step G13 to check if the error currently detected is present in the optional subsidiary system control unit 152e. If the answer for this step G13 is given in the affirmative, the microprocessor 200 proceeds to step G14 and checks if the flag parameter "JOBACT" is reset at logic value "0". If the answer for this step G14 is given in the negative indicating that printing operation is currently in progress in the apparatus, the microprocessor 200 proceeds to step G15 to execute the steps required for copying with the error invited and thereafter reverts to the polling control timer control subroutine program A07 of the timer interrupt routine program shown in FIG. 16B.

If it is found at step G14 that the flag parameter "JOBACT" is reset at logic value "0" indicating that printing operation is not in progress, the microprocessor 200 determines that the subsidiary system control unit 152e which has been confirmed to be duly coupled to the master system control unit 150 has invited an error while the control unit was held in a stand-by condition. In this instance, the microprocessor 200 proceeds to step G16 to reset each of the flags "UNITS" and "ENBS" to logic value "0" to regard the subsidiary system control unit 152e as having been disconnected from the macrosystem interface bus 154. The microprocessor 200 thereafter proceeds to the step G10 to reset the flags "MSIFS" at logic value "0" and set the flag "SYSWAIT" to logic value "1". The step G10 is followed by step G11 at which the microprocessor 200 resets the data receipt report flag $F_{RR}$ to logic value "0" in the status data stored in the status register 182 of the master system control unit 150. Having executed this series of steps G09, G10 and G11, the microprocessor 200 reiterates the macrosystem interface monitor subroutine program B09 as described with reference to FIGS. 18A to 18D and each of the optional subsidiary system control unit 152d and 152e is for a second time checked for its connection to the macrosystem interface bus 154.

Figure 23:
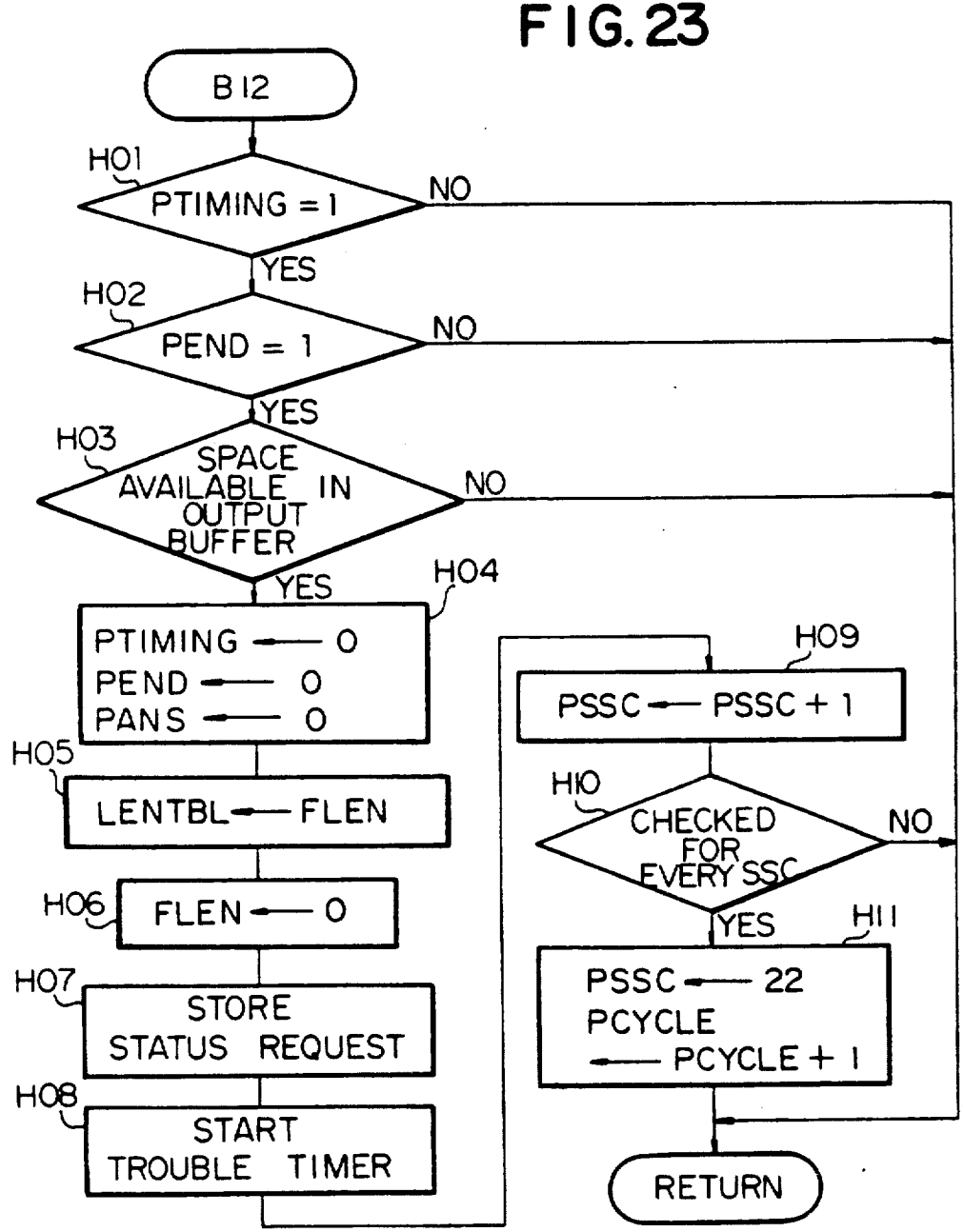
FIG. 23 is a flowchart showing the details of the polling control subroutine program included in the main routine program illustrated in FIGS. 17A and 18B.

FIG. 23 is a flowchart showing the details of the polling control subroutine program B12 included in the main routine program described with reference to FIGS. 17A and 17B.

The polling control subroutine program B12 starts with a decision step H01 at which the microprocessor 200 checks if the flag "PTIMING" is set at logic value "1". If the answer for this step H01 is given in the negative, the microprocessor 200 determines that the timing (pt1, pt2, ..., FIG. 7) at which a cycle of polling operation is to be started is not yet reached and as such jumps over the remaining steps of this subroutine program B12 to return to the main routine program illustrated in FIGS. 17A and 17B.

If, on the other hand, it is found at step H01 that the flag "PTIMING" is set at logic value "1" and accordingly the answer for the step H01 is given in the affirmative, the microprocessor 200 determines that the timing at which a cycle of polling operation is to be started has already been reached and as such proceeds to step H02 to check if the flag "PEND" is set at logic value "1". As will be described in more detail, the microprocessor 200 confirms the termination of a frame from a particular subsidiary system control unit when either the frame-to-continue bit "N" of logic value "1" is detected in the status answer frame or the sequence report frame received from the subsidiary system control unit or the frame end code is detected in the mode answer frame received from the subsidiary system control unit during execution of the input data process control subroutine program B10. The presence of the flag "PEND" set at logic value "1" therefore indicates that all the characters which form the frame transmitted from a subsidiary system control unit have been received by the master system control unit 150 and accordingly that the master system control unit 150 is allowed to send out a new request for communication to another subsidiary system control unit.

However, in the presence of the flag "PEND" of logic value "0", it is understood that not all of the characters which form the frame transmitted from a subsidiary system control unit have not been received by the master system control unit 150 and accordingly that the master system control unit 150 is prohibited from sending out a new request for communication to another subsidiary system control unit. In this instance, the microprocessor 200 jumps over the remaining steps of this subroutine program B12 and returns to the main routine program illustrated in FIGS. 17A and 17B.

When the answer for the step H02 is given in the affirmative, then the microprocessor 200 proceeds to step H03 and checks if there is a free memory space available in the output data buffer 194 of the master system control unit 150. If it is determined at this step H03 that there is no free memory space available and, thus, the answer for the step H03 is given in the negative, the microprocessor 200 also jumps over the remaining steps of this subroutine program B12 and returns to the main routine program illustrated in FIGS. 17A and 17B. In these manners, a request for communication to any of the subsidiary system control units 152a to 152e is issued from the master system control unit 150 on condition that (1) the timing at which a cycle of polling operation is to be started is reached, (2) an answer to the immediately preceding request for communication to another one of the subsidiary system control units 152a to 152e has been duly received and, in addition, (3) there is a free memory space available in the output data buffer 194 of the master system control unit 150.

When it is confirmed in the master-system control unit 150 that all of these requirements are met, the microprocessor 200 proceeds to step H04 to reset each of the flags "PTIMING", "PEND" and "PANS" to logic value "0". The step H04 is followed by step H05 at which the microprocessor 200 updates the parameter "LENTBL" to a new numerical value on the basis of the parameter "FLEN" which is indicative of the data length of the answer frame responsive to the immediately preceding request for communication issued from the master system control unit 150. With the parameter "LENTBL" thus updated to a new numerical value, the microprocessor 200 proceeds to step H06 to clear the existing flag "FLEN" as being now obsolete for the request for communication to be newly issued from the master system control unit 150.

To send out the new request for communication, the microprocessor 200 proceeds to step H07 to supply a status request frame to the output data buffer 192 of the master system control unit 150 and temporarily stores the frame therein. Thereafter, the microprocessor 200 proceeds to step H08 to start the trouble timer in order to monitor the condition in which communication is to be exchanged with the master system control unit 150 and the subsidiary system control unit under consideration. The master system control unit 150 is now ready to send out the request for communication to the subsidiary system control unit and thus proceed to step H09 to increment the parameter "PSSC" to specify the new subsidiary system control unit to which the request for communication is to be directed. The parameter "PSSC" being thus incremented at step H09, the microprocessor 200 is ready to for reiteration of the polling control subroutine program B12. The status request frame which is stored in the output data buffer 194 as noted above is to be sent to the subsidiary system control unit during execution of the output data buffer control subroutine program A08 of the incoming interrupt routine program illustrated in FIG. 16C.

When the master system control unit 150 is thus conditioned to be ready to send out the new request for communication to the subsidiary system control unit under consideration, the microprocessor 200 proceeds to step H10 to detect whether or not a request for communication has been transmitted to every one of the subsidiary system control units 152a to 152e which are coupled to the master system control unit 150 through the macrosystem interface bus 154. If the answer for this step H10 is given in the negative, the microprocessor 200 jumps over step H11 and returns to the main routine program illustrated in FIGS. 17A and 17B. If it is determined at step H10 that a request for communication has been transmitted to every one of the subsidiary system control units 152a to 152e and the answer for the step H10 is thus given in the affirmative, the microprocessor 200 proceeds to the step H11 to update the parameter "PSSC" to the numerical value assigned to the first optional subsidiary system control unit 152a. This process is intended to enable the master system control unit 150 to send requests for communication successively to the subsidiary system control units 152a to 152e starting with the first standard subsidiary system control unit 152a. Also at this step H11, the microprocessor 200 increments the parameter "PCYCLE" so that the parameter is indicative of the number of the request for communication which have been issued from the master system control unit 150.

Figure 24A:
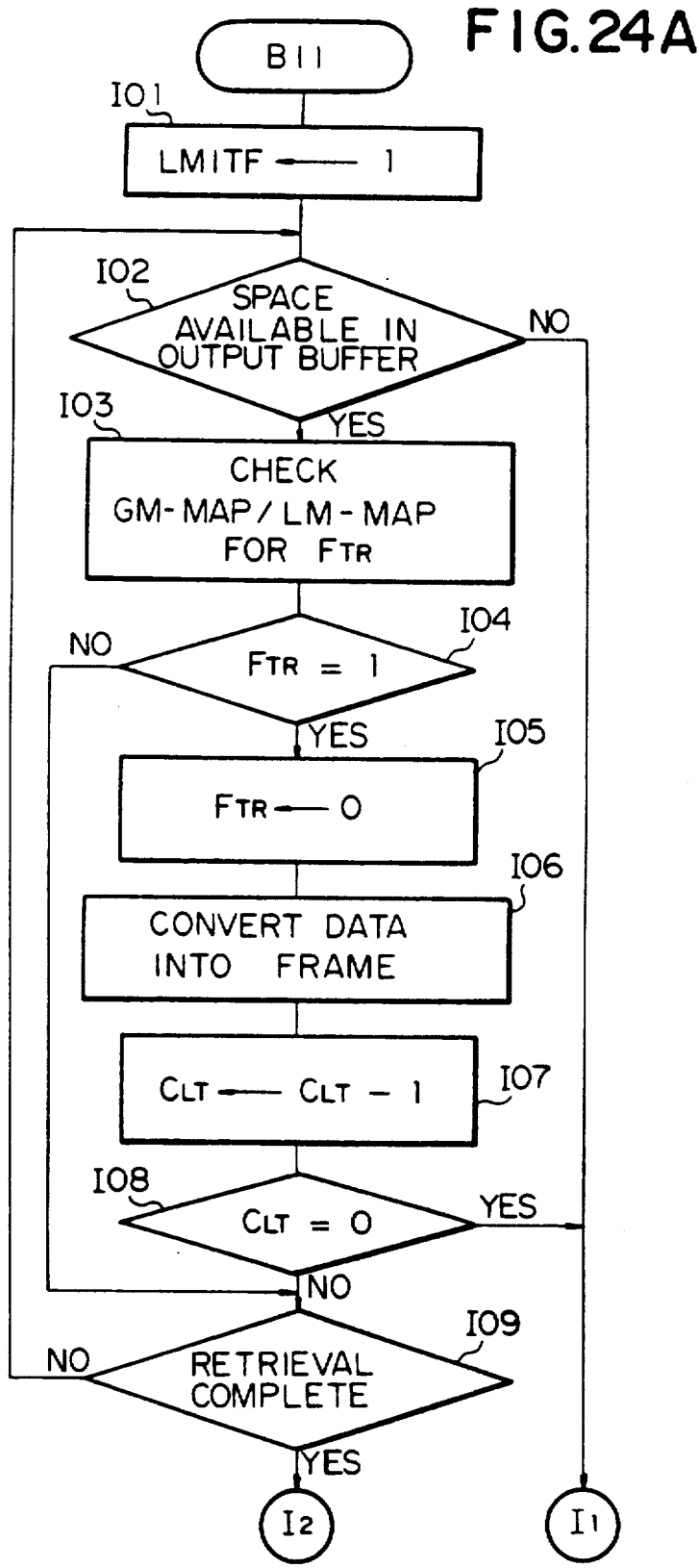
FIGS. 24A and 24B are flowcharts showing the details of the data transmission request control subroutine program included in the main routine program illustrated in FIGS. 17A and 18B.
Figure 24B:
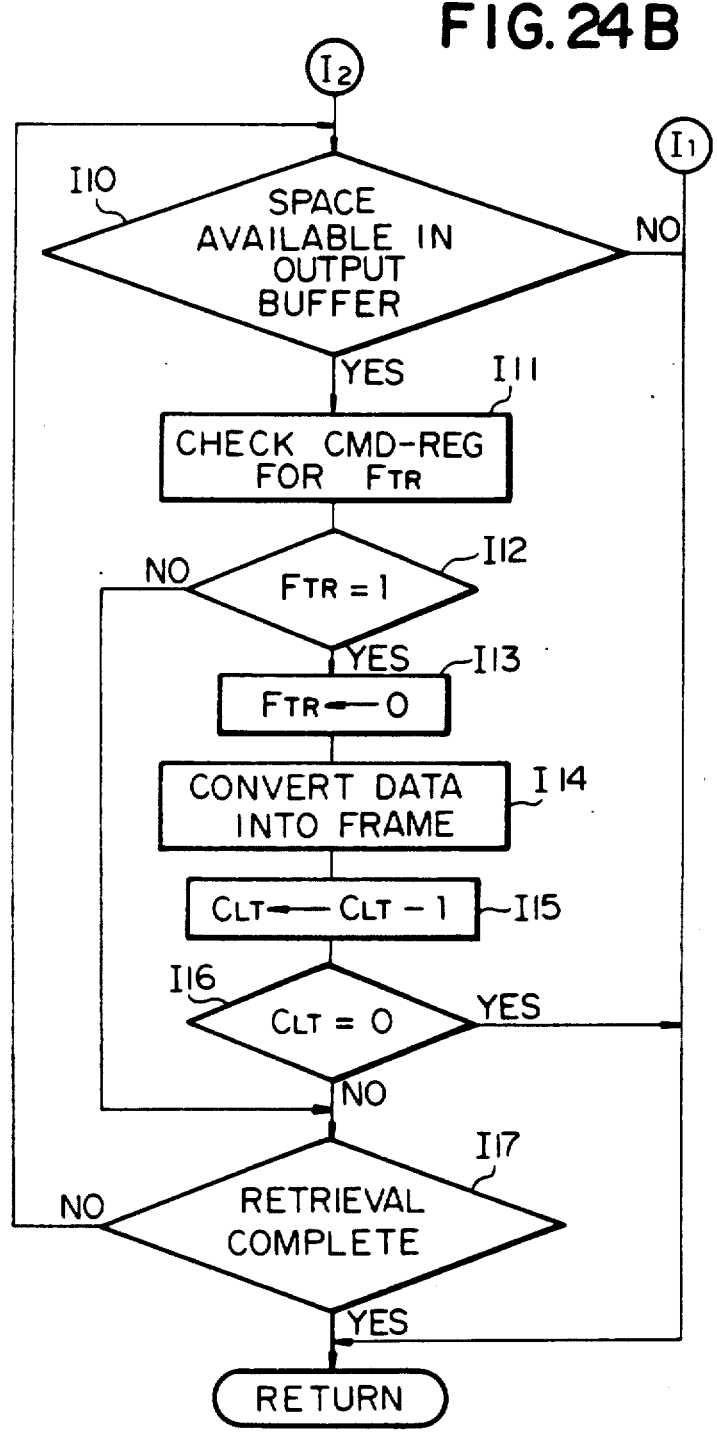

FIGS. 24A and 24B are flowcharts showing the details of the data transmission request subroutine program B11 included in the main routine program described with reference to FIGS. 17A and 17B.

The data transmission request subroutine program B11 starts with a step I01 at which the microprocessor 200 sets the parameter "LMTF" in the limiting counter and thereafter proceeds to step I02 to check if there is a free memory space available in the output data buffer 194 of the master system control unit 150. If it is found at this step I02 that there is no free memory space available in the output data buffer 194 of the master system control unit 150 and thus the answer for the step I02 is given in the negative, the microprocessor 200 determines that the request for communication could not be coped with and as such jumps over all the remaining steps of the present subroutine program B11 to revert to the main routine program illustrated in FIGS. 17A and 17B.

If it is found at step I02 that there is a free memory space available in the output data buffer 194 of the master system control unit 150 and thus the answer for the step I02 is given in the affirmative, the microprocessor 200 proceeds to step I03 checks the global mode map 186 and local mode map 188 in search of any data having the data transmission request flag $F_{TR}$ set at logic value "1". Subsequently to step I03, the microprocessor 200 proceeds to step I04 to detect whether or not such data has been located in the global or local mode map 188 or 188. If the answer for this step I04 is given in the negative, the microprocessor 200 jumps over steps I05 to I08 and proceeds to step I09. If it is found at step I04 that data having the data transmission request flag $F_{TR}$ set at logic value "1" has been located in the global or local mode map 188 or 188 and accordingly the answer for the step I04 is given in the affirmative, the microprocessor 200 proceeds to step I05 to reset the detected data transmission request flag $F_{TR}$ at logic value "0" and further to step I06 to convert the particular data into the form of a frame and send the frame to a free memory space found to be available in the output data buffer 194.

Subsequently, the microprocessor 200 proceeds to step I07 to decrement the content $C_{LT}$ of the limiting counter and further proceeds to step I08 to check if the content $C_{LT}$ of the limiting counter thus decremented has reached a numerical value "0". If the answer for this step I08 is given in the affirmative, the microprocessor 200 jumps over all the remaining steps of the present subroutine program B11 to revert to the main routine program illustrated in FIGS. 17A and 17B. If the answer for the step I08 is given in the negative, the microprocessor 200 proceeds to step I09 to detect whether or not all the data stored in the global and local mode maps 186 and 188 of the master system control unit 150 have been checked for the data transmission request flag $F_{TR}$ having logic value "1". If the answer for this step 109 is given in the negative, the microprocessor 200 recycles to step 102 to check if there is a free memory space available in the output data buffer 194 and thus reiterates the loop of the steps 102 to 109 until it is found at step 102 that the output data buffer 194 can no longer store data or it is found at step 109 that all the data stored in the global and local mode maps 186 and 188 of the master system control unit 150 have been checked for the data transmission request flag $F_{TR}$ having logic value "1". Thus, the number of the characters which can be sent out from the master system control unit 150 during each iteration of the data transmission request subroutine program B11 is limited on the basis of the content $C_{LT}$ of the limiting counter used in the image processing system embodying the present invention. For this reason, the master system control unit 150 of the system is permitted to communicate with each of the subsidiary system control units 152a to 152e without sacrificing any other functions allocated thereto and each of the subsidiary system control units 152a to 152e, in turn, is enabled to respond without delay to the request for communication from the master system control unit 150.

When, now, the answer for step 109 is turned affirmative, the microprocessor 200 proceeds to step 110 to detect whether or not there is a free memory space available in the output data buffer 194 of the master system control unit 150. If the answer for this step 110 is given in the affirmative, the microprocessor 200 proceeds to step 111 to check the command register 180 of the master system control unit 150 in search of any command data having the data transmission request flag $F_{TR}$ set at logic value "1". Subsequently to step 111, the microprocessor 200 proceeds to step 112 to check if such data has been located in the command register 180. If the answer for this step 112 is given in the negative, the microprocessor 200 jumps over steps 113 to 116 and proceeds to step 117. If it is found at step 112 that the command data having the data transmission request flag $F_{TR}$ set at logic value "1" has been located in the command register 180 and accordingly the answer for the step 112 is given in the affirmative, the microprocessor 200 proceeds to step 113 to reset the detected data transmission request flag $F_{TR}$ at logic value "0" and further to step 114 to convert the particular command data into the form of a frame and send the frame to a free memory space found to be available in the output data buffer 194.

Subsequently, the microprocessor 200 proceeds to step 114 to decrement the content $C_{LT}$ of the limiting counter and further proceeds to step 116 to detect whether or not the content $C_{LT}$ of the limiting counter thus decremented has reached a numerical value "0". If the answer for this step 116 is given in the affirmative, the microprocessor 200 jumps over the remaining step 117 and reverts to the main routine program illustrated in FIGS. 17A and 17B. If the answer for the step 116 is given in the negative, the microprocessor 200 proceeds to the step 117 to check if all the command data stored in the command register 180 have been checked for the data transmission request flag $F_{TR}$ having logic value "1".

If the answer for this step 117 is given in the negative, the microprocessor 200 recycles to step 110 to detect whether or not there is a free memory space available in the output data buffer 194 and thus reiterates the loop of the steps 110 to 117 until it is found at step 110 that the output data buffer 194 can no longer store data or it is found at step 117 that all the data stored in the command register 180 have been checked for the data transmission request flag $F_{TR}$ having logic value "1".

In these manners, the frame stored into the output data buffer 194 through execution of each of the step 106 and 114 is transmitted to the subsidiary system control unit during execution of the output data buffer control subroutine program A09 of the outgoing interrupt routine program described with reference to FIG. 16D.

During execution of the output data buffer control subroutine program A09 of the data transmission interrupt routine program, the microprocessor 200 retrieves data in the global mode map 186 and local mode map 188 and thus sends the data to a free memory space found to be available in the output data buffer 194. If it is thereafter found that there is a free memory space still available in the output data buffer 194, the command to be sent out from the command register 180 is stored into the output data buffer 194. In this fashion, each of the subsidiary system control units 152a to 152e is enabled to receive the data stored in the global mode map 186 and local mode map 188 before the subsidiary system control unit is supplied with a command from the command register 180. This is advantageous for the subsidiary system control unit because of the fact that each subsidiary system control unit is guaranteed to receive data necessary for executing the command.

Figure 25:
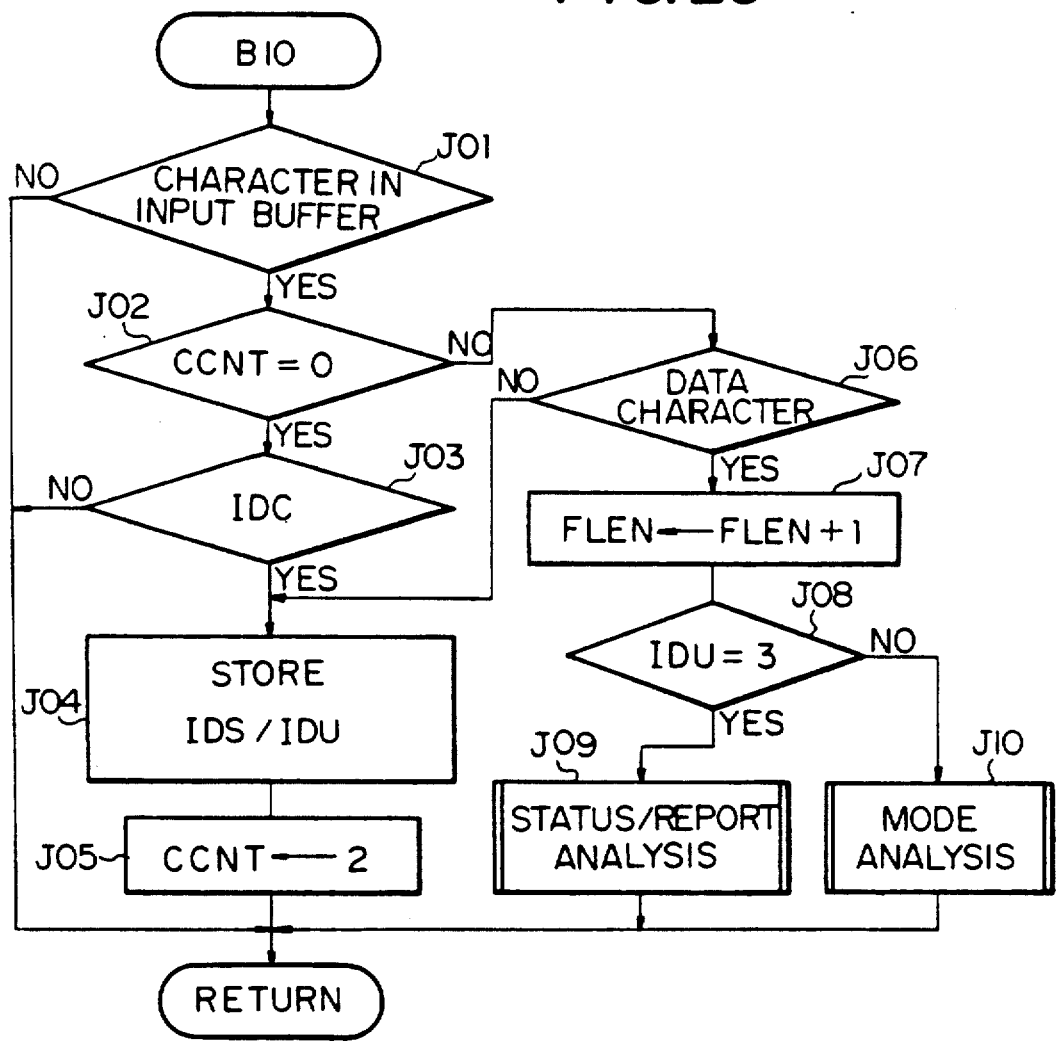
FIG. 25 is a flowchart showing the details of the input data process control subroutine program included in the main routine program illustrated in FIGS. 17A and 18B.

FIG. 25 is a flowchart showing the details of the input data process control subroutine program B10 included in the main routine program described with reference to FIGS. 17A and 17B.

The data transmission request subroutine program B10 is to be executed during execution of the input data buffer control subroutine program A08 included in the incoming interrupt routine program described with reference to FIG. 16C. Execution of this subroutine program B10 is started when the character which has been latched in the input data register 190 is transferred to the input data buffer 192 of the master system control unit 150.

The data transmission request subroutine program B10 starts with a step J01 at which the microprocessor 200 checks if there is a character latched in the input data buffer 192 of the master system control unit 150. If it is found at this step J01 that there is no character currently retained in the input data buffer 192 of the master system control unit 150 and thus the answer for the step J01 is given in the negative, the microprocessor 200 jumps over all the remaining steps and subroutine programs of this subroutine program B10 and reverts to the main routine program described with reference to FIGS. 17A and 17B. On the other hand, if it is found at step J01 that there is a character stored in the input data buffer 192 of the master system control unit 150 and thus the answer for the step J01 is given in the negative, then the microprocessor 200 proceeds to step J02 to check if the parameter "CCNT" is reset at numerical value "0". The parameter "CCNT" is indicative of the number of the characters contained in the frame received by the master system control unit 150 as previously noted and, accordingly, has a numerical value "0" immediately after a frame has been received by the master system control unit 150. The answer for the step J02 being thus given in the affirmative, the microprocessor 200 proceeds to step J03 and checks if the character currently received by the master system control unit 150 is an identification character. An identification character is the starting character of a frame so that, if the character received is not an identification character in spite of the fact that the parameter "CCNT" is indicative of a numerical value "0", it is understood that an error has occurred in receiving the frame or that the character received is the identification character which has already been processed during execution of the input data process control subroutine program B10. For this reason, the microprocessor 200 jumps over all the remaining steps and subroutine programs of this subroutine program B10 and reverts to the main routine program described with reference to FIGS. 17A and 17B provided the answer for step J03 is given in the negative.

If, on the other hand, it is found at step J03 that the character currently received is an identification character and accordingly the answer for the step J03 is given in the affirmative, the microprocessor 200 proceeds to step J04 to transfer the destination identification code "S" and memory area identification code "U" in the received identification character to the working area of the random access memory 204 (FIG. 6) of the master system control unit 150. The destination and memory area identification codes "S" and "U" thus transferred to and stored into the random access memory 204 of the master system control unit 150 implement the previously mentioned parameters "IDS" and "IDU", respectively.

Subsequently, the microprocessor 200 proceeds to step J05 to set the parameter "CCNT" at numerical value "2" and thereafter reverts to the main routine program described with reference to FIGS. 17A and 17B. It may be herein noted that the parameter "CCNT" is not to be set at numerical value "1" in this input data process control subroutine program B10.

The input data buffer 192 will thereafter receive the second character of the frame while the microprocessor 200 is in operation for executing any of the various subroutine programs included in the main routine program. When the second character of the frame is thus received in and latched into the input data buffer 192, the answer for the step J02 of this input data process control subroutine program B10 is given in the negative. In this instance, the microprocessor 200 proceeds to step J06 to detect whether or not the received second character is a data character. If it is found at this step J06 that the received second character is an identification character, the answer for the step J06 is given in the negative so that the microprocessor 200 proceeds to the step J04 to transfer the destination identification code "S" and memory area identification code "U" in the received identification character to the working area of the random access memory 204 of the master system control unit 150 as the parameters "IDS" and "IDU", respectively. Subsequently, the microprocessor 200 proceeds to the step J05 to set the parameter "CCNT" at numerical value "2" and thereafter reverts to the main routine program described with reference to FIGS. 17A and 17B.

On the other hand, if it is found at step J06 that the second character currently received is a data character, the answer for the step J06 is given in the affirmative so that the microprocessor 200 proceeds to step J07 to increment the parameter "FLEN" and further to step J08 to check if the parameter "IDU" implemented by the memory area code "U" in the identification character of the frame being received is set at numerical value "3". The parameter "IDU" is indicative of the logic address space in the subsidiary system control unit with which the master system control unit 150 is currently in communication and the memory area code "U" of numerical value "3" is indicative of the command register 180 or the status register 182 as has been discussed with reference to Table I. Thus, the purpose of the decision step J07 is to determine whether or not the memory area code "U" in the identification character of the frame being received designates either the command register 180 or the status register 182 as the destination.

If it is found at step J08 that the memory area code "U" in the identification character of the frame being received designates the command register 180 or the status register 182 as the destination, the answer for this step J08 is given in the affirmative, the microprocessor 200 executes a status/report analysis subroutine program J09. If, on the contrary, it is found at step J08 that the memory area code "U" designates neither the command register 180 nor the status register 182 as the destination, the answer for the step J08 is given in the negative so that the microprocessor 200 executes a mode analysis subroutine program J10. Upon termination of either the status/report analysis subroutine program J09 or the mode analysis subroutine program J10, the microprocessor 200 reverts to the main routine program described with reference to FIGS. 17A and 17B.

Figure 26A:
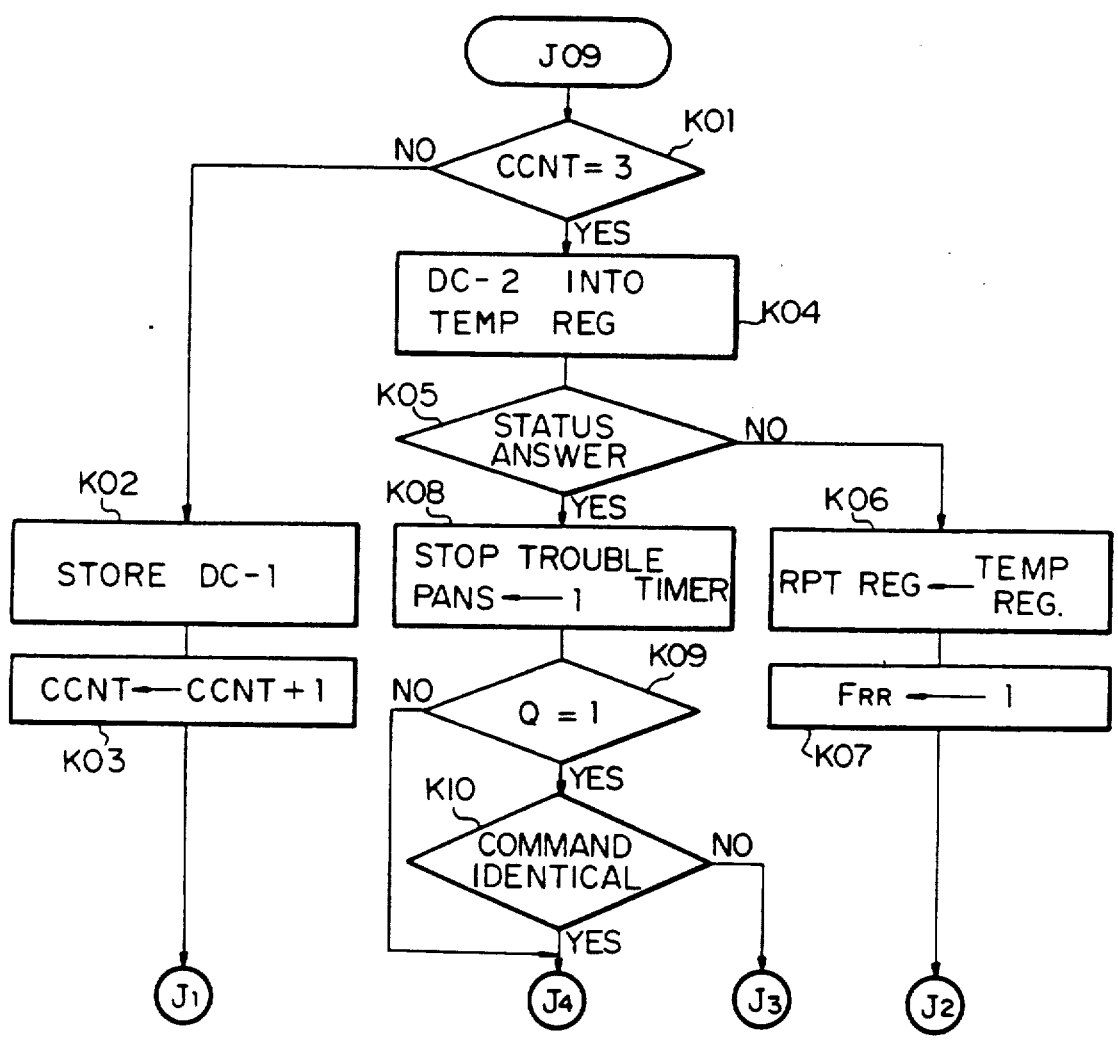
FIGS. 26A and 26B are flowcharts showing the details of the status/report analysis subroutine program included in the input data process control routine program illustrated in FIG. 25.
Figure 26B:
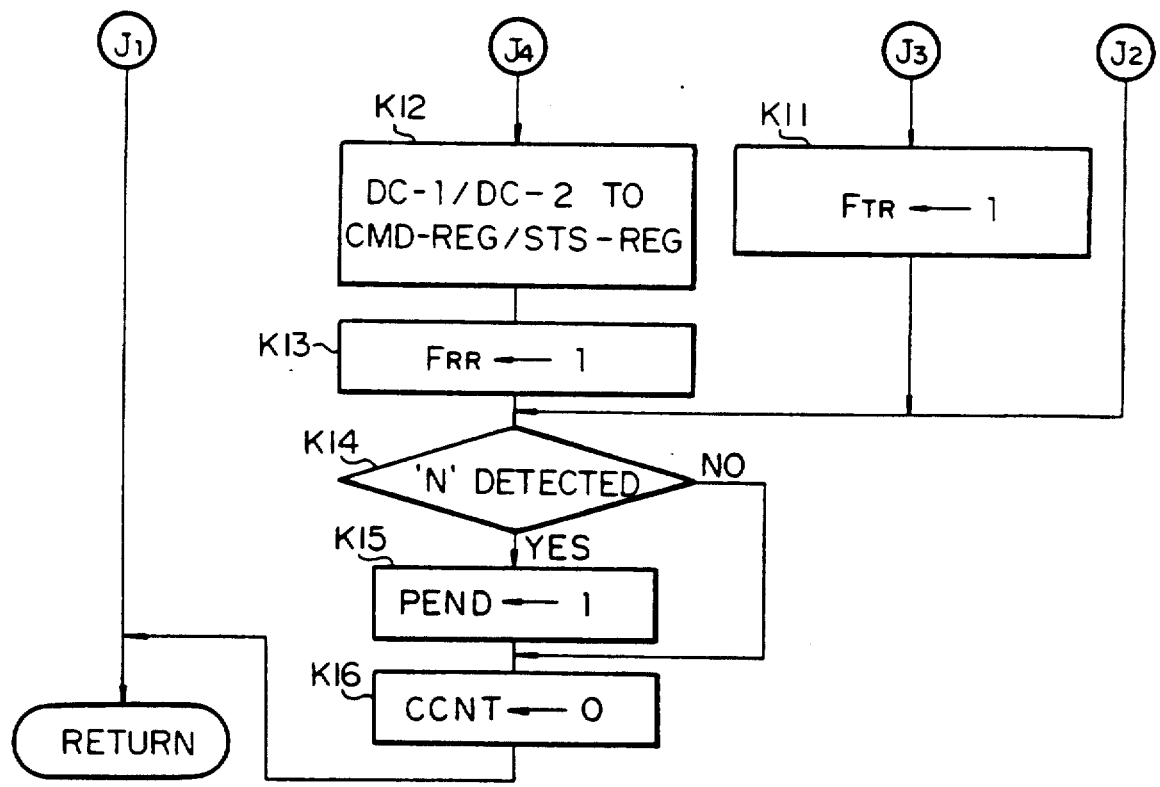

FIGS. 26A and 26B are flowcharts showing the details of the status/report analysis subroutine program J09 included in the input data process control subroutine program B10 hereinbefore described with reference to FIG. 25.

This status/report analysis subroutine program J09 is to be executed to analyze either the status answer frame or the sequential report frame received from the subsidiary system control unit with which the master system control unit 150 is currently in communication. As noted above, this subroutine program J09 is executed when it is determined at step J08 of the input data process control subroutine program B10 that the memory area code "U" in the identification character of the frame being received designates either the command register 180 or the status register 182 as the destination.

When it is thus found at step J08 of the input data process control subroutine program B10 that the parameter "IDU" is set at numerical value "3", the microprocessor 200 proceeds to step K01 of the status/report analysis subroutine program J09 and checks if the parameter "CCNT" is set at numerical value "3". At the point of time the first data character (DC-1) is received, the parameter "CCNT" is set at numerical value "2" at step J05 of the input data process control subroutine program B10. The answer for step K01 is for this reason given in the negative so that the microprocessor 200 proceeds to step K02 to store the first data character DC-1 into the particular temporary register of the microprocessor 200 to which the first data character is assigned. Subsequently, the microprocessor 200 proceeds to step K03 to increment the parameter "CCNT" and thereafter reverts to the input data process control subroutine program B01 shown in FIG. 25 and thence to the main routine program shown in FIGS. 17A and 17B.

As has been described with reference to FIGS. 12A and 12B, each of the status answer frame and sequential report frame received from a subsidiary system control unit is composed of a series of three characters and must be inclusive of the second data character DC-2 in addition to the identification character IDC and the first data character DC-1. The second data character DC-2 of the frame supplied from the subsidiary system control unit currently in communication with the master system control unit 150 is latched into the input data buffer 192 of the master system control unit 150. The present status/report analysis subroutine program J09 is executed after the second data character DC-2 is thus stored into the input data buffer 192 of the master system control unit 150 and, for this reason, the answer for step K01 is this time given in the affirmative.

The answer for step K01 being thus given in the affirmative, the microprocessor 200 proceeds to step K04 to store the second data character DC-2 into the temporary register of the microprocessor 200 to which the second data character is assigned. Subsequently, the microprocessor 200 proceeds to step K05 to detect whether or not the frame received is a status answer frame, this decision being made through analysis of the contents of the first and second data characters DC-1 and DC-2. If it is found at this step K05 that the frame received is a sequential report frame and accordingly the answer for the step K05 is given in the negative, the microprocessor 200 proceeds to step K06 whereby the first and second data characters DC-1 and DC-2 which are currently stored in the temporary registers of the microprocessor 200 are transferred to the report register 184 of the master system control unit 150. The step K06 is followed by step K07 at which the data receipt report flag $F_{RR}$ included in each of the first and second data characters DC-1 and DC-2 is set at logic value "1" to indicate that a response has been received from the subsidiary system control unit which is currently in communication with the master system control unit 150. The sequence report frame thus received by the master system control unit 150 is to be used during execution of the job control subroutine program A05 of the man routine program as will be described later.

On the other hand, if it is found at step K05 that the frame received is a status answer frame and accordingly the answer for the step K05 is given in the affirmative, then the microprocessor 200 proceeds to step K08 to bring a stop to the trouble timer and set the flag "PANS" at logic value "1". With the trouble timer thus brought to a stop and the flag "PANS" set at logic value "1" at step K08, it could not be determined at step F06 of the polling control timer control subroutine program A06 (FIG. 21) that an error has occurred in the response from the subsidiary system control unit in communication with the master system control unit 150.

Subsequently to step K08, the microprocessor 200 proceeds to step K09 and checks if the command contained in the frame received includes a data character having logic value "1" set at the second highest bit, viz., the receipt confirmation bit "Q", of the character (see FIG. 12A). This confirmation is necessitated to determine whether or not the frame currently received from the subsidiary system control unit under consideration is identical with the newest frame which was sent from the master system control unit 150 to the particular subsidiary system control unit. If the answer for this step K09 is given in the negative, the microprocessor 200 jumps over step K10 and proceeds to step K12 but if the answer for the step K09 is given in the affirmative, then the microprocessor 200 proceeds to the step K10 and detects whether or not the command contained in the frame currently received from the subsidiary system control unit is identical with the newest frame which was sent from the master system control unit 150 to the particular subsidiary system control unit. If it is determined at step K10 that the command in the frame currently received is not identical with the newest frame sent out from the master system control unit 150 to the particular subsidiary system control unit and accordingly the answer for the step K10 is given in the negative, the microprocessor 200 proceeds to step K11 whereby the data transmission request flag $F_{TR}$ of the newest command supplied to the subsidiary system control unit currently in communication with the master system control unit 150 is set to logic "1". This process step K11 is required to enable the master system control unit 150 to send the newest command to the subsidiary system control unit under consideration for a second time.

On the other hand, if it is determined at step K10 that the command in the frame currently received is identical with the newest frame sent out from the master system control unit 150 to the particular subsidiary system control unit and accordingly the answer for the step K10 is given in the affirmative, the microprocessor 200 proceeds to step K12 at which the first and second data characters DC-1 and DC-2 which are currently stored in the temporary registers of the microprocessor 200 are transferred to and stored into each of the command register 180 and status register 182 of the master system control unit 150. This step K12 is followed by step K13 at which the data receipt report flag $F_{RR}$ included in each of the first and second data characters DC-1 and DC-2 received is set to logic value "1" to indicate that a response has been received from the subsidiary system control unit which is currently in communication with the master system control unit 150.

Subsequently, the microprocessor 200 proceeds to step K14 to detect whether or not the frame-to-continue bit "N" is contained in the last received data characters of the frame to detect whether or not the frame further includes a character or characters. If it is found at this step K14 that the frame-to-continue bit "N" is not contained in the last received data characters of the frame and accordingly the answer for step K14 is given in the negative, the microprocessor 200 determines that the frame further includes a character or characters and thus jumps over step K15 to proceed directly to step K16. On the other hand, if it is found at step K14 that the frame-to-continue bit "N" is contained in the last received data characters of the frame, the microprocessor 200 determines that the last received character is the final character of the frame received and as such proceeds to the step K15 to set the flag "PEND" at logic value "1" to indicate the termination of the frame supplied from the subsidiary system control unit under consideration. The step K15 is followed by the step K16 at which the parameter "CCNT" is cleared to numerical value "0" to enable the master system control unit 150 to be ready for receiving the subsequent frame to be transmitted from another subsidiary system control unit.

Figure 27A:
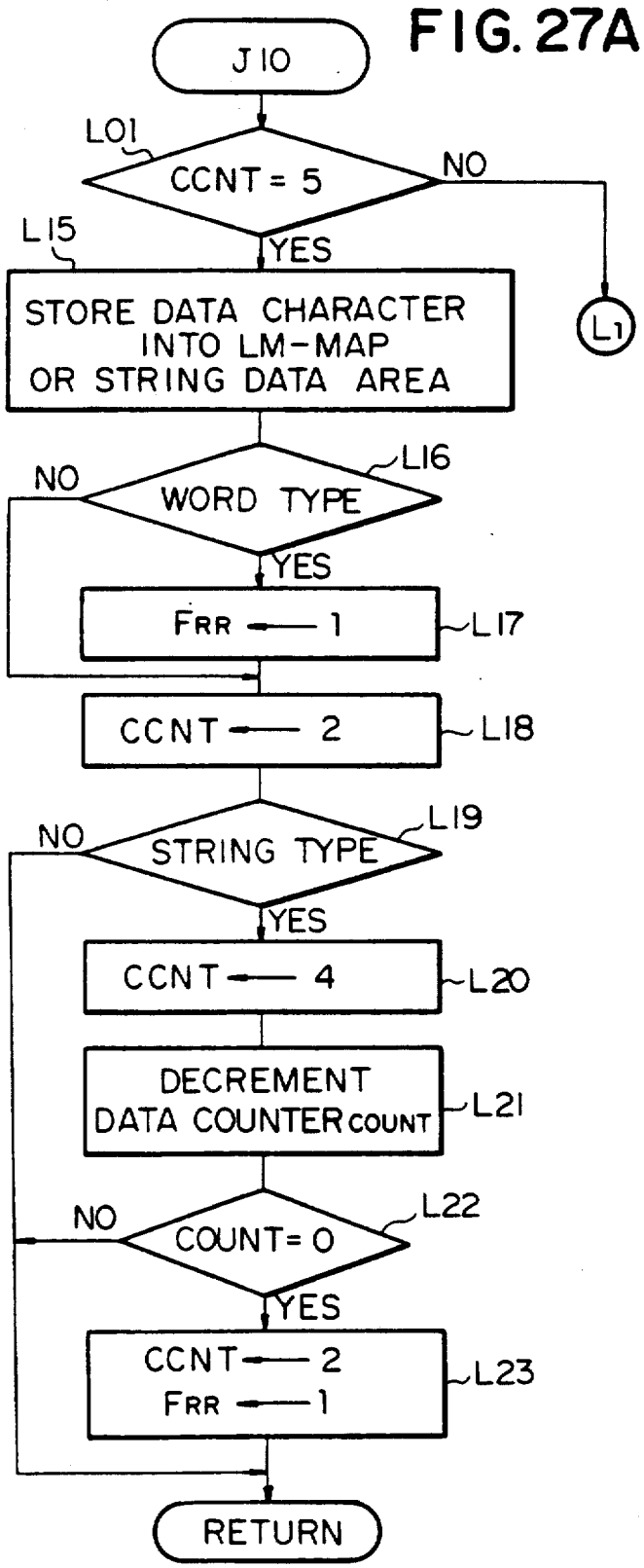
FIGS. 27A, 27B and 27C are flowcharts showing the details of the mode analysis subroutine program further included in the input data process control routine program illustrated in FIG. 25.
Figure 27B:
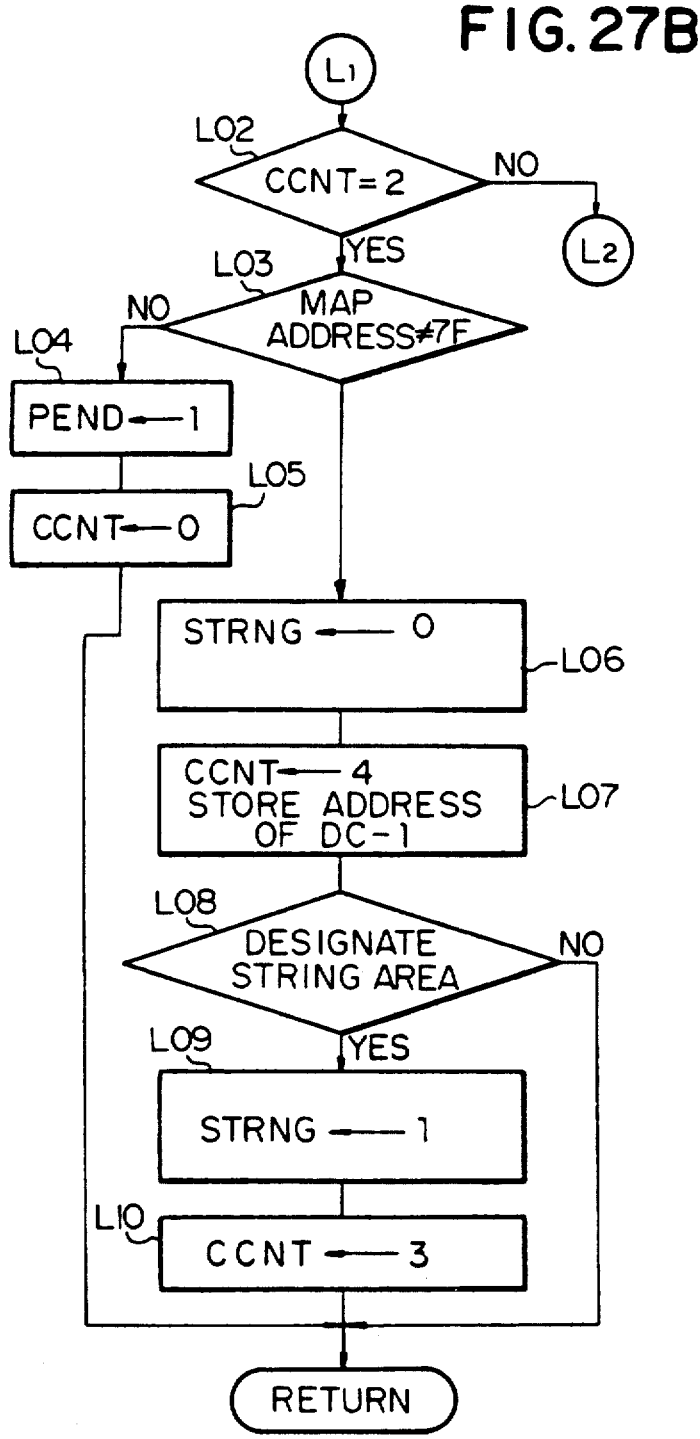
Figure 27C:
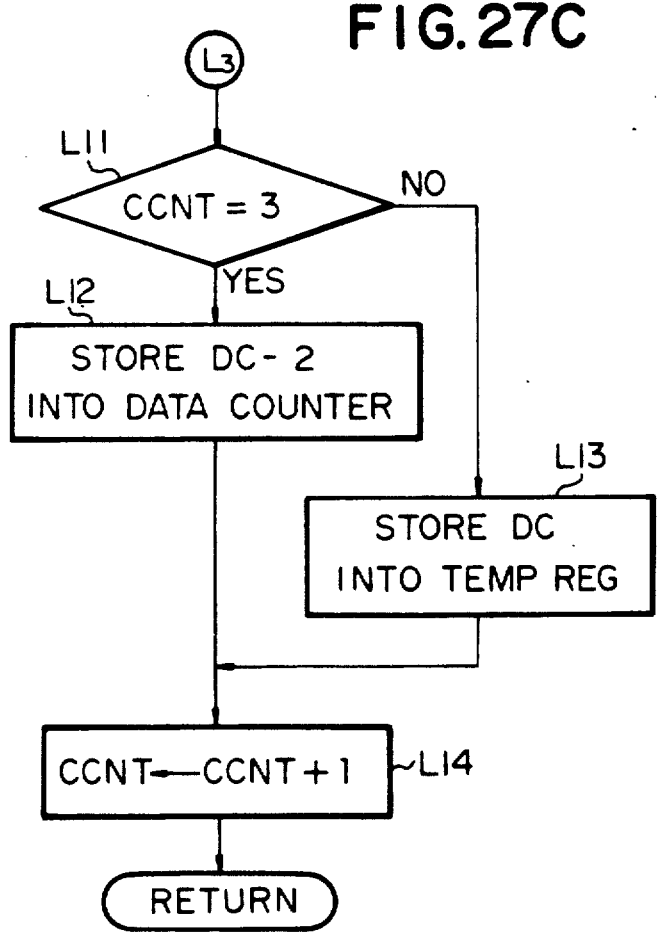

FIGS. 27A to 27C are flowcharts showing the details of the mode analysis subroutine program J10 included in the input data process control subroutine program B10 hereinbefore described with reference to FIG. 25.

This mode analysis subroutine program J10 is to be executed to analyze either the mode answer received from the subsidiary system control unit with which the master system control unit 150 is currently in communication. As has been noted hereinbefore, this subroutine program J10 is executed when it is determined at step J08 of the input data process control subroutine program B10 that the memory area code "U" in the identification character of the frame being received designates neither the command register 180 nor the status register 182 as the destination. As has been described with reference to FIGS. 12C and 12D, the mode answer frame is provided either in the word type configuration or in the string type configuration.

When it is found at step J08 of the input data process control subroutine program B10 that the parameter "IDU" is not set at numerical value "3", the microprocessor 200 proceeds to step L01 of the mode analysis subroutine program J10 and checks if the parameter "CCNT" is set at numerical value "5". The parameter "CCNT" of numerical value "5" indicates that the character last received from the subsidiary system control unit in communication with the master system control unit 150 is the fifth data word which may be contained in the frame received or being received. At the point of time the first data character (DC-1) is received subsequently to the identification character IDC, the parameter "CCNT" is set at numerical value "2" at step J05 of the input data process control subroutine program B10 as previously noted. The answer for step L01 is for this reason given in the negative so that the microprocessor 200 proceeds to step L02 to detect whether or not the parameter "CCNT" is set at numerical value "2". The parameter "CCNT" having been set at numerical value "2" at step J05 of the input data process control subroutine program B10, the answer for the step L02 is given in the affirmative. In this instance, the microprocessor 200 proceeds to step L03 to check if the character currently received is indicative of the hexadecimal value of "7F". As explained previously with reference to FIGS. 12C and 12D, the use of the hexadecimal value of "7F" is prohibited for the memory map address $M_6$ to $M_0$ and is allowed only for the last character (DC-n) containing the frame end code.

If it is found at step L03 that the character currently received is indicative of the hexadecimal value of "7F" and accordingly the answer for the step L03 is given in the negative, the microprocessor 200 proceeds to step L04 to reset the flag "PEND" to logic value "1" to indicate the termination of the frame received. The step L04 is followed by step L05 at which the parameter "CCNT" is cleared to numerical value "0" and, thereafter, the microprocessor 200 returns to the input data process control subroutine program B10 shown in FIG. 25 and accordingly to the main routine program shown in FIGS. 17A and 17B.

On the other hand, if it is found at step L03 that the character currently received is not indicative of the hexadecimal value of "7F" and accordingly the answer for the step L03 is given in the affirmative, then the microprocessor 200 proceeds to step L06 to reset the flag "STRNG" to logic value "0" to indicate that the frame being received is not of the string type configuration. The step L06 is followed by step L07 at which the parameter "CCNT" is set to numerical value "4" and, in addition, the first data character DC-1 received is transferred to the address register of the microprocessor 200. Thereafter, the microprocessor 200 proceeds to step L08 and checks if the map address $M_6$ to $M_0$ contained in the first data character DC-1 thus stored into the address register of the microprocessor 200 is indicative of the string area. The answer for this step L09 being given in the affirmative if the map address $M_6$ to $M_0$ is indicative of the string area, the microprocessor 200 proceeds to step L09 to set the flag "STRNG" to logic value "1" to indicate that the frame being received is of the string type configuration. The step L09 is followed by step L10 at which the parameter "CCNT" is set to numerical value "3", whereupon the microprocessor 200 returns to the input data process control subroutine program B10 shown in FIG. 25 and accordingly to the main routine program shown in FIGS. 17A and 17B. If it is found at step L08 that the map address $M_6$ to $M_0$ is not indicative of the string area, the answer for this step L09 is given in the negative. In this case, the microprocessor 200 jumps over the steps L09 and L10 and returns to the input data process control subroutine program B10 shown in FIG. 25 and accordingly to the main routine program shown in FIGS. 17A and 17B.

When the third character (DC-2) is thereafter received by the master system control unit 150, the mode analysis subroutine program J10 is reiterated for a second time. The answer for the step L02 is this time given in the negative, the microprocessor 200 proceeds to step L11 to detect whether or not the parameter "CCNT" is set at numerical value "3". As has been noted, the parameter "CCNT" is set at numerical value "3" if the mode answer frame is of the string type configuration but, if the mode answer frame is of the word type configuration, the parameter "CCNT" is set at numerical value "4". If it is found at step L11 that the parameter "CCNT" is set at numerical value "3" and accordingly the answer for this step L11 is given in the affirmative, the step S11 is followed by step L12 at which the second data character DC-2 indicative of the data length of the frame being received is transferred to and stored into the data counter in the microprocessor 200.

On the other hand, if it is found at step L11 that the parameter "CCNT" is not set at numerical value "3", then the step S11 is followed by step L13 at which the second data character DC-2 indicative of the first data byte of the frame being received is transferred to and stored into the temporary register in the microprocessor 200 to which the second data character DC-2 is assigned. Subsequently to step L12 or to step L13, the microprocessor 200 proceeds to step L14 to increment the parameter "CCNT" and thereafter returns to the input data process control subroutine program B10 shown in FIG. 25 and accordingly to the main routine program shown in FIGS. 17A and 17B.

If the mode answer frame being currently received by the master system control unit 150 is of the string type configuration, the parameter "CCNT" incremented at step L14 as above noted is set at numerical value "4". In this instance, the microprocessor 200 responsive to the third data character DC-3 when reiterating the present subroutine program J10 for a third time proceeds through the steps L01, L02 and L11 to the step L13 at which the third data character DC-3 is transferred to and stored into the temporary register in the microprocessor 200.

Assume now that data characters are further supplied to the master system control unit 150 in addition to the third data character DC-3. Each time a new data character is thus received, the microprocessor 200 reiterates the mode analysis subroutine program J10. During reiteration of the mode analysis subroutine program J10 in response to the fourth data character, the answer for the step L01 is given in the affirmative so that the microprocessor 200 now proceeds to step L15 at which the words (each consisting of two byte data) forming the newly received data character and the data characters which have been stored in the temporary registers of the microprocessor 200 are one after another transferred to and stored into the local mode map 188 or the string area data of the master system control unit 150. Subsequently, the microprocessor 200 proceeds to step L16 to detect whether or not the mode answer frame being received is of the word type configuration or of the string type. If it is found at step L16 that the mode answer frame being received is of the word type configuration and accordingly the answer for step L16 is given in the affirmative, the microprocessor 200 proceeds to step L17 to set the data receipt report flag $F_{RR}$ to logic value "1" and further to step L18 to update the parameter "CCNT" to numerical value "2". On the other hand, if it is found at step L16 that the mode answer frame being received is of the string type configuration and accordingly the answer for step L16 is given in the negative, the microprocessor 200 jumps over the step L17 and proceeds directly to the step L18 to update the parameter "CCNT" to numerical value "2".

Thereafter, the microprocessor 200 proceeds to step L19 to check if the mode answer frame being received is of the string type configuration or of the word type. If it is found at step L19 that the mode answer frame being received is of the string type configuration and accordingly the answer for step L19 is given in the affirmative, the microprocessor 200 proceeds to step L20 to update the parameter "CCNT" to numerical value "4" and further to step L21 to decrement the content of the data counter which retains the data length of the frame being received. Subsequently, the microprocessor 200 detects at step L22 whether or not the content of the data counter is of numerical value "0". If it is determined at this step L22 that the content of the data counter is of the numerical value "0" which indicates that the newest received data character is the final data character with data words, the answer for this step L22 is given in the affirmative so that the microprocessor 200 proceeds to step L23 to further update the parameter "CCNT" to numerical value "2" and set the data receipt report flag $F_{RR}$ to logic value "1". Subsequently to step L23 or if the answer for step L19 or step L22 is given in the negative, the microprocessor 200 returns to the input data process control subroutine program B10 shown in FIG. 25 and accordingly to the main routine program shown in FIGS. 17A and 17B.

As has been described, the microprocessor 200 responsive to the mode answer frame of the string type configuration proceeds through the steps L01, L02 and L11 to step L13 to transfer the newly received data character to the temporary register of the microprocessor 200 each time a new data character is received by the master system control unit 150. After the received data character is thus transferred to and stored into the temporary register of the microprocessor 200, the words forming the further newly received data character and the data characters stored in the temporary registers of the microprocessor 200 are one after another transferred to the string area of the master system control unit 150. In response, on the other hand, to the mode answer frame of the word type configuration, the microprocessor 200 proceeds through the steps L01, L02, L06, L07, L08 and L 11 to step L13 to transfer the newly received data character to the temporary register of the microprocessor 200 each time a new data character is received by the master system control unit 150.

After the newly received data character is thus transferred to and stored into the temporary register of the microprocessor 200, the words forming the data character thus stored in the temporary registers of the microprocessor 200 are one after another transferred to the local mode map 188 of the master system control unit 150.

When all the data characters with the data words transmitted from the subsidiary system control unit under consideration are received by the master system control unit 150, the microprocessor 200 proceeds to step L21 to decrement the content of the data counter to numerical value "0" to bring an end to the counting operation by the data counter. In response to the final data character which contains the data words, it is determined at step L22 that the frame being received is now terminated so that the microprocessor 200 proceeds to step L23 to further update the parameter "CCNT" to numerical value "2" and set the data receipt report flag $F_{RR}$ to logic value "1". Thereafter, the microprocessor 200 at step L03 detects the arrival of the last data character (DC-n in FIGS. 12C and 12D) containing the frame end code indicative of the hexadecimal value of 7F and, upon execution of the steps L04 and L05, terminates the execution of the present mode analysis subroutine program J10.

Figure 28:
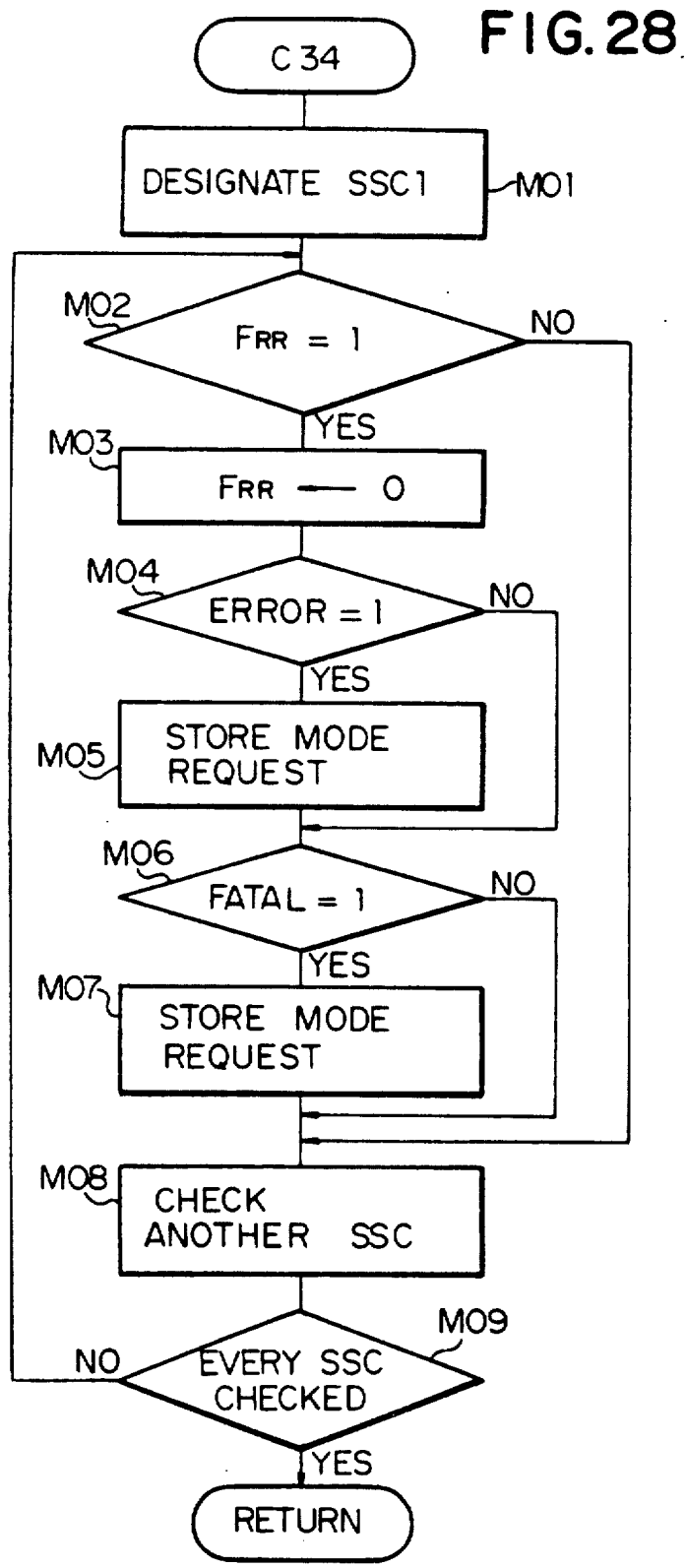
FIG. 28 is a flowchart showing the details of the subsidiary system control unit status detect subroutine program included in the macrosystem interface monitor routine program illustrated in FIGS. 18A to 18D.

FIG. 28 is a flowchart showing the details of the subsidiary system control unit status detect subroutine program C34 included in the macrosystem interface monitor routine program B09 illustrated in FIGS. 18A to 18D. As has been described, the master system control unit 150 of the image processing system embodying the present invention cyclically receives brief status data from the individual subsidiary system control units 152a to 152e and checks the received brief status data for any failure which may have occurred in any one of the subsidiary system control units. When a failure is detected in any one of the subsidiary system control units 152a to 152e, the master system control unit 150 sends a mode request frame to the particular subsidiary system control unit to request transmission of the detailed version of the brief status data indicating the occurrence of the failure. The subsidiary system control unit status detect subroutine program C34 included in the macrosystem interface monitor routine program B09 is executed by the master system control unit 150 to achieve these functions.

The subsidiary system control unit status detect subroutine program C34 starts with a step M01 at which the microprocessor 200 of the master system control unit 150 designates a particular one of the subsidiary system control units 152a to 152e as the subsidiary system control unit to be checked for any failure. In the description to follow, the subsidiary system control unit thus selected by the master system control unit 150 at an initial stage of the subroutine program C34 is assumed to be the first standard subsidiary system control unit 152a by way of example. Subsequently to step M01, the microprocessor 200 proceeds to step M02 to check if the data receipt report flag $F_{RR}$ in the brief status data which has been received from the subsidiary system control unit 152a is set at logic value "1". If it is found at this step M02 that the data receipt report flag $F_{RR}$ in the brief status data received from the subsidiary system control unit 152a is reset at logic value "0" and accordingly the answer for the step M02 is given in the negative, the microprocessor 200 jumps over steps M03 to M07 and proceeds to step M08 to designate another subsidiary system control unit as the subsidiary system control unit to be checked for a failure. The step M08 is followed by step M09 to detect whether or not the master system control unit 150 has examined the brief status data received from every one of the subsidiary system control units 152a to 152e. If it is found at this step M09 that there is at least one subsidiary system control unit remaining to be checked and accordingly the answer for this step M09 is given in the negative, the microprocessor 200 reverts to the step M02 to repeat the loop of the steps M02 to M09 until the answer for step M09 turns affirmative.

If it is found at step M02 that the data receipt report flag $F_{RR}$ in the brief status data received from the subsidiary system control unit 152a is set at logic value "1" and accordingly the answer for the step M02 is given in the affirmative, the microprocessor 200 proceeds to step M03 to reset the data receipt report flag $F_{RR}$ in the brief status data to logic value "0". Thereafter, the microprocessor 200 proceeds to step M04 to detect whether or not the brief status data received from the subsidiary system control unit 152a under consideration contains the "error" bit $G_1$ of logic value "1" (Table II). If the answer for this step M04 is given in the affirmative, the microprocessor 200 determines that a recoverable failure is invited in the functional module (assumed to be the control panel of the printer apparatus and represented by "MODULE 1" 156a in FIG. 2) which is under the control of the first standard subsidiary system control unit 152a currently under consideration. In this instance, the microprocessor 200 proceeds to step M05 to store a mode request frame in the output data buffer 194 of the master system control unit 150 in order to request the subsidiary system control unit 152a to send back the detailed status data regarding the failure invited. As noted previously, the detailed status data indicating the failure is stored in the local mode map 172 of the subsidiary system control unit 152a.

On the other hand, if the answer for step M04 is given in the negative, the microprocessor 200 determines that there is no recoverable failure invited in the functional module under the control of the first standard subsidiary system control unit 152a. In this instance, the microprocessor 200 jumps over the step M05 and proceeds directly to step M06 to check if the brief status data received from the subsidiary system control unit 152a under consideration contains the "fatal" bit $G_2$ of logic value "1" (Table II). If the answer for this step M06 is given in the affirmative, the microprocessor 200 determines that an irrecoverable failure is invited in the functional module under the control of the first standard subsidiary system control unit 152a. Thus, the microprocessor 200 proceeds to step M07 to store a mode request frame in the output data buffer 194 of the master system control unit 150 in order to request the subsidiary system control unit 152a to send back the detailed status data regarding the irrecoverable failure invited from the local mode map 172 of the subsidiary system control unit 152a.

On the other hand, if the answer for step M06 is given in the negative, the microprocessor 200 determines that there is no irrecoverable failure invited in the functional module under the control of the first standard subsidiary system control unit 152a. In this instance, the microprocessor 200 jumps over the step M07 and proceeds directly to step M08 to designate another subsidiary system control unit as the subsidiary system control unit to be checked for a failure. The step M08 is followed by step M09 to detect whether or not the master system control unit 150 has examined the brief status data received from every one of the subsidiary system control units 152a to 152e. When it is found at this step M09 that all the subsidiary system control units 152a to 152e have been checked for failure, the microprocessor 200 reverts to the macrosystem interface monitor subroutine program B09 described with reference to FIGS. 18A to 18D.

Through execution of the subsidiary system control unit status detect subroutine program C34, the microprocessor 200 makes preparation for receiving the detailed status data regarding a recoverable or irrecoverable failure which may be invited in the functional module associated with any of the subsidiary system control units 152a to 152e. The mode request frame stored in the output data buffer 194 of the master system control unit 150 when a failure is detected in connection with any of the subsidiary system control units 152a to 152e is to be transmitted to the subsidiary system control unit under consideration during execution of the outout data buffer control subroutine program A08 (FIG. 16D) and the data transmission request subroutine program B11 (FIG. 24). In response to a mode answer frame transmitted from the subsidiary system control unit under consideration, the microprocessor 200 of the master system control unit 150 executes the outout data buffer control subroutine program A08 and data to read the detailed status data indicating the recoverable or irrecoverable failure occurring in the functional module associated with the subsidiary system control unit in which the mode answer frame originates. The detailed status data is analyzed by the master system control unit 150 executing the troubleshooting subroutine program N05 to be described later with reference to FIG. 30.

As has been described with reference to FIGS. 17A and 17B, the microprocessor 200 of the master system control unit 150 checks the flag "SYSWAIT" to determine if the apparatus in operation or in a stand-by condition (step B13) after execution of the series of subroutine programs B09, B10, B11 and B12 of the main routine program. If it is found that the printer apparatus is in a stand-by condition with the flag "SYSWAIT" set at logic value "1", the microprocessor 200 reverts to the macrosystem interface monitor subroutine program B09 and executes the steps described with reference to FIGS. 18A to 18D. On the other hand, if it is found that the printer apparatus is in operation with the flag "SYSWAIT" set at logic value "0", the microprocessor 200 checks if the flag "LOOPF" is set at logic value "1" (step B14). As has been described in connection with the main loop timer control subroutine program A06 with reference to FIGS. 21A and 21B, the microprocessor 200 of the master system control unit 150 is operative to set the flag "LOOPF" at logic value "1" at predetermined time intervals. The answer for the decision step B14 is for this reason cyclically given in the affirmative and accordingly the microprocessor 200 resets the flag "LOOPF" to logic "0" states also in cycles. After an iteration of the job control subroutine program A05 is terminated, the subroutine program A05 can not be reiterated by the end of a predetermined time interval subsequent to the termination of the previous iteration of the subroutine program A05.

Figure 29A:
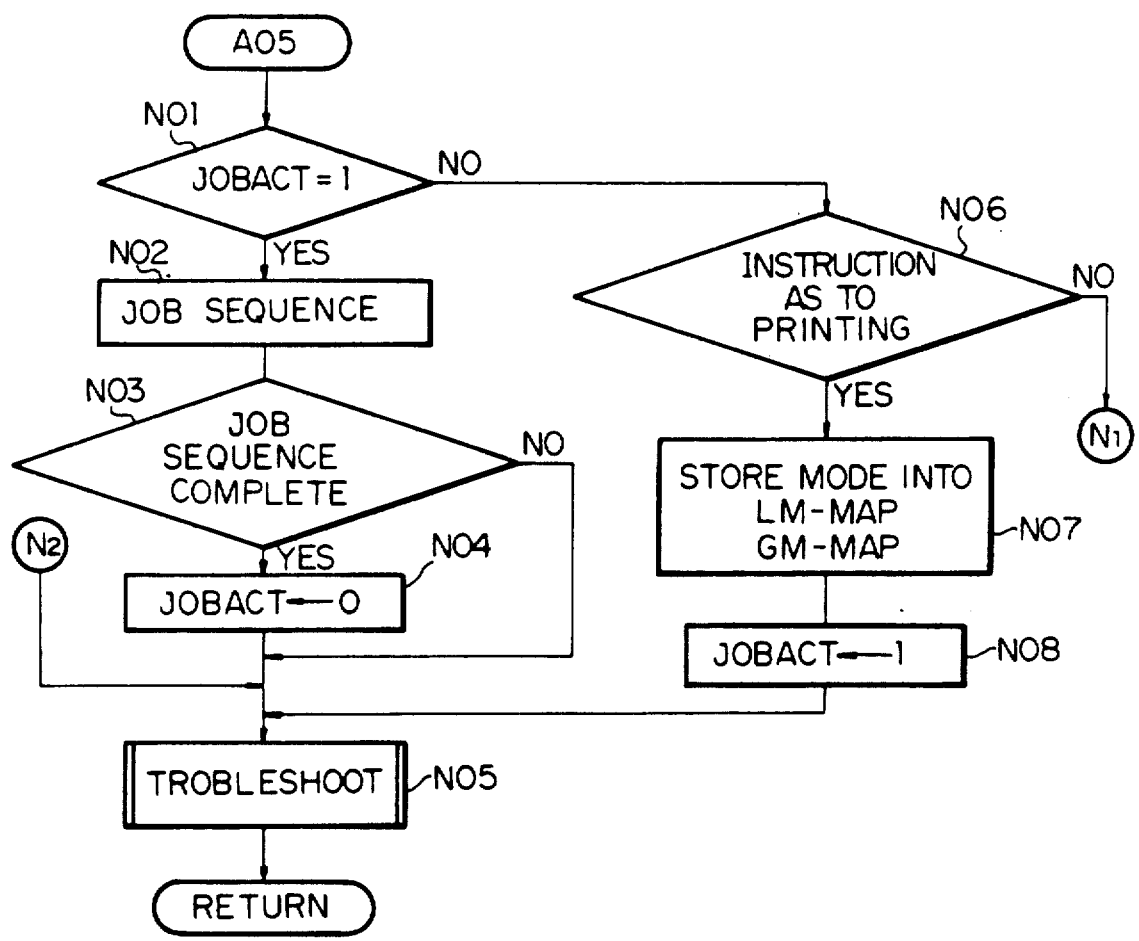
FIGS. 29A and 29B a flowchart showing the details of the job control subroutine program included in the main routine program illustrated in FIG. 16A.
Figure 29B:
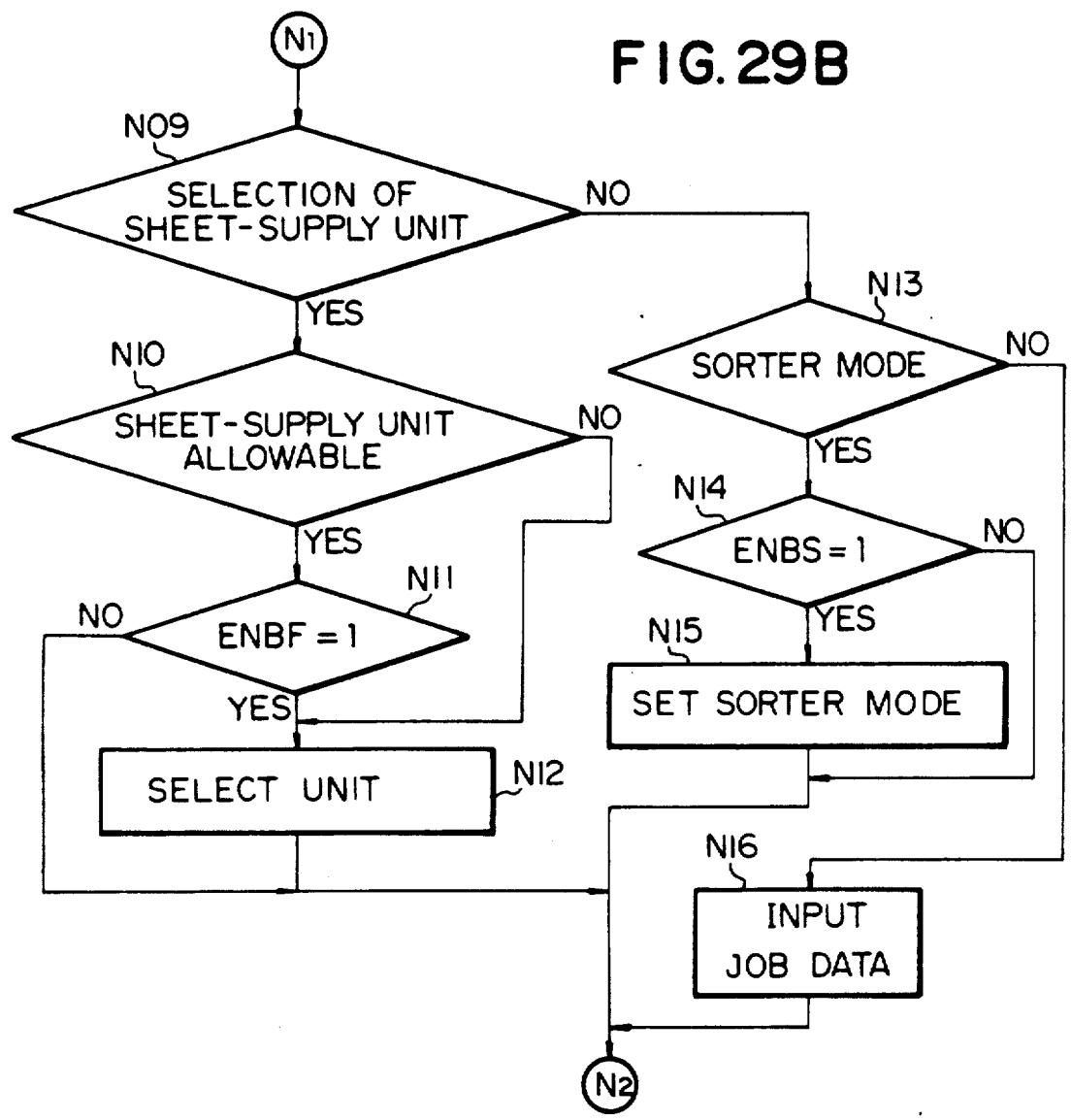

FIG. 29 is a flowchart showing the details of the job control subroutine program A05 thus included in the main routine program described with reference to FIGS. 16A and 16B.

The job control subroutine program A05 starts with a decision step N01 at which the microprocessor checks if the flag "JOBACT" is set at logic value "1". The flag "JOBACT" being to be set to logic value "1" at step N08 of this subroutine program A05, the answer for this step N01 is ordinarily given in the negative at an incipient stage after the subroutine program A05 is started. The answer for the step N01 being thus is given in the negative, the microprocessor 200 proceeds to step N06 and checks if there is any instruction from the user system in regard to the printing operation to be performed in the apparatus. If the answer for this step N06 is also given in the negative, the microprocessor 200 proceeds to step N09 to check if there is any signal supplied from the higher-level user system in regard to the selection of a print-sheet supply unit. If the answer for this step N09 is given in the affirmative, the microprocessor 200 proceeds to step N10 to detect whether or not the signal is instructing selection of the sheet-supply unit 160a (FIG. 2) assembled to the apparatus. If the answer for this step N10 is also given in the affirmative, the microprocessor 200 proceeds to step N11 and checks if the flag "ENBF" is set at logic value "1" indicating that the selection of the print-sheet supply unit 160a for use is allowable. If it is found at this step N11 that the flag "ENBF" is set at logic value "1" and accordingly the answer for the step N11 is given in the affirmative, the microprocessor 200 supplies a signal effective to select the existing print-sheet supply unit 160a for use (step N12).

On the other hand, if the answer for step N10 is given in the negative, the microprocessor 200 jumps over the step N11 and proceeds directly to step N12 to select the existing print-sheet supply unit 160a and, if the answer for step N11 is given in the negative, the microprocessor 200 jumps over the step N12 and proceeds directly to the troubleshooting subroutine program N05.

If, furthermore, the answer for step N09 is given in the negative, the microprocessor 200 proceeds to step N13 to detect whether or not there is a signal instructing the use of a particular mode of operation in the output page sorting unit 160b (FIG. 2) assembled to the apparatus. If the answer for this step N13 is given in the affirmative, the microprocessor 200 proceeds to step N14 and checks if the flag "ENBS" is set at logic value "1" indicating that the use of the particular mode of operation in the page sorting unit 160b is allowable. If the answer for this step N14 is also given in the affirmative, the microprocessor 200 proceeds to step N15 to produce signals effective to establish the designated mode of operation in the output page sorting unit 160b and thereafter proceeds to the trouble-shooting subroutine program N05.

On the other hand, if the answer for step N13 is given in the negative, the microprocessor 200 proceeds to step N16 to receive from the higher-level user system any job data such as data regarding the functions to be executed for the printing operation. Thereafter, the microprocessor 200 proceeds to the troubleshooting subroutine program N05. If the answer for step N14 is given in the negative, the microprocessor 200 jumps over the step N15 and proceeds directly to the troubleshooting subroutine program N05.

When any instruction is received from the higher-level user system in regard to the printing operation to be performed in the apparatus, the answer for step N06 is given in the affirmative so that the microprocessor 200 proceeds to step N07 to store data regarding preselected functions and parameters for printing operation into the global and local mode maps 186 and 188 of the master system control unit 150 and set the data transmission request flag $F_{TR}$ set to logic value "1". Subsequently, the microprocessor 200 proceeds to step N08 to set the flag "JOBACT" to logic value "1" and thereafter proceeds to the troubleshooting subroutine program N05.

The flag "JOBACT" being now set at logic value "1" at step N08, the answer for step N01 turns affirmative so that the microprocessor 200 proceeds to step N02 to execute a job sequence. Thereafter, the microprocessor 200 proceeds to step N03 to check if the job sequence is complete and, if the answer for this step N03 is given in the affirmative, the microprocessor 200 proceeds to step N04 to reset the flag "JOBACT" to logic value "0" to indicate that the apparatus is in a stand-by condition. Subsequently to the step N04 or if the answer for step N03 is given in the negative, the microprocessor 200 proceeds to and executes the troubleshooting subroutine program N05.

Figure 30:
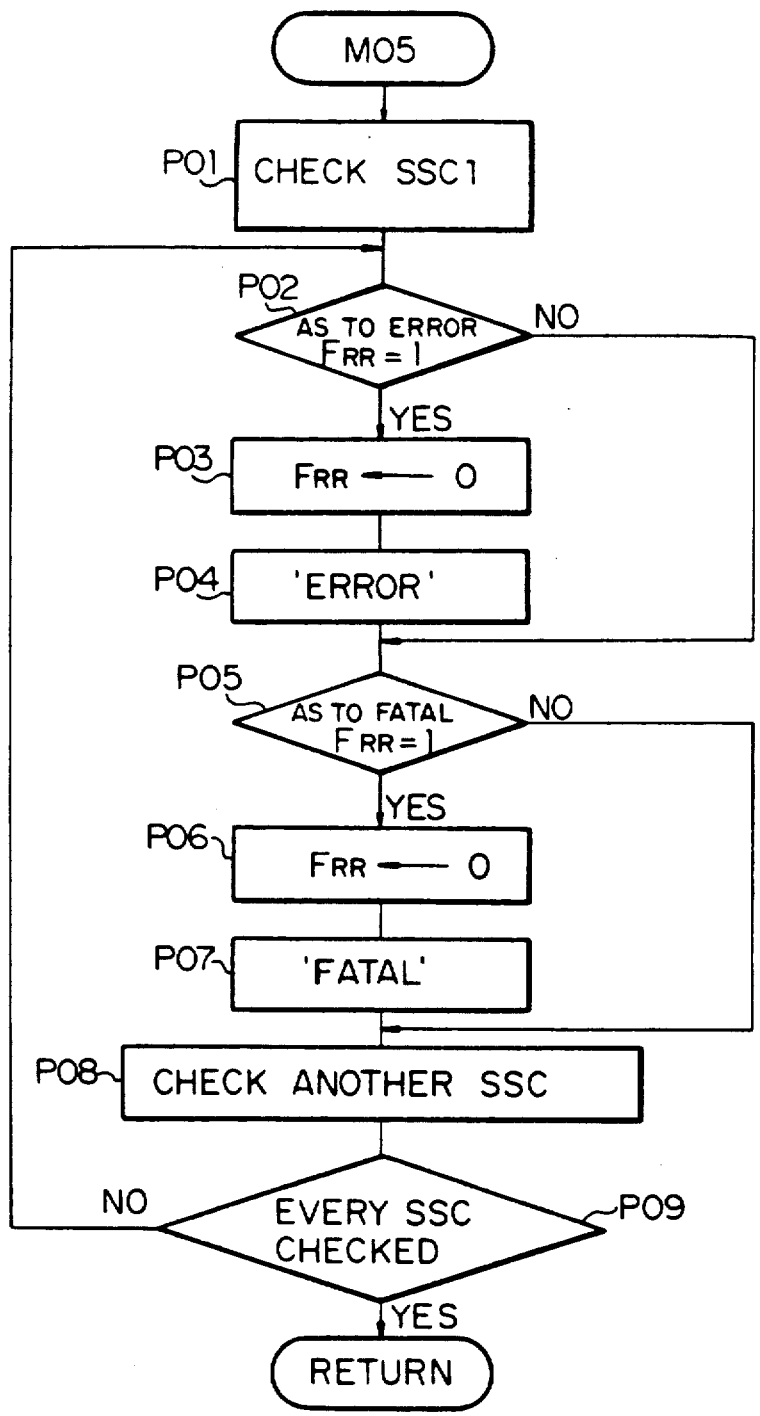
FIG. 30 is a flowchart showing the details of the troubleshooting subroutine program included in the job control routine program illustrated in FIG. 29.

FIG. 30 is a flowchart showing the details of the troubleshooting subroutine program N05 included in the job control subroutine program A05 hereinbefore described with reference to FIG. 29.

The troubleshooting subroutine program N05 starts with a step P01 at which the microprocessor 200 of the master system control unit 150 designates a particular one of the subsidiary system control units 152a to 152e as the subsidiary system control unit to be checked for any failure. The subsidiary system control unit thus selected by the master system control unit 150 at an initial stage of the subroutine program C34 is herein assumed to be the first standard subsidiary system control unit 152a by way of example. Subsequently to step P01, the microprocessor 200 proceeds to step P02 to detect whether or not the data receipt report flag $F_{RR}$ in the detailed status data received from the subsidiary system control unit 152a and including the "error" bit $G_1$ of logic value "1" (Table II) is set at logic value "1".

If it is found at step P02 that the data receipt report flag $F_{RR}$ in the detailed status data received from the subsidiary system control unit 152a is set at logic value "1" and accordingly the answer for the step P02 is given in the affirmative, the microprocessor 200 proceeds to step P03 to reset the data receipt report flag $F_{RR}$ in the detailed status data to logic value "0". Thereafter, the microprocessor 200 proceeds to step P04 to produce signals to execute various process steps responsive to the recoverable failure occurring in the functional module 156a (control panel) associated with the subsidiary system control unit 152a. These process steps include display of the location where the failure is currently invited. Upon termination of the step P04, the microprocessor 200 proceeds to step P05.

On the other hand, if it is found at step P02 that the data receipt report flag $F_{RR}$ in the detailed status data received from the subsidiary system control unit 152a is reset at logic value "0" and accordingly the answer for the step P02 is given in the negative, the microprocessor 200 jumps over the steps P03 and P04 and proceeds directly to the step P05 to check if the data receipt report flag $F_{RR}$ in the detailed status data received from the subsidiary system control unit 152a and including the "fatal" bit $G_2$ of logic value "1" (Table II) is set at logic value "1".

If it is found at step P05 that the data receipt report flag $F_{RR}$ in the detailed status data including the "fatal"

bit $G_2$ is set at logic value "1" and accordingly the answer for the step P05 is given in the affirmative, the microprocessor 200 proceeds to step P06 to reset the data receipt report flag $F_{RR}$ including the "fatal" bit $G_2$ is set at logic value "1" to logic value "0". Thereafter, the microprocessor 200 proceeds to step P07 to produce signals to execute various process steps responsive to the irrecoverable failure occurring in the functional module 156a associated with the subsidiary system control unit 152a. These process steps include a step to indicate that the failure currently occurring is of the irrecoverable nature. Upon termination of the step P07, the microprocessor 200 proceeds to step P08.

On the other hand, if it is found at step P05 that the data receipt report flag $F_{RR}$ in the detailed status data received from the subsidiary system control unit 152a and including the "fatal" bit $G_2$ is set at logic value "1" and accordingly the answer for the step P05 is given in the negative, the microprocessor 200 jumps over the steps P06 and P07 and proceeds directly to the step P08 to designate another subsidiary system control unit as the subsidiary system control unit to be checked for a failure. The step P08 is followed by step P09 to detect whether or not the master system control unit 150 has examined the detailed status data received from every one of the subsidiary system control units 152a to 152e. If it is found at this step P09 that there is at least one subsidiary system control unit remaining to be checked and accordingly the answer for this step P09 is given in the negative, the microprocessor 200 reverts to the step P02 to repeat the loop of the steps P02 to P09 until the answer for step P09 turns affirmative. When it is found at this step P09 that all the subsidiary system control units 152a to 152e have been checked for failure, the microprocessor 200 reverts to the job control subroutine program A05 described with reference to FIG. 29.

Each of the subsidiary system control units 152a to 152e provided in the image processing system embodying the present invention has the hardware configuration hereinbefore described partly with reference to FIG. 3 and partly with reference to FIG. 6. FIG. 31 is a block diagram which is complementary to these FIGS. 3 and 6 and which shows the arrangement of an address buffer 212, an output data buffer 214 and an output data register 216 in addition to the status register 170 (STS-REG), local mode map 172 (LM-MAP) and report register 176 (RPT-REG). Each of the status register 170, local mode map 172 and report register 176 has stored therein data ready to be converted into the form of frames and the addresses indicating the locations of the frames of the data currently required by the master system control unit 150 are stored in the address buffer 212 for transfer to the master system control unit 150. The addresses of the data required by the master system control unit 150 being thus stored externally of each of the status register 170, local mode map 172 and report register 176, the data required by the master system control unit 150 can be fetched rapidly from any of the are status register 170, local mode map 172 and report register 176 immediately upon receipt of a request for communication from the master system control unit 150. The data thus fetched from any of the status register 170, local mode map 172 and report register 176 are, upon conversion into frames, temporarily stored in the output data buffer 214 and are thence released through the output data register 216 to the macrosystem interface bus 154 for transmission to the master system control unit 150. When a new request for communication is received by a subsidiary system control unit after a request for communication was received by every one of the subsidiary system control units 152a to 152e, the subsidiary system control unit can transmit a latest version of data to the master system control unit 150 even if the data has been updated after the subsidiary system control unit was accepted for the last time.

While the data fetched from the local mode map 172 or the report register 176 must be converted into frames before the data is loaded into the output data buffer 214, the data fetched from the status register 170 in particular may be passed to the output data register 216 without being converted into the form of frames although such data may also be converted into frames before the data is brought into the output data buffer 214. This enables the subsidiary system control unit to transmit data from the status register 170 to the master system control unit 150 more rapidly than the data fetched from the local mode map 172 or the report register 176. It may be further noted that only a limited number of addresses are to be stored the address buffer 212 since, if a larger number of addresses are stored therein, it may happen that a significantly larger amount of data is transmitted from a particular subsidiary system control unit than the mount of data from other subsidiary system control units and thus requires a longer cycle of polling operation than those for the other subsidiary system control units.

Description will now be made in regard to the operation of each of the subsidiary system control units 152a to 152e included in the image processing system embodying the present invention. During operation of the subsidiary system control unit, various flags and parameters are used to achieve various functions in the subsidiary system control unit. Typical ones of such flags and parameters are as follows:

"CCNT", a parameter indicative of the number of the characters of a frame or a series of frames which have been received by the subsidiary system control unit after the starting bit of the frame or the series of frames was received. This parameter is used when the microprocessor of a subsidiary system control unit analyzes the data received from the master system control unit 150.

"JOBACT", a flag used to indicate whether or not the subsidiary system control unit is currently in operation for performing any job. When set to logic value "1", the flag indicates that the subsidiary system control unit is currently in operation. When reset to logic value "0", the flag indicates that the subsidiary system control unit is currently in a stand-by condition.

"LOOPF", a flag used to indicate whether or not a timing (main loop timing) is reached at which any job is to be started during execution of the main routine program by the subsidiary system control unit. When it is detected that the timing at which the job is to be started is reached, the flag is set to logic value "1". In the presence of the flag "LOOPF" of logic value "0", the subsidiary system control unit is not allowed to start execution of a job.

"MSIFS", a parameter indicating the current stage execution of the macrosystem interface monitor subroutine program which is currently being executed by the subsidiary system control unit. The stage of execution of the macrosystem interface monitor subroutine program for the subsidiary system control unit is indicated by any of the numerical values "0" to "3" as the process of the macrosystem interface monitor subroutine program proceeds in the subsidiary system control unit.

"STOPF", a flag used to request for compulsory termination of the job control subroutine program when set to logic value "1".

"SYSWAIT", a flag used to request for prohibition of the execution of the job control subroutine program when set to logic value "1".

"TYPE", a flag used to indicate the word type or string type configuration of a mode set frame received from the master system control unit 150. When set to logic value "1", the flag indicates that the mode set frame received is of the string type configuration and, when reset to logic value "0", the flag indicates that the mode set frame is of the word type configuration.

Routine Programs for SSC

Figure 32A:
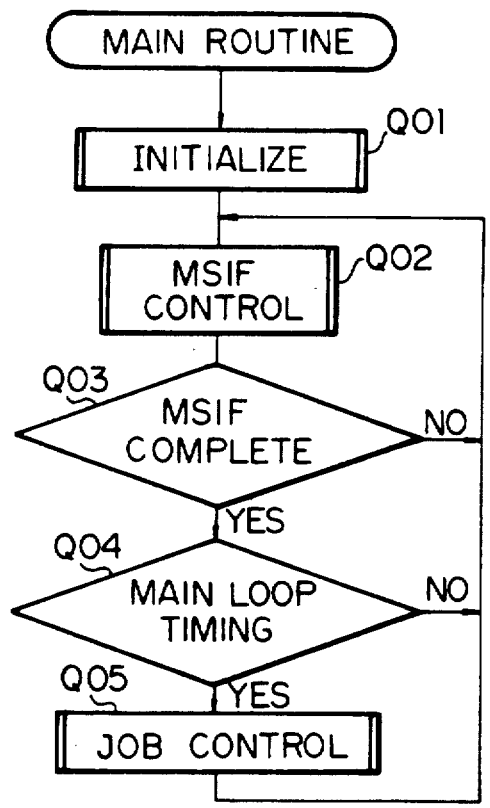
FIG. 32A is a flowchart showing the main routine program to be executed by each of the subsidiary system control units of the image processing system embodying the present invention.

FIG. 32A is a flowchart showing the main routine program to be executed by each of the subsidiary system control units 152a to 152e of the image processing system embodying the present invention. The image processing system executes three different interrupt routine programs shown in FIGS. 32B to 32D in addition to the main routine program illustrated in FIG. 32A.

Referring first to FIG. 32A, the execution of the main routine program is started when the system is initially switched in. The system being thus switched in, the microprocessor 166 (FIG. 3) of the subsidiary system control unit 152 executes an initializing subroutine program Q01. Details of this initializing subroutine program Q01 will be hereinafter described with reference to FIGS. 33A and 33B. Upon termination of the initializing subroutine program Q01, the microprocessor 166 proceeds to a macrosystem interface (MSIF) control subroutine program Q02 to follow process steps including those for detecting the interconnection between each of the subsidiary system control units 152a to 152e and the master system control unit 150 through the macrosystem interface bus 154.

When it is then confirmed at step Q03 that the execution of the macrosystem interface control subroutine program Q02 is complete, the microprocessor 166 detects the flag "LOOPF" at step Q04 to confirm whether or not the timing, viz., main loop timing is reached at which any job is to be performed in any of the subsidiary system control units 152a to 152e. When it is confirmed from the flag "LOOPF" that such a timing has not been reached, the microprocessor 166 reverts to the macrosystem interface control subroutine program Q02 and repeats the loop composed of the subroutine program Q02 and decision steps Q03 and Q04 until the answer for step Q04 turns affirmative. When it is thus confirmed at step Q04 that the main loop timing is reached, then the microprocessor 166 executes a job control subroutine program Q05 to control the operation to perform the job currently required. Upon termination of the job control subroutine program Q05, the microprocessor 166 recycles to the macrosystem interface control subroutine program Q02 and repeats the loop composed of the subroutine program Q02, decision steps Q03 and Q04 and job control subroutine program Q05.

During operation of each of the subsidiary system control units 152a to 152e thus executing the loop composed of the subroutine program Q02, decision steps Q03 and Q04 and job control subroutine program Q05 of the main routine program, the interrupt timer provided in the subsidiary system control unit may generate an interrupt in the subsidiary system control unit. In such an occasion, a timer interrupt takes place in the subsidiary system control unit so that the microprocessor 166 shifts from the main routine program to a timer interrupt routine program illustrated in FIG. 32B. In this timer interrupt routine program, the microprocessor 166 executes a main loop timer control subroutine program Q06 and thereafter a job control timer control subroutine program Q07. Upon termination of these subroutine programs Q06 and Q07, the subsidiary system control unit returns to the loop of the main routine program illustrated in FIG. 32A. Details of the main loop timer control subroutine program Q06 and job control timer control subroutine program Q07 will be hereinafter described with reference to FIGS. 36A and 36B and FIGS. 37A and 37B, respectively.

During operation of each of the subsidiary system control units 152a to 152e executing the loop composed of the subroutine program Q02, steps Q03 and Q04 and job control subroutine program Q05, a character may be transmitted from the master system control unit 150 to the subsidiary system control unit. When the character thus transmitted to the subsidiary system control unit is latched in the input data register (represented by the register 208 in the arrangement shown in FIG. 6) of the subsidiary system control unit, an incoming interrupt occurs in the subsidiary system control unit so that the subsidiary system control unit shifts from the main routine program to an incoming interrupt routine program illustrated in FIG. 32C. In this incoming interrupt routine program, the microprocessor 166 executes an input data process control subroutine program Q08 to temporarily store the received frame into the input data buffer 214 of the subsidiary system control unit. Upon termination of this subroutine program Q08, the subsidiary system control unit also returns to the loop of the main routine program illustrated in FIG. 32A.

Figure 32B:
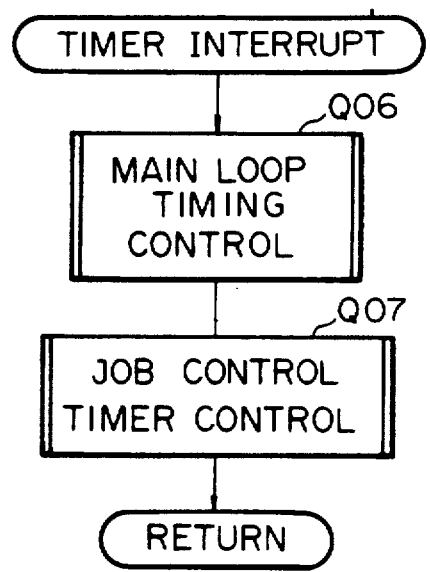
FIGS. 32B, 32C and 32D are flowcharts showing the interrupt routine programs each of which is to be executed by each of the subsidiary system control units of the image processing system embodying the present invention.
Figure 32C:
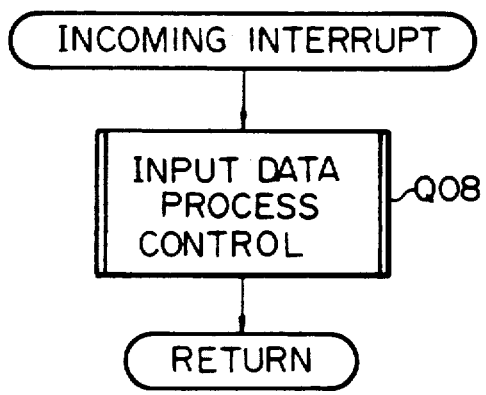
Figure 32D:
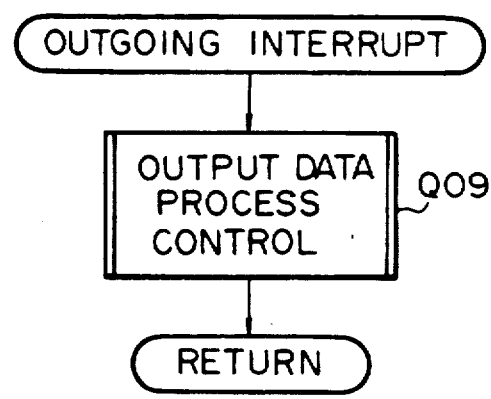

When, on the other hand, the first character of the frame stored in the output data register 216 of the subsidiary system control unit is released to the macrosystem interface bus 154, an outgoing interrupt occurs in the subsidiary system control unit so that the subsidiary system control unit shifts from the main routine program to an outgoing interrupt routine program illustrated in FIG. 32D. In this incoming interrupt routine program, the microprocessor 166 executes an output data process control subroutine program Q09 through which the data bits forming the frame stored in the output data register 216 of the subsidiary system control unit are successively transferred to the macrosystem interface bus 154. Upon termination of this subroutine program Q09, the subsidiary system control unit also returns to the loop of the main routine program illustrated in FIG. 32A.

Main Routine Programs for SSC

Figure 33A:
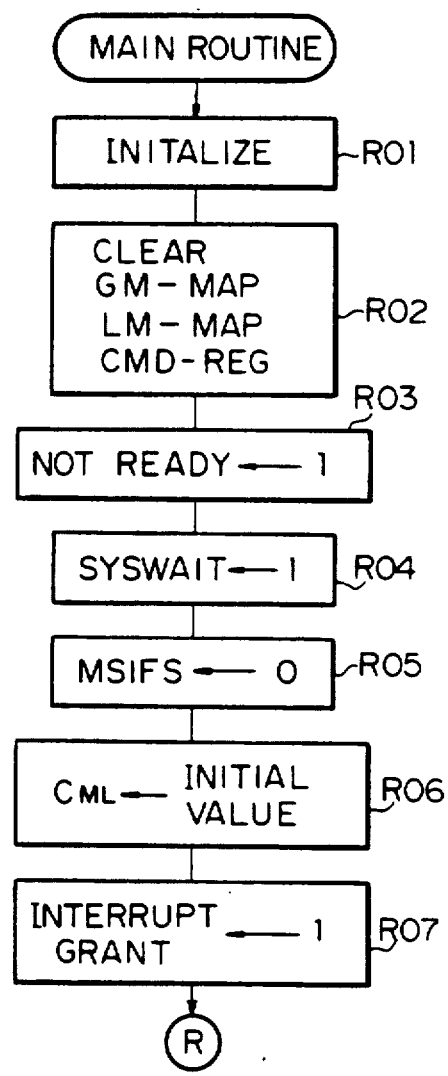
FIGS. 33A and 33B are flowcharts showing the details of the main program illustrated in FIG. 32A.
Figure 33B:
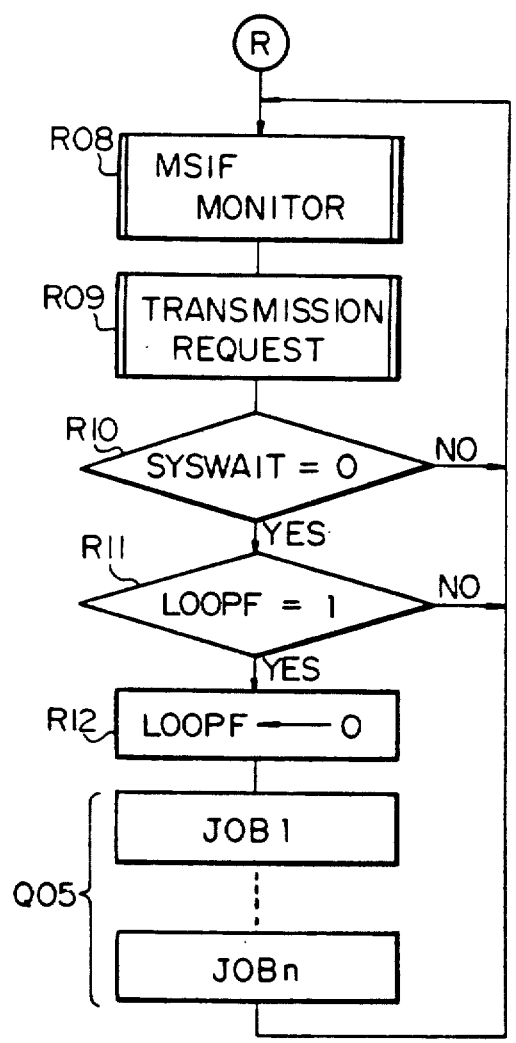

FIGS. 33A and 33B are flowcharts showing the details of the main routine program described with reference to FIG. 32A.

As has been noted, the execution of the main routine program for each of the subsidiary system control units 152a to 152e is started when the system is initially switched in. With the system thus switched in, the microprocessor 166 of the subsidiary system control unit executes an initializing step R01 to initialize the internal circuitry of the microprocessor. Subsequently to step R01, the microprocessor 166 proceeds to step R02 to clear the data stored in the command register 168, local mode map 172 and global mode map 174.

The microprocessor 166 then proceeds to step R03 to place the "NOT READY" bit (bit $G_5$) of logic value "1" in the "not ready" register section of the status register 170 to indicate that initialization is currently in progress in the microprocessor 166 of the subsidiary system control unit. As noted previously, this "NOT READY" bit is used to detect the interconnection between the macrosystem interface bus 154 and each of the subsidiary system control units 152a to 152e. Upon termination of the step R03, the microprocessor 166 proceeds to step R04 to set the flag "SYSWAIT" to logic value "1" to prohibit execution of any job in the subsidiary system control unit. Subsequently to step R04, the microprocessor 166 proceeds to step R05 to reset the parameter "MSIFS" to numerical value "0". This parameter "MSIFS" is to be referenced during execution of the macrosystem interface control subroutine program Q02 and is reset to numerical value "0". The step R05 is followed by step R06 to start the main loop timer of the subsidiary system control unit by setting an initial value therein. Prior to issuing a request for interrupt produced in any of the interrupt routine programs described with reference to FIGS. 32B to 32D, the microprocessor 166 grants the request for interrupt at step R07 and thereafter proceeds to the main loop of the main routine program.

The main loop of the main routine program to be executed by the subsidiary system control unit includes steps to execute the macrosystem interface monitor subroutine program R08 and steps to execute the data transmission request subroutine program R09. The details of these macrosystem interface monitor subroutine program R08 and data transmission request subroutine program R09 will be hereinafter described with reference to FIGS. 34A and 34B and FIGS. 35A and 35B, respectively.

When it is then confirmed at step R10 that the flag "SYSWAIT" is reset to logic value "0" indicating that the initialization of the microprocessor 166 is complete, the microprocessor 166 further checks the flag "LOOPF" at step R11 (which is identical with step Q04) to confirm whether or not the main loop timing is reached at which a job is to be performed in the subsidiary system control unit. When it is confirmed from the flag "LOOPF" that such a timing has not been reached, the microprocessor 166 reverts to the macrosystem interface monitor subroutine program R08 and repeats the loop composed of the subroutine programs R08 and R09 and decision steps R10 and R11 until the answer for step R11 turns affirmative. When it is thus confirmed at step R11 that the main loop timing is reached, then the microprocessor 166 executes step R12 to reset the flag "LOOPF" to logic value "0" for future execution of the job control subroutine program Q05. The job control subroutine program Q05 consists of a plurality of stages "JOB1" to "JOBn" which are to be executed in predetermined cycles as the main routine program for the subsidiary system control unit is in progress. Details of this job control subroutine program Q05 will be described with reference to FIG. 42. Upon termination of the job control subroutine program Q05, the microprocessor 166 recycles to the macrosystem interface monitor subroutine program R08 and repeats the loop composed of the subroutine programs R08 and R09, steps R10 to R12 and job control subroutine program Q05.

FIGS. 34A and 34B are flowcharts showing the details of the macrosystem interface monitor subroutine program R08 included in the main routine program described with reference to FIGS. 33A and 33B.

The macrosystem interface monitor subroutine program R08 starts with a decision step S01 to detect whether or not the reset command "RESET" has already been supplied from the master system control unit 150 (see step C12 of the macrosystem interface monitor subroutine program B09, FIGS. 18A to 18D). If it is found at this step S01 that the reset command "RESET" has not been supplied from the master system control unit 150 and accordingly the answer for the step S01 is given in the negative, the microprocessor 166 proceeds to step S07 to check if the parameter "MSIFS" is set at numerical value "1". Since the parameter "MSIFS" has already been set to numerical value "0" at step R05 of the main routine program described with reference to FIGS. 33A and 33B, the answer for this step S07 is also given in the negative at an incipient stage after execution of this macrosystem interface monitor subroutine program R08 is started. Thus, the microprocessor 166 further proceeds to step S11 to detect whether or not the parameter "MSIFS" is set at numerical value "2". The answer for this step S11 being also given in the negative, the microprocessor 166 reverts to the main routine program illustrated in FIGS. 33A and 33B.

When the reset command "RESET" is thereafter supplied from the master system control unit 150, the answer for step S01 turns affirmative so that the microprocessor 166 proceeds to step S02 to reset to logic value "0" the receipt confirmation bit "Q" included in the reset command "RESET". This enables the master system control unit 150 to send out the subsequent command to any of the subsidiary system control units 152a to 152e. It may be herein noted that the status answer responsive to the reset command "RESET" is to be issued during execution of the input data process control subroutine program Q08 included in the routine program illustrated in FIG. 32C, there are no process steps taken in the main routine program for each of the subsidiary system control units 152a to 152e.

Subsequently to step S02, the microprocessor 166 proceeds to step S03 to set the "NOT READY" bit (bit $G_5$) in the status register 170 to logic value "1" and further proceeds to step S04 to detect whether or not the flag "SYSWAIT" is reset at logic value "0". The flag "SYSWAIT" has already been set to logic value "1" at step R04 of the main routine program described with reference to FIGS. 33A and 33B and, for this reason, the answer for the step S04 is given in the negative at this stage of execution of the macrosystem interface monitor subroutine program R08. In this instance, the microprocessor 166 jumps over step S05 and directly proceeds to step S06. If, however, the reset command "RESET" is received when the subsidiary system control unit is in operation, the flag "SYSWAIT" has been reset at logic value "0" so that the microprocessor 166 proceeds from the step S04 to the step S05 to set the flag "STOPF" to logic value "1" to compulsorily bring an end to the job currently in progress It may be noted that the flag "STOPF" is reset to logic value "0" when the job thus interrupted is re-started.

At step S06, the microprocessor 166 sets the parameter "MSIFS" to numerical value "1" and then proceeds to step S07 to check if the parameter "MSIFS" is set at numerical value "1". If it is found at this step S07 that the parameter "MSIFS" is reset at numerical value "0" and accordingly the answer for the step S07 is given in the negative, the microprocessor 166 reverts through step S11 to the main routine program illustrated in FIGS. 33A and 33B. On the other hand, if it is found at step S07 that the parameter "MSIFS" is set at numerical value "1", the microprocessor 166 proceeds to step S08 to detect whether or not the flag "STOPF" is reset at logic value "0". If it is found at this step S08 that the flag "STOPF" is reset at logic value "0" and accordingly the answer for the step S08 is given in the negative, the microprocessor 166 also reverts through the step S11 to the main routine program illustrated in FIGS. 33A and 33B. The flag "STOPF" is reset to logic value "0" as when a job currently in progress is interrupted. In this instance, the answer for this step S08 is given in the affirmative so that the microprocessor 166 proceeds to step S09 to initialize the local mode map 172 of the subsidiary system control unit.

After the local mode map 172 of the subsidiary system control unit under consideration is thus initialized, the microprocessor 166 sets to logic value "1" the data transmission request flag $F_{TR}$ in the data stored in the local mode map 172 so as to be ready to send the content of the local mode map 172 to the master system control unit 150. The data having the data transmission request flag $F_{TR}$ of logic value "1" is to be sent to the master system control unit 150 during execution of the data transmission request subroutine program R09 and the output data process control subroutine program Q09.

Subsequently, the microprocessor 166 proceeds to step S10 to set the flag "SYSWAIT" to logic value "1" and the parameter "MSIFS" to numerical value "2" further proceeds to step S11 to check if the parameter "MSIFS" is set at numerical value "2". If it is found at this step S11 that the parameter "MSIFS" is set at a numerical value other than "2" and accordingly the answer for the step S11 is given in the negative, the microprocessor 166 jumps over steps S12 to S14 and reverts to the main routine program illustrated in FIGS. 33A and 33B.

On the other hand, if it is found at S11 that the parameter "MSIFS" is set at numerical value "2" and accordingly the answer for the step S11 is given in the affirmative, the microprocessor 166 proceeds to step S12 to detect whether or not all the data stored in the local mode map 172 has been sent out to the master system control unit 150. If the answer for the step S12 is given in the negative, the microprocessor 166 jumps over steps S13 and S14 and reverts to the main routine program illustrated n FIGS. 33A and 33B. If it is determined at step S12 that all the data stored in the local mode map 172 has been sent out to the master system control unit 150 and accordingly the answer for the step S12 is given in the affirmative, the microprocessor 166 proceeds to step S13 to set the parameter "MSIFS" to numerical value "3" and reset the "NOT READY" bit (bit $G_5$) in the status register 170 to logic value "0". Thereafter, the microprocessor 166 proceeds to step S14 to reset the flag "SYSWAIT" to logic value "0" and then reverts to the main routine program illustrated in FIGS. 33A and 33B. In this fashion, the flag "SYSWAIT" is maintained at logic value "1" and accordingly the execution of a job is prohibited until all the data stored in the local mode map 172 has been sent out to the master system control unit 150.

Figure 35A:
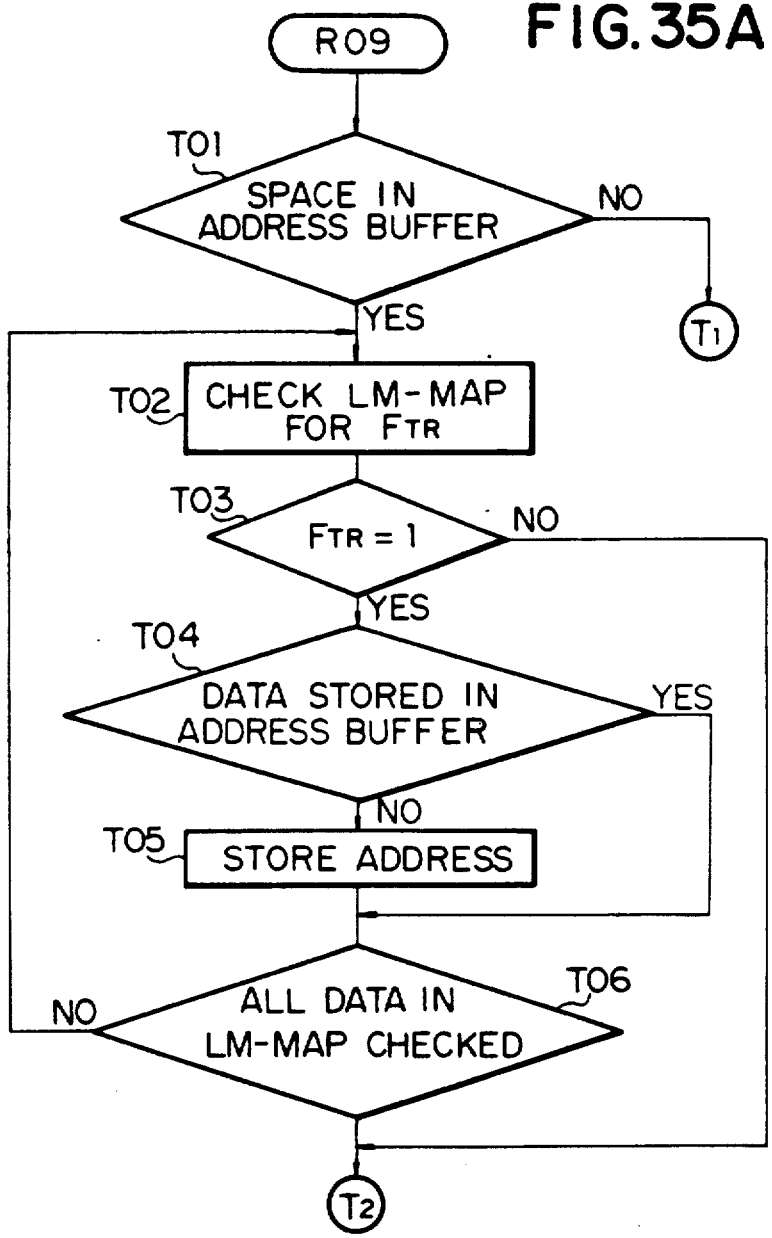
FIGS. 35A and 35B are flowchart showing the details of the data transmission request subroutine program also included in the main routine program illustrated in FIGS. 33A and 33B.
Figure 35B:
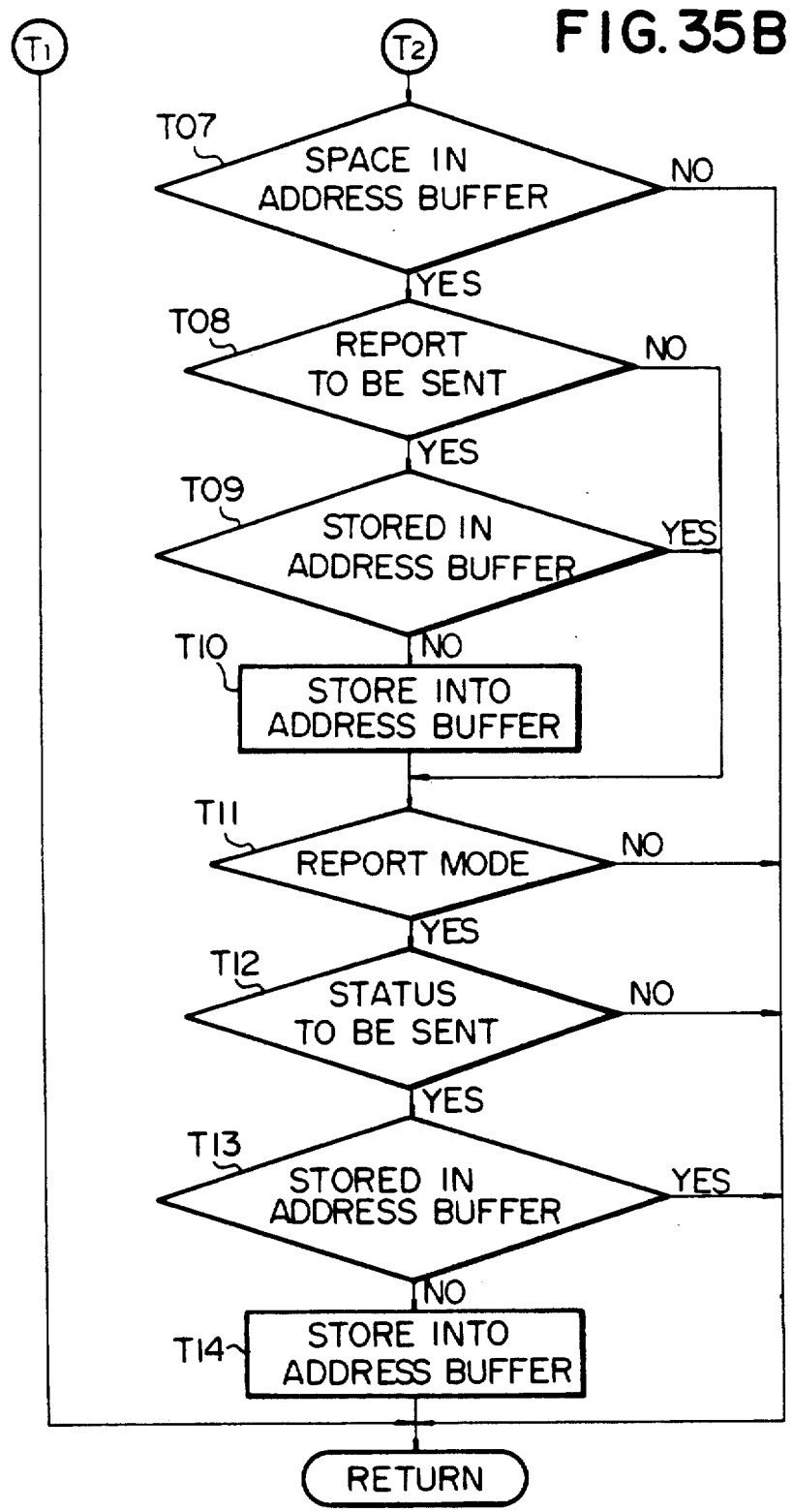

FIGS. 35A and 35B are flowcharts showing the details of the data transmission request subroutine program R09 included in the main routine program described with reference to FIGS. 33A and 33B.

Execution of the data transmission request subroutine program R09 is started upon termination of the macrosystem interface monitor subroutine program B08 and the microprocessor 166 first proceeds to step T01 to detect whether or not there is a free memory space available in the address buffer 212 (FIG. 31) of the subsidiary system control unit under consideration. If it is found at this step T01 that there currently is no free memory space available in the address buffer 212 and accordingly the answer for the step T01 is given in the negative, the microprocessor 166 jumps over all the remaining steps of this subroutine program R09 and reverts to the main routine program illustrated in FIGS. 33A and 33B.

On the other hand, if it is found at step T01 that there is a free memory space available in the address buffer 212 and accordingly the answer for the step T01 is given in the affirmative, the microprocessor 166 proceeds to step T02 to examine the data stored in the local mode map 172 of the subsidiary system control unit and check at step T03 for any data having the data transmission request flag $F_{TR}$ of logic value "1". If it is found at this step T03 that there is no data having the data transmission request flag $F_{TR}$ of logic value "1" in the local mode map 172, the answer for the step T03 is given in the negative so that the microprocessor 166 jumps over steps T04 to T06 and proceeds to step T07. On the other hand, if it is found at step T03 that there is data having the data transmission request flag $F_{TR}$ of logic value "1" in the local mode map 172, the answer for the step T03 is now given in the affirmative and, in this instance, the microprocessor 166 proceeds to step T04 to confirm whether or not the data having the data transmission request flag $F_{TR}$ of logic value "1" in the local mode map 172 has its address already stored in the address buffer 212 of the subsidiary system control unit. If it is found at this step T04 that the address of the data having the data transmission request flag $F_{TR}$ of logic value "1" in the local mode map 172 has already been stored in the address buffer 212 and accordingly the answer for the step T04 is given in the affirmative, the microprocessor 166 jumps over step T05 and proceeds to step T06. However, if it is found at step T04 that the address of the data having the data transmission request flag $F_{TR}$ of logic value "1" in the local mode map 172 has not yet been stored into the address buffer 212 and accordingly the answer for the step T04 is given in the negative, the microprocessor 166 proceeds to the step T05 to store the address of the particular data into the address buffer 212 of the subsidiary system control unit.

Subsequently, the microprocessor 166 proceeds to step T06 to check if the addresses of all the pieces of data each containing the transmission request flag $F_{TR}$ of logic value "1" in the local mode map 172 of the subsidiary system control unit have been stored into the address buffer 212. If the answer for this step T06 is given in the negative, the microprocessor 166 returns to step T02 to repeat the loop of the steps T02 to T06 and, if the answer for the step T06 is given in the affirmative, the microprocessor 166 proceeds to step T07 to detect whether or not there is a free memory space available in the address buffer 212 of the subsidiary system control unit. If it is found at this step T07 that there is no free memory space available in the address buffer 212 that and accordingly the answer for the step T07 is given in the negative, the microprocessor 166 returns to the main routine program illustrated in FIGS. 33A and 33B.

On the other hand, if it is found at step T07 that there is a free memory space available in the address buffer 212 of the subsidiary system control unit, the microprocessor 166 proceeds to step T08 to check if the subsidiary system control unit under consideration has any sequential report frame to be dispatched to the master system control unit 150. If it is found at this step T08 that there currently is no such report frame and accordingly the answer for the step T08 is given in the negative, the microprocessor 166 jumps over steps T09 and T10 and proceeds to step T11. If it is found at the step T08 that there is any sequential report frame to be sent out to the master system control unit 150, the microprocessor 166 proceeds to step T09 to detect whether or not the address of the report frame to be sent out to the master system control unit 150 has already been stored into the address buffer 212. If it is found at this step T09 that the address of the report frame to be sent out to the master system control unit 150 has already been stored into the address buffer 212 and accordingly the answer for the step T09 is given in the affirmative, the microprocessor 166 jumps over step T10 and proceeds to step T11. However, if it is found at step T09 that the address of the sequential report frame to be sent to the master system control unit 150 has not yet been stored into the address buffer 212, the microprocessor 166 proceeds to the step T10 to store the address of the report frame into the address buffer 212 and thereafter proceeds to the step T11.

At this step T11 is tested whether or not the report mode is currently established. This decision is made by referencing the local mode map 172 at address "0C" thereof (FIG. 14). If it is found at this step T11 that the report mode is not established and accordingly the answer for the step T11 is given in the negative, the microprocessor 166 jumps over steps T12 to T14 and reverts to the main routine program illustrated in FIGS. 33A and 33B. On the other hand, if it is found at the step T11 that the report mode is established, the microprocessor 166 proceeds to step T12 to check if there currently is a status frame to be sent to the master system control unit 150. If it is found at this step T12 that there currently is no status frame to be sent to the master system control unit 150 and accordingly the answer for the step T12 is given in the negative, the microprocessor 166 jumps over steps T13 and T14 and reverts to the main routine program illustrated in FIGS. 33A and 33B. On the other hand, if it is found at this seep T12 that there is any status frame to be sent to the master system control unit 150, the microprocessor 166 proceeds to step T13 to detect whether or not the address of the status frame to be sent out to the master system control unit 150 has already been stored into the address buffer 212. If it is found at this step T13 that the address of the status frame to be sent out to the master system control unit 150 has already been stored into the address buffer 212 and accordingly the answer for the step T13 is given in the affirmative, the microprocessor 166 jumps over step T14 and reverts to the main routine program illustrated in FIGS. 33A and 33B. However, if it is found at step T13 that the address of the status frame to be sent to the master system control unit 150 has not yet been stored into the address buffer 212, the microprocessor 166 proceeds to the step T14 to store the address of the status frame into the address buffer 212 and thereafter reverts to the main routine program illustrated in FIGS. 33A and 33B.

When the main routine program is thus restored, the microprocessor 166 confirms at step R10 that the flag "SYSWAIT" is reset to logic value "0" indicating that the initialization of the microprocessor 166 is complete. If the answer for this step R10 is given in the negative with the flag "SYSWAIT" set to logic value "1", the microprocessor 166 returns to the macrosystem interface monitor subroutine program R08 to repeat the subroutine program R08 and the data transmission request subroutine program R09.

If the answer for this step R10 is however given in the affirmative with the flag "SYSWAIT" reset to logic value "0", the microprocessor 166 further checks the flag "LOOPF" at step R11 to confirm whether or not the main loop timing is reached at which a job is to be performed in the subsidiary system control unit. When it is confirmed from the flag "LOOPF" that such a timing has not been reached, the microprocessor 166 further reverts to the macrosystem interface monitor subroutine program R08 and repeats the loop composed of the subroutine programs R08 and R09 and decision steps R10 and R11 until the answer for step R11 turns affirmative. When it is thus confirmed at step R11 that the main loop timing is reached, then the microprocessor 166 executes step R12 to reset the flag "LOOPF" to logic value "0" for future execution of the job control subroutine program Q05. As has been noted, the job control subroutine program Q05 consists of a plurality of stages "JOB1" to "JOBn" which are to be executed in predetermined cycles as the main routine program for the subsidiary system control unit is in progress. Upon termination of the job control subroutine program Q05, the microprocessor 166 recycles to the macrosystem interface monitor subroutine program R08 and repeats the loop composed of the subroutine programs R08 and R09, steps R10 to R12 and job control subroutine program Q05.

Figure 36A:
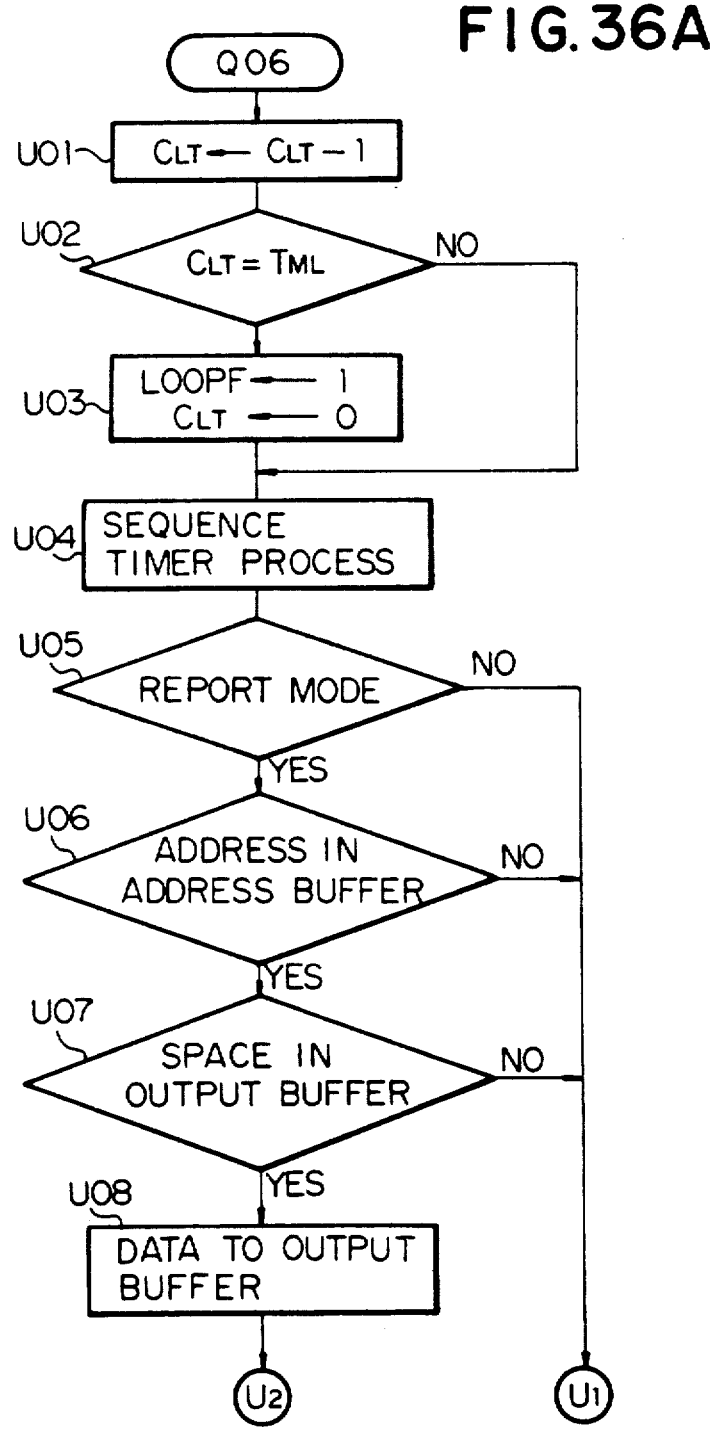
FIGS. 36A and 36B are flowcharts showing the details of the main loop timer control subroutine program included in the timer interrupt routine program illustrated in FIG. 32B.
Figure 36B:
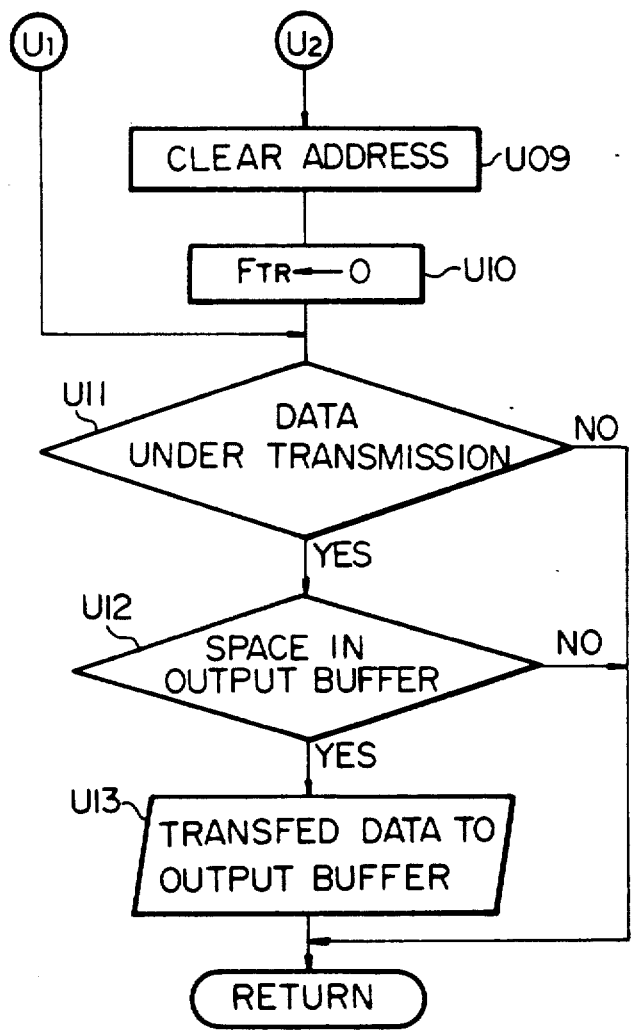

FIGS. 36A and 36B are flowcharts showing the details of the main loop timer control subroutine program Q06 included in the timer interrupt routine program shown in FIG. 32B.

The main loop timer control subroutine program Q06 starts with a step U01 at which the microprocessor 166 of the subsidiary system control unit under consideration increments the loop timer count $C_{LT}$. This loop timer count $C_{LT}$ is predominant over the cycles in which the jobs JOB1 to JOBn are to be performed through the job control subroutine program Q05 of the main routine program described with reference to FIG. 32A. It is then tested at step U02 whether or not the loop timer count $C_{LT}$ thus incremented at step U01 has reached a numerical value representing a preset main loop timing $T_{ML}$ which is indicative of the timing at which any of the jobs JOB1, ... JOBn is to be executed. If the answer for this step U02 is given in the negative, the microprocessor 166 jumps over step U03 and proceeds to step U04. If, however, it is found at step U02 that the loop timer count $C_{LT}$ has reached the numerical value representing such a main loop timing $T_{ML}$, the microprocessor 166 proceeds to the step U03 to set the flag "LOOPF" to logic value "1" and reset the loop timer count $C_{LT}$ to numerical value "0" enabling the loop timer of the subsidiary system control unit to start counting operation for a second time from the reset state. The flag "LOOPF" being thus set to logic value "1", the answer for the step R11 of the main routine program is given in the affirmative during the subsequent reiteration of the main routine program and enables the microprocessor 166 to execute any of the jobs JOB1 to JOBn required.

Subsequently, the microprocessor 166 proceeds to step U04 to execute the sequence timer processing and thereafter proceeds to step U05 to detect whether or not the report mode is currently established. If it is found at this step U05 that the report mode is currently not established and accordingly the answer for the step U05 is given in the negative, the microprocessor 166 jumps over steps U06 to U10 and proceeds to step U11. If however it is found at the step U05 that the report mode is currently established, the microprocessor 166 proceeds to step U06 to check if there is stored in the address buffer 212 of the subsidiary system control unit the address of the data to be transmitted to the master system control unit 150. If it is found at this step U06 that there is no such address in the address buffer 212 and accordingly the answer for the step U06 is given in the negative, the microprocessor 166 jumps over steps U07 to U10 and proceeds to the step U11. If however it is found at the step U06 that there is stored in the address buffer 212 of the subsidiary system control unit the address of the data to be transmitted to the master system control unit 150, then the microprocessor 166 proceeds to step U07 to detect whether or not there is a free memory space available in the output data buffer 214 (FIG. 31). If it is found at this step U07 that there is no free memory space available in the output data buffer 214 and accordingly the answer for the step U07 is given in the negative, the microprocessor 166 jumps over steps U08 to U10 and proceeds to the step U11. On the other hand, if it is found at the step U07 that there is a free memory space available in the output data buffer 214 and accordingly the answer for the step U07 is given in the affirmative, the microprocessor 166 proceeds to the step U08 so that the data stored in the report register 176 at the address stored in the address buffer 212 is converted into the form of a frame and is transferred to the output data buffer 214. The data thus latched into the output data buffer 214 in this fashion is to be released to the macrosystem interface bus 154 during execution of the output data process control subroutine program Q09 of the outgoing interrupt routine program illustrated in FIG. 32D.

Having the data thus transferred to the output data buffer 214, the microprocessor 166 of the subsidiary system control unit under consideration proceeds to step U09 to clear the address which has been stored in the address buffer 212 and thereafter proceeds to step U10 to reset to logic value "0" the data transmission request flag $F_{TR}$ which has been contained in the data stored at the address thus cleared. Through execution of this step U10, the microprocessor 166 is now ready to transmit to the master system control unit 150 the data designated by the address which has been stored in the address buffer 212.

Thus, the microprocessor 166 then proceeds to step U11 to detect whether or not there currently is any data being transmitted to the master system control unit 150. If it is found at this step U11 that no data is now being transmitted to the master system control unit 150 and thus the answer for this step U11 is given in the negative, the microprocessor 166 jumps over steps U12 and U13 to proceed to the timer interrupt subroutine program illustrated in FIG. 32B. However, if it is found at the step U11 that there is no data being transmitted to the master system control unit 150, the microprocessor 166 proceeds to step U12 to check if there is a free memory space available in the data output buffer 214. If it is found at this step U12 that there is no free memory space available in the data output buffer 214 with any data still remaining therein and accordingly the answer for the step U12 is given in the negative, the microprocessor 166 jumps over the step U13 and reverts to the timer interrupt subroutine program illustrated in FIG. 32B. However, if it is found at the step U12 that there is a free memory space available in the data output buffer 214, the microprocessor 166 proceeds to the step U13 to transfer to the output data buffer 214 the data to be transmitted to the master system control unit 150 and thereafter returns to the timer interrupt subroutine program illustrated in FIG. 32B.

Figure 37A:
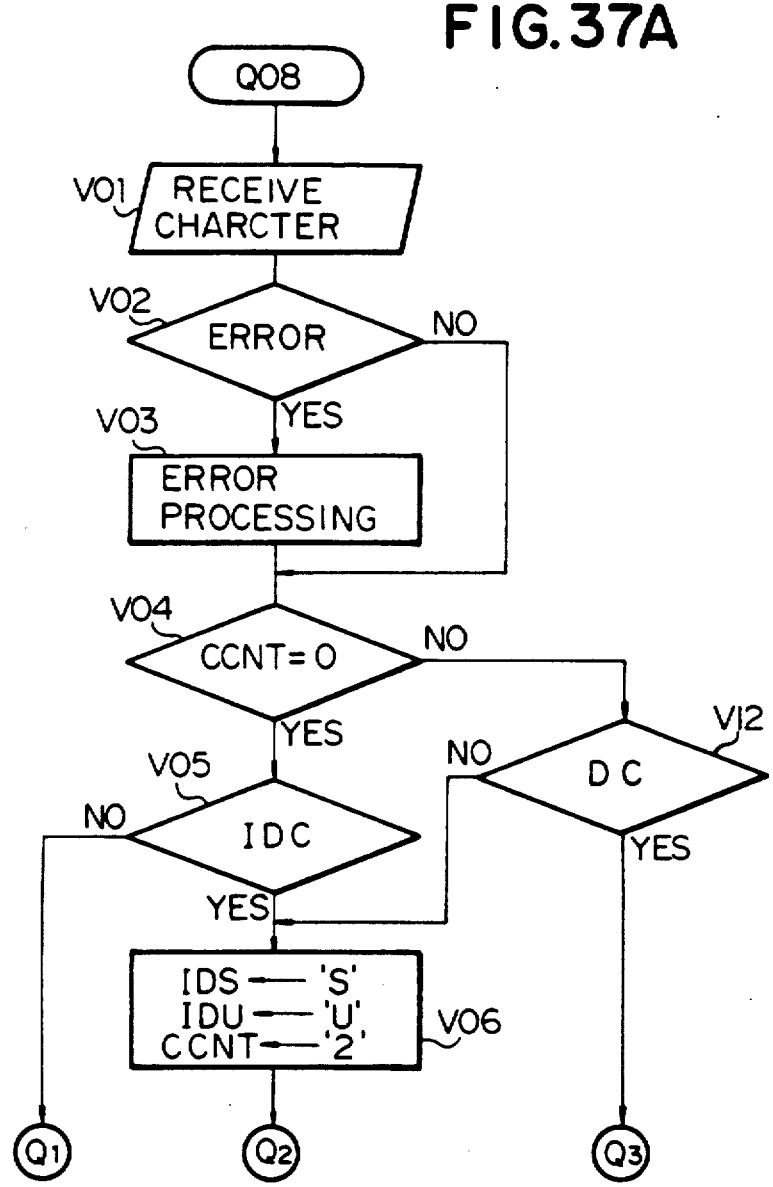

FIGS. 37A and 37B are flowcharts showing the details of the input data process control subroutine program Q08 included in the incoming interrupt routine program shown in FIG. 32C.

The input data process control subroutine program Q08 starts with a step V01 at which the microprocessor 166 of the subsidiary system control unit under consideration receives the character which has been loaded into the input data register (represented by the register 208 shown in FIG. 6). Subsequently, the microprocessor 166 proceeds to step V02 to detect whether or not there is any error invited in receiving the data from the master system control unit 150. If it is found at this step V02 that there is any error invited in receiving the data from the master system control unit 150 and accordingly the answer for the step V02 is given in the affirmative, the microprocessor 166 proceeds to step V03 to take steps to cope with the occurrence of the error and thereafter proceeds to step V04. If it is found at the step V02 that there is no error invited in receiving the data from the master system control unit 150, the microprocessor 166 directly proceeds to the step V04 to check if the parameter "CCNT" is reset at numerical value "0".

The parameter "CCNT" is reset at numerical value "0" when the reception of a frame is started in the subsidiary system control unit as has been noted. The answer for the step V04 is thus first given in the affirmative so that the microprocessor 166 proceeds to step V05 to detect whether or not the character just received is an identification character (IDC). If it is found at this step V05 that the character just received is not an identification character although the parameter "CCNT" is reset at numerical value "0" and accordingly the answer for the step V05 is given in the negative, the microprocessor 166 determines that any failure must have occurred during transmission of the frame currently being received from the master system control unit 150. Thus, the microprocessor 166 immediately terminates execution of this input data process control subroutine program Q08 and returns to the incoming interrupt routine program illustrated in FIG. 32C.

If it is found at step V05 that the character just received is an identification character, the microprocessor 166 proceeds to step V06 register as the parameters "IDS" and "IDU" the destination and memory area identification codes "S" and "U" in the identification character received and, in addition, set the parameter "CCNT" to numerical value "2". Having generated the parameters "IDS" and "IDU" in this fashion, the microprocessor 166 proceeds to step V07 to check if the character received is directed to a particular subsidiary system control unit. If it is found at this step V07 that the character received is not directed to any particular subsidiary system control unit and accordingly the answer for the step V07 is given in the negative, the microprocessor 166 determines that the character received is common to the characters transmitted to all the other subsidiary system control units from the global mode map 186 of the master system control unit 150 and proceeds to step V10, the details of which will be described hereinafter.

On the other hand, if it is found at step V07 that the character received is directed a particular subsidiary system control unit and accordingly the answer for the step V07 is given in the affirmative, the microprocessor 166 proceeds to step V08 to detect whether or not the character received is directed to the subsidiary system control unit under consideration. If it is found at this step V08 that the character received is directed to another subsidiary system control unit and accordingly the answer for the step V08 is given in the affirmative, the microprocessor 166 proceeds to step V09 to reset the parameter "CCNT" to numerical value "0" and thereafter returns to the incoming interrupt routine program illustrated in FIG. 32C. However, if it is found at the step V08 that the character received is directed to the subsidiary system control unit under consideration and accordingly the answer for the step V08 is given in the negative, then the microprocessor 166 proceeds to step V10 to detect whether or not the frame being received is a status request frame. If it is found at this step V10 that the frame being received is a status request frame which consists of a single character, viz., an identification character alone as described with reference to FIG. 11B, the answer for the step V10 is given in the affirmative. In this instance, the microprocessor 166 proceeds to and executes a status/command process control subroutine program V11, the details of which will be hereinafter described with reference to FIG. 38. If it is found at step V10 that the frame being received is a status request frame and accordingly the answer for the step V10 is given in the negative, the microprocessor 116 returns to the incoming interrupt routine program illustrated in FIG. 32C.

If, on the other hand, it is found at step V04 that the parameter "CCNT" is set at a numerical value other than "0" and accordingly the answer for the step V04 is given in the negative, then the microprocessor 166 proceeds to step V12 to check if the character just received is a data character. If it is found at this step V12 that the character just received is not a data character and accordingly the answer for this step V12 is given in the negative, the microprocessor 166 determines that the character is received is an identification character and as such proceeds to the step V06 to executes the step V06 to V09 or the steps V06 to V11. However, if it is found at the step V12 that the character just received is a data character, the microprocessor 166 proceeds to step V13 to confirm whether or not the frame including the data character is either a mode request frame or a mode set frame.

If it is found at this step V13 that the frame including the data character is neither a mode request frame nor a mode set frame and thus the answer for the step V13 is given in the negative, the microprocessor 166 determines that the frame being received is a sequence command and as such proceeds to the status/command process control subroutine program V11 as will be described later. On the other hand, if it is found at the step V13 that the frame including the data character is a mode request frame or a mode set frame and thus the answer for the step V13 is given in the affirmative, then the microprocessor 166 proceeds to step V14 to detect whether or not the data character received is a mode request frame. If it is found at this step V14 that frame including the data character received is a mode request frame and accordingly the answer for the step V14 is given in the affirmative, the microprocessor 166 now proceeds to and execute a mode request frame process subroutine program V15. The details of this mode request frame process subroutine program V15 will be hereinafter described with reference to FIG. 41. If, on the other hand, it is found at the step V14 that the frame including the data character received is not a mode request frame, then the microprocessor 166 determines that the frame is a mode set frame and, thus, executes a mode set frame process subroutine program V16. The details of this mode set frame process subroutine program V16 will be hereinafter described with reference to FIG. 40.

Figure 38:
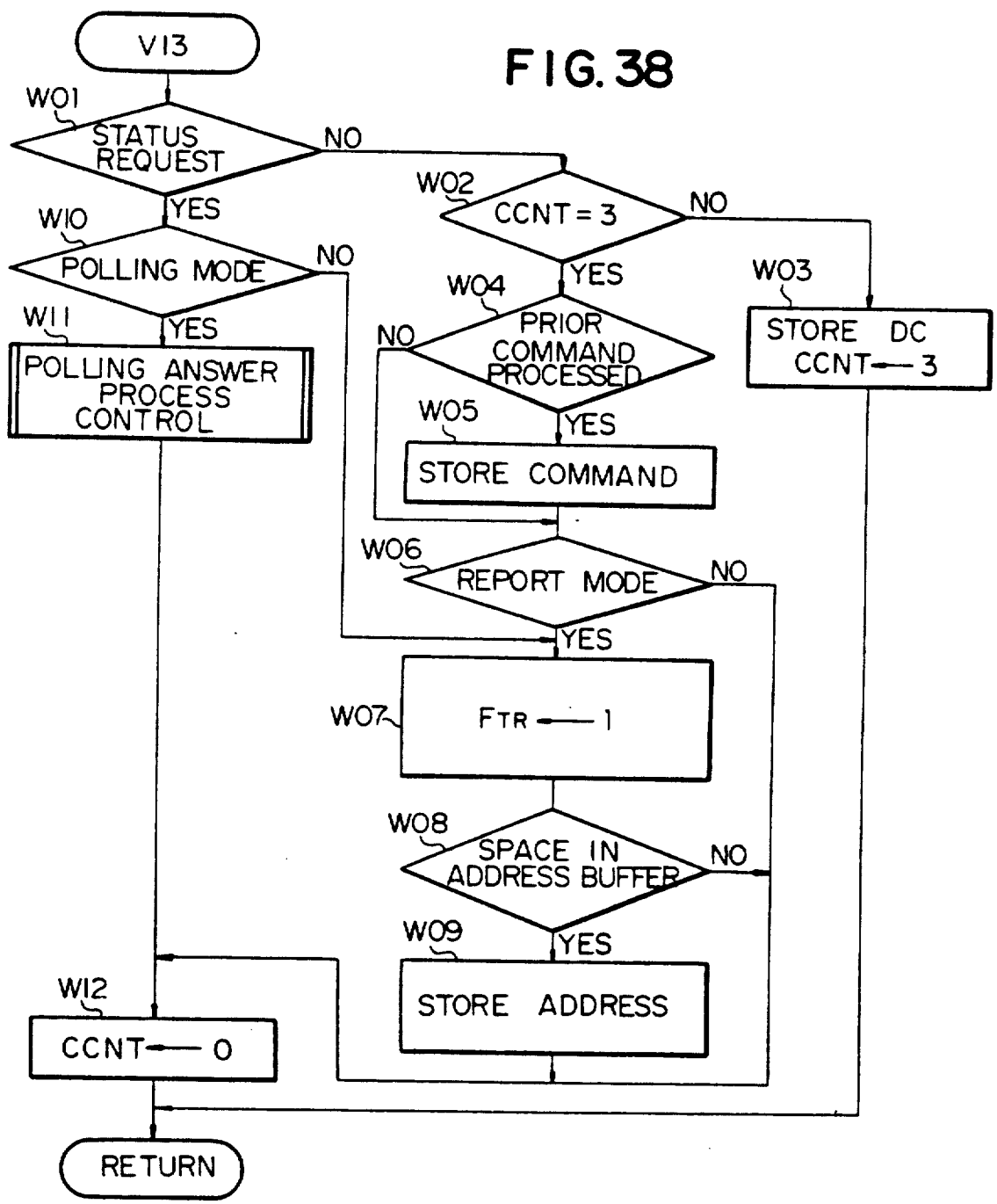
FIG. 38 is a flowchart showing the details of the status/command process control subroutine program included in the input data process control subroutine program illustrated in FIGS. 37A and 37B.

FIG. 38 is a flowchart showing the details of the status/command process control subroutine program V11 included in the input data process control routine program described with reference to FIGS. 37A and 37B.

The status/command process control subroutine program V11 starts with a decision step W01 at which the microprocessor 166 checks if the frame being received is a status request frame, not a sequence command. If it is found at this step W01 that the frame being received is not a status request frame but a sequence command and accordingly the answer for the step W01 is given in the negative, the microprocessor 166 proceeds to step W02 to further check if the parameter "CCNT" is set at numerical value "3". The parameter "CCNT" having been set at numerical value "1" when the subsidiary system control unit under consideration is in receipt of the data character DC-1 immediately subsequent to an identification character, the answer for the step W02 is also given in the negative so that the microprocessor 166 proceeds to step W03 to transfer the received data character DC-1 to the temporary register section allocated to the first data character. At this step W03 is further set the parameter "CCNT" to numerical value "3". Subsequently to step W03, the microprocessor 166 returns to the input data process control subroutine program Q08 described with reference to FIGS. 37A and 37B and accordingly reverts to the incoming interrupt routine program illustrated in FIG. 32C.

On the other hand, when the subsidiary system control unit under consideration has received the second data character DC-2, the parameter "CCNT" is set at numerical value "3" so that the answer for the step W02 is given in the affirmative. In this instance, the microprocessor 166 proceeds to step W04 to detect whether or not the command supplied from the master system control unit 150 during the immediately preceding cycle of polling operation has been transferred from the command register 168 to the microprocessor 166 and has already been processed in the latter. If it is found at this step W04 that the command supplied from the master system control unit 150 during the preceding cycle of polling operation has already been processed in the microprocessor 166, the microprocessor 166 proceeds to step W05 at which the first data character DC-1 stored in the temporary register section allocated thereto and the second data character DC-2 newly received are supplied to and loaded into the command register 168 of the subsidiary system control unit. If, however, it is found at the step W04 that the command supplied from the master system control unit 150 during the preceding cycle of polling operation has not yet been processed in the microprocessor 166 and thus the answer for the step W04 is given in negative, the microprocessor 166 jumps over the step W05 and proceeds directly to step W06 to check if the report mode is established in the subsidiary system control unit.

If the answer for this step W06 is given in the negative, the microprocessor 166 jumps over steps W07, W08 and W09 and proceeds to step W12. On the other hand, if the answer for the step W06 is given in the affirmative, then the microprocessor 166 proceeds to step W07 to set to logic value "1" the data transmission request flag $F_{TR}$ included in the data stored in the status register 170 of the subsidiary system control unit. Subsequently, the microprocessor 166 proceeds to step W08 to detect whether or not there is a free memory space available in the address buffer 212 of the subsidiary system control unit. If it is found at this step W08 that there is no free memory space currently available in the address buffer 212 and accordingly the answer for the step W08 is given in the negative, the microprocessor 166 jumps over the step W09 and proceeds to the step W12. If, however, it is found at the step W08 that there is a free memory space available in the address buffer 212, then the microprocessor 166 proceeds to step W09 at which the address of the data including the data transmission request flag $F_{TR}$ set to logic value "1" at step W07 is stored into the address buffer 212.

Figure 39A:
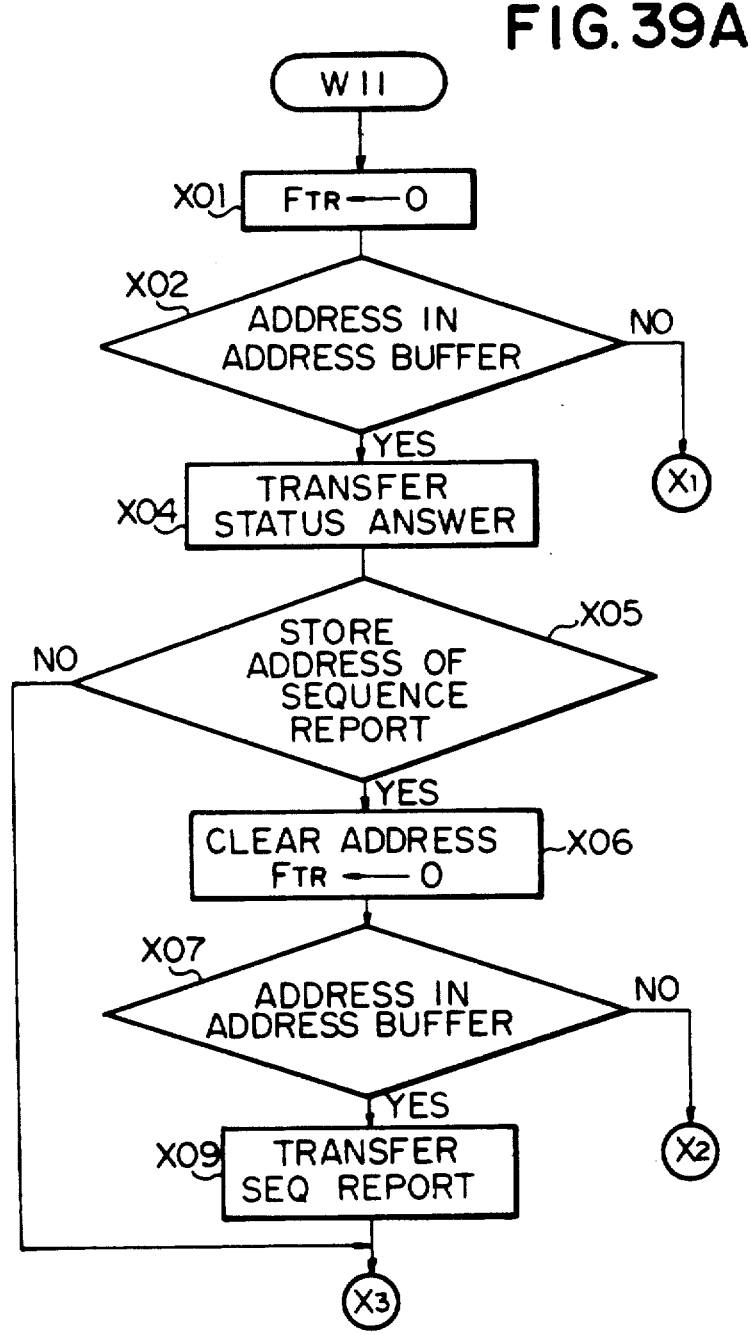
FIGS. 39A and 39B are flowcharts showing the details of the polling answer process control subroutine program included in the status/command process control subroutine program illustrated in FIG. 38.
Figure 39B:
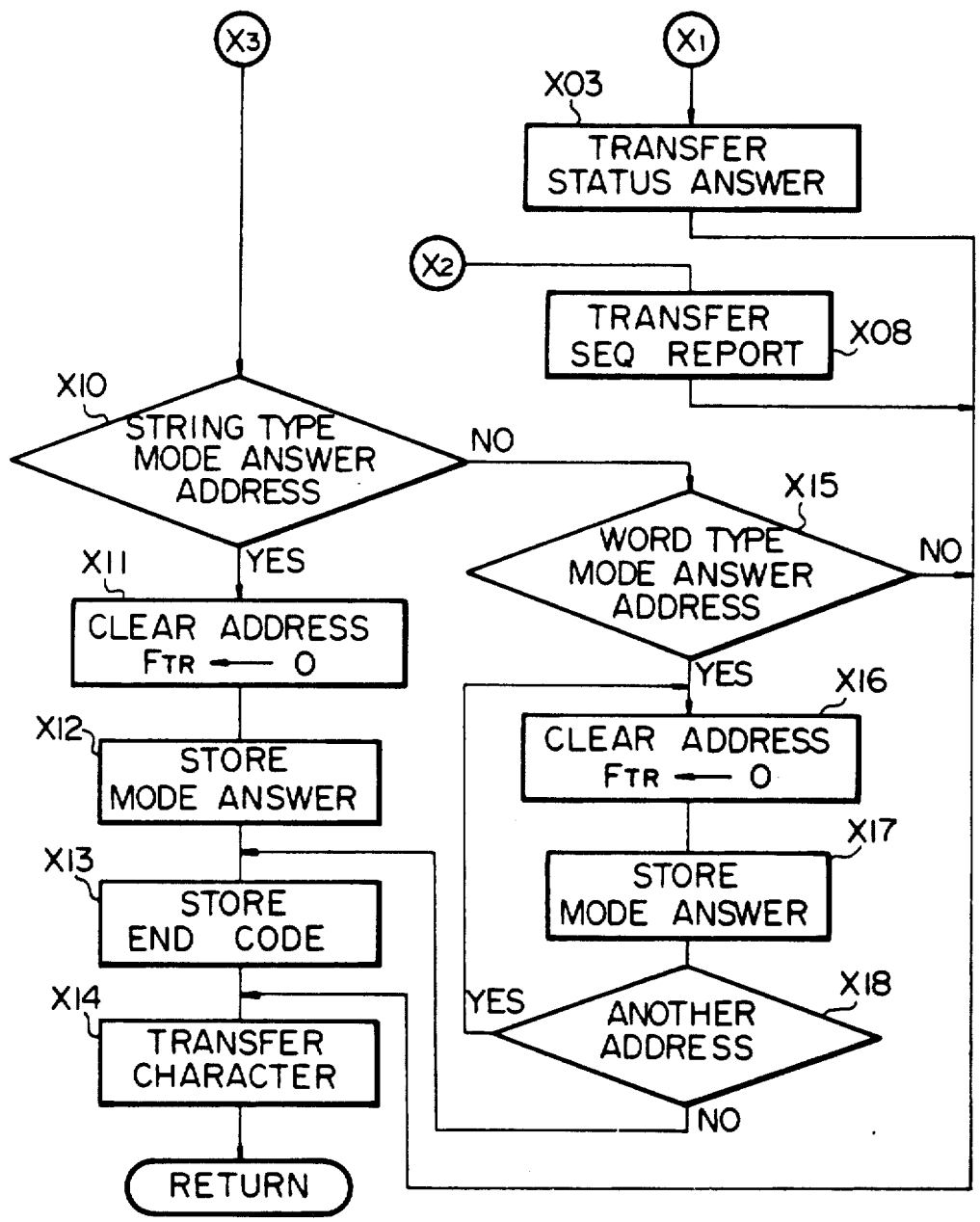

On the other hand, if it is found at step W01 that the frame being received is a status request frame and is not a sequence command, the answer for the step W01 is given in the affirmative. In this instance, the microprocessor 166 proceeds to step W10 to detect whether or not the polling mode is established in the subsidiary system control unit. If the answer for this step W10 is given in the negative, the microprocessor 166 proceeds to the step W07 to set to logic value "1" the data transmission request flag $F_{TR}$ included in the data stored in the status register 170 as above noted. However, if it is determined at step W10 that the polling mode is currently established in the subsidiary system control unit and accordingly the answer for the step W10 is given in the affirmative, the microprocessor 166 proceeds to and executes a polling answer process control subroutine program W11. The details of this polling answer process control subroutine program W11 will be hereinafter described with reference to FIGS. 39A and 39B. Upon termination of the polling answer process control subroutine program W11, the microprocessor 166 proceeds to the step W12 to reset the parameter "CCNT" to numerical value "0" and thereafter returns to the input data process control subroutine program Q08 described with reference to FIGS. 37A and 37B and accordingly reverts to the incoming interrupt routine program illustrated in FIG. 32C. W11 starts with a step X01 at which the microprocessor 166 resets to logic value "0" the data transmission request flag $F_{TR}$ of the data stored in the status register 170. Subsequently, the microprocessor 166 proceeds to step X02 to check if there is stored in the address buffer 212 the address for the data to be transmitted to the master system control unit 150. If it is found at this step X02 that there is no such address stored in the address buffer 212 and accordingly the answer for the step X02 is given in the negative, the microprocessor 166 proceeds to step X03 to transfer to the output data buffer 214 the status answer frame having the frame-to-continue bit "N" of logic value "0" so as to be ready to send the status answer frame to the master system control unit 150. The microprocessor 166 then proceeds to step X11.

If it is found at the step X02 that there is stored in the address buffer 212 the address for the data to be transmitted to the master system control unit 150 and thus the answer for the step X02 is given in the affirmative, the microprocessor 166 proceeds to step X04 and transfers to the output data buffer 214 the status answer frame having the frame-to-continue bit "N" of logic value "1" so as to be ready to send the status answer frame to the master system control unit 150. Thereafter, the microprocessor 166 proceeds to step X05 to check if there is stored in the address buffer 212 the address for the sequence report frame to be transmitted to the master system control unit 150. If it is found at this step X05 that there is such an address stored in the address buffer 212 and accordingly the answer for the step X05 is given in the affirmative, the microprocessor 166 proceeds to step X06 to clear the address thus stored in the address buffer 212. At this step X06, the data transmission request flag $F_{TR}$ of logic value "1" included in the report data stored in the report register 176 is reset to logic value "0".

Subsequently, the microprocessor 166 proceeds to step X07 to check if there is stored in the address buffer 212 the address for the data to be transmitted to the master system control unit 150. If it is found at this step X02 that there is no such address stored in the address buffer 212 and accordingly the answer for the step X07 is given in the negative, the microprocessor 166 proceeds to step X08 to transfer to the output data buffer 214 the sequence report frame having the frame-to-continue bit "N" of logic value "0" so as to be ready to send the sequence report frame to the master system control unit 150. The microprocessor 166 then proceeds to the step X14.

If it is found at the step X07 that there is stored in the address buffer 212 the address for the data to be transmitted to the master system control unit 150 and thus the answer for the step X07 is given in the affirmative, the microprocessor 166 proceeds to step X09 and transfers to the output data buffer 214 the sequence report frame having the frame-to-continue bit "N" of logic value "1" so as to be ready to send the sequence report frame to the master system control unit 150. Thereafter, the microprocessor 166 proceeds to step X10 to check the address buffer 212 for the address of a mode answer frame of the string type configuration to be sent to the master system control unit 150. If it is found at this step X10 that there is such an address stored in the address buffer 212 and accordingly the answer for the step X10 is given in the affirmative, the microprocessor 166 proceeds to the step X11 to clear the address thus stored in the address buffer 212. At this step X11, the data transmission request flag $F_{TR}$ of logic value "1" of the data transmission request flag $F_{TR}$ included in the mode answer frame is reset to logic value "0".

Thereafter, the microprocessor 166 proceeds to step X12 to transfer the mode answer frame of the string type configuration to the output data buffer 214 and is now ready to send the mode answer frame to the master system control unit 150. Then, the microprocessor 166 proceeds to step X13 to send a frame end code to the output data buffer 214. In the system embodying the present invention, a frame end code is thus added to the mode answer frame of the string type configuration before all the characters forming the mode answer frame are passed to the output data buffer 214. This is advantageous in that, if all the characters of a mode answer frame of the string type configuration are processed simultaneously, the master system control unit 150 would be required to consume a great amount of time in processing the mode answer frame and would thus cause a delay in the communication of the master system control unit 150 with another subsidiary system control unit.

If it is found at step X10 that there is not the address of a mode answer frame of the string type configuration stored in the address buffer 212 and accordingly the answer for the step X10 is given in the negative, the microprocessor 166 proceeds to the step X15 to check the address buffer 212 for the address of a mode answer frame of the word type configuration to be sent to the master system control unit 150. If it is found at this step X15 that there is such an address stored in the address buffer 212 and accordingly the answer for the step X15 is given in the affirmative, the microprocessor 166 proceeds to the step X16 to clear the address thus stored in the address buffer 212. At this step X16, the data transmission request flag $F_{TR}$ of logic value "1" included in the mode answer frame of the word type configuration is reset to logic value "0".

Thereafter, the microprocessor 166 proceeds to step X17 to transfer the mode answer frame of the word type configuration to the output data buffer 214 and is now ready to send the mode answer frame to the master system control unit 150. Then, the microprocessor 166 proceeds to step X18 to check the address buffer 212 for the address of another mode answer frame of the word type configuration to be sent to the master system control unit 150. If it is found at this step X18 that there is such an address stored in the address buffer 212 and accordingly the answer for the step X18 is given in the affirmative, the microprocessor 166 reverts to the step X16 to repeat the loop of the steps X16 to X18. When the answer for the step X18 turns negative, the microprocessor 166 proceeds to the step X13 to send a frame end code to the output data buffer 214.

In these manners, the characters forming the frame stored in the output data buffer 214 are transferred one after another from the output data buffer 214 to the output data register 216 and thereafter the microprocessor 166 proceeds to step W12 of the status/command process control subroutine program V13 described with reference to FIG. 38. The individual characters thus stored in the output data register 216 are supplied one after another to the master system control unit 150 through execution of the output data process control subroutine program Q09 included in the outgoing interrupt routine program illustrated in FIG. 32D.

Figure 40:
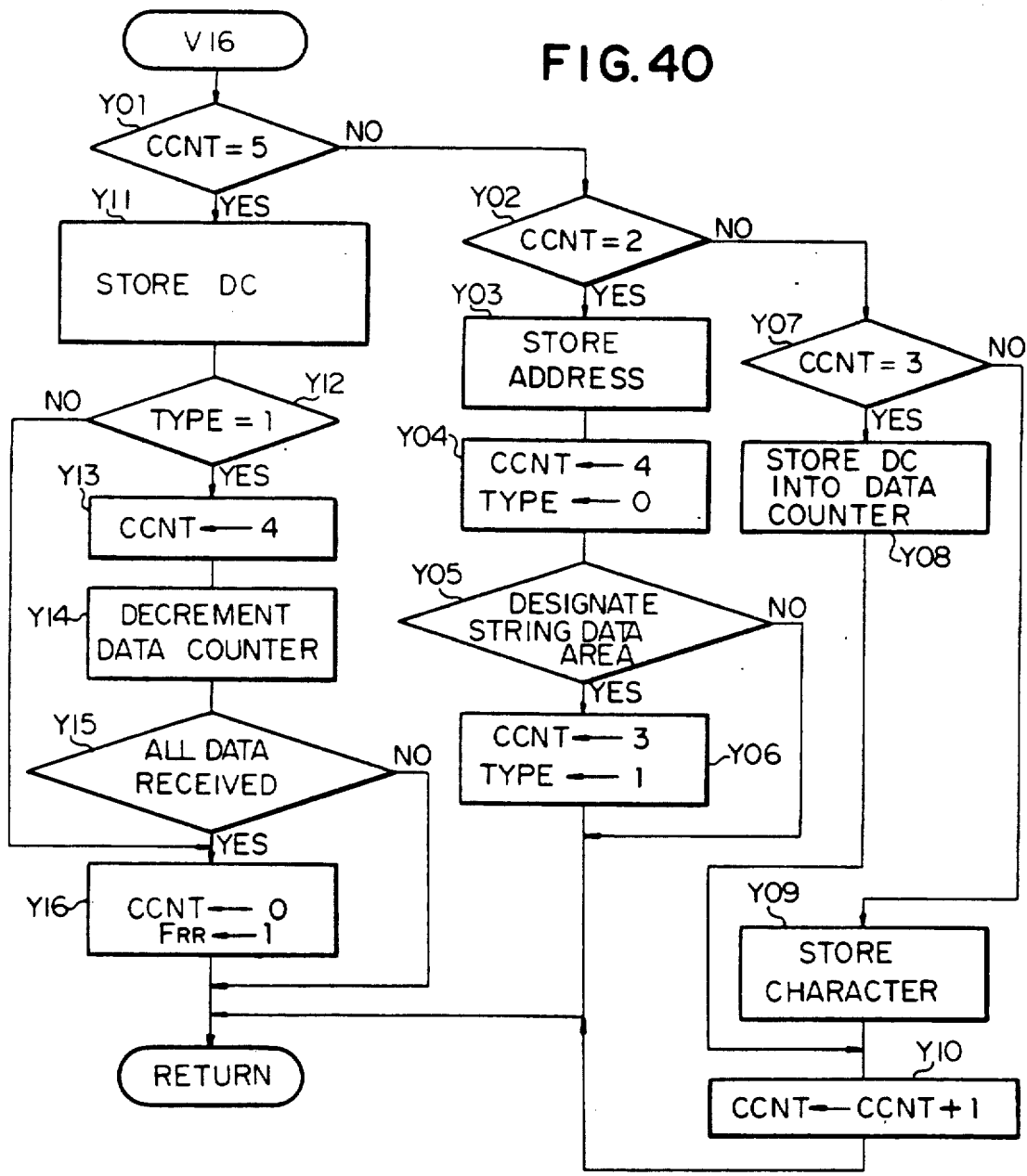
FIG. 40 is a flowchart showing the details of the mode set frame process control subroutine program included in the routine program illustrated in FIGS. 37A and 37B.

FIG. 40 is a flowchart showing the details of the mode set frame process subroutine program V16 included in the input data process control subroutine program Q08 described with reference to FIGS. 37A and 37B.

The mode set frame process subroutine program V16 starts with a decision step Y01 at which the microprocessor 166 proceeds to step Y01 to check if the parameter "CCNT" is set at numerical value "5". The parameter "CCNT" being set at numerical value "2" when the first data character DC-1 is received, the answer for this step Y01 is given in the negative so that the microprocessor 166 proceeds to step Y02 to check if the parameter "CCNT" is set at numerical value "2". With the parameter "CCNT" set at numerical value "2" when the first data character DC-1 is received as above mentioned, the answer for this step Y02 is given in the affirmative. The character DC-1 of a mode set frame is assigned to the address $M_6$ to $M_0$ and, thus, the microprocessor 166 proceeds from the step Y02 to step Y03 and transfers the address $M_6$ to $M_0$ in the received character to the address register and thereafter proceeds to step Y04 to set the parameter "CCNT" to numerical value "4" and reset the flag "TYPE" to logic value "0".

Subsequently, the microprocessor 166 proceeds to step Y05 and refers to the map address stored into the address register at step Y03 to check if the address designates the string area 178 in the local mode map 172 of the subsidiary system control unit. If it is found at this step Y05 that the map address stored in the address register designates the string area 178 and accordingly the answer for the step Y05 is given in the affirmative, the microprocessor 166 proceeds to step Y06 to set the parameter "CCNT" to numerical value "3" and set the flag "TYPE" to logic value "1". Upon termination of this step Y06, the microprocessor 166 returns to the input data process control subroutine program Q08 described with reference to FIGS. 37A and 37B. If, however, it is found at the step Y05 that the string area 178 in the local mode map 172 is not designated by the map address stored in the address register, the microprocessor 166 jumps over the step Y06 and immediately returns to the input data process control subroutine program Q08 described with reference to FIGS. 37A and 37B.

When the second data character DC-2 is thereafter received and the mode set frame process control subroutine program V16 of the input data process control routine program Q08 described with reference to FIGS. 37A and 37B is executed, the answer for each of the decision steps Y01 and Y02 is given in the negative. In this instance, the microprocessor 166 proceeds to step Y07 to check if the parameter "CCNT" is set at numerical value "3". The parameter "CCNT" is set at numerical value "3" for a mode set frame of the string type configuration and at numerical value "4" for a mode set frame of the word type configuration through execution of the steps Y04 to Y06 as above described. Thus, the answer for the step Y07 is given in the affirmative if the frame being received by the subsidiary system control unit is of the string type configuration or in the negative if the frame being received by the subsidiary system control unit is of the word type configuration. If the frame being received by the subsidiary system control unit is of the string type configuration, the second data character DC-2 of the frame is indicative of the length of the data contained in the frame and, thus, the microprocessor 166 proceeds from step Y07 to step Y08 to transfer the data character DC-2 to the data counter and stores the character at the step Y08. If, on the other hand, the frame being received by the subsidiary system control unit is of the word type configuration, the second data character DC-2 of the frame forms the first byte of the data contained in the frame and, in this instance, the microprocessor 166 proceeds from step Y07 to step Y09 to transfer the second data character DC-2 to the register section assigned thereto and stores the character at the step Y09. Subsequently to the step Y08 or the step Y09, the microprocessor 166 proceeds to step Y10 to increment the parameter "CCNT" and thereupon returns to the input data process control subroutine program Q08 described with reference to FIGS. 37A and 37B.

When the third data character DC-3 of the mode set frame is thereafter received by the subsidiary system control unit, the answer for each of the steps Y01, Y02 and Y07 is given in the negative since the parameter "CCNT" for a mode set frame of the string type configuration is set at numerical value "4". In this instance, the microprocessor 166 proceeds through the steps Y01, Y02 and Y07 to the step Y09 to store the data character DC-3 into the register section assigned thereto. Thereafter, the microprocessor 166 proceeds to the step Y10 to increment the parameter "CCNT" and thereupon returns to the input data process control subroutine program Q08 described with reference to FIGS. 37A and 37B.

If the mode set frame being currently received by the subsidiary system control unit is of the word type configuration, the answer for the step Y01 is given in the affirmative. Thus, the microprocessor 166 proceeds from the step Y01 to step Y11 at which the data character just received and the data character which has been stored in the register section assigned thereto are stored into the local mode map 172 per se or the string data area 178 in the local mode map 172 of the subsidiary system control unit. It may be herein noted that the data character just received and the data character which has been stored in the register section are stored into the local mode map 172 if the mode set frame being received is of the word type configuration or into the string data area 178 if the mode set frame being received is of the string type configuration.

Upon termination of the step Y11, the microprocessor 166 proceeds to step Y12 and checks the flag "TYPE" to see if the mode set frame being received is of the word type configuration or of the string type configuration. If it is found at this step Y12 that the flag "TYPE" is set at logic value "0" indicating that the mode set frame being received is of the word type configuration, the microprocessor 166 determines that the mode set frame of the word type configuration has been received completely and thus jumps over steps Y12 to Y15 to proceed to step Y16 to reset the parameter "CCNT" to numerical value "0". At this step Y16, furthermore, the data receipt report flag $F_{RR}$ contained in the data now stored in the local mode map 172 is set to logic value "1". The microprocessor 166 thereafter returns to the input data process control subroutine program Q08 described with reference to FIGS. 37A and 37B.

If it is found at the step Y12 that the flag "TYPE" is set at logic value "1" indicating that the mode set frame being received is of the string type configuration, then the microprocessor 166 proceeds to step Y13 to set the parameter "CCNT" to numerical value "4" and subsequently proceeds to step Y14 to decrement the data indicative of the data length as stored in the data counter. The microprocessor 166 then detects at step Y15 whether or not all the data has been received by the subsidiary system control unit and, if the answer for the step Y15 is given in the negative, the microprocessor 166 reverts directly to the input data process control subroutine program Q08 described with reference to FIGS. 37A and 37B. On the other hand, if the answer for the step Y15 is given in the affirmative, then the microprocessor 166 proceeds to the step Y16 to reset the parameter "CCNT" to numerical value "0" and set to logic value "1" the data receipt report flag $F_{RR}$ contained in the data now stored in the local mode map 172. The microprocessor 166 then reverts directly to the input data process control subroutine program Q08 described with reference to FIGS. 37A and 37B.

Figure 41:
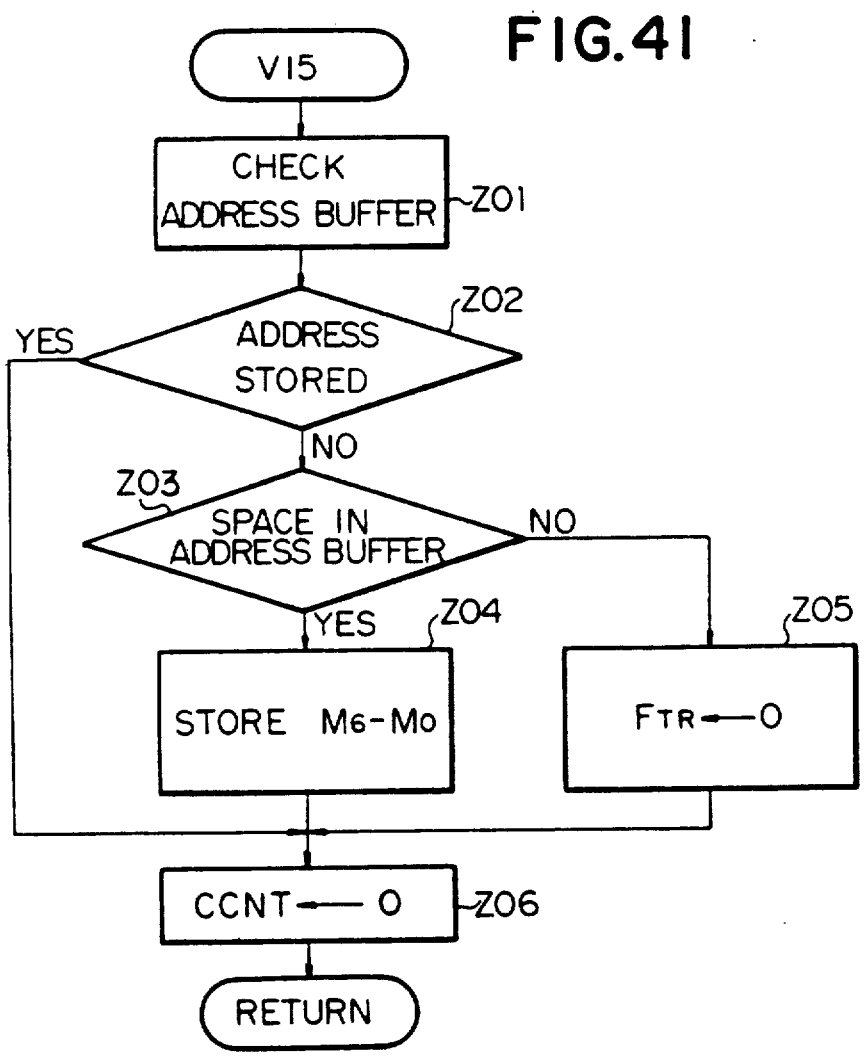
FIG. 41 is a flowchart showing the details of the mode request frame process control subroutine program included in the routine program illustrated in FIGS. 37A and 37B.

FIG. 41 is a flowchart showing the details of the mode request frame process subroutine program V15 included in the input data process control subroutine program Q08 described with reference to FIGS. 37A and 37B.

The mode request frame process subroutine program V15 starts with a step Z01 at which the microprocessor 166 checks the content of the address buffer 212 in search for the map address $M_6$ to $M_0$ contained in the first data character DC-1 in the frame received. If it is found at step Z02 that the map address $M_6$ to $M_0$ is stored in the address buffer 212 and accordingly the answer for the step Z02 is given in the affirmative, the microprocessor 166 jumps over steps Z03 and Z04 or steps Z03 and Z05 and proceeds to step Z06 to reset the parameter "CCNT" to numerical value "0" and thereafter returns to the input data process control subroutine program Q08 described with reference to FIGS. 37A and 37B.

On the other hand, if it is found at the step Z02 that the map address $M_6$ to $M_0$ contained in the first data character DC-1 in the frame received is not stored in the address buffer 212 and accordingly the answer for the step Z02 is given in the negative, then the microprocessor 166 proceeds to step Z03 to check if there is a free memory space available in the address buffer 212 of the subsidiary system control unit. If it is found at this step Z03 that there is a free memory space available in the address buffer 212 and accordingly the answer for the step Z03 is given in the affirmative, the microprocessor 166 proceeds to step Z04 to store into the address buffer 212 the map address $M_6$ to $M_0$ contained in the first data character DC-1 in the frame received and thereafter proceeds to the step Z06. However, if it is found at the step Z03 that there currently is no free memory space available in the address buffer 212, then the microprocessor 166 proceeds to step Z05 to reset to logic value "0" the data transmission request flag $F_{TR}$ in the data designated by the map address $M_6$ to $M_0$ contained in the first data character DC-1 in the frame received and thereafter proceeds to the step Z06. As described above, the parameter "CCNT" is reset to numerical value "0" and thereafter the microprocessor 166 returns to the input data process control subroutine program Q08 described with reference to FIGS. 37A and 37B.

Turning back to the main routine program illustrated in FIGS. 33A and 33B, the microprocessor 166 which has returned from the data transmission request subroutine program R09 confirms at step R10 that the flag "SYSWAIT" is reset to logic value "0" indicating that the initialization of the microprocessor 166 is complete. The flag "SYSWAIT" is reset to logic value "0" through execution of the step S14 in the macrosystem interface monitor subroutine program R08 described with reference to FIGS. 34A and 34B and is, for this reason, set at logic value "1" if the initialization of the subsidiary system control unit is still incomplete. In this instance, the answer for the step R10 is given in the negative so that the microprocessor 166 returns to the macrosystem interface monitor subroutine program R08 to repeat the subroutine program R08 and the data transmission request subroutine program R09.

If the initialization of the subsidiary system control unit is complete so that the answer for the step R10 is given in the affirmative, the microprocessor 166 further checks the flag "LOOPF" at step R11 to confirm whether or not the main loop timing is reached at which a job is to be performed in the subsidiary system control unit. When it is confirmed from the flag "LOOPF" that such a timing has not been reached, the microprocessor 166 further reverts to the macrosystem interface monitor subroutine program R08 and repeats the loop composed of the subroutine programs R08 and R09 and decision steps R10 and R11 until the answer for step R11 turns affirmative. When it is thus confirmed at step R11 that the main loop timing is reached, then the microprocessor 166 executes step R12 to reset the flag "LOOPF" to logic value "0" for future execution of the job control subroutine program Q05. As has been noted, the job control subroutine program Q05 consists of a plurality of stages "JOB1" to "JOBn" which are to be executed in predetermined cycles as the main routine program for the subsidiary system control unit is in progress. Upon termination of the job control subroutine program Q05, the microprocessor 166 recycles to the macrosystem interface monitor subroutine program R08 and repeats the loop composed of the subroutine programs R08 and R09, steps R10 to R12 and job control subroutine program Q05.

Figure 42:
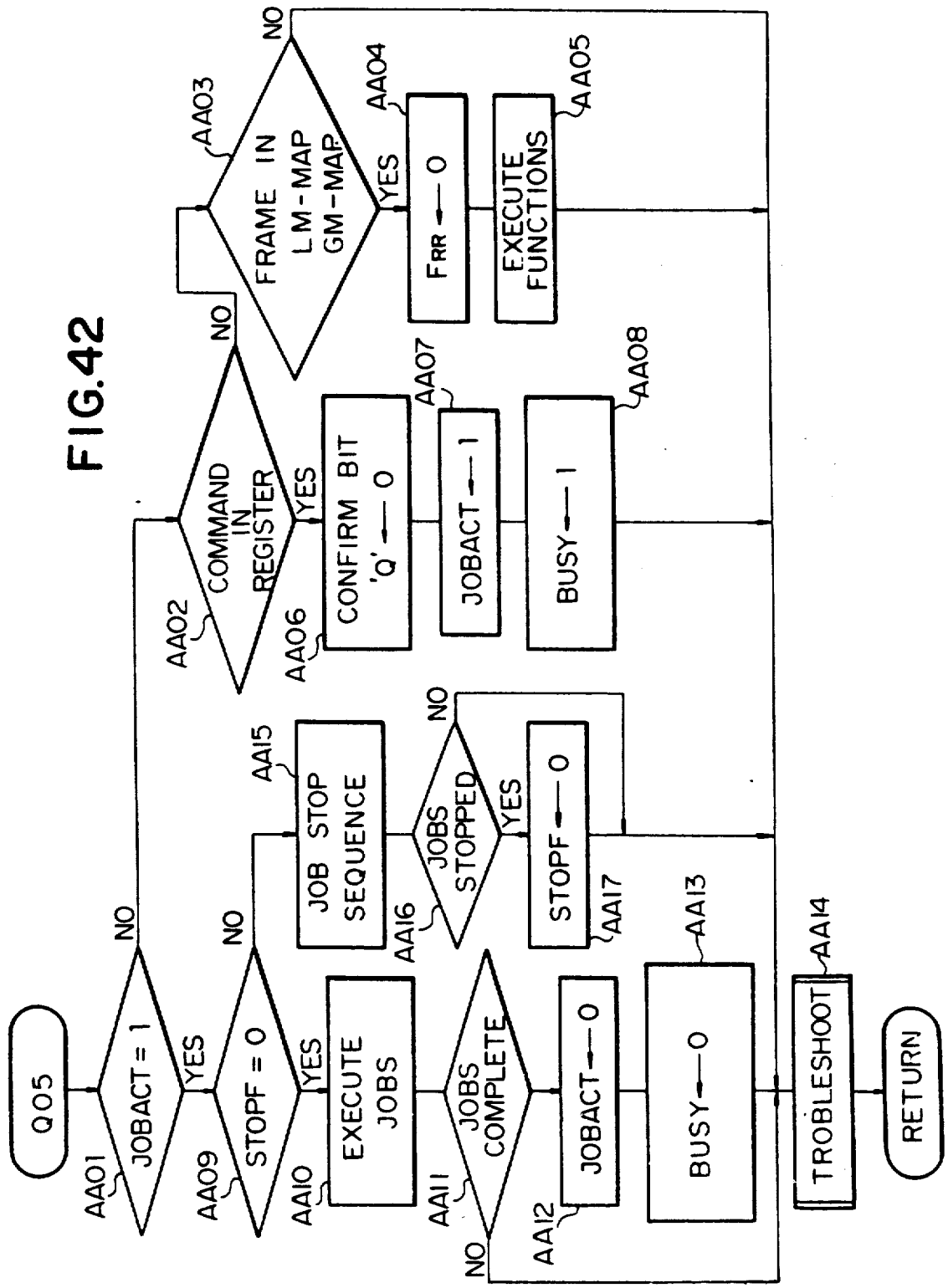
FIG. 42 is a flowchart showing the details of the job control timer control subroutine program included in the timer interrupt routine program illustrated in FIG. 32B.

FIG. 42 is a flowchart showing the details of the job control subroutine program Q05 included in the main routine program described with reference to FIG. 32A.

The job control subroutine program Q05 starts with a step AA01 to check if the flag "JOBACT" is set at logic value "1" indicating that the subsidiary system control unit under consideration is withdrawn from a stand-by state. The flag "JOBACT" is to be set to logic value "1" through execution of step AA07 and is at logic value "0" at an incipient stage after execution of the subroutine program Q05 is started. The answer for the step AA01 being thus is given in the negative, the microprocessor 166 proceeds to step AA02 to check if there is a command stored in the command register 168 of the subsidiary system control unit. If it is found at this step AA02 that there is no command stored in the command register 168 and accordingly the answer for the step AA02 is also given in the negative, the microprocessor 166 further proceeds to step AA03 to check if there is a frame received by the subsidiary system control unit and stored in the local mode map 172 or the global mode map 174. This decision is made through detection of the data receipt report flag $F_{RR}$. If it is found at this step AA03 that there is no frame currently stored in the local mode map 172 or the global mode map 174 and thus the answer for the step AA03 is also given in the negative, the microprocessor 166 proceeds to and executes a troubleshooting subroutine program AA14. The details of this troubleshooting subroutine program AA14 will be hereinafter described with reference to FIG. 43.

On the other hand, if it is found at the step AA03 that there is any frame currently stored in the local mode map 172 or the global mode map 174, then the microprocessor 166 proceeds to step AA04 to reset to logic value "0" the data receipt report flag $F_{RR}$ contained in the frame thus found to be stored in the local mode map 172 or the global mode map 174 of the subsidiary system control unit. Subsequently to the step AA04, the microprocessor 166 proceeds to step AA05 to perform functions required by the particular frame and thereafter proceeds to and executes the troubleshooting subroutine program AA14.

When a command is thereafter stored into the command register 168 of the subsidiary system control unit, the answer for the step AA02 turns affirmative so that the microprocessor 166 proceeds to step AA06 to reset to logic value "0" the data receipt confirmation bit "Q" included in the command fetched from the command register 168. Subsequently, the microprocessor 166 proceeds to step AA07 to set the flag "JOBACT" to logic value "1" and thereafter to step AA08 to set to logic value "1" the bit on the "busy" register contained in the local mode map 172. The microprocessor 166 then proceeds to and executes the troubleshooting subroutine program AA14.

With the flag "JOBACT" set to logic value "1" at step AA07, the answer for the step AA01 is given in the affirmative during the subsequent iteration of this subroutine program Q05. In this instance, the microprocessor 166 proceeds to step AA09 to check if the flag "STOPF" is reset at logic value "0". If it is found at this step AA09 that the flag "STOPF" is reset at logic value "0" and thus the answer for the step AA09 is given in the affirmative, the microprocessor 166 determines that it is not requested to put an end to the execution of the subroutine program Q08 and as such proceeds to step AA10 to perform various functions required by the data stored in the local and global mode maps 172 and 174 and the command stored in the command register 168. When it is determined at step AA11 that these functions are performed completely, the microprocessor 166 proceeds to step AA12 to reset the flag "JOBACT" to logic value "0" and further proceeds to step AA13 to reset to logic value "1" the bit on the "busy" register contained in the local mode map 172. The microprocessor 166 then proceeds to and executes the troubleshooting subroutine program AA14.

On the other hand, if it is found at step AA09 that the flag "STOPF" is set at logic value "1", then the microprocessor 166 determines that it is requested to put an end to the execution of the subroutine program Q08 and as such proceeds to step AA15 to perform a job stop sequence. When it is then determined at step AA16 that the execution of the subroutine program Q08 is brought to a stop, the microprocessor 166 proceeds to step AA17 to reset the flag "STOPF" to logic value "0" and thereafter proceeds to the trouble-shooting subroutine program AA14. If it is determined at the step AA16 that the execution of the subroutine program Q08 has not yet been brought to a stop, the microprocessor 166 jumps over the steps AA12 and AA13 and directly proceeds to the troubleshooting subroutine program AA14.

Figure 43:
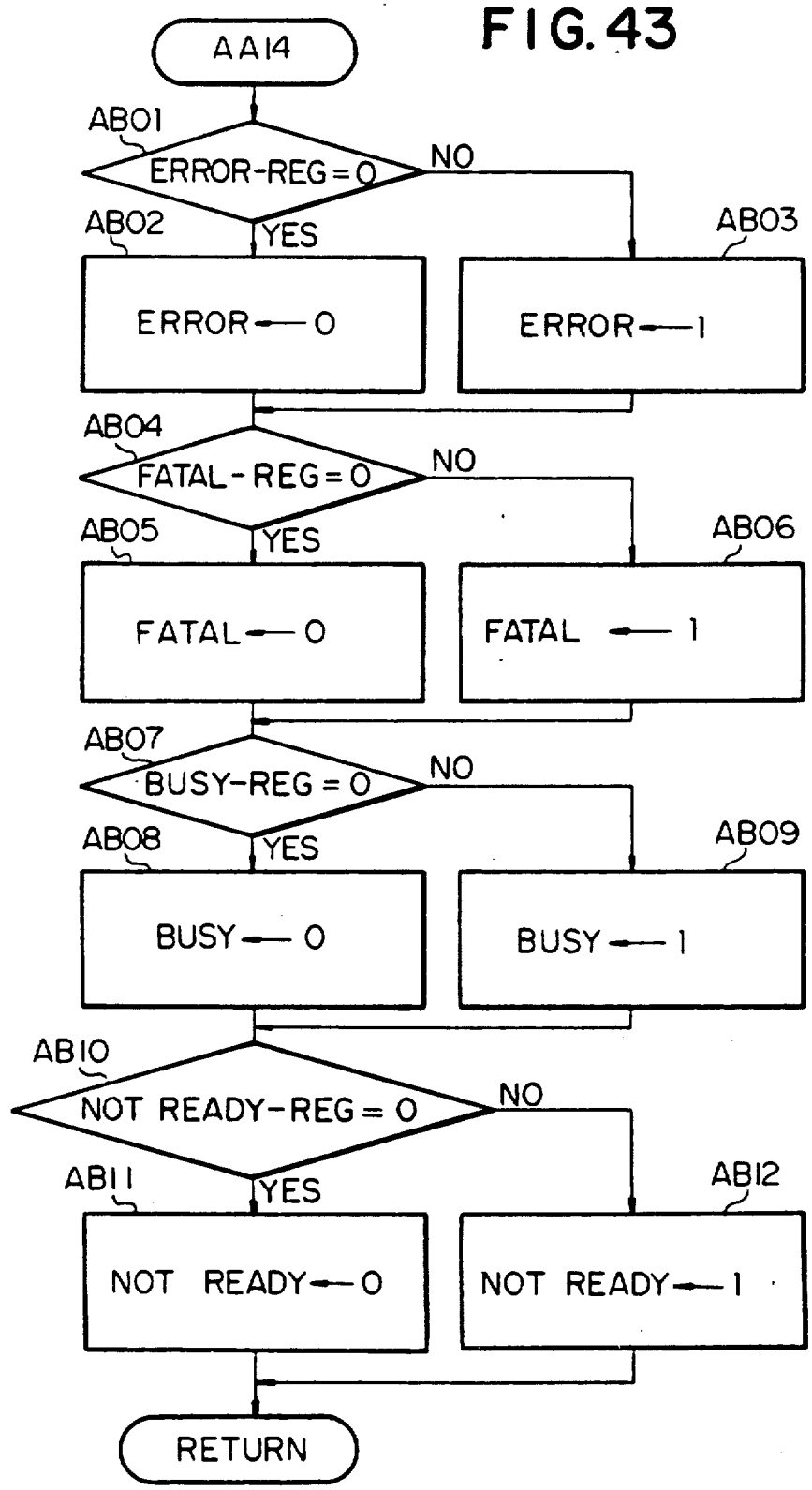
FIG. 43 is a flowchart showing the details of the troubleshooting subroutine program included in the job control timer control subroutine program illustrated in FIG. 42.

FIG. 43 is a flowchart showing the details of the troubleshooting subroutine program AA14 included in the job control routine program Q05 hereinbefore described with reference to FIG. 42.

The troubleshooting subroutine program AA14 starts with a decision step AB01 to check the "error" register section in the local mode map 172 of the subsidiary system control unit to see if the error bit stored in the register section is reset at logic value "0" indicating that there currently is no recoverable error detected in the functional module associated with the subsidiary system control unit. If it is found at this step AB01 that the error bit stored in the "error" register section of the local mode map 172 is set at logic value "0" and accordingly the answer for the step AB01 is given in the affirmative, the microprocessor 166 proceeds to step AB02 to reset the "ERROR" bit $G_1$ in the status register 170 to logic value "0". If however it is found at the step AB01 that the error bit stored in the "error" register section of the local mode map 172 is set at logic value "1" indicating that there currently is a recoverable error detected in the functional unit associated with the subsidiary system control unit, the microprocessor 166 proceeds to step AB03 to set the "ERROR" bit $G_1$ in the status register 170 to logic value "1".

Subsequently to step AB02 or step AB03, the microprocessor 166 proceeds to step AB04 to check the "fatal" register section in the local mode map 172 of the subsidiary system control unit to see if the bit stored in the register section is reset at logic value "0" indicating that there currently is no irrecoverable error detected in the functional module associated with the subsidiary system control unit. If it is found at this step AB04 that the fatal error bit stored in the "fatal" register section of the local mode map 172 is set at logic value "0" and accordingly the answer for the step AB04 is given in the affirmative, the microprocessor 166 proceeds to step AB05 to reset the "FATAL" bit $G_2$ in the status register 170 to logic value "0". If however it is found at the step AB04 that the fatal error bit stored in the "fatal" register section of the local mode map 172 is set at logic value "1" indicating that there currently is an irrecoverable error detected in the functional unit associated with the subsidiary system control unit, the microprocessor 166 proceeds to step AB06 to set the "FATAL" bit $G_2$ in the status register 170 to logic value "1".

Subsequently to step AB05 or step AB06, the microprocessor 166 proceeds to step AB07 to check the "busy" register section in the local mode map 172 of the subsidiary system control unit to see if the bit stored in the register section is reset at logic value "0" indicating that operation is not in progress to cope with a change in the command or the mode of operation to be executed. If it is found at this step AB07 that the busy bit stored in the "busy" register section of the local mode map 172 is set at logic value "0" and accordingly the answer for the step AB07 is given in the affirmative, the microprocessor 166 proceeds to step AB08 to reset the "BUSY" bit $G_4$ in the status register 170 to logic value "0". If however it is found at the step AB07 that the busy bit stored in the "busy" register section of the local mode map 172 is set at logic value "1" indicating that operation is currently in progress to cope with a change in the command or the mode of operation to be executed, the microprocessor 166 proceeds to step AB09 to set the "BUSY" bit $G_4$ in the status register 170 to logic value "1".

Subsequently to step AB08 or step AB09, the microprocessor 166 proceeds to step AB10 to check the "not ready" register section in the local mode map 172 of the subsidiary system control unit to see if the bit stored in the register section is reset at logic value "0" indicating that the initialization of the subsidiary system control unit is complete. If it is found at this step AB10 that the "not ready" bit stored in the "not ready" register section of the local mode map 172 is set at logic value "0" indicating that the initialization of the subsidiary system control unit is complete and accordingly the answer for the step AB10 is given in the affirmative, the microprocessor 166 proceeds to step AB11 to reset the "NOT READY" bit $G_5$ in the status register 170 to logic value "0". If however it is found at the step AB10 that the "not ready" bit stored in the "not ready" register section of the local mode map 172 is set at logic value "1" indicating that the initialization of the subsidiary system control unit is complete, the microprocessor 166 proceeds to step AB12 to set the "NOT READY" bit $G_5$ in the status register 170 to logic value "1". Upon termination of the step AB08 or step AB09, the microprocessor 166 returns to the job control subroutine program Q05 in the main routine program described with reference to FIG. 32A.

What is claimed is:

1. An image processing system having modes of operation including operating and stand-by modes of operation which are to be selectively put into effect, comprising
   a) a plurality of slave data processor units each of which is operative to execute a set of predetermined functions assigned thereto,
   b) a master data processor unit for controlling the operation of each of said slave data processor units, the master data processor unit being operative to output a data processing command requesting each of said slave data processor units to execute said predetermined functions assigned to the slave data processor unit and a communication control command predominant over the communication of data dictating the operation of each of said slave data processor units, and
   c) coupling means providing bidirectional connection between said master data processor unit and each of said slave data processor units for allowing transmission therethrough of said data processing command and said communication control command to each of said slave data processor units,
   said master data processor unit comprising
   b/1) state detecting means for detecting which of the slave data processor units is currently coupled to the master data processor units through said coupling means by confirming receipt of a reply from the slave data processor unit responsive to the communication control command,
   b/2) command delivery means through which, in an operating mode of operation of the image processing system, said data processing command or said communication control command is to be distributed through said coupling means exclusively to the particular slave data processor unit which is detected to the currently coupled to said master data processor unit, and
   b/3) activating means operative to activate said state detecting means during a stand-by mode of operation of the image processing system.

2. An image processing system as set forth in claim 1, in which the period of time of the standby mode of operation is inclusive of a period of time immediately subsequent to the time when the image processing system is powered on.

3. An image processing system as set forth in claim 2, in which said state detecting means instructs said command delivery means to deliver the communication control command requesting a recipient slave data processor unit to transmit a reply to the communication control command toward all of said slave data processor units and subsequently confirm the receipt of the reply for identifying the slave data processor units coupled to said master data processor unit.

* * * * *

UNITED STATES PATENT AND TRADEMARK OFFICE
CERTIFICATE OF CORRECTION

PATENT NO. : 5,191,648
DATED : March 2, 1993
INVENTOR(S) : Yoshikazu Ikenoue et al It is certified that error appears in the above-indentified patent and that said Letters Patent is hereby corrected as shown below:

On the title page, Item [54]: title of the invention should read:
--Image System Including A Master-Processor Which Used Communication Protocols For Detecting/Controlling The Connection Status And Operation Modes of Slave-Processors--.

Signed and Sealed this

Twenty-fifth Day of January, 1994

Attest:

BRUCE LEHMAN

*Attesting Officer*  *Commissioner of Patents and Trademarks*